United States Patent
Yu et al.

(10) Patent No.: US 12,448,434 B2
(45) Date of Patent: Oct. 21, 2025

(54) **ANTIBODIES SPECIFICALLY RECOGNIZING *PSEUDOMONAS* PcrV AND USES THEREOF**

(71) Applicant: Staidson (Beijing) Biopharmaceuticals Co., LTD., Beijing (CN)

(72) Inventors: Maorong Yu, Beijing (CN); Zhong Li, Beijing (CN); Chao Wang, Beijing (CN)

(73) Assignee: STAIDSON (BEIJING) BIOPHARMACEUTICALS CO., LTD., Beijing (CN)

( * ) Notice: Subject to any disclaimer, the term of this patent is extended or adjusted under 35 U.S.C. 154(b) by 937 days.

(21) Appl. No.: 17/625,724

(22) PCT Filed: Jul. 7, 2020

(86) PCT No.: PCT/CN2020/100592
§ 371 (c)(1),
(2) Date: Jan. 7, 2022

(87) PCT Pub. No.: WO2021/004446
PCT Pub. Date: Jan. 14, 2021

(65) Prior Publication Data
US 2022/0289830 A1  Sep. 15, 2022

(30) Foreign Application Priority Data
Jul. 9, 2019 (WO) ............... PCT/CN2019/095181

(51) Int. Cl.
| | | |
|---|---|---|
| C07K 16/12 | (2006.01) | |
| A61K 31/407 | (2006.01) | |
| A61K 31/496 | (2006.01) | |
| A61K 31/497 | (2006.01) | |
| A61K 31/7036 | (2006.01) | |
| A61K 39/00 | (2006.01) | |
| A61K 39/40 | (2006.01) | |
| A61P 31/04 | (2006.01) | |

(52) U.S. Cl.
CPC ........ *C07K 16/1214* (2013.01); *A61K 31/407* (2013.01); *A61K 31/496* (2013.01); *A61K 31/7036* (2013.01); *A61K 39/40* (2013.01); *A61P 31/04* (2018.01); *A61K 2039/505* (2013.01); *C07K 2317/21* (2013.01); *C07K 2317/33* (2013.01); *C07K 2317/34* (2013.01); *C07K 2317/52* (2013.01); *C07K 2317/622* (2013.01); *C07K 2317/76* (2013.01); *C07K 2317/92* (2013.01)

(58) Field of Classification Search
CPC ............ C07K 16/1214; C07K 2317/21; C07K 2317/33; C07K 2317/34; C07K 2317/52; C07K 2317/622; C07K 2317/76; C07K 2317/92; A61K 31/407; A61K 31/496; A61K 31/7036; A61K 39/40; A61K 2039/505; A61K 31/497; A61P 31/04
See application file for complete search history.

(56) References Cited

U.S. PATENT DOCUMENTS

| | | |
|---|---|---|
| 3,773,919 A | 11/1973 | Boswell |
| 4,816,567 A | 3/1989 | Cabilly |
| 5,229,275 A | 7/1993 | Goroff |
| 5,350,674 A | 9/1994 | Boenisch |
| 5,399,346 A | 3/1995 | Anderson |
| 5,500,362 A | 3/1996 | Robinson |
| 5,545,806 A | 8/1996 | Lonberg |
| 5,545,807 A | 8/1996 | Surani |
| 5,567,610 A | 10/1996 | Borrebaeck |
| 5,569,825 A | 10/1996 | Lonberg |
| 5,580,859 A | 12/1996 | Felgner |
| 5,585,362 A | 12/1996 | Wilson |
| 5,589,466 A | 12/1996 | Felgner |
| 5,591,669 A | 1/1997 | Krimpenfort et al. |
| 5,591,828 A | 1/1997 | Bosslet |
| 5,624,821 A | 4/1997 | Winter |
| 5,625,126 A | 4/1997 | Lonberg |
| 5,633,425 A | 5/1997 | Lonberg |
| 5,648,260 A | 7/1997 | Winter |
| 5,661,016 A | 8/1997 | Lonberg |
| 5,750,373 A | 5/1998 | Garrard |
| 5,821,337 A | 10/1998 | Carter |
| 6,013,605 A | 1/2000 | Rees |
| 6,194,551 B1 | 2/2001 | Idusogie |
| 6,326,193 B1 | 12/2001 | Liu |
| 6,551,795 B1 | 4/2003 | Rubenfield et al. |
| 6,602,684 B1 | 8/2003 | Umana |

(Continued)

FOREIGN PATENT DOCUMENTS

| | | |
|---|---|---|
| EP | 0404097 A2 | 12/1990 |
| WO | 199311161 A1 | 6/1993 |

(Continued)

OTHER PUBLICATIONS

Lynch, S.V. et al. (Jun. 1, 2010). "Polymorphism in the Pseudomonas aeruginosa Type III Secretion Protein, PcrV Implications for Anti-PcrV Immunotherapy," Microbial Pathogenesis 48(6):197-204, 17 pages.

(Continued)

*Primary Examiner* — Misook Yu
*Assistant Examiner* — James Lyle McLellan
(74) *Attorney, Agent, or Firm* — Meunier Carlin & Curfman LLC

(57) ABSTRACT

Provided are antibodies including antigen-binding fragment thereof that specifically recognizing *Pseudomonas* PcrV. Also provided are methods of making and using these antibodies.

12 Claims, 17 Drawing Sheets
Specification includes a Sequence Listing.

(56) References Cited

U.S. PATENT DOCUMENTS

| | | |
|---|---|---|
| 6,737,056 B1 | 5/2004 | Presta |
| 7,332,581 B2 | 2/2008 | Presta |
| 7,371,826 B2 | 5/2008 | Presta |
| 7,521,541 B2 | 4/2009 | Eigenbrot |
| 8,313,913 B2 | 11/2012 | Nakamura |
| 8,679,492 B2 | 3/2014 | Blein et al. |
| 8,945,862 B2 | 2/2015 | Wu et al. |
| 2002/0164328 A1 | 11/2002 | Shinkawa |
| 2003/0115614 A1 | 6/2003 | Kanda |
| 2003/0157108 A1 | 8/2003 | Presta |
| 2004/0093621 A1 | 5/2004 | Shitara |
| 2004/0109865 A1 | 6/2004 | Niwa |
| 2004/0110282 A1 | 6/2004 | Kanda |
| 2004/0110704 A1 | 6/2004 | Yamane |
| 2004/0132140 A1 | 7/2004 | Satoh |
| 2005/0014934 A1 | 1/2005 | Hinton |
| 2005/0031613 A1 | 2/2005 | Nakamura |
| 2005/0079574 A1 | 4/2005 | Bond |
| 2005/0119455 A1 | 6/2005 | Fuh |
| 2005/0123546 A1 | 6/2005 | Umana |
| 2005/0266000 A1 | 12/2005 | Bond |
| 2007/0117126 A1 | 5/2007 | Sidhu |
| 2007/0134759 A1 | 6/2007 | Nishiya |
| 2007/0160598 A1 | 7/2007 | Dennis |
| 2007/0237764 A1 | 10/2007 | Birtalan |
| 2007/0292936 A1 | 12/2007 | Barthelemy |
| 2009/0002360 A1 | 1/2009 | Chen |
| 2012/0093808 A1 | 4/2012 | Yamano et al. |

FOREIGN PATENT DOCUMENTS

| | | |
|---|---|---|
| WO | 199429351 A2 | 12/1994 |
| WO | 199429351 A3 | 2/1995 |
| WO | 199704801 A1 | 2/1997 |
| WO | 1997017852 A1 | 5/1997 |
| WO | 199730087 A1 | 8/1997 |
| WO | 199856418 A1 | 12/1998 |
| WO | 199858964 A1 | 12/1998 |
| WO | 199922764 A1 | 5/1999 |
| WO | 199951642 A1 | 10/1999 |
| WO | 200042072 A2 | 7/2000 |
| WO | 200061739 A1 | 10/2000 |
| WO | 200042072 A3 | 11/2000 |
| WO | 2001029058 A1 | 4/2001 |
| WO | 2001029246 A1 | 4/2001 |
| WO | 200196584 A2 | 12/2001 |
| WO | 2002031140 A1 | 4/2002 |
| WO | 2002064161 A2 | 8/2002 |
| WO | 2002064161 A3 | 12/2002 |
| WO | 200196584 A3 | 1/2003 |
| WO | 2003011878 A2 | 2/2003 |
| WO | 2003048731 A2 | 6/2003 |
| WO | 2003084570 A1 | 10/2003 |
| WO | 2003085107 A1 | 10/2003 |
| WO | 2003011878 A3 | 11/2003 |
| WO | 2003048731 A3 | 1/2004 |
| WO | 2004056312 A2 | 7/2004 |
| WO | 2005035586 A1 | 4/2005 |
| WO | 2005035778 A1 | 4/2005 |
| WO | 2004056312 A3 | 5/2005 |
| WO | 2005053742 A1 | 6/2005 |
| WO | 2003085119 A1 | 8/2005 |
| WO | 2005100402 A1 | 10/2005 |
| WO | 2006029879 A2 | 3/2006 |
| WO | 2006029879 A3 | 9/2006 |
| WO | 2008077546 A1 | 7/2008 |
| WO | 2013070615 A1 | 5/2013 |
| WO | 2013128031 A1 | 9/2013 |
| WO | 2014074528 A2 | 5/2014 |
| WO | 2014074528 A3 | 7/2014 |

OTHER PUBLICATIONS

Rudikoff, S. et al. (Mar. 1, 1982). "Single Amino Acid Substitution Altering Antigen-Binding Specificity," Proc. Natl. Acad. Sci. 79:1979-1983.

Abhinandan, K.R et al. (Aug. 2008, e-pub. Jul. 9, 2008). "Analysis and Improvements To Kabat and Structurally Correct Numbering Of Antibody Variable Domain," Molecular Immunology 45(14):3832-3839.

Adolf-Bryfogle, J. et al. (2015, e-pub. Nov. 11, 2014). "PyIgClassify: A Database of Antibody CDR Structural Classifications," Nucleic Acids Res. 43:D432-D438.

Al-Lazikani, B. et al. (1997). "Standard Conformations for the Canonical Structures of Immunoglobulins," J. Mol. Biol. 273:927-948.

Boerner, P. et al. (Jul. 1, 1991). "Production of a Antigen-Specific Human Monoclonal Antibodies from In Vitro-Primed Human Splenocytes," J. Immunol. 147(1):86-95.

Brown, M. et al. (Jun. 5, 1987). "lac Repressor Can Regulate Expression From a Hybrid SV40 Early Promoter Containing a lac Operator in Animal Cells," Cell 49:603-612.

Brüggemann, M. et al. (1993) "Designer Mice: The Production of Human Antibody Repertoires in Transgenic Animals," Year in Immunol. vol. 7:33-40.

Brüggemann, M. et al. (Nov. 1, 1987). "Comparison of the Effector Functions of Human Immunoglobulins Using a Matched Set of Chimeric Antibodies," J. Exp. Med. 166:1351-1361.

Burton, D.R. (1985). "Immunoglobulin G: Functional Sites," Molec. Immunol. 22(3):161-206.

Capel, P.J. et al. (Feb. 1994). "Heterogeneity of Human IgG Fc Receptors," Immunomethods 4(1):25-34.

Chothia, C. et al. (1987). "Canonical Structures for the Hypervariable Regions of Immunoglobulins," J. Mol. Biol. 196:901-917.

Chowdhury, P.S. (2008). "Engineering Hot Spots for Affinity Enhancement of Antibodies," Methods Mol. Biol. 207:179-196.

Clackson, T. et al. (Aug. 15, 1991). "Making Antibody Fragments Using Phage Display Libraries," Nature 352:624-628.

Clynes, R. et al. (Jan. 1998). "Fc Receptors are Required in Passive and Active Immunity to Melanoma," Proc. Natl. Acad. Sci. USA 95:652-656.

Cole et al. (1985). "The EBV-Hybridoma Technique And Its Application To Human Lung Cancer," Monolclonal Antibodies and Cancer Therapy 27:77-96.

Cragg, M.S. et al. (Apr. 1, 2004). "Antibody Specificity Controls In Vivo Effector Mechanisms Of Anti-CD20 Reagents," Blood 103(7):2738-2743.

Cragg, M.S. et al. (Feb. 1, 2003). "Complement-Mediated Lysis By Anti-CD20 Mab Correlates With Segregation Into Lipid Rafts," Blood 101(3):1045-1052.

Cunningham, B.C. et al. (Jun. 2, 1989). "High-Resolution Epitope Mapping of hGH-Receptor Interactions by Alanine-Scanning Mutagenesis," Science 244:1081-1085.

Daeron, M. (1997). "Fc Receptor Biology," Annu. Rev. Immunol. 15:203-234.

Datta, R. et al. (Nov. 1992). "Ionizing Radiation Activates Transcription of the EGR1 Gene Via CArG Elements," Proc. Natl. Acad. Sci. USA 89(1):10149-10153.

De Haas, M. et al. (1995). Fcγ Receptors of Phagocytes, J. Lab. Clin. Med. 126(4):330-341.

De Tavernier, E. et al. (Jul. 15, 2016, e-pub. May 20, 2016). "High Throughput Combinatorial Formatting of PcrV Nanobodies for Efficient Potency Improvement," The Journal of Biological Chemistry 291(29):15243-15255.

Digiandomenico, A. et al. (Mar. 13, 2007). "Intranasal Immunization with Heterologously Expressed Polysaccharide Protects Against Multiple Pseudomonas aeruginosa Infections," Proc. Natl. Acad. Sci. U.S.A. 104 (11):4624-4629.

Digiandomenico, A. et al. (Nov. 12, 2014). "A Multifunctional Bispecific Antibody Protects Against Pseudomonas aeruginosa," Sci. Transl. Med. 6(262):262ra155, 13 pages.

Duncan, A.R. et al. (Apr. 21, 1988). "The Binding Site for C1q on IgG," Nature 322:738-740.

Edgar, R.C. (2004). "MUSCLE: Multiple Sequence Alignment With High Accuracy and High Throughput," Nucleic Acids Research 32(5):1792-1797.

(56) References Cited

OTHER PUBLICATIONS

Edgar, R.C. (Aug. 19, 2004, e-pub. Mar. 19, 2004). "MUSCLE: A Multiple Sequence Alignment Method with Reduced Time and Space Complexity," BMC Bioinformatics 5(1):113, 19 pages.

Ehrenmann, F. et al. (Jan. 2010, e-pub. Nov. 9, 2009). "IMGT/3Dstructure-DB and IMGT/DomainGapAlign: A Database and a Tool For Immunoglobulins or Antibodies, T Cell Receptors, MHC, IgSF and MhcSF," Nucleic Acids Res. 38:D301-D307.

Faure, K. et al. (Aug. 13, 2003). "Effects of Monoclonal Anti-PcrV Antibody on Pseudomonas aeruginosa-Induced Acute Lung Injury in a Rat Model," J. Immune. Based. Therapies and Vaccines 1(2):1-9.

Fellouse, F.A. et al. (Aug. 24, 2004). "Synthetic Antibodies from a Four-Amino-Acid Code: A Dominant Role for Tyrosine in Antigen Recognition," Proc. Natl. Acad. Sci. USA 101(34):12467-12472.

Ferrara, C. et al. (2006, e-pub. Jan. 24, 2006). "Modulation of Therapeutic Antibody Effector Functions by Glycosylation Engineering: Influence of Golgi Enzyme Localization Domain and Co-Expression of Heterologous β1,4-N-Acetylglucosaminyltransferase III and Golgi α-Mannosidase II," Biotechnology and Bioengineering 93(5):851-861.

Fishwild, D.M. et al. (Jul. 1996). "High-Avidity Human IgGκ Monoclonal Antibodies from a Novel Strain of Minilocus Transgenic Mice," Nature Biotechnol. 14:845-851.

Frank, D.W. et al. (2002). "Generation and Characterization of a Protective Monoclonal Antibody to Pseudomonas aeruginosa PerV," J. Infect. Disease 186:64-73.

Gazzano-Santoro, H. et al. (Mar. 28, 1997). "A Non-Radioactive Complement-Dependent Cytotoxicity Assay for Anti-CD20 Monoclonal Antibody," J. Immunol. Methods 202:163-171.

Ghetie, V. et al. (2000). "Multiple Roles For The Major Histocompatibility Complex Class I-Related Receptor FCRN," Annu. Rev. Immunol. 18:739-766.

Gingrich, J.R. et al. (1998). "Inducible Gene Expression in the Nervous System of Transgenic Mice," Annual Rev. Neurosci. 21:377-405.

Gossen, M. et al. (1993). "Anhydrotetracycline, A Novel Effector For Tetracycline Controlled Gene Expression Systems in Eukaryotic Cells," Nucleic Acids Research 21(18):4411-4412.

Griffiths, A.D. et al. (1993). "Human Anti-Self Antibodies with High Specificity from Phage Display Libraries," EMBO J. 12(2):725-734.

Guyer, R.L. et al. (Aug. 1976). "Immunoglobulin Binding By Mouse Intestinal Epithelial Cell Receptors," J. Immunol. 117(2):587-593.

Harlow, E. et al. eds. (1988). "Using Antibodies: A Laboratory Manual," Cold Spring Harbor Laboratory Press, pp. iv-ix, (Table of Contents Only), 9 pages.

Hellstrom, I. et al. (Mar. 1985). "Strong Antitumor Activities of IgG3 Antibodies to a Human Melanoma-associated Ganglioside," Proc. Natl. Acad. Sci. USA 82:1499-1502.

Hellstrom, I. et al. (Sep. 1986). "Antitumor Effects of L6, an IgG2a Antibody That Reacts With Most Human Carcinomas," Proc. Natl. Acad. Sci. USA 83:7059-7063.

Hoet, R.M. et al. (Mar. 2005, e-pub. Feb. 20, 2005). "Generation Of High-Affinity Human Antibodies By Combining Donor-Derived and Synthetic Complementarity-Determining-Region Diversity," Nat Biotechnol, 23 (3):344-348.

Hollinger, P. et al. (Jul. 1993). "Diabodies: Small Bivalent And Bispecific Antibody Fragments," Proc. Natl. Acad. Sci. USA 90:6444-6448.

Honegger, A. et al. (2001). "Yet Another Numbering Scheme for Immunoglobulin Variable Domains: An Automatic Modeling and Analysis Tool," J Mol Biol. 309(3):657-670.

Hoogenboom, H.R. et al. (2001). "Overview of Antibody Phage-Display Technology and Its Applications," Chapter 1 in Methods in Molecular Biology, O'Brien et al. ed., Humana Press, Totowa, NJ, 178:1-37.

Hoogenboom, H.R. et al. (Sep. 20, 1992). "By-Passing Immunisation Human Antibodies From Synthetic Repertoires Of Germline VH Gene Segments Rearranged In Vitro," J. Mol. Biol. 227(2):381-388.

Huang, J. et al. (Nov. 15, 2012). "Broad and Potent Neutralization of HIV-1 by a gp41-Specific Human Antibody," Nature 491(7424):406-412. 22 pages.

Hötzel, I. (2012, e-pub. Nov. 1, 2012). "A Strategy for Risk Mitigation of Antibodies with Fast Clearance," mAbs 4(6):753-760.

Idusogie, E.E. et al. (2000). "Mapping of the C1q Binding Site on Rituxan, a Chimeric Antibody With a Human IgG1 Fc," J. Immunol. 164:4178-4184.

Imamura, Y. et al. (2007). "Effect of Anti-PcrV Antibody in a Murine Chronic Airway Pseudomonas aeruginosa Infection Model," Eur. Respir. J. 29:965-968.

International Preliminary Report on Patentability, issued Jan. 11, 2022, for PCT Application No. PCT/CN2020/100592, filed Jul. 7, 2020, 5 pages.

International Search Report and Written Opinion, mailed Oct. 10, 2020, for PCT Application No. PCT/CN2020/100592, filed Jul. 7, 2020, 12 pages.

Jakobovits, A. et al. (Mar. 18, 1993). "Germ-Line Transmission And Expression Of A Human-Derived Yeast Artificial Chromosome," Nature 362(6417):255-258.

Jakobovits, A. et al. (Mar. 1993). "Analysis of Homozygous Mutant Chimeric Mice: Deletion of the Immunoglobulin Heavy-Chain Joining Region Blocks B-Cell Development and Antibody Production," Proc. Natl. Acad. Sci. USA 90 (6):2551-2555.

Jones, P.T. et al. (May 29, 1986). "Replacing The Complementarity-Determining Regions In A Human Antibody With Those From A Mouse," Nature 321:522-525.

Kabat E.A. et al. (1991). "Sequences of Proteins of Immunological Interest, 5th Ed. Public Health Service," National Institutes of Health, Bethesda, MD. pp. iii-xix. (Table of Contents Only).

Kabat, E.A. et al. (Oct. 10, 1977). "Unusual Distributions Of Amino Acids In Complementarity-Determining (Hypervariable) Segments Of Heavy And Light Chains Of Immunoglobulins And Their Possible Roles In Specificity Of Antibody-Combining Sites," J. Biol. Chem. 252(19):6609-6616.

Kam, N.W.S. et al. (Aug. 16, 2005). "Carbon Nanotubes as Multifunctional Biological Transporters and Near-Infrared Agents for Selective Cancer Cell Destruction," PNAS 102(33):11600-11605, 6 pages.

Kanda, Y. et al. (Jul. 5, 2006, e-pub. Apr. 11, 2006). "Comparison of Cell Line for Stable Production of Fucose-Negative Antibodies with Enhanced ADCC," Biotechnol. Bioeng. 94(4):680-688.

Lee, C.V. et al. (2004). "Bivalent Antibody Phage Display Mimics Natural Immunoglobulin," .J. Immunol. Methods 284 (1-2):119-132.

Lee, C.V. et al. (2004). "High-Affinity Human Antibodies From Phage-Displayed Synthetic Fab Libraries With A Single Framework Scaffold," J. Mol. Biol. 340:1073-1093.

Lefranc, M.P. et al. (Jan. 2003). "IMGT Unique Numbering For Immunoglobulin And T Cell Receptor Variable Domains And Ig Superfamily V-Like Domains," Dev. Comp. Immunol. 27(1):55-77.

Lonberg, N. et al. (Apr. 28, 1994). "Antigen-Specific Human Antibodies From Mice Comprising Four Distinct Genetic Modifications," Nature 368:856-859.

Lonberg, N. et al. (1995, e-pub. Jul. 10, 2009). "Human Antibodies From Transgenic Mice," Int. Rev. Immunol. 13 (1):65-93.

Maccallum, R.M. et al. (1996). "Antibody-Antigen Interactions: Contact Analysis and Binding Site Topography," J. Mol. Biol. 262:732-745.

Mader, S. et al. (Jun. 1993). "A Steroid-Inducible Promoter for the Controlled Overexpression of Cloned Genes in Eukaryotic Cells." Proc. Natl. Acad. Sci. USA 90:5603-5607.

Manome, Y. et al. (Oct. 1993). "Coinduction of c-jun Gene Expression and Internucleosomal DNA Fragmentation by Ionizing Radiation," Biochemistry 32(40):10607-10613.

Marks, J.D. et al. (1991). "By-Passing Immunization Human Antibodies from V-gene Libraries Displayed on Phage," J. Mol. Biol. 222:581-597.

(56) References Cited

OTHER PUBLICATIONS

Marks, J.D. et al. (2004) "Selection of Human Antibodies from Phage Display Libraries," Chapter 8 in Methods in Molecular Biology, Lo, B.K.C. (ed.), Humana Press Inc., Totowa, NJ, 248:161-176, 29 pages.

Marks, J.D. et al. (Jul. 1992). "By-Passing Immunization: Building High Affinity Human Antibodies by Chain Shuffling," Bio/Technology 10:779-783.

Mccafferty, J. et al. (Dec. 6, 1990). "Phage Antibodies: Filamentous Phage Displaying Antibody Variable Domains," Nature 348:552-554.

Moore, G.L. et al. (2010). "Engineered Fc Variant Antibodies With Enhanced Ability to Recruit Complement and Mediate Effector Functions," Landes Bioscience 2(2):181-189.

Morris, G.E. (1996). "Epitope Mapping Protocols," Methods in Molecular Biology 66:1-12.

Morrison, S.C. et al. (Nov. 1984). "Chimeric Human Antibody Molecules: Mouse Antigen-Binding Domains With Human Constant Region Domains," Proc. Natl. Acad. Sci. USA 81:6851-6855.

Morrison, S.L. (Apr. 28, 1994). "Success in Specification," Nature 368:812-813.

Munson, P.J. et al. (1980). "Ligand: A Versatile Computerized Approach for Characterization of Ligand-Binding Systems," Analy. Biochem. 107:220-239.

Neuberger, M. (Jul. 1996) "Generating High-Avidity Human Mabs in Mice," Nature Biotechnology 14:826, 1 page.

Okazaki, A. et al. (Mar. 5, 2004). "Fucose Depletion From Human IgG1 Oligosaccharide Enhances Binding Enthalpy And Association Rate Between IgG1 and FcγRIIIa," J. Mol. Biol. 336(5):1239-1249.

Petkova, S.B. et al. (2006, e-pub. Oct. 31, 2006). "Enhanced Half-Life of Genetically Engineered Human IgG1 Antibodies in a Humanized FcRn Mouse Model: Potential Application in Humorally Mediated Autoimmune Disease," Int'l. Immunol. 18(12):1759-1769.

Plückthun, A. (1994). "Antibodies from *Escherichia coli*," in Chapter 11 The Pharmacology of Monoclonal Antibodies, vol. 113, Rosenburg and Moore eds., Springer-Verlag, New York, pp. 269-315, 48 pages.

Presta, L.G. (1992). "Antibody Engineering," Current Opinion in Structural Biology 2:593-596.

Ravetch, J.V. et al. (1991). "Fc Receptors," Annu. Rev. Immunol. 9:457-492.

Remington's Pharmaceutical Sciences. (1980). 16th edition, Osol, A. Ed, pp. 1-2, (Table of Contents Only).

Riechmann, L. et al. (Mar. 1988). "Reshaping Human Antibodies for Therapy," Nature 332:323-329.

Ripka, J. et al. (Sep. 1986). "Two Chinese Hamster Ovary Glycosylation Mutants Affected in the Conversion of GDP-Mannose to GDP-Fucose," Arch Biochem Biophys. 249(2):533-545.

Sakai, S. et al. (1994). "Characterization of Plasma and Prolactin Receptor in Lactating Intracellular Membrane Mouse Mammary Cells," J. Immunol. 41(3):249-256.

Sawa, T. et al. (Apr. 1999). Active and Passive Immunization with the Pseudomonas V Antigen Protects Against Type III Intoxication and Lung Injury, Nature Medicine 5(4):392-398.

Shields, R.L. et al. (Mar. 2, 2001). "High Resolution Mapping of the Binding Site on Human IgG1 for FcγRI, FcγRII. FcγRIII, and FcRn and Design of IgG1 Variants With Improved Binding to the FcγR," J. Biol.Chem. 276(9):6591-6604.

Shime, N. et al. (2001). "Therapeutic Administration of Anti-PcrV F(ab')2 in Sepsis Associated with Pseudomonas aeruginosa," J. Immunol. 167:5880-5886.

Shoji-Hosaka, E. et al. (2006). "Enhanced Fc-Dependent Cellular Cytotoxicity of Fc Fusion Proteins Derived from TNF Receptor II and LFA-3 by Fucose Removal from Asn-Linked Oligosaccharides," J. Biochem. 140(6):777-783.

Sidhu, S.S. et al. (2004). "Phage-Displayed Antibody Libraries of Synthetic Heavy Chain Complementarity Determining Regions," J. Mol. Biol. 338(2):299-310.

Spencer, D. M. et al. (Nov. 12, 1993). "Controlling Signal Transduction with Synthetic Ligands," Science 262 (5136):1019-1024.

Ui-Tei, K. et al. (2000). "Sensitive Assay of RNA Interference in *Drosophila* and Chinese Hamster Cultured Cells Using Firefly Luciferase Gene As Target," FEBS Letters 479:79-82.

Verhoeyen, M. et al. (Mar. 25, 1988). "Reshaping Human Antibodies: Grafting An Antilysozyme Activity," Science 239(4857):1534-1536.

Warrener, P. et al. (Aug. 2014, e-pub. May 19, 2014). "A Novel Anti-PcrV Antibody Providing Enhanced Protection Against Pseudomonas aeruginosa in Multiple Animal Infection Models," Antimicrob. Agents Chemother. 58 (8):4384-4391.

Wright, A. et al. (Jan. 1997). "Effect of Glycosylation on Antibody Function: Implications for Genetic Engineering," Trends Biotech. 15:26-32.

Yahr, T. L. et al. (Nov. 1997). "Identification of Type III Secreted Products of the Pseudomonas aeruginosa Exoenzyme S Regulon," J. Bacterial. 179(22):7165-7168.

Yamane-Ohnuki, N. et al. (Sep. 5, 2004, e-pub Aug. 6, 2004). "Establishment Of FUT8 Knockout Chinese Hamster Ovary Cells: An Ideal Host Cell Line For Producing Completely Defucosylated Antibodies With Enhanced Antibody-Dependent Cellular Cytotoxicity," Biotechnology and Bioengineering 87(5):614-622.

SEQUENCE LISTING

```
<160> NUMBER OF SEQ ID NOS: 74

<210> SEQ ID NO 1
<211> LENGTH: 5
<212> TYPE: PRT
<213> ORGANISM: Artificial Sequence
<220> FEATURE:
<223> OTHER INFORMATION: Synthetic Construct

<400> SEQUENCE: 1

Asp Tyr Pro Met Ser
1               5

<210> SEQ ID NO 2
<211> LENGTH: 5
<212> TYPE: PRT
<213> ORGANISM: Artificial Sequence
<220> FEATURE:
<223> OTHER INFORMATION: Synthetic Construct

<400> SEQUENCE: 2

Ser Tyr Pro Met Ser
1               5

<210> SEQ ID NO 3
<211> LENGTH: 5
<212> TYPE: PRT
<213> ORGANISM: Artificial Sequence
<220> FEATURE:
<223> OTHER INFORMATION: Synthetic Construct

<400> SEQUENCE: 3

Asp Asn His Met Ser
1               5

<210> SEQ ID NO 4
<211> LENGTH: 5
<212> TYPE: PRT
<213> ORGANISM: Artificial Sequence
<220> FEATURE:
```

```
<223> OTHER INFORMATION: Synthetic Construct

<400> SEQUENCE: 4

Asp Tyr Ser Met Ser
1               5

<210> SEQ ID NO 5
<211> LENGTH: 5
<212> TYPE: PRT
<213> ORGANISM: Artificial Sequence
<220> FEATURE:
<223> OTHER INFORMATION: Synthetic Construct

<400> SEQUENCE: 5

Ser Tyr His Met Ser
1               5

<210> SEQ ID NO 6
<211> LENGTH: 5
<212> TYPE: PRT
<213> ORGANISM: Artificial Sequence
<220> FEATURE:
<223> OTHER INFORMATION: Synthetic Construct

<400> SEQUENCE: 6

Ser Asn His Met Ser
1               5

<210> SEQ ID NO 7
<211> LENGTH: 5
<212> TYPE: PRT
<213> ORGANISM: Artificial Sequence
<220> FEATURE:
<223> OTHER INFORMATION: Synthetic Construct

<400> SEQUENCE: 7

Asp Asn Tyr Met Ser
1               5

<210> SEQ ID NO 8
<211> LENGTH: 5
<212> TYPE: PRT
<213> ORGANISM: Artificial Sequence
<220> FEATURE:
<223> OTHER INFORMATION: Synthetic Construct

<400> SEQUENCE: 8

Asp Asn Pro Met Ser
1               5

<210> SEQ ID NO 9
<211> LENGTH: 17
<212> TYPE: PRT
<213> ORGANISM: Artificial Sequence
<220> FEATURE:
<223> OTHER INFORMATION: Synthetic Construct

<400> SEQUENCE: 9

Gly Ile Ser Glu Ser Gly Gly Ser Thr Asn Asp Ala Asp Ser Val Lys
1               5                   10                  15

Gly

<210> SEQ ID NO 10
<211> LENGTH: 17
<212> TYPE: PRT
<213> ORGANISM: Artificial Sequence
```

```
<220> FEATURE:
<223> OTHER INFORMATION: Synthetic Construct

<400> SEQUENCE: 10

Gly Ile Ser Glu Ser Gly Gly Ser Thr Asn Tyr Ala Asp Ser Val Lys
1               5                   10                  15

Gly

<210> SEQ ID NO 11
<211> LENGTH: 17
<212> TYPE: PRT
<213> ORGANISM: Artificial Sequence
<220> FEATURE:
<223> OTHER INFORMATION: Synthetic Construct

<400> SEQUENCE: 11

Gly Ile Ser Glu Ser Gly Gly Ser Thr Tyr Tyr Ala Asp Ser Val Lys
1               5                   10                  15

Gly

<210> SEQ ID NO 12
<211> LENGTH: 17
<212> TYPE: PRT
<213> ORGANISM: Artificial Sequence
<220> FEATURE:
<223> OTHER INFORMATION: Synthetic Construct

<400> SEQUENCE: 12

Gly Ile Ser Glu Ser Gly Gly Ser Thr Tyr Asp Ala Asp Ser Val Lys
1               5                   10                  15

Gly

<210> SEQ ID NO 13
<211> LENGTH: 17
<212> TYPE: PRT
<213> ORGANISM: Artificial Sequence
<220> FEATURE:
<223> OTHER INFORMATION: Synthetic Construct

<400> SEQUENCE: 13

Val Ile Ser Glu Ser Gly Gly Ser Thr Asn Tyr Ala Asp Ser Val Lys
1               5                   10                  15

Gly

<210> SEQ ID NO 14
<211> LENGTH: 17
<212> TYPE: PRT
<213> ORGANISM: Artificial Sequence
<220> FEATURE:
<223> OTHER INFORMATION: Synthetic Construct

<400> SEQUENCE: 14

Val Ile Ser Glu Ser Gly Gly Ser Thr Asn Asp Ala Asp Ser Val Lys
1               5                   10                  15

Gly

<210> SEQ ID NO 15
<211> LENGTH: 19
<212> TYPE: PRT
<213> ORGANISM: Artificial Sequence
<220> FEATURE:
<223> OTHER INFORMATION: Synthetic Construct

<400> SEQUENCE: 15
```

```
Gly Arg Phe Cys Thr Asn Ser Ser Cys Phe Phe Arg Ala Val Tyr Gly
1               5                   10                  15

Met Asp Val

<210> SEQ ID NO 16
<211> LENGTH: 19
<212> TYPE: PRT
<213> ORGANISM: Artificial Sequence
<220> FEATURE:
<223> OTHER INFORMATION: Synthetic Construct

<400> SEQUENCE: 16

Gly Arg Phe Ser Gly Glu Ser His His Phe Phe Arg Ala Val Tyr Gly
1               5                   10                  15

Met Asp Val

<210> SEQ ID NO 17
<211> LENGTH: 19
<212> TYPE: PRT
<213> ORGANISM: Artificial Sequence
<220> FEATURE:
<223> OTHER INFORMATION: Synthetic Construct

<400> SEQUENCE: 17

Gly Arg Phe Ser Asp Tyr Ser Gln His Phe Phe Arg Ala Val Tyr Gly
1               5                   10                  15

Met Asp Val

<210> SEQ ID NO 18
<211> LENGTH: 19
<212> TYPE: PRT
<213> ORGANISM: Artificial Sequence
<220> FEATURE:
<223> OTHER INFORMATION: Synthetic Construct

<400> SEQUENCE: 18

Gly Arg Phe Ser Thr Asn Ser Ala His Phe Phe Arg Ala Val Tyr Gly
1               5                   10                  15

Met Asp Val

<210> SEQ ID NO 19
<211> LENGTH: 19
<212> TYPE: PRT
<213> ORGANISM: Artificial Sequence
<220> FEATURE:
<223> OTHER INFORMATION: Synthetic Construct

<400> SEQUENCE: 19

Gly Arg Phe Ser Thr Ser Ser Ser His Phe Tyr Arg Ala Val Tyr Gly
1               5                   10                  15

Met Asp Val

<210> SEQ ID NO 20
<211> LENGTH: 19
<212> TYPE: PRT
<213> ORGANISM: Artificial Sequence
<220> FEATURE:
<223> OTHER INFORMATION: Synthetic Construct

<400> SEQUENCE: 20

Gly Arg Phe Ser Tyr Asp Thr Arg His Phe Phe Arg Ala Val Tyr Gly
1               5                   10                  15
```

Met Asp Val

<210> SEQ ID NO 21
<211> LENGTH: 19
<212> TYPE: PRT
<213> ORGANISM: Artificial Sequence
<220> FEATURE:
<223> OTHER INFORMATION: Synthetic Construct

<400> SEQUENCE: 21

Gly Arg Phe Ser Asp Ser Thr Lys His Phe Phe Arg Ala Val Tyr Gly
1               5                   10                  15

Met Asp Val

<210> SEQ ID NO 22
<211> LENGTH: 19
<212> TYPE: PRT
<213> ORGANISM: Artificial Sequence
<220> FEATURE:
<223> OTHER INFORMATION: Synthetic Construct

<400> SEQUENCE: 22

Gly Arg Phe Ser Gln Ser Ser Ser His Phe Phe Arg Ala Val Tyr Gly
1               5                   10                  15

Met Asp Val

<210> SEQ ID NO 23
<211> LENGTH: 19
<212> TYPE: PRT
<213> ORGANISM: Artificial Sequence
<220> FEATURE:
<223> OTHER INFORMATION: Synthetic Construct

<400> SEQUENCE: 23

Gly Arg Phe Ser Asp Glu Tyr Gly His Phe Phe Arg Ala Val Tyr Gly
1               5                   10                  15

Met Asp Val

<210> SEQ ID NO 24
<211> LENGTH: 19
<212> TYPE: PRT
<213> ORGANISM: Artificial Sequence
<220> FEATURE:
<223> OTHER INFORMATION: Synthetic Construct

<400> SEQUENCE: 24

Gly Arg Phe Ser Ala Ser Ala Gly His Phe Phe Arg Ala Val Tyr Gly
1               5                   10                  15

Met Asp Val

<210> SEQ ID NO 25
<211> LENGTH: 19
<212> TYPE: PRT
<213> ORGANISM: Artificial Sequence
<220> FEATURE:
<223> OTHER INFORMATION: Synthetic Construct

<400> SEQUENCE: 25

Gly Arg Phe Ser Asp Ala Ser Glu His Phe Phe Arg Ala Val Tyr Gly
1               5                   10                  15

Met Asp Val

<210> SEQ ID NO 26

```
<211> LENGTH: 19
<212> TYPE: PRT
<213> ORGANISM: Artificial Sequence
<220> FEATURE:
<223> OTHER INFORMATION: Synthetic Construct

<400> SEQUENCE: 26

Gly Arg Phe Ser Gln Asp Ser Tyr His Phe Phe Arg Ala Val Tyr Gly
1               5                   10                  15

Met Asp Val

<210> SEQ ID NO 27
<211> LENGTH: 19
<212> TYPE: PRT
<213> ORGANISM: Artificial Sequence
<220> FEATURE:
<223> OTHER INFORMATION: Synthetic Construct

<400> SEQUENCE: 27

Gly Arg Phe Ser Thr Ser Ser His Phe Phe Arg Ala Val Tyr Gly
1               5                   10                  15

Met Asp Val

<210> SEQ ID NO 28
<211> LENGTH: 19
<212> TYPE: PRT
<213> ORGANISM: Artificial Sequence
<220> FEATURE:
<223> OTHER INFORMATION: Synthetic Construct

<400> SEQUENCE: 28

Gly Arg Phe Ser Thr Asp Ser Ser His Phe Tyr Arg Ala Val Tyr Gly
1               5                   10                  15

Met Asp Val

<210> SEQ ID NO 29
<211> LENGTH: 19
<212> TYPE: PRT
<213> ORGANISM: Artificial Sequence
<220> FEATURE:
<223> OTHER INFORMATION: Synthetic Construct

<400> SEQUENCE: 29

Gly Arg Phe Ser Thr Leu Ser Ser His Phe Phe Arg Ala Val Tyr Gly
1               5                   10                  15

Met Asp Val

<210> SEQ ID NO 30
<211> LENGTH: 19
<212> TYPE: PRT
<213> ORGANISM: Artificial Sequence
<220> FEATURE:
<223> OTHER INFORMATION: Synthetic Construct

<400> SEQUENCE: 30

Gly Arg Phe Ser Thr Asp Ser Ser His Phe Phe Arg Ala Val Tyr Gly
1               5                   10                  15

Met Asp Val

<210> SEQ ID NO 31
<211> LENGTH: 19
<212> TYPE: PRT
<213> ORGANISM: Artificial Sequence
<220> FEATURE:
```

```
<223> OTHER INFORMATION: Synthetic Construct

<400> SEQUENCE: 31

Gly Arg Phe Ser Thr Asn Ser Asp His Phe Tyr Arg Ala Val Tyr Gly
1               5                   10                  15

Met Asp Val

<210> SEQ ID NO 32
<211> LENGTH: 11
<212> TYPE: PRT
<213> ORGANISM: Artificial Sequence
<220> FEATURE:
<223> OTHER INFORMATION: Synthetic Construct

<400> SEQUENCE: 32

Arg Ala Ser Gln Gly Ile Ser Ser Tyr Leu Ala
1               5                   10

<210> SEQ ID NO 33
<211> LENGTH: 11
<212> TYPE: PRT
<213> ORGANISM: Artificial Sequence
<220> FEATURE:
<223> OTHER INFORMATION: Synthetic Construct

<400> SEQUENCE: 33

Arg Ala Ser Gln Gly Ile Arg Ser Tyr Leu Ala
1               5                   10

<210> SEQ ID NO 34
<211> LENGTH: 7
<212> TYPE: PRT
<213> ORGANISM: Artificial Sequence
<220> FEATURE:
<223> OTHER INFORMATION: Synthetic Construct

<400> SEQUENCE: 34

Ala Ala Ser Thr Leu Gln Ser
1               5

<210> SEQ ID NO 35
<211> LENGTH: 9
<212> TYPE: PRT
<213> ORGANISM: Artificial Sequence
<220> FEATURE:
<223> OTHER INFORMATION: Synthetic Construct

<400> SEQUENCE: 35

Gln Gln Leu Ser Ser Tyr Pro Leu Ser
1               5

<210> SEQ ID NO 36
<211> LENGTH: 9
<212> TYPE: PRT
<213> ORGANISM: Artificial Sequence
<220> FEATURE:
<223> OTHER INFORMATION: Synthetic Construct

<400> SEQUENCE: 36

Gln Gln Leu Asn Ser Tyr Pro Leu Thr
1               5

<210> SEQ ID NO 37
<211> LENGTH: 9
<212> TYPE: PRT
<213> ORGANISM: Artificial Sequence
```

```
<220> FEATURE:
<223> OTHER INFORMATION: Synthetic Construct

<400> SEQUENCE: 37

Gln Gln Leu Ser Ser Tyr Pro Leu Thr
1               5

<210> SEQ ID NO 38
<211> LENGTH: 9
<212> TYPE: PRT
<213> ORGANISM: Artificial Sequence
<220> FEATURE:
<223> OTHER INFORMATION: Synthetic Construct

<400> SEQUENCE: 38

Gln Gln Leu Lys Ser Tyr Pro Leu Thr
1               5

<210> SEQ ID NO 39
<211> LENGTH: 5
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: 1
<223> OTHER INFORMATION: Xaa = Asp or Ser
<220> FEATURE:
<221> NAME/KEY: VARIANT
<222> LOCATION: 2
<223> OTHER INFORMATION: Xaa = Tyr or Asn
<220> FEATURE:
<221> NAME/KEY: VARIANT
<222> LOCATION: 3
<223> OTHER INFORMATION: Xaa = Pro, His, Tyr or Ser

<400> SEQUENCE: 39

Xaa Xaa Xaa Met Ser
1               5

<210> SEQ ID NO 40
<211> LENGTH: 17
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: 1
<223> OTHER INFORMATION: Xaa = Gly or Val
<220> FEATURE:
<221> NAME/KEY: VARIANT
<222> LOCATION: 10
<223> OTHER INFORMATION: Xaa = Asn or Tyr
<220> FEATURE:
<221> NAME/KEY: VARIANT
<222> LOCATION: 11
<223> OTHER INFORMATION: Xaa = Asp or Tyr

<400> SEQUENCE: 40

Xaa Ile Ser Glu Ser Gly Gly Ser Thr Xaa Xaa Ala Asp Ser Val Lys
1               5                   10                  15
Gly

<210> SEQ ID NO 41
<211> LENGTH: 19
<212> TYPE: PRT
<213> ORGANISM: Artificial Sequence
<220> FEATURE:
```

```
<223> OTHER INFORMATION: Synthetic Construct
<220> FEATURE:
<221> NAME/KEY: VARIANT
<222> LOCATION: 4
<223> OTHER INFORMATION: Xaa = Ser or Cys
<220> FEATURE:
<221> NAME/KEY: VARIANT
<222> LOCATION: 5
<223> OTHER INFORMATION: Xaa = Thr, Gly, Asp, Tyr, Gln or Ala
<220> FEATURE:
<221> NAME/KEY: VARIANT
<222> LOCATION: 6
<223> OTHER INFORMATION: Xaa =  Ser, Asp, Asn, Glu, Leu, Ala or Tyr
<220> FEATURE:
<221> NAME/KEY: VARIANT
<222> LOCATION: 7
<223> OTHER INFORMATION: Xaa = Ser, Thr, Tyr or Ala
<220> FEATURE:
<221> NAME/KEY: VARIANT
<222> LOCATION: 8
<223> OTHER INFORMATION: Xaa = Ser, His, Gln, Ala, Arg, Lys, Gly, Glu,
     Tyr or Asp
<220> FEATURE:
<221> NAME/KEY: VARIANT
<222> LOCATION: 9
<223> OTHER INFORMATION: Xaa = His or Cys
<220> FEATURE:
<221> NAME/KEY: VARIANT
<222> LOCATION: 11
<223> OTHER INFORMATION: Xaa = Phe or Tyr

<400> SEQUENCE: 41

Gly Arg Phe Xaa Xaa Xaa Xaa Xaa Xaa Phe Xaa Arg Ala Val Tyr Gly
1               5                   10                  15

Met Asp Val

<210> SEQ ID NO 42
<211> LENGTH: 11
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: 7
<223> OTHER INFORMATION: Xaa = Ser or Arg

<400> SEQUENCE: 42

Arg Ala Ser Gln Gly Ile Xaa Ser Tyr Leu Ala
1               5                   10

<210> SEQ ID NO 43
<211> LENGTH: 9
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: 4
<223> OTHER INFORMATION: Xaa = Ser, Asn or Lys
<220> FEATURE:
<221> NAME/KEY: VARIANT
<222> LOCATION: 9
<223> OTHER INFORMATION: Xaa = Ser or Thr

<400> SEQUENCE: 43

Gln Gln Leu Xaa Ser Tyr Pro Leu Xaa
1               5

<210> SEQ ID NO 44
<211> LENGTH: 5
```

```
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: 2
<223> OTHER INFORMATION: Xaa = Asn or Tyr
<220> FEATURE:
<221> NAME/KEY: VARIANT
<222> LOCATION: 3
<223> OTHER INFORMATION: Xaa = Phe, His or Tyr

<400> SEQUENCE: 44

Asp Xaa Xaa Met Ser
1               5

<210> SEQ ID NO 45
<211> LENGTH: 17
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: 1
<223> OTHER INFORMATION: Xaa = Gly or Val

<400> SEQUENCE: 45

Xaa Ile Ser Glu Ser Gly Gly Ser Thr Asn Tyr Ala Asp Ser Val Lys
1               5                   10                  15

Gly

<210> SEQ ID NO 46
<211> LENGTH: 19
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: 6
<223> OTHER INFORMATION: Xaa = Asn, Ser, Asp or Leu
<220> FEATURE:
<221> NAME/KEY: VARIANT
<222> LOCATION: 8
<223> OTHER INFORMATION: Xaa = Ser or Ala
<220> FEATURE:
<221> NAME/KEY: VARIANT
<222> LOCATION: 11
<223> OTHER INFORMATION: Xaa = Phe or Tyr

<400> SEQUENCE: 46

Gly Arg Phe Ser Thr Xaa Ser Xaa His Phe Xaa Arg Ala Val Tyr Gly
1               5                   10                  15

Met Asp Val

<210> SEQ ID NO 47
<211> LENGTH: 9
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: 9
<223> OTHER INFORMATION: Xaa = Ser or Thr

<400> SEQUENCE: 47

Gln Gln Leu Ser Ser Tyr Pro Leu Xaa
```

<210> SEQ ID NO 48
<211> LENGTH: 128
<212> TYPE: PRT
<213> ORGANISM: Artificial Sequence
<220> FEATURE:
<223> OTHER INFORMATION: Synthetic Construct

<400> SEQUENCE: 48

```
Glu Val Gln Leu Leu Glu Ser Gly Gly Gly Leu Val Gln Pro Gly Gly
1               5                   10                  15

Ser Leu Arg Leu Ser Cys Thr Ala Ser Gly Phe Thr Phe Ser Asp Tyr
            20                  25                  30

Pro Met Ser Trp Val Arg Gln Ala Pro Gly Lys Gly Leu Asp Trp Val
        35                  40                  45

Ser Gly Ile Ser Glu Ser Gly Gly Ser Thr Asn Asp Ala Asp Ser Val
    50                  55                  60

Lys Gly Arg Phe Ser Thr Ser Arg Asp Asn Ser Lys Ser Thr Leu Tyr
65                  70                  75                  80

Leu Asp Met Asn Ser Leu Arg Ala Glu Asp Thr Ala Ile Tyr Tyr Cys
                85                  90                  95

Ala Lys Gly Arg Phe Cys Thr Asn Ser Ser Cys Phe Phe Arg Ala Val
            100                 105                 110

Tyr Gly Met Asp Val Trp Gly Gln Gly Thr Ala Val Thr Val Ser Ser
            115                 120                 125
```

<210> SEQ ID NO 49
<211> LENGTH: 128
<212> TYPE: PRT
<213> ORGANISM: Artificial Sequence
<220> FEATURE:
<223> OTHER INFORMATION: Synthetic Construct

<400> SEQUENCE: 49

```
Glu Val Gln Leu Leu Glu Ser Gly Gly Gly Leu Val Gln Pro Gly Gly
1               5                   10                  15

Ser Leu Arg Leu Ser Cys Thr Ala Ser Gly Phe Thr Phe Ser Ser Tyr
            20                  25                  30

Pro Met Ser Trp Val Arg Gln Ala Pro Gly Lys Gly Leu Asp Trp Val
        35                  40                  45

Ser Gly Ile Ser Glu Ser Gly Gly Ser Thr Asn Tyr Ala Asp Ser Val
    50                  55                  60

Lys Gly Arg Phe Ser Thr Ser Arg Asp Asn Ser Lys Ser Thr Leu Tyr
65                  70                  75                  80

Leu Asp Met Asn Ser Leu Arg Ala Glu Asp Thr Ala Ile Tyr Tyr Cys
                85                  90                  95

Ala Lys Gly Arg Phe Ser Gly Glu Ser His His Phe Phe Arg Ala Val
            100                 105                 110

Tyr Gly Met Asp Val Trp Gly Gln Gly Thr Ala Val Thr Val Ser Ser
            115                 120                 125
```

<210> SEQ ID NO 50
<211> LENGTH: 128
<212> TYPE: PRT
<213> ORGANISM: Artificial Sequence
<220> FEATURE:
<223> OTHER INFORMATION: Synthetic Construct

<400> SEQUENCE: 50

Glu Val Gln Leu Leu Glu Ser Gly Gly Gly Leu Val Gln Pro Gly Gly
1               5                   10                  15

Ser Leu Arg Leu Ser Cys Thr Ala Ser Gly Phe Thr Phe Ser Asp Tyr
                20                  25                  30

Pro Met Ser Trp Val Arg Gln Ala Pro Gly Lys Gly Leu Asp Trp Val
        35                  40                  45

Ser Gly Ile Ser Glu Ser Gly Gly Ser Thr Asn Asp Ala Asp Ser Val
        50                  55                  60

Lys Gly Arg Phe Ser Thr Ser Arg Asp Asn Ser Lys Ser Thr Leu Tyr
65                  70                  75                  80

Leu Asp Met Asn Ser Leu Arg Ala Glu Asp Thr Ala Ile Tyr Tyr Cys
                85                  90                  95

Ala Lys Gly Arg Phe Ser Asp Tyr Ser Gln His Phe Phe Arg Ala Val
                100                 105                 110

Tyr Gly Met Asp Val Trp Gly Gln Gly Thr Ala Val Thr Val Ser Ser
        115                 120                 125

<210> SEQ ID NO 51
<211> LENGTH: 128
<212> TYPE: PRT
<213> ORGANISM: Artificial Sequence
<220> FEATURE:
<223> OTHER INFORMATION: Synthetic Construct

<400> SEQUENCE: 51

Glu Val Gln Leu Leu Glu Ser Gly Gly Gly Leu Val Gln Pro Gly Gly
1               5                   10                  15

Ser Leu Arg Leu Ser Cys Thr Ala Ser Gly Phe Thr Phe Ser Asp Asn
                20                  25                  30

His Met Ser Trp Val Arg Gln Ala Pro Gly Lys Gly Leu Asp Trp Val
        35                  40                  45

Ser Gly Ile Ser Glu Ser Gly Gly Ser Thr Asn Tyr Ala Asp Ser Val
        50                  55                  60

Lys Gly Arg Phe Ser Thr Ser Arg Asp Asn Ser Lys Ser Thr Leu Tyr
65                  70                  75                  80

Leu Asp Met Asn Ser Leu Arg Ala Glu Asp Thr Ala Ile Tyr Tyr Cys
                85                  90                  95

Ala Lys Gly Arg Phe Ser Thr Asn Ser Ala His Phe Phe Arg Ala Val
                100                 105                 110

Tyr Gly Met Asp Val Trp Gly Gln Gly Thr Ala Val Thr Val Ser Ser
        115                 120                 125

<210> SEQ ID NO 52
<211> LENGTH: 128
<212> TYPE: PRT
<213> ORGANISM: Artificial Sequence
<220> FEATURE:
<223> OTHER INFORMATION: Synthetic Construct

<400> SEQUENCE: 52

Glu Val Gln Leu Leu Glu Ser Gly Gly Gly Leu Val Gln Pro Gly Gly
1               5                   10                  15

Ser Leu Arg Leu Ser Cys Thr Ala Ser Gly Phe Thr Phe Ser Asp Asn
                20                  25                  30

His Met Ser Trp Val Arg Gln Ala Pro Gly Lys Gly Leu Asp Trp Val
        35                  40                  45

Ser Gly Ile Ser Glu Ser Gly Gly Ser Thr Asn Tyr Ala Asp Ser Val

```
                    50                  55                  60
Lys Gly Arg Phe Ser Thr Ser Arg Asp Asn Ser Lys Ser Thr Leu Tyr
 65                  70                  75                  80

Leu Asp Met Asn Ser Leu Arg Ala Glu Asp Thr Ala Ile Tyr Tyr Cys
                 85                  90                  95

Ala Lys Gly Arg Phe Ser Thr Ser Ser Ser His Phe Tyr Arg Ala Val
                100                 105                 110

Tyr Gly Met Asp Val Trp Gly Gln Gly Thr Ala Val Thr Val Ser Ser
                115                 120                 125
```

<210> SEQ ID NO 53
<211> LENGTH: 128
<212> TYPE: PRT
<213> ORGANISM: Artificial Sequence
<220> FEATURE:
<223> OTHER INFORMATION: Synthetic Construct

<400> SEQUENCE: 53

```
Glu Val Gln Leu Leu Glu Ser Gly Gly Gly Leu Val Gln Pro Gly Gly
  1               5                  10                  15

Ser Leu Arg Leu Ser Cys Thr Ala Ser Gly Phe Thr Phe Ser Asp Asn
                 20                  25                  30

His Met Ser Trp Val Arg Gln Ala Pro Gly Lys Gly Leu Asp Trp Val
                 35                  40                  45

Ser Gly Ile Ser Glu Ser Gly Ser Thr Tyr Tyr Ala Asp Ser Val
             50                  55                  60

Lys Gly Arg Phe Ser Thr Ser Arg Asp Asn Ser Lys Ser Thr Leu Tyr
 65                  70                  75                  80

Leu Asp Met Asn Ser Leu Arg Ala Glu Asp Thr Ala Ile Tyr Tyr Cys
                 85                  90                  95

Ala Lys Gly Arg Phe Ser Tyr Asp Thr Arg His Phe Phe Arg Ala Val
                100                 105                 110

Tyr Gly Met Asp Val Trp Gly Gln Gly Thr Ala Val Thr Val Ser Ser
                115                 120                 125
```

<210> SEQ ID NO 54
<211> LENGTH: 128
<212> TYPE: PRT
<213> ORGANISM: Artificial Sequence
<220> FEATURE:
<223> OTHER INFORMATION: Synthetic Construct

<400> SEQUENCE: 54

```
Glu Val Gln Leu Leu Glu Ser Gly Gly Gly Leu Val Gln Pro Gly Gly
  1               5                  10                  15

Ser Leu Arg Leu Ser Cys Thr Ala Ser Gly Phe Thr Phe Ser Asp Tyr
                 20                  25                  30

Ser Met Ser Trp Val Arg Gln Ala Pro Gly Lys Gly Leu Asp Trp Val
                 35                  40                  45

Ser Gly Ile Ser Glu Ser Gly Ser Thr Asn Tyr Ala Asp Ser Val
             50                  55                  60

Lys Gly Arg Phe Ser Thr Ser Arg Asp Asn Ser Lys Ser Thr Leu Tyr
 65                  70                  75                  80

Leu Asp Met Asn Ser Leu Arg Ala Glu Asp Thr Ala Ile Tyr Tyr Cys
                 85                  90                  95

Ala Lys Gly Arg Phe Ser Asp Ser Thr Lys His Phe Phe Arg Ala Val
                100                 105                 110
```

Tyr Gly Met Asp Val Trp Gly Gln Gly Thr Ala Val Thr Val Ser Ser
            115                 120                 125

<210> SEQ ID NO 55
<211> LENGTH: 128
<212> TYPE: PRT
<213> ORGANISM: Artificial Sequence
<220> FEATURE:
<223> OTHER INFORMATION: Synthetic Construct

<400> SEQUENCE: 55

Glu Val Gln Leu Leu Glu Ser Gly Gly Gly Leu Val Gln Pro Gly Gly
1               5                   10                  15

Ser Leu Arg Leu Ser Cys Thr Ala Ser Gly Phe Thr Phe Ser Ser Tyr
            20                  25                  30

His Met Ser Trp Val Arg Gln Ala Pro Gly Lys Gly Leu Asp Trp Val
        35                  40                  45

Ser Gly Ile Ser Glu Ser Gly Gly Ser Thr Asn Tyr Ala Asp Ser Val
    50                  55                  60

Lys Gly Arg Phe Ser Thr Ser Arg Asp Asn Ser Lys Ser Thr Leu Tyr
65                  70                  75                  80

Leu Asp Met Asn Ser Leu Arg Ala Glu Asp Thr Ala Ile Tyr Tyr Cys
                85                  90                  95

Ala Lys Gly Arg Phe Ser Gln Ser Ser Ser His Phe Phe Arg Ala Val
            100                 105                 110

Tyr Gly Met Asp Val Trp Gly Gln Gly Thr Ala Val Thr Val Ser Ser
            115                 120                 125

<210> SEQ ID NO 56
<211> LENGTH: 128
<212> TYPE: PRT
<213> ORGANISM: Artificial Sequence
<220> FEATURE:
<223> OTHER INFORMATION: Synthetic Construct

<400> SEQUENCE: 56

Glu Val Gln Leu Leu Glu Ser Gly Gly Gly Leu Val Gln Pro Gly Gly
1               5                   10                  15

Ser Leu Arg Leu Ser Cys Thr Ala Ser Gly Phe Thr Phe Ser Ser Asn
            20                  25                  30

His Met Ser Trp Val Arg Gln Ala Pro Gly Lys Gly Leu Asp Trp Val
        35                  40                  45

Ser Gly Ile Ser Glu Ser Gly Gly Ser Thr Asn Tyr Ala Asp Ser Val
    50                  55                  60

Lys Gly Arg Phe Ser Thr Ser Arg Asp Asn Ser Lys Ser Thr Leu Tyr
65                  70                  75                  80

Leu Asp Met Asn Ser Leu Arg Ala Glu Asp Thr Ala Ile Tyr Tyr Cys
                85                  90                  95

Ala Lys Gly Arg Phe Ser Asp Glu Tyr Gly His Phe Phe Arg Ala Val
            100                 105                 110

Tyr Gly Met Asp Val Trp Gly Gln Gly Thr Ala Val Thr Val Ser Ser
            115                 120                 125

<210> SEQ ID NO 57
<211> LENGTH: 128
<212> TYPE: PRT
<213> ORGANISM: Artificial Sequence
<220> FEATURE:
<223> OTHER INFORMATION: Synthetic Construct -continued

<400> SEQUENCE: 57

Glu Val Gln Leu Leu Glu Ser Gly Gly Gly Leu Val Gln Pro Gly Gly
1               5                   10                  15

Ser Leu Arg Leu Ser Cys Thr Ala Ser Gly Phe Thr Phe Ser Asp Tyr
            20                  25                  30

Pro Met Ser Trp Val Arg Gln Ala Pro Gly Lys Gly Leu Asp Trp Val
        35                  40                  45

Ser Gly Ile Ser Glu Ser Gly Gly Ser Thr Tyr Asp Ala Asp Ser Val
    50                  55                  60

Lys Gly Arg Phe Ser Thr Ser Arg Asp Asn Ser Lys Ser Thr Leu Tyr
65                  70                  75                  80

Leu Asp Met Asn Ser Leu Arg Ala Glu Asp Thr Ala Ile Tyr Tyr Cys
                85                  90                  95

Ala Lys Gly Arg Phe Ser Ala Ser Ala Gly His Phe Phe Arg Ala Val
            100                 105                 110

Tyr Gly Met Asp Val Trp Gly Gln Gly Thr Ala Val Thr Val Ser Ser
        115                 120                 125

<210> SEQ ID NO 58
<211> LENGTH: 128
<212> TYPE: PRT
<213> ORGANISM: Artificial Sequence
<220> FEATURE:
<223> OTHER INFORMATION: Synthetic Construct

<400> SEQUENCE: 58

Glu Val Gln Leu Leu Glu Ser Gly Gly Gly Leu Val Gln Pro Gly Gly
1               5                   10                  15

Ser Leu Arg Leu Ser Cys Thr Ala Ser Gly Phe Thr Phe Ser Ser Tyr
            20                  25                  30

Pro Met Ser Trp Val Arg Gln Ala Pro Gly Lys Gly Leu Asp Trp Val
        35                  40                  45

Ser Gly Ile Ser Glu Ser Gly Gly Ser Thr Asn Tyr Ala Asp Ser Val
    50                  55                  60

Lys Gly Arg Phe Ser Thr Ser Arg Asp Asn Ser Lys Ser Thr Leu Tyr
65                  70                  75                  80

Leu Asp Met Asn Ser Leu Arg Ala Glu Asp Thr Ala Ile Tyr Tyr Cys
                85                  90                  95

Ala Lys Gly Arg Phe Ser Asp Ala Ser Glu His Phe Phe Arg Ala Val
            100                 105                 110

Tyr Gly Met Asp Val Trp Gly Gln Gly Thr Ala Val Thr Val Ser Ser
        115                 120                 125

<210> SEQ ID NO 59
<211> LENGTH: 128
<212> TYPE: PRT
<213> ORGANISM: Artificial Sequence
<220> FEATURE:
<223> OTHER INFORMATION: Synthetic Construct

<400> SEQUENCE: 59

Glu Val Gln Leu Leu Glu Ser Gly Gly Gly Leu Val Gln Pro Gly Gly
1               5                   10                  15

Ser Leu Arg Leu Ser Cys Thr Ala Ser Gly Phe Thr Phe Ser Asp Tyr
            20                  25                  30

Pro Met Ser Trp Val Arg Gln Ala Pro Gly Lys Gly Leu Asp Trp Val
        35                  40                  45

```
Ser Gly Ile Ser Glu Ser Gly Gly Ser Thr Asn Asp Ala Asp Ser Val
    50              55                  60

Lys Gly Arg Phe Ser Thr Ser Arg Asp Asn Ser Lys Ser Thr Leu Tyr
65                  70                  75                  80

Leu Asp Met Asn Ser Leu Arg Ala Glu Asp Thr Ala Ile Tyr Tyr Cys
                85                  90                  95

Ala Lys Gly Arg Phe Ser Gln Asp Ser Tyr His Phe Arg Ala Val
                100                 105                 110

Tyr Gly Met Asp Val Trp Gly Gln Gly Thr Ala Val Thr Val Ser Ser
                115                 120                 125
```

<210> SEQ ID NO 60
<211> LENGTH: 128
<212> TYPE: PRT
<213> ORGANISM: Artificial Sequence
<220> FEATURE:
<223> OTHER INFORMATION: Synthetic Construct

<400> SEQUENCE: 60

```
Glu Val Gln Leu Leu Glu Ser Gly Gly Gly Leu Val Gln Pro Gly Gly
1               5                   10                  15

Ser Leu Arg Leu Ser Cys Thr Ala Ser Gly Phe Thr Phe Ser Asp Asn
                20                  25                  30

His Met Ser Trp Val Arg Gln Ala Pro Gly Lys Gly Leu Asp Trp Val
                35                  40                  45

Ser Gly Ile Ser Glu Ser Gly Gly Ser Thr Asn Tyr Ala Asp Ser Val
    50              55                  60

Lys Gly Arg Phe Ser Thr Ser Arg Asp Asn Ser Lys Ser Thr Leu Tyr
65                  70                  75                  80

Leu Asp Met Asn Ser Leu Arg Ala Glu Asp Thr Ala Ile Tyr Tyr Cys
                85                  90                  95

Ala Lys Gly Arg Phe Ser Thr Ser Ser His Phe Phe Arg Ala Val
                100                 105                 110

Tyr Gly Met Asp Val Trp Gly Gln Gly Thr Ala Val Thr Val Ser Ser
                115                 120                 125
```

<210> SEQ ID NO 61
<211> LENGTH: 128
<212> TYPE: PRT
<213> ORGANISM: Artificial Sequence
<220> FEATURE:
<223> OTHER INFORMATION: Synthetic Construct

<400> SEQUENCE: 61

```
Glu Val Gln Leu Leu Glu Ser Gly Gly Gly Leu Val Gln Pro Gly Gly
1               5                   10                  15

Ser Leu Arg Leu Ser Cys Thr Ala Ser Gly Phe Thr Phe Ser Asp Tyr
                20                  25                  30

Pro Met Ser Trp Val Arg Gln Ala Pro Gly Lys Gly Leu Asp Trp Val
                35                  40                  45

Ser Gly Ile Ser Glu Ser Gly Gly Ser Thr Asn Tyr Ala Asp Ser Val
    50              55                  60

Lys Gly Arg Phe Ser Thr Ser Arg Asp Asn Ser Lys Ser Thr Leu Tyr
65                  70                  75                  80

Leu Asp Met Asn Ser Leu Arg Ala Glu Asp Thr Ala Ile Tyr Tyr Cys
                85                  90                  95

Ala Lys Gly Arg Phe Ser Thr Asp Ser Ser His Phe Tyr Arg Ala Val
                100                 105                 110
```

Tyr Gly Met Asp Val Trp Gly Gln Gly Thr Ala Val Thr Val Ser Ser
        115                 120                 125

<210> SEQ ID NO 62
<211> LENGTH: 128
<212> TYPE: PRT
<213> ORGANISM: Artificial Sequence
<220> FEATURE:
<223> OTHER INFORMATION: Synthetic Construct

<400> SEQUENCE: 62

Glu Val Gln Leu Leu Glu Ser Gly Gly Gly Leu Val Gln Pro Gly Gly
1               5                   10                  15

Ser Leu Arg Leu Ser Cys Thr Ala Ser Gly Phe Thr Phe Ser Asp Asn
            20                  25                  30

Tyr Met Ser Trp Val Arg Gln Ala Pro Gly Lys Gly Leu Asp Trp Val
        35                  40                  45

Ser Val Ile Ser Glu Ser Gly Gly Ser Thr Asn Tyr Ala Asp Ser Val
    50                  55                  60

Lys Gly Arg Phe Ser Thr Ser Arg Asp Asn Ser Lys Ser Thr Leu Tyr
65                  70                  75                  80

Leu Asp Met Asn Ser Leu Arg Ala Glu Asp Thr Ala Ile Tyr Tyr Cys
                85                  90                  95

Ala Lys Gly Arg Phe Ser Thr Leu Ser Ser His Phe Phe Arg Ala Val
            100                 105                 110

Tyr Gly Met Asp Val Trp Gly Gln Gly Thr Ala Val Thr Val Ser Ser
        115                 120                 125

<210> SEQ ID NO 63
<211> LENGTH: 128
<212> TYPE: PRT
<213> ORGANISM: Artificial Sequence
<220> FEATURE:
<223> OTHER INFORMATION: Synthetic Construct

<400> SEQUENCE: 63

Glu Val Gln Leu Leu Glu Ser Gly Gly Gly Leu Val Gln Pro Gly Gly
1               5                   10                  15

Ser Leu Arg Leu Ser Cys Thr Ala Ser Gly Phe Thr Phe Ser Asp Tyr
            20                  25                  30

Pro Met Ser Trp Val Arg Gln Ala Pro Gly Lys Gly Leu Asp Trp Val
        35                  40                  45

Ser Gly Ile Ser Glu Ser Gly Gly Ser Thr Asn Tyr Ala Asp Ser Val
    50                  55                  60

Lys Gly Arg Phe Ser Thr Ser Arg Asp Asn Ser Lys Ser Thr Leu Tyr
65                  70                  75                  80

Leu Asp Met Asn Ser Leu Arg Ala Glu Asp Thr Ala Ile Tyr Tyr Cys
                85                  90                  95

Ala Lys Gly Arg Phe Ser Thr Asp Ser Ser His Phe Phe Arg Ala Val
            100                 105                 110

Tyr Gly Met Asp Val Trp Gly Gln Gly Thr Ala Val Thr Val Ser Ser
        115                 120                 125

<210> SEQ ID NO 64
<211> LENGTH: 128
<212> TYPE: PRT
<213> ORGANISM: Artificial Sequence
<220> FEATURE:
<223> OTHER INFORMATION: Synthetic Construct

<400> SEQUENCE: 64

Glu Val Gln Leu Leu Glu Ser Gly Gly Gly Leu Val Gln Pro Gly Gly
1               5                   10                  15

Ser Leu Arg Leu Ser Cys Thr Ala Ser Gly Phe Thr Phe Ser Asp Asn
            20                  25                  30

Pro Met Ser Trp Val Arg Gln Ala Pro Gly Lys Gly Leu Asp Trp Val
        35                  40                  45

Ser Val Ile Ser Glu Ser Gly Gly Ser Thr Asn Asp Ala Asp Ser Val
    50                  55                  60

Lys Gly Arg Phe Ser Thr Ser Arg Asp Asn Ser Lys Ser Thr Leu Tyr
65                  70                  75                  80

Leu Asp Met Asn Ser Leu Arg Ala Glu Asp Thr Ala Ile Tyr Tyr Cys
                85                  90                  95

Ala Lys Gly Arg Phe Ser Thr Asn Ser Asp His Phe Tyr Arg Ala Val
            100                 105                 110

Tyr Gly Met Asp Val Trp Gly Gln Gly Thr Ala Val Thr Val Ser Ser
        115                 120                 125

<210> SEQ ID NO 65
<211> LENGTH: 107
<212> TYPE: PRT
<213> ORGANISM: Artificial Sequence
<220> FEATURE:
<223> OTHER INFORMATION: Synthetic Construct

<400> SEQUENCE: 65

Asp Ile Gln Leu Thr Gln Ser Pro Ser Ser Leu Ser Ala Ser Val Gly
1               5                   10                  15

Asp Arg Val Thr Ile Thr Cys Arg Ala Ser Gln Gly Ile Ser Ser Tyr
            20                  25                  30

Leu Ala Trp Tyr Gln Gln Lys Pro Gly Lys Ala Pro Lys Leu Leu Ile
        35                  40                  45

Tyr Ala Ala Ser Thr Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Leu Ser Ser Tyr Pro Leu
                85                  90                  95

Ser Phe Gly Gly Gly Thr Lys Val Glu Ile Lys
            100                 105

<210> SEQ ID NO 66
<211> LENGTH: 107
<212> TYPE: PRT
<213> ORGANISM: Artificial Sequence
<220> FEATURE:
<223> OTHER INFORMATION: Synthetic Construct

<400> SEQUENCE: 66

Asp Ile Gln Leu Thr Gln Ser Pro Ser Ser Leu Ser Ala Ser Val Gly
1               5                   10                  15

Asp Arg Val Thr Ile Thr Cys Arg Ala Ser Gln Gly Ile Ser Ser Tyr
            20                  25                  30

Leu Ala Trp Tyr Gln Gln Lys Pro Gly Lys Ala Pro Lys Leu Leu Ile
        35                  40                  45

Tyr Ala Ala Ser Thr Leu Gln Ser Gly Val Pro Ser Arg Phe Ser Gly
    50                  55                  60

```
Ser Gly Ser Gly Thr Asp Phe Thr Leu Thr Ile Ser Ser Leu Gln Pro
 65                  70                  75                  80

Glu Asp Phe Ala Thr Tyr Tyr Cys Gln Gln Leu Asn Ser Tyr Pro Leu
                 85                  90                  95

Thr Phe Gly Gly Gly Thr Lys Val Glu Ile Lys
            100                 105
```

<210> SEQ ID NO 67
<211> LENGTH: 107
<212> TYPE: PRT
<213> ORGANISM: Artificial Sequence
<220> FEATURE:
<223> OTHER INFORMATION: Synthetic Construct

<400> SEQUENCE: 67

```
Asp Ile Gln Leu Thr Gln Ser Pro Ser Ser Leu Ser Ala Ser Val Gly
 1               5                  10                  15

Asp Arg Val Thr Ile Thr Cys Arg Ala Ser Gln Gly Ile Ser Ser Tyr
             20                  25                  30

Leu Ala Trp Tyr Gln Gln Lys Pro Gly Lys Ala Pro Lys Leu Leu Ile
             35                  40                  45

Tyr Ala Ala Ser Thr Leu Gln Ser Gly Val Pro Ser Arg Phe Ser Gly
 50                  55                  60

Ser Gly Ser Gly Thr Asp Phe Thr Leu Thr Ile Ser Ser Leu Gln Pro
 65                  70                  75                  80

Glu Asp Phe Ala Thr Tyr Tyr Cys Gln Gln Leu Ser Ser Tyr Pro Leu
                 85                  90                  95

Thr Phe Gly Gly Gly Thr Lys Val Glu Ile Lys
            100                 105
```

<210> SEQ ID NO 68
<211> LENGTH: 107
<212> TYPE: PRT
<213> ORGANISM: Artificial Sequence
<220> FEATURE:
<223> OTHER INFORMATION: Synthetic Construct

<400> SEQUENCE: 68

```
Asp Ile Gln Leu Thr Gln Ser Pro Ser Ser Leu Ser Ala Ser Val Gly
 1               5                  10                  15

Asp Arg Val Thr Ile Thr Cys Arg Ala Ser Gln Gly Ile Arg Ser Tyr
             20                  25                  30

Leu Ala Trp Tyr Gln Gln Lys Pro Gly Lys Ala Pro Lys Leu Leu Ile
             35                  40                  45

Tyr Ala Ala Ser Thr Leu Gln Ser Gly Val Pro Ser Arg Phe Ser Gly
 50                  55                  60

Ser Gly Ser Gly Thr Asp Phe Thr Leu Thr Ile Ser Ser Leu Gln Pro
 65                  70                  75                  80

Glu Asp Phe Ala Thr Tyr Tyr Cys Gln Gln Leu Ser Ser Tyr Pro Leu
                 85                  90                  95

Ser Phe Gly Gly Gly Thr Lys Val Glu Ile Lys
            100                 105
```

<210> SEQ ID NO 69
<211> LENGTH: 107
<212> TYPE: PRT
<213> ORGANISM: Artificial Sequence
<220> FEATURE:
<223> OTHER INFORMATION: Synthetic Construct

<400> SEQUENCE: 69

Asp Ile Gln Leu Thr Gln Ser Pro Ser Ser Leu Ser Ala Ser Val Gly
1               5                   10                  15

Asp Arg Val Thr Ile Thr Cys Arg Ala Ser Gln Gly Ile Ser Ser Tyr
            20                  25                  30

Leu Ala Trp Tyr Gln Gln Lys Pro Gly Lys Thr Pro Lys Leu Leu Ile
        35                  40                  45

Tyr Ala Ala Ser Thr Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Leu Ser Ser Tyr Pro Leu
                85                  90                  95

Thr Phe Gly Gly Gly Thr Lys Val Glu Ile Lys
            100                 105

<210> SEQ ID NO 70
<211> LENGTH: 107
<212> TYPE: PRT
<213> ORGANISM: Artificial Sequence
<220> FEATURE:
<223> OTHER INFORMATION: Synthetic Construct

<400> SEQUENCE: 70

Asp Ile Gln Leu Thr Gln Ser Pro Ser Ser Phe Ser Ala Ser Thr Gly
1               5                   10                  15

Asp Arg Val Thr Ile Thr Cys Arg Ala Ser Gln Gly Ile Ser Ser Tyr
            20                  25                  30

Leu Ala Trp Tyr Gln Gln Lys Pro Gly Lys Ala Pro Lys Val Leu Ile
        35                  40                  45

Tyr Ala Ala Ser Thr Leu Gln Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Gln Gln Leu Lys Ser Tyr Pro Leu
                85                  90                  95

Thr Phe Gly Gly Gly Thr Lys Leu Glu Ile Lys
            100                 105

<210> SEQ ID NO 71
<211> LENGTH: 294
<212> TYPE: PRT
<213> ORGANISM: Pseudomonas aeruginosa

<400> SEQUENCE: 71

Met Glu Val Arg Asn Leu Asn Ala Ala Arg Glu Leu Phe Leu Asp Glu
1               5                   10                  15

Leu Leu Ala Ala Ser Ala Ala Pro Ala Ser Ala Glu Gln Glu Glu Leu
            20                  25                  30

Leu Ala Leu Leu Arg Ser Glu Arg Ile Val Leu Ala His Ala Gly Gln
        35                  40                  45

Pro Leu Ser Glu Ala Gln Val Leu Lys Ala Leu Ala Trp Leu Leu Ala
    50                  55                  60

Ala Asn Pro Ser Ala Pro Pro Gly Gln Gly Leu Glu Val Leu Arg Glu
65                  70                  75                  80

Val Leu Gln Ala Arg Arg Gln Pro Gly Ala Gln Trp Asp Leu Arg Glu 85                  90                  95
Phe Leu Val Ser Ala Tyr Phe Ser Leu His Gly Arg Leu Asp Glu Asp
                100                 105                 110

Val Ile Gly Val Tyr Lys Asp Val Leu Gln Thr Gln Asp Gly Lys Arg
            115                 120                 125

Lys Ala Leu Leu Asp Glu Leu Lys Ala Leu Thr Ala Glu Leu Lys Val
        130                 135                 140

Tyr Ser Val Ile Gln Ser Gln Ile Asn Ala Ala Leu Ser Ala Lys Gln
145                 150                 155                 160

Gly Ile Arg Ile Asp Ala Gly Gly Ile Asp Leu Val Asp Pro Thr Leu
                165                 170                 175

Tyr Gly Tyr Ala Val Gly Asp Pro Arg Trp Lys Asp Ser Pro Glu Tyr
            180                 185                 190

Ala Leu Leu Ser Asn Leu Asp Thr Phe Ser Gly Lys Leu Ser Ile Lys
        195                 200                 205

Asp Phe Leu Ser Gly Ser Pro Lys Gln Ser Gly Glu Leu Lys Gly Leu
    210                 215                 220

Ser Asp Glu Tyr Pro Phe Glu Lys Asp Asn Asn Pro Val Gly Asn Phe
225                 230                 235                 240

Ala Thr Thr Val Ser Asp Arg Ser Arg Pro Leu Asn Asp Lys Val Asn
                245                 250                 255

Glu Lys Thr Thr Leu Leu Asn Asp Thr Ser Ser Arg Tyr Asn Ser Ala
            260                 265                 270

Val Glu Ala Leu Asn Arg Phe Ile Gln Lys Tyr Asp Ser Val Leu Arg
        275                 280                 285

Asp Ile Leu Ser Ala Ile
    290

<210> SEQ ID NO 72
<211> LENGTH: 107
<212> TYPE: PRT
<213> ORGANISM: Homo sapiens

<400> SEQUENCE: 72

Arg Thr Val Ala Ala Pro Ser Val Phe Ile Phe Pro Pro Ser Asp Glu
1               5                   10                  15

Gln Leu Lys Ser Gly Thr Ala Ser Val Val Cys Leu Leu Asn Asn Phe
            20                  25                  30

Tyr Pro Arg Glu Ala Lys Val Gln Trp Lys Val Asp Asn Ala Leu Gln
        35                  40                  45

Ser Gly Asn Ser Gln Glu Ser Val Thr Glu Gln Asp Ser Lys Asp Ser
    50                  55                  60

Thr Tyr Ser Leu Ser Ser Thr Leu Thr Leu Ser Lys Ala Asp Tyr Glu
65                  70                  75                  80

Lys His Lys Val Tyr Ala Cys Glu Val Thr His Gln Gly Leu Ser Ser
                85                  90                  95

Pro Val Thr Lys Ser Phe Asn Arg Gly Glu Cys
            100                 105

<210> SEQ ID NO 73
<211> LENGTH: 330
<212> TYPE: PRT
<213> ORGANISM: Homo sapiens

<400> SEQUENCE: 73

Ala Ser Thr Lys Gly Pro Ser Val Phe Pro Leu Ala Pro Ser Ser Lys

```
              1               5                  10                 15
            Ser Thr Ser Gly Gly Thr Ala Ala Leu Gly Cys Leu Val Lys Asp Tyr
                            20                  25                 30
            Phe Pro Glu Pro Val Thr Val Ser Trp Asn Ser Gly Ala Leu Thr Ser
                            35                  40                 45
            Gly Val His Thr Phe Pro Ala Val Leu Gln Ser Ser Gly Leu Tyr Ser
                50                      55                  60
            Leu Ser Ser Val Val Thr Val Pro Ser Ser Leu Gly Thr Gln Thr
            65                      70                  75                  80
            Tyr Ile Cys Asn Val Asn His Lys Pro Ser Asn Thr Lys Val Asp Lys
                                85                  90                 95
            Lys Val Glu Pro Lys Ser Cys Asp Lys Thr His Thr Cys Pro Pro Cys
                            100                 105                110
            Pro Ala Pro Glu Leu Leu Gly Gly Pro Ser Val Phe Leu Phe Pro Pro
                            115                 120                125
            Lys Pro Lys Asp Thr Leu Met Ile Ser Arg Thr Pro Glu Val Thr Cys
            130                     135                 140
            Val Val Val Asp Val Ser His Glu Asp Pro Glu Val Lys Phe Asn Trp
            145                     150                 155                 160
            Tyr Val Asp Gly Val Glu Val His Asn Ala Lys Thr Lys Pro Arg Glu
                                165                 170                175
            Glu Gln Tyr Asn Ser Thr Tyr Arg Val Val Ser Val Leu Thr Val Leu
                            180                 185                 190
            His Gln Asp Trp Leu Asn Gly Lys Glu Tyr Lys Cys Lys Val Ser Asn
                            195                 200                 205
            Lys Ala Leu Pro Ala Pro Ile Glu Lys Thr Ile Ser Lys Ala Lys Gly
                        210                 215                 220
            Gln Pro Arg Glu Pro Gln Val Tyr Thr Leu Pro Pro Ser Arg Glu Glu
            225                     230                 235                 240
            Met Thr Lys Asn Gln Val Ser Leu Thr Cys Leu Val Lys Gly Phe Tyr
                                245                 250                 255
            Pro Ser Asp Ile Ala Val Glu Trp Glu Ser Asn Gly Gln Pro Glu Asn
                            260                 265                 270
            Asn Tyr Lys Thr Thr Pro Pro Val Leu Asp Ser Asp Gly Ser Phe Phe
                        275                 280                 285
            Leu Tyr Ser Lys Leu Thr Val Asp Lys Ser Arg Trp Gln Gln Gly Asn
                        290                 295                 300
            Val Phe Ser Cys Ser Val Met His Glu Ala Leu His Asn His Tyr Thr
            305                     310                 315                 320
            Gln Lys Ser Leu Ser Leu Ser Pro Gly Lys
                                325                 330

<210> SEQ ID NO 74
<211> LENGTH: 327
<212> TYPE: PRT
<213> ORGANISM: Homo sapiens

<400> SEQUENCE: 74

Ala Ser Thr Lys Gly Pro Ser Val Phe Pro Leu Ala Pro Cys Ser Arg
            1               5                   10                  15
            Ser Thr Ser Glu Ser Thr Ala Ala Leu Gly Cys Leu Val Lys Asp Tyr
                            20                  25                  30
            Phe Pro Glu Pro Val Thr Val Ser Trp Asn Ser Gly Ala Leu Thr Ser
                            35                  40                  45
```

-continued

```
Gly Val His Thr Phe Pro Ala Val Leu Gln Ser Ser Gly Leu Tyr Ser
    50              55                  60

Leu Ser Ser Val Val Thr Val Pro Ser Ser Leu Gly Thr Lys Thr
65              70                  75                  80

Tyr Thr Cys Asn Val Asp His Lys Pro Ser Asn Thr Lys Val Asp Lys
            85              90                  95

Arg Val Glu Ser Lys Tyr Gly Pro Pro Cys Pro Ser Cys Pro Ala Pro
            100             105             110

Glu Phe Leu Gly Gly Pro Ser Val Phe Leu Phe Pro Pro Lys Pro Lys
        115             120             125

Asp Thr Leu Met Ile Ser Arg Thr Pro Glu Val Thr Cys Val Val Val
    130             135             140

Asp Val Ser Gln Glu Asp Pro Glu Val Gln Phe Asn Trp Tyr Val Asp
145             150             155             160

Gly Val Glu Val His Asn Ala Lys Thr Lys Pro Arg Glu Glu Gln Phe
                165             170             175

Asn Ser Thr Tyr Arg Val Val Ser Val Leu Thr Val Leu His Gln Asp
            180             185             190

Trp Leu Asn Gly Lys Glu Tyr Lys Cys Lys Val Ser Asn Lys Gly Leu
        195             200             205

Pro Ser Ser Ile Glu Lys Thr Ile Ser Lys Ala Lys Gly Gln Pro Arg
    210             215             220

Glu Pro Gln Val Tyr Thr Leu Pro Pro Ser Gln Glu Glu Met Thr Lys
225             230             235             240

Asn Gln Val Ser Leu Thr Cys Leu Val Lys Gly Phe Tyr Pro Ser Asp
            245             250             255

Ile Ala Val Glu Trp Glu Ser Asn Gly Gln Pro Glu Asn Asn Tyr Lys
            260             265             270

Thr Thr Pro Pro Val Leu Asp Ser Asp Gly Ser Phe Phe Leu Tyr Ser
        275             280             285

Arg Leu Thr Val Asp Lys Ser Arg Trp Gln Glu Gly Asn Val Phe Ser
        290             295             300

Cys Ser Val Met His Glu Ala Leu His Asn His Tyr Thr Gln Lys Ser
305             310             315             320

Leu Ser Leu Ser Leu Gly Lys
                325
```

ANTIBODIES SPECIFICALLY RECOGNIZING *PSEUDOMONAS* PcrV AND USES THEREOF

CROSS REFERENCE TO RELATED APPLICATIONS

This application is a national stage application under 35 U.S.C. § 371 of International Application No. PCT/CN2020/100592, filed internationally on Jul. 7, 2020, which claims priority of International Chinese Application No. PCT/CN2019/095181, filed Jul. 9, 2019, the disclosures of which are herein incorporated by reference in their entirety.

The content of the following submission on ASCII text file is incorporated herein by reference in its entirety: a computer readable form (CRF) of the Sequence Listing (file name: 710262000300SEQLIST.TXT, date recorded: Jan. 7, 2022, size: 47,191 bytes).

FIELD OF THE APPLICATION

This application pertains to antibodies that specifically recognize PcrV from *Pseudomonas aeruginosa*, and methods of manufacture and uses thereof, including methods of treating and preventing *Pseudomonas* infections.

BACKGROUND OF THE APPLICATION

*Pseudomonas aeruginosa* is an obligately aerobic gram negative *bacillus* being widely existing in the natural world. Although its pathogenicity is usually low, it is a pathogen that causes opportunistic infections, often occurring in patients suffering from various pre-existing diseases such as cancer, diabetes, immunodeficiency diseases and patients administered with pharmaceuticals exhibiting immune-inhibitory action. Patients with breached skin mucous membrane are prone to *P. aeruginosa* infections while it also poses considerable risk to patients with chronic structural lung diseases (such as COPD or cystic fibrosis). *P. aeruginosa* may often cause pneumonia, urinary tract infection, sepsis and the like, and often leading to severe results. Up to 10% of nosocomial infections are attributed to *P. aeruginosa*, with mortality rates approaching 40% in patients with *P. aeruginosa* bacteremia. In clinical fields, *P. aeruginosa* infection is considered as one of the most difficult infections to be treated not only because *P. aeruginosa* has inherently low sensitivity to existent antibiotics, but also because of its high tendency to acquire resistance to various antibiotics. Thus the strategy of developing an arsenal of antibiotics has limited merits in combating *P. aeruginosa* infections.

*Pseudomonas aeruginosa* is a major cause of hospital-acquired infections, particularly in mechanically ventilated patients, and it is the leading cause of death in cystic fibrosis patients. A key virulence factor associated with disease severity is the *P. aeruginosa* type III secretion system (T3SS), which injects bacterial toxins directly into the cytoplasm of host cells. High cytotoxicity of *Pseudomonas aeruginosa* is exerted by injection of toxin into a eukaryotic cell via a type III exotoxin secretion system (T3SS). PcrV is a protein of 294 residues (NCBI Accession No. AAC45935, SEQ NO: 71) constituting the type III exotoxin secretion system, and an operon sequence encoding the same is open to the public (U.S. Pat. No. 6,551,795, Yahr, T. L. et al., *J. Bacteriol.*, 1997, vol. 179, p. 7165). The PcrV protein, located at the tip of the T3SS injectisome complex, is required for T3SS function and is a well-validated target in animal models of immunoprophylactic strategies targeting *P. aeruginosa*. The *P. aeruginosa* T3SS is a well-validated target for intervention in infections caused by this opportunistic pathogen. Both active vaccination with T3SS component proteins and passive immunotherapy targeting PcrV strongly attenuate *P. aeruginosa* disease in animal models. Since control for PcrV can possibly lead a therapeutic means in controlling *Pseudomonas aeruginosa* infection (T. Sawa et al., Nature Medicine, 1999, vol. 5, p. 392), polyclonal antibodies (Shime N et al., *J. Immunol.* 2001, vol. 167, p. 5880, Imamura Y et al., *Eur. Respir. J.*, 2007, Vol. 29, p. 965) and monoclonal antibodies (WO2002064161A2, Karine Faure et al., *J. Immune. Based. Therapies and Vaccines*, 2003, Vol. 1, Dara W. Frank et al., *J. Infect. Disease*, 2002, Vol. 186, p. 64) against PcrV having neutralizing activity are reported. However, polyclonal antibodies are difficult to be humanized and to be used as pharmaceutical compositions because of the difficulty in improving antigenicity. An antibody against PcrV, designated V2L2, is described in Warrener et al., 2014, *Antimicrob. Agents Chemother.*, 58, 4384-4391. A pegylated Fab fragment of an anti-PcrV Mab, based on the PcrV-specific mouse monoclonal antibody MAb166, is inactive for preventing *P. aeruginosa* respiratory infections in mechanically ventilated patients. While effective in blocking *P. aeruginosa* T3SS in vitro, MAb166 requires relatively high antibody doses for protection in animal models. The present application provides novel anti-PcrV mAbs that showed potent inhibition of PcrV in vitro and in vivo.

The disclosures of all publications, patents, patent applications and published patent applications referred to herein are hereby incorporated herein by reference in their entirety.

BRIEF SUMMARY OF THE APPLICATION

The present application provides an isolated anti-PcrV antibody that specifically binds to an epitope on *Pseudomonas* PcrV, and methods of use thereof for treating *Pseudomonas* infections.

In one aspect, the present application provides an isolated anti-PcrV antibody that specifically binds to an epitope on *Pseudomonas* PcrV, wherein the epitope comprises one, two, three, four, five, or six amino acid residues selected from the group consisting of Gln160, Asp165, Asp170, Asp173, Thr175, and Ser202 of *Pseudomonas* PcrV. In some embodiments, the anti-PcrV antibody binds to the *Pseudomonas* PcrV with a Kd from 70 about 0.1 pM to about 1 nM.

In one aspect, the present application provides an isolated anti-PcrV antibody, wherein the anti-PcrV antibody comprises a heavy chain variable domain (VH) comprising: a heavy chain complementarity determining region (HC-CDR) 1 comprising $X_1X_2X_3MS$ (SEQ ID NO: 39), or a variant thereof comprising up to about 3 amino acid substitutions, wherein $X_1$ is D or S, $X_2$ is Y or N and $X_3$ is P, H, Y or S; an HC-CDR2 comprising $X_1ISESGGSTX_2X_3ADSVKG$ (SEQ ID NO: 40), or a variant thereof comprising up to about 3 amino acid substitutions, wherein $X_1$ is G or V; $X_2$ is N or Y; and $X_3$ is D or Y; and an HC-CDR3 comprising $GRFX_1X_2X_3X_4X_5X_6FX_7RAVYGMDV$ (SEQ ID NO: 41), or a variant thereof comprising up to about 3 amino acid substitutions, 80 wherein $X_1$ is S or C, $X_2$ is T, G, D, Y, Q or A, $X_3$ is S, D, N, E, L, A, or Y, $X_4$ is S, T, Y, or A, $X_5$ is S, H, Q, A, R, K, G, E, Y or D, $X_6$ is H or C, and $X_7$ is F or Y; and a light chain variable domain (VL) comprising: a light chain complementarity determining region (LC-CDR) 1 comprising $RASQGIX_1SYLA$ (SEQ ID NO: 42), or a variant thereof comprising up to about 3 amino acid substitutions, wherein $X_1$ is S or R; a LC-CDR2 comprising AASTLQS (SEQ ID NO: 34), or a variant thereof comprising up to about 3 amino acid substitutions; and a LC-CDR3 comprising QQLX$_1$SYPLX$_2$ (SEQ ID NO: 43), or a variant thereof comprising up to about 3 amino acid substitutions, wherein $X_1$ is S, N or K, and $X_2$ is S or T.

In some embodiments, there is provided an isolated anti-PcrV antibody, wherein the anti-PcrV antibody comprises a heavy chain variable domain (VH) comprising: a heavy chain complementarity determining region (HC-CDR) 1 comprising DX$_1$X$_2$MS (SEQ ID NO: 44), or a variant thereof comprising up to about 3 amino acid substitutions, wherein $X_1$ is N or Y and $X_2$ is P, H, or Y; an HC-CDR2 comprising X$_1$ISESGGSTNYADSVKG (SEQ ID NO: 45), or a variant thereof comprising up to about 3 amino acid substitutions, wherein $X_1$ is G or V; and an HC-CDR3 comprising GRFSTX$_1$SX$_2$HFX$_3$RAVYGMDV (SEQ ID NO: 46), or a variant thereof comprising up to about 3 amino acid substitutions, wherein $X_1$ is N, S, D, or L, $X_2$ is S or A, and $X_3$ is F or Y; and a light chain variable domain (VL) comprising: a light chain complementarity determining region (LC-CDR) 1 comprising RASQGISSYLA (SEQ ID NO: 32), or a variant thereof comprising up to about 3 amino acid substitutions; a LC-CDR2 comprising AASTLQS (SEQ ID NO: 34), or a variant thereof comprising up to about 3 amino acid substitutions; and a LC-CDR3 comprising QQLSSYPLX$_1$ (SEQ ID NO: 47), or a variant thereof comprising up to about 3 amino acid substitutions, wherein $X_1$ is S or T. In some embodiments, there is provided an isolated anti-PcrV antibody, wherein the anti-PcrV antibody comprises a VH comprising an HC-CDR1, an HC-CDR2, and an HC-CDR3 of the VH comprising the amino acid sequence of any one of SEQ ID NOs: 48-64; and a VL comprising a LC-CDR1, a LC-CDR2, and a LC-CDR3 of the VL comprising the amino acid sequence of any one of SEQ ID NOs: 65-70.

In some embodiments according to any one of the isolated anti-PcrV antibody described above, the anti-PcrV antibody comprises: a VH comprising an HC-CDR1 comprising the amino acid sequence of any one of SEQ ID NOs: 1-8, or a variant thereof comprising up to about 3 amino acid substitutions; an HC-CDR2 comprising the amino acid sequence of any one of SEQ ID NOs: 9-14, or a variant thereof comprising up to about 3 amino acid substitutions; and an HC-CDR3 comprising the amino acid sequence of any one of SEQ ID NOs: 15-31, or a variant thereof comprising up to about 3 amino acid substitutions; and a VL comprising a LC-CDR1 comprising the amino acid sequence of SEQ ID NO: 32-33, or a variant thereof comprising up to about 3 amino acid substitutions; a LC-CDR2 comprising the amino acid sequence of SEQ ID NO: 34, or a variant thereof comprising up to about 3 amino acid substitutions; and a LC-CDR3 comprising the amino acid sequence of any one of SEQ ID NOs: 35-38, or a variant thereof comprising up to about 3 amino acid substitutions.

In some embodiments according to any one of the isolated anti-PcrV antibody described above, the anti-PcrV antibody comprises: (i) a V$_H$ comprising an HC-CDR1 comprising the amino acid sequence of SEQ ID NO: 1, an HC-CDR2 comprising the amino acid sequence of SEQ ID NO: 9, and an HC-CDR3 comprising the amino acid sequence of SEQ ID NO: 15, or a variant thereof comprising up to about 5 amino acid substitutions in the HC-CDRs; and a V$_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35, or a variant thereof comprising up to about 5 amino acid substitutions in the LC-CDRs; (ii) a V$_H$ comprising an HC-CDR1 comprising the amino acid sequence of SEQ ID NO: 2, an HC-CDR2 comprising the amino acid sequence of SEQ ID NO: 10, and an HC-CDR3 comprising the amino acid sequence of SEQ ID NO: 16, or a variant thereof comprising up to about 5 amino acid substitutions in the HC-CDRs; and a V$_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35, or a variant thereof comprising up to about 5 amino acid substitutions in the LC-CDRs; (iii) a V$_H$ comprising an HC-CDR1 comprising the amino acid sequence of SEQ ID NO: 1, an HC-CDR2 comprising the amino acid sequence of SEQ ID NO: 9, and an HC-CDR3 comprising the amino acid sequence of SEQ ID NO: 17, or a variant thereof comprising up to about 5 amino acid substitutions in the HC-CDRs; and a V$_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 36, or a variant thereof comprising up to about 5 amino acid substitutions in the LC-CDRs; (iv) a V$_H$ comprising an HC-CDR1 comprising the amino acid sequence of SEQ ID NO: 3, an HC-CDR2 comprising the amino acid sequence of SEQ ID NO: 10, and an HC-CDR3 comprising the amino acid sequence of SEQ ID NO: 18, or a variant thereof comprising up to about 5 amino acid substitutions in the HC-CDRs; and a V$_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37, or a variant thereof comprising up to about 5 amino acid substitutions in the LC-CDRs; (v) a V$_H$ comprising an HC-CDR1 comprising the amino acid sequence of SEQ ID NO: 3, an HC-CDR2 comprising the amino acid sequence of SEQ ID NO: 10, and an HC-CDR3 comprising the amino acid sequence of SEQ ID NO: 19, or a variant thereof comprising up to about 5 amino acid substitutions in the HC-CDRs; and a V$_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35, or a variant thereof comprising up to about 5 amino acid substitutions in the LC-CDRs; (vi) a V$_H$ comprising an HC-CDR1 comprising the amino acid sequence of SEQ ID NO: 3, an HC-CDR2 comprising the amino acid sequence of SEQ ID NO: 11, and an HC-CDR3 comprising the amino acid sequence of SEQ ID NO: 20, or a variant thereof comprising up to about 5 amino acid substitutions in the HC-CDRs; and a V$_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35, or a variant thereof comprising up to about 5 amino acid substitutions in the LC-CDRs; (vii) a V$_H$ comprising an HC-CDR1 comprising the amino acid sequence of SEQ ID NO: 4, an HC-CDR2 comprising the amino acid sequence of SEQ ID NO: 10, and an HC-CDR3 comprising the amino acid sequence of SEQ ID NO: 21, or a variant thereof comprising up to about 5 amino acid substitutions in the HC-CDRs; and a V$_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35, or a variant thereof comprising up to about 5 amino acid substitutions in the LC-CDRs; (viii) a $V_H$ comprising an HC-CDR1 comprising the amino acid sequence of SEQ ID NO: 5, an HC-CDR2 comprising the amino acid sequence of SEQ ID NO: 10, and an HC-CDR3 comprising the amino acid sequence of SEQ ID NO: 22, or a variant thereof comprising up to about 5 amino acid substitutions in the HC-CDRs; and a $V_L$ comprising n LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37, or a variant thereof comprising up to about 5 amino acid substitutions in the LC-CDRs; (ix) a $V_H$ comprising an HC-CDR1 comprising the amino acid sequence of SEQ ID NO: 6, an HC-CDR2 comprising the amino acid sequence of SEQ ID NO: 10, and an HC-CDR3 comprising the amino acid sequence of SEQ ID NO: 23, or a variant thereof comprising up to about 5 amino acid substitutions in the HC-CDRs; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37, or a variant thereof comprising up to about 5 amino acid substitutions in the LC-CDRs; (x) a $V_H$ comprising an HC-CDR1 comprising the amino acid sequence of SEQ ID NO: 1, an HC-CDR2 comprising the amino acid sequence of SEQ ID NO: 12, and an HC-CDR3 comprising the amino acid sequence of SEQ ID NO: 24, or a variant thereof comprising up to about 5 amino acid substitutions in the HC-CDRs; and a $V_L$ comprising an LC-CDR1 comprising the amino acid sequence of SEQ ID NO: 33, an LC-CDR2 comprising the amino acid sequence of SEQ ID NO: 34, and an LC-CDR3 comprising the amino acid sequence of SEQ ID NO: 35, or a variant thereof comprising up to about 5 amino acid substitutions in the LC-CDRs; (xi) a $V_H$ comprising an HC-CDR1 comprising the amino acid sequence of SEQ ID NO: 2, an HC-CDR2 comprising the amino acid sequence of SEQ ID NO: 10, and an HC-CDR3 comprising the amino acid sequence of SEQ ID NO: 25, or a variant thereof comprising up to about 5 amino acid substitutions in the HC-CDRs; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37, or a variant thereof comprising up to about 5 amino acid substitutions in the LC-CDRs; (xii) a $V_H$ comprising an HC-CDR1 comprising the amino acid sequence of SEQ ID NO: 1, an HC-CDR2 comprising the amino acid sequence of SEQ ID NO: 9, and an HC-CDR3 comprising the amino acid sequence of SEQ ID NO: 26, or a variant thereof comprising up to about 5 amino acid substitutions in the HC-CDRs; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35, or a variant thereof comprising up to about 5 amino acid substitutions in the LC-CDRs; (xiii) a $V_H$ comprising an HC-CDR1 comprising the amino acid sequence of SEQ ID NO: 3, an HC-CDR2 comprising the amino acid sequence of SEQ ID NO: 10, and an HC-CDR3 comprising the amino acid sequence of SEQ ID NO: 27, or a variant thereof comprising up to about 5 amino acid substitutions in the HC-CDRs; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35, or a variant thereof comprising up to about 5 amino acid substitutions in the LC-CDRs; (xiv) a $V_H$ comprising an HC-CDR1 comprising the amino acid sequence of SEQ ID NO: 1, an HC-CDR2 comprising the amino acid sequence of SEQ ID NO: 10, and an HC-CDR3 comprising the amino acid sequence of SEQ ID NO: 28, or a variant thereof comprising up to about 5 amino acid substitutions in the HC-CDRs; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35, or a variant thereof comprising up to about 5 amino acid substitutions in the LC-CDRs; (xv) a $V_H$ comprising an HC-CDR1 comprising the amino acid sequence of SEQ ID NO: 7, an HC-CDR2 comprising the amino acid sequence of SEQ ID NO: 13, and an HC-CDR3 comprising the amino acid sequence of SEQ ID NO: 29, or a variant thereof comprising up to about 5 amino acid substitutions in the HC-CDRs; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37, or a variant thereof comprising up to about 5 amino acid substitutions in the LC-CDRs; (xvi) a $V_H$ comprising an HC-CDR1 comprising the amino acid sequence of SEQ ID NO: 1, an HC-CDR2 comprising the amino acid sequence of SEQ ID NO: 10, and an HC-CDR3 comprising the amino acid sequence of SEQ ID NO: 30, or a variant thereof comprising up to about 5 amino acid substitutions in the HC-CDRs; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35, or a variant thereof comprising up to about 5 amino acid substitutions in the LC-CDRs; (xvii) a $V_H$ comprising an HC-CDR1 comprising the amino acid sequence of SEQ ID NO: 8, an HC-CDR2 comprising the amino acid sequence of SEQ ID NO: 14, and an HC-CDR3 comprising the amino acid sequence of SEQ ID NO: 31, or a variant thereof comprising up to about 5 amino acid substitutions in the HC-CDRs; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37, or a variant thereof comprising up to about 5 amino acid substitutions in the LC-CDRs; or (xviii) a $V_H$ comprising an HC-CDR1 comprising the amino acid sequence of SEQ ID NO: 7, an HC-CDR2 comprising the amino acid sequence of SEQ ID NO: 13, and an HC-CDR3 comprising the amino acid sequence of SEQ ID NO: 29, or a variant thereof comprising up to about 5 amino acid substitutions in the HC-CDRs; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 38, or a variant thereof comprising up to about 5 amino acid substitutions in the LC-CDRs.

In some embodiments according to any one of the isolated anti-PcrV antibodies described above, the anti-PcrV antibody comprises: (i) a $V_H$ comprising an HC-CDR1 comprising the amino acid sequence of SEQ ID NO: 3, an HC-CDR2 comprising the amino acid sequence of SEQ ID NO: 10, and an HC-CDR3 comprising the amino acid sequence of SEQ ID NO: 18, or a variant thereof comprising up to about 5 amino acid substitutions in the HC-CDRs; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37, or a variant thereof comprising up to about 5 amino acid substitutions in the LC-CDRs; (ii) a $V_H$ comprising an HC-CDR1 comprising the amino acid sequence of SEQ ID NO: 3, an HC-CDR2 comprising the amino acid sequence of SEQ ID NO: 10, and an HC-CDR3 comprising the amino acid sequence of SEQ ID NO: 19, or a variant thereof comprising up to about 5 amino acid substitutions in the HC-CDRs; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35, or a variant thereof comprising up to about 5 amino acid substitutions in the LC-CDRs; (iii) a $V_H$ comprising an HC-CDR1 comprising the amino acid sequence of SEQ ID NO: 1, an HC-CDR2 comprising the amino acid sequence of SEQ ID NO: 10, and an HC-CDR3 comprising the amino acid sequence of SEQ ID NO: 28, or a variant thereof comprising up to about 5 amino acid substitutions in the HC-CDRs; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35, or a variant thereof comprising up to about 5 amino acid substitutions in the LC-CDRs; or (iv) a $V_H$ comprising an HC-CDR1 comprising the amino acid sequence of SEQ ID NO: 7, an HC-CDR2 comprising the amino acid sequence of SEQ ID NO: 13, and an HC-CDR3 comprising the amino acid sequence of SEQ ID NO: 29, or a variant thereof comprising up to about 5 amino acid substitutions in the HC-CDRs; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37, or a variant thereof comprising up to about 5 amino acid substitutions in the LC-CDRs.

In some embodiments according to any one of the isolated anti-PcrV antibodies described above, the isolated anti-PcrV antibody comprises: a $V_H$ comprising the amino acid sequence of any one of SEQ ID NOs: 48-64, or a variant thereof having at least about 90% sequence identity to the amino acid sequence of any one of SEQ ID NOs: 48-64; and a $V_L$ comprising the amino acid sequence of any one of SEQ ID NOs: 65-70, or a variant thereof having at least about 90% sequence identity to the amino acid sequence of any one of SEQ ID NOs: 65-70. In some embodiments, the isolated anti-PcrV antibody comprises: a $V_H$ comprising the amino acid sequence of any one of SEQ ID NOs: 51-52 and 61-62, or a variant thereof having at least about 90% sequence identity to the amino acid sequence of any one of SEQ ID NOs: 51-52 and 61-62; and a $V_L$ comprising the amino acid sequence of SEQ ID NO: 65 or 67, or a variant thereof having at least about 90% sequence identity to the amino acid sequence of SEQ ID NO: 65 or 67. In some embodiments, the isolated anti-PcrV antibody comprises: (i) a $V_H$ comprising the amino acid sequence of SEQ ID NO: 48 and a $V_L$ comprising the amino acid sequence of SEQ ID NO: 65; (ii) a $V_H$ comprising the amino acid sequence of SEQ ID NO: 49 and a $V_L$ comprising the amino acid sequence of SEQ ID NO: 65; (iii) a $V_H$ comprising the amino acid sequence of SEQ ID NO: 50 and a $V_L$ comprising the amino acid sequence of SEQ ID NO: 66; (iv) a $V_H$ comprising the amino acid sequence of SEQ ID NO: 51 and a $V_L$ comprising the amino acid sequence of SEQ ID NO: 67; (v) a $V_H$ comprising the amino acid sequence of SEQ ID NO: 52 and a $V_L$ comprising the amino acid sequence of SEQ ID NO: 65; a (vi) $V_H$ comprising the amino acid sequence of SEQ ID NO: 53 and a $V_L$ comprising the amino acid sequence of SEQ ID NO: 65; (vii) a $V_H$ comprising the amino acid sequence of SEQ ID NO: 54 and a $V_L$ comprising the amino acid sequence of SEQ ID NO: 65; (viii) a $V_H$ comprising the amino acid sequence of SEQ ID NO: 55 and a $V_L$ comprising the amino acid sequence of SEQ ID NO: 67; (ix) a $V_H$ comprising the amino acid sequence of SEQ ID NO: 56 and a $V_L$ comprising the amino acid sequence of SEQ ID NO: 67; (x) a $V_H$ comprising the amino acid sequence of SEQ ID NO: 57 and a $V_L$ comprising the amino acid sequence of SEQ ID NO: 68; (xi) a $V_H$ comprising the amino acid sequence of SEQ ID NO: 58 and a $V_L$ comprising the amino acid sequence of SEQ ID NO: 69; (xii) a $V_H$ comprising the amino acid sequence of SEQ ID NO: 59 and a $V_L$ comprising the amino acid sequence of SEQ ID NO: 65; (xiii) a $V_H$ comprising the amino acid sequence of SEQ ID NO: 60 and a $V_L$ comprising the amino acid sequence of SEQ ID NO: 65; (xiv) a $V_H$ comprising the amino acid sequence of SEQ ID NO: 61 and a $V_L$ comprising the amino acid sequence of SEQ ID NO: 65; (xv) a $V_H$ comprising the amino acid sequence of SEQ ID NO: 62 and a $V_L$ comprising the amino acid sequence of SEQ ID NO: 67; (xvi) a $V_H$ comprising the amino acid sequence of SEQ ID NO: 63 and a $V_L$ comprising the amino acid sequence of SEQ ID NO: 65; (xvii) a $V_H$ comprising the amino acid sequence of SEQ ID NO: 64 and a $V_L$ comprising the amino acid sequence of SEQ ID NO: 67; or (xviii) a $V_H$ comprising the amino acid sequence of SEQ ID NO: 62 and a $V_L$ comprising the amino acid sequence of SEQ ID NO: 70.

In some embodiments, there is provided an isolated anti-PcrV antibody that specifically binds to PcrV competitively with the isolated anti-PcrV antibody of any one of isolated anti-PcrV antibodies described above. In some embodiments, there is provided an isolated anti-PcrV antibody that specifically binds to the same epitope as any one of isolated anti-PcrV antibodies as described above.

In some embodiments according to any one of the isolated anti-PcrV antibodies described above, the anti-PcrV antibody comprises an Fc fragment. In some embodiments, the anti-PcrV antibody is a full-length IgG antibody. In some embodiments, the anti-PcrV antibody is a full-length IgG1 or IgG4 antibody. In some embodiments, the anti-PcrV antibody is chimeric, human, or humanized. In some embodiments, the anti-PcrV antibody is an antigen binding fragment selected from the group consisting of a Fab, a Fab', a F(ab')2, a Fab'-SH, a single-chain Fv (scFv), an Fv fragment, a dAb, a Fd or a diabody.

In some embodiments, there is provided isolated nucleic acid molecule(s) that encodes any one of the anti-PcrV antibodies described above. In some embodiments, there is provided a vector comprising a nucleic acid molecule according to any one of the nucleic acid molecules described above. In some embodiments, there is provided a host cell comprising any one of the anti-PcrV antibodies described above, any one of the nucleic acid molecules described above, or any one of the vectors described above. In some embodiments, there is provided a method of producing an anti-PcrV antibody, comprising: a) culturing any one of the host cells described above under conditions effective to express the anti-PcrV antibody; and b) obtaining the expressed anti-PcrV antibody from the host cell.

In some embodiments, there is provided a method of preventing or treating a disease or condition in an individual in need thereof, comprising administering to the individual an effective amount of an anti-PcrV antibody according to any one of the anti-PcrV antibodies described above, or a pharmaceutical composition comprising an anti-PcrV antibody according to any one of the pharmaceutical compositions described above. In some embodiments, use of the anti-PcrV antibody according to any one of the anti-PcrV antibodies described above, or a pharmaceutical composition comprising an anti-PcrV antibody according to any one of the pharmaceutical compositions described above in the manufacture of a medicament for treating a disease or condition. In some embodiments, the disease or condition is a pathogenic infection. In some embodiments, the infection is a gram-negative bacterial infection. In some embodiments, the bacterium is Pseudomonas aeruginosa. In some embodiments, the disease or condition comprises one or more symptoms caused by Pseudomonas aeruginosa infection. In some embodiments, the symptom comprises one or more of fever, chills, fatigues, muscle and joint pain, swelling of joints, headache, diarrhea, skin rashes, pus in wounds, bacteremia, acute pneumonia, or intraperitoneal infection.

In some embodiments according to any one of the methods of treatment described above, the method further comprises administering one or more therapeutic agents. In some embodiments, at least one of the therapeutic agents is an antibiotic. In some embodiments, the antibiotic is one or more of Imipenem, Tobramycin, Ciprofloxacin, Meropenem or Aztreonam.

Also provided are pharmaceutical compositions, kits and articles of manufacture comprising any one of the anti-PcrV antibodies, nucleic acids, vectors, isolated host cells described above.

DETAILED DESCRIPTION OF THE APPLICATION

Figure 1A:
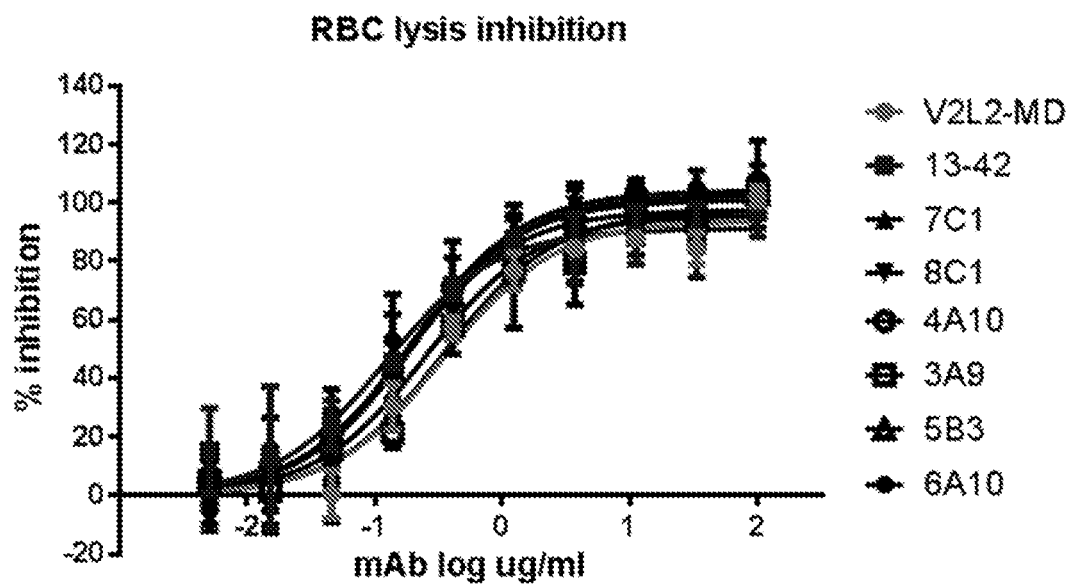
FIGS. 1A and 1B show the ability of lead optimized antibodies in in inhibiting RBC lysis compared to parental 13-42 mAb and reference antibody V2L2-MD.

The present application in one aspect provides anti-PcrV antibodies. By using a combination of selections on scFv phage libraries, affinity maturation and appropriately designed biochemical and biological assays, we have identified highly potent antibody molecules that bind to PcrV which inhibit the action of red blood cell and A549 cell lysis, and which provide both therapeutic and prophylactic in vivo protection against Pseudomonas aeruginosa. The results presented herein indicate that our antibodies bind a different region or epitope of PcrV when compared with either of the known anti-PcrV antibodies Mab166 or V2L2-MD, and surprisingly are even more potent than the known anti-PcrV antibodies, as demonstrated in a variety of biological assays.

The anti-PcrV antibodies provided by the present application include, for example, full-length anti-PcrV antibodies, anti-PcrV scFvs, anti-PcrV Fc fusion proteins, multi-specific (such as bispecific) anti-PcrV antibodies, anti-PcrV immunoconjugates, and the like.

In one aspect, the present application provides an isolated anti-PcrV antibody that specifically binds to an epitope on Pseudomonas PcrV, wherein the epitope comprises one, two, three, four, five, or six amino acid residues selected from the group consisting of Gln160, Asp165, Asp170, Asp173, Thr175, and Ser202 of Pseudomonas PcrV.

Also provided are anti-PcrV antibodies having specific sequences and antibodies that compete with or binds to the same epitope as such antibodies.

Also provided are nucleic acids encoding the anti-PcrV antibodies, compositions comprising the anti-PcrV antibodies, and methods of making and using the anti-PcrV antibodies.

Definitions

As used herein, "treatment" or "treating" is an approach for obtaining beneficial or desired results, including clinical results. For purposes of this application, beneficial or desired clinical results include, but are not limited to, one or more of the following: alleviating one or more symptoms resulting from the disease, diminishing the extent of the disease, stabilizing the disease (e.g., preventing or delaying the worsening of the disease), preventing or delaying the spread (e.g., systemic spread of a pathogen) of the disease, preventing or delaying the recurrence of the disease, delay or slowing the progression of the disease, ameliorating the disease state, providing a remission (partial or total) of the disease, decreasing the dose of one or more other medications required to treat the disease, delaying the progression of the disease, increasing or improving the quality of life, increasing weight gain, and/or prolonging survival. Also encompassed by "treatment" is a reduction of pathological consequence of infection (such as, for example, host cell lysis or necrosis). The methods of the application contemplate any one or more of these aspects of treatment.

The term "prevent," and similar words such as "prevented," "preventing," "prevention" etc., indicate an approach for preventing, inhibiting, or reducing the likelihood of the occurrence or recurrence of, a disease or condition, e.g., a pathogenic infection. It also refers to delaying the occurrence or recurrence of a disease or condition, or delaying the occurrence or recurrence of the symptoms of a disease or condition. As used herein, "prevention" and similar words also includes reducing the intensity, effect, symptoms and/or burden of a disease or condition prior to occurrence or recurrence of the disease or condition. As used herein, "prevention" and similar words also includes reducing the risk and susceptibility to occurrence or recurrence of the disease or condition, e.g., a pathogenic infection.

The term "antibody" includes full-length antibodies and antigen-binding fragments thereof. A full-length antibody comprises two heavy chains and two light chains. The variable regions of the light and heavy chains are responsible for antigen binding. The variable regions in both chains generally contain three highly variable loops called the complementarity determining regions (CDRs) (light chain (LC) CDRs including LC-CDR1, LC-CDR2, and LC-CDR3, heavy chain (HC) CDRs including HC-CDR1, HC-CDR2, and HC-CDR3). CDR boundaries for the antibodies and antigen-binding fragments disclosed herein may be defined or identified by the conventions of Kabat, Chothia, or Al-Lazikani (Al-Lazikani 1997; Chothia 1985; Chothia 1987; Chothia 1989; Kabat 1987; Kabat 1991). The three CDRs of the heavy or light chains are interposed between flanking stretches known as framework regions (FRs), which are more highly conserved than the CDRs and form a scaffold to support the hypervariable loops. The constant regions of the heavy and light chains are not involved in antigen binding, but exhibit various effector functions. Antibodies are assigned to classes based on the amino acid sequence of the constant region of their heavy chain. The five major classes or isotypes of antibodies are IgA, IgD, IgE, IgG, and IgM, which are characterized by the presence of α, δ, ε, γ, and μ heavy chains, respectively. Several of the major antibody classes are divided into subclasses such as IgG1 (γ1 heavy chain), IgG2 (γ2 heavy chain), IgG3 (γ3 heavy chain), IgG4 (γ4 heavy chain), IgA1 (α1 heavy chain), or IgA2 (α2 heavy chain).

The term "antigen-binding fragment" as used herein refers to an antibody fragment including, for example, a diabody, a Fab, a Fab', a F(ab')2, an Fv fragment, a disulfide stabilized Fv fragment (dsFv), a (dsFv)2, a bispecific dsFv (dsFv-dsFv'), a disulfide stabilized diabody (ds diabody), a single-chain Fv (scFv), an scFv dimer (bivalent diabody), a multispecific antibody formed from a portion of an antibody comprising one or more CDRs, a camelized single domain antibody, a nanobody, a domain antibody, a bivalent domain antibody, or any other antibody fragment that binds to an antigen but does not comprise a complete antibody structure. An antigen-binding fragment is capable of binding to the same antigen to which the parent antibody or a parent antibody fragment (e.g., a parent scFv) binds. In some embodiments, an antigen-binding fragment may comprise one or more CDRs from a particular human antibody grafted to a framework region from one or more different human antibodies.

The term "epitope" as used herein refers to the specific group of atoms or amino acids on an antigen to which an antibody or antibody moiety binds. Two antibodies or antibody moieties may bind the same epitope within an antigen if they exhibit competitive binding for the antigen.

As used herein, a first antibody "competes" for binding to a target PcrV with a second antibody when the first antibody inhibits target PcrV binding of the second antibody by at least about 50% (such as at least about any of 55%, 60%, 65%, 70%, 75%, 80%, 85%, 90%, 95%, 98% or 99%) in the presence of an equimolar concentration of the first antibody, or vice versa. A high throughput process for "binning" antibodies based upon their cross-competition is described in PCT Publication No. WO 03/48731.

As use herein, the term "specifically binds," "specifically recognizing," or "is specific for" refers to measurable and reproducible interactions, such as binding between a target and an antibody, that is determinative of the presence of the target in the presence of a heterogeneous population of molecules, including biological molecules. For example, an antibody that specifically recognizes a target (which can be an epitope) is an antibody that binds this target with greater affinity, avidity, more readily, and/or with greater duration than its bindings to other targets. In some embodiments, an antibody that specifically recognizes an antigen reacts with one or more antigenic determinants of the antigen with a binding affinity that is at least about 10 times its binding affinity for other targets.

An "isolated" anti-PcrV antibody as used herein refers to an anti-PcrV antibody that (1) is not associated with proteins found in nature, (2) is free of other proteins from the same source, (3) is expressed by a cell from a different species, or, (4) does not occur in nature.

The term "isolated nucleic acid" as used herein is intended to mean a nucleic acid of genomic, cDNA, or synthetic origin or some combination thereof, which by virtue of its origin the "isolated nucleic acid" (1) is not associated with all or a portion of a polynucleotide in which the "isolated nucleic acid" is found in nature, (2) is operably linked to a polynucleotide which it is not linked to in nature, or (3) does not occur in nature as part of a larger sequence.

As used herein, the term "CDR" or "complementarity determining region" is intended to mean the non-contiguous antigen combining sites found within the variable region of both heavy and light chain polypeptides. These particular regions have been described by Kabat et al., J. Biol. Chem. 252:6609-6616 (1977); Kabat et al., U.S. Dept. of Health and Human Services, "Sequences of proteins of immunological interest" (1991); Chothia et al., J. Mol. Biol. 196: 901-917 (1987); Al-Lazikani B. et al., *J. Mol. Biol.*, 273: 927-948 (1997); MacCallum et al., J. Mol. Biol. 262:732-745 (1996); Abhinandan and Martin, *Mol. Immunol.*, 45: 3832-3839 (2008); Lefranc M. P. et al., *Dev. Comp. Immunol.*, 27: 55-77 (2003); and Honegger and Plackthun, *J. Mol. Biol.*, 309:657-670 (2001), where the definitions include overlapping or subsets of amino acid residues when compared against each other. Nevertheless, application of either definition to refer to a CDR of an antibody or grafted antibodies or variants thereof is intended to be within the scope of the term as defined and used herein. The amino acid residues which encompass the CDRs as defined by each of the above cited references are set forth below in Table 1 as a comparison. CDR prediction algorithms and interfaces are known in the art, including, for example, Abhinandan and Martin, *Mol. Immunol.,* 45: 3832-3839 (2008); Ehrenmann F. et al., *Nucleic Acids Res.,* 38: D301-D307 (2010); and Adolf-Bryfogle J. et al., *Nucleic Acids Res.,* 43: D432-D438 (2015). The contents of the references cited in this paragraph are incorporated herein by reference in their entireties for use in the present application and for possible inclusion in one or more claims herein.

TABLE 1

CDR DEFINITIONS

| | Kabat[1] | Chothia[2] | MacCallum[3] | IMGT[4] | AHo[5] |
|---|---|---|---|---|---|
| $V_H$ CDR1 | 31-35 | 26-32 | 30-35 | 27-38 | 25-40 |
| $V_H$ CDR2 | 50-65 | 53-55 | 47-58 | 56-65 | 58-77 |
| $V_H$ CDR3 | 95-102 | 96-101 | 93-101 | 105-117 | 109-137 |
| $V_L$ CDR1 | 24-34 | 26-32 | 30-36 | 27-38 | 25-40 |
| $V_L$ CDR2 | 50-56 | 50-52 | 46-55 | 56-65 | 58-77 |
| $V_L$ CDR3 | 89-97 | 91-96 | 89-96 | 105-117 | 109-137 |

[1]Residue numbering follows the nomenclature of Kabat et al., supra
[2]Residue numbering follows the nomenclature of Chothia et al., supra
[3]Residue numbering follows the nomenclature of MacCallum et al., supra
[4]Residue numbering follows the nomenclature of Lefranc et al., supra
[5]Residue numbering follows the nomenclature of Honegger and Plückthun, supra The term "chimeric antibodies" refer to antibodies in which a portion of the heavy and/or light chain is identical with or homologous to corresponding sequences in antibodies derived from a particular species or belonging to a particular antibody class or subclass, while the remainder of the chain(s) is identical with or homologous to corresponding sequences in antibodies derived from another species or belonging to another antibody class or subclass, as well as fragments of such antibodies, so long as they exhibit a biological activity of this application (see U.S. Pat. No. 4,816,567; and Morrison et al., Proc. Natl. Acad. Sci. USA, 81:6851-6855 (1984)).

"Fv" is the minimum antibody fragment which contains a complete antigen-recognition and -binding site. This fragment consists of a dimer of one heavy- and one light-chain variable region domain in tight, non-covalent association. From the folding of these two domains emanate six hypervariable loops (3 loops each from the heavy and light chain) that contribute the amino acid residues for antigen binding and confer antigen binding specificity to the antibody. However, even a single variable domain (or half of an Fv comprising only three CDRs specific for an antigen) has the ability to recognize and bind antigen, although at a lower affinity than the entire binding site.

"Single-chain Fv," also abbreviated as "sFv" or "scFv," are antibody fragments that comprise the $V_H$ and $V_L$ antibody domains connected into a single polypeptide chain. In some embodiments, the scFv polypeptide further comprises a polypeptide linker between the $V_H$ and $V_L$ domains which enables the scFv to form the desired structure for antigen binding. For a review of scFv, see Pluckthun in *The Pharmacology of Monoclonal Antibodies,* vol. 113, Rosenburg and Moore eds., Springer-Verlag, New York, pp. 269-315 (1994).

The term "diabodies" refers to small antibody fragments prepared by constructing scFv fragments (see preceding paragraph) typically with short linkers (such as about 5 to about 10 residues) between the $V_H$ and $V_L$ domains such that inter-chain but not intra-chain pairing of the V domains is achieved, resulting in a bivalent fragment, i.e., fragment having two antigen-binding sites. Bispecific diabodies are heterodimers of two "crossover" scFv fragments in which the $V_H$ and $V_L$ domains of the two antibodies are present on different polypeptide chains. Diabodies are described more fully in, for example, EP 404,097; WO 93/11161; and Hollinger et al., *Proc. Natl. Acad. Sci. USA,* 90:6444-6448 (1993).

"Humanized" forms of non-human (e.g., rodent) antibodies are chimeric antibodies that contain minimal sequence derived from the non-human antibody. For the most part, humanized antibodies are human immunoglobulins (recipient antibody) in which residues from a hypervariable region (HVR) of the recipient are replaced by residues from a hypervariable region of a non-human species (donor antibody) such as mouse, rat, rabbit or non-human primate having the desired antibody specificity, affinity, and capability. In some instances, framework region (FR) residues of the human immunoglobulin are replaced by corresponding non-human residues. Furthermore, humanized antibodies can comprise residues that are not found in the recipient antibody or in the donor antibody. These modifications are made to further refine antibody performance. In general, the humanized antibody will comprise substantially all of at least one, and typically two, variable domains, in which all or substantially all of the hypervariable loops correspond to those of a non-human immunoglobulin and all or substantially all of the FRs are those of a human immunoglobulin sequence. The humanized antibody optionally also will comprise at least a portion of an immunoglobulin constant region (Fc), typically that of a human immunoglobulin. For further details, see Jones et al., *Nature* 321:522-525 (1986); Riechmann et al., *Nature* 332:323-329 (1988); and Presta, *Curr. Op. Struct. Biol.* 2:593-596 (1992).

"Percent (%) amino acid sequence identity" or "homology" with respect to the polypeptide and antibody sequences identified herein is defined as the percentage of amino acid residues in a candidate sequence that are identical with the amino acid residues in the polypeptide being compared, after aligning the sequences considering any conservative substitutions as part of the sequence identity. Alignment for purposes of determining percent amino acid sequence identity can be achieved in various ways that are within the skill in the art, for instance, using publicly available computer software such as BLAST, BLAST-2, ALIGN, Megalign (DNASTAR), or MUSCLE software. Those skilled in the art can determine appropriate parameters for measuring alignment, including any algorithms needed to achieve maximal alignment over the full-length of the sequences being compared. For purposes herein, however, % amino acid sequence identity values are generated using the sequence comparison computer program MUSCLE (Edgar, R. C., *Nucleic Acids Research* 32(5):1792-1797, 2004; Edgar, R. C., *BMC Bioinformatics* 5(1):113, 2004).

The terms "Fc receptor" or "FcR" are used to describe a receptor that binds to the Fc region of an antibody. In some embodiments, an FcR of this application is one that binds an IgG antibody (a γ receptor) and includes receptors of the FcγRI, FcγRII, and FcγRIII subclasses, including allelic variants and alternatively spliced forms of these receptors. FcγRII receptors include FcγRIIA (an "activating receptor") and FcγRIIB (an "inhibiting receptor"), which have similar amino acid sequences that differ primarily in the cytoplasmic domains thereof. Activating receptor FcγRIIA contains an immunoreceptor tyrosine-based activation motif (ITAM) in its cytoplasmic domain. Inhibiting receptor FcγRIIB contains an immunoreceptor tyrosine-based inhibition motif (ITIM) in its cytoplasmic domain (see review M. in Daëron, *Annu. Rev. Immunol.* 15:203-234 (1997)). The term includes allotypes, such as FcγRIIIA allotypes: FcγRIIIA-Phe158, FcγRIIIA-Val158, FcγRIIA-R131 and/or FcγRIIA-H131. FcRs are reviewed in Ravetch and Kinet, *Annu. Rev. Immunol* 9:457-92 (1991); Capel et al., *Immunomethods* 4:25-34 (1994); and de Haas et al., *J. Lab. Clin. Med.* 126:330-41 (1995). Other FcRs, including those to be identified in the future, are encompassed by the term "FcR" herein. The term also includes the neonatal receptor, FcRn, which is responsible for the transfer of maternal IgGs to the fetus (Guyer et al., *J. Immunol.* 117:587 (1976) and Kim et al., *J. Immunol.* 24:249 (1994)).

The term "FcRn" refers to the neonatal Fc receptor (FcRn). FcRn is structurally similar to major histocompatibility complex (MHC) and consists of an α-chain noncovalently bound to 02-microglobulin. The multiple functions of the neonatal Fc receptor FcRn are reviewed in Ghetie and Ward (2000) *Annu. Rev. Immunol.* 18, 739-766. FcRn plays a role in the passive delivery of immunoglobulin IgGs from mother to young and the regulation of serum IgG levels. FcRn can act as a salvage receptor, binding and transporting pinocytosed IgGs in intact form both within and across cells, and rescuing them from a default degradative pathway.

The "CH1 domain" of a human IgG Fc region usually extends from about amino acid 118 to about amino acid 215 (EU numbering system).

"Hinge region" is generally defined as stretching from Glu216 to Pro230 of human IgG1 (Burton, *Molec. Immunol.* 22:161-206 (1985)). Hinge regions of other IgG isotypes may be aligned with the IgG1 sequence by placing the first and last cysteine residues forming inter-heavy chain S—S bonds in the same positions.

The "CH2 domain" of a human IgG Fc region usually extends from about amino acid 231 to about amino acid 340. The CH2 domain is unique in that it is not closely paired with another domain. Rather, two N-linked branched carbohydrate chains are interposed between the two CH2 domains of an intact native IgG molecule. It has been speculated that the carbohydrate may provide a substitute for the domain-domain pairing and help stabilize the CH2 domain. Burton, *Molec Immunol.* 22:161-206 (1985).

The "CH3 domain" comprises the stretch of residues C-terminal to a CH2 domain in an Fc region (i.e. from about amino acid residue 341 to the C-terminal end of an antibody sequence, typically at amino acid residue 446 or 447 of an IgG).

A "functional Fc fragment" possesses an "effector function" of a native sequence Fc region. Exemplary "effector functions" include C1q binding; complement dependent cytotoxicity (CDC); Fc receptor binding; antibody-dependent cell-mediated cytotoxicity (ADCC); phagocytosis; down regulation of cell surface receptors (e.g. B cell receptor; BCR), etc. Such effector functions generally require the Fc region to be combined with a binding domain (e.g. an antibody variable domain) and can be assessed using various assays known in the art.

An antibody with a variant IgG Fc with "altered" FcR binding affinity or ADCC activity is one which has either enhanced or diminished FcR binding activity (e.g., FcγR or FcRn) and/or ADCC activity compared to a parent polypeptide or to a polypeptide comprising a native sequence Fc region. The variant Fc which "exhibits increased binding" to an FcR binds at least one FcR with higher affinity (e.g., lower apparent $K_d$ or $IC_{50}$ value) than the parent polypeptide or a native sequence IgG Fc. According to some embodiments, the improvement in binding compared to a parent polypeptide is about 3 fold, such as about any of 5, 10, 25, 50, 60, 100, 150, 200, or up to 500 fold, or about 25% to 1000% improvement in binding. The polypeptide variant which "exhibits decreased binding" to an FcR, binds at least one FcR with lower affinity (e.g., higher apparent $K_d$ or higher $IC_{50}$ value) than a parent polypeptide. The decrease in binding compared to a parent polypeptide may be about 40% or more decrease in binding.

"Antibody-dependent cell-mediated cytotoxicity" or "ADCC" refers to a form of cytotoxicity in which secreted Ig bound to Fc receptors (FcRs) present on certain cytotoxic cells (e.g., Natural Killer (NK) cells, neutrophils, and macrophages) enable these cytotoxic effector cells to bind specifically to an antigen-bearing target cell and subsequently kill the target cell with cytotoxins. The antibodies "arm" the cytotoxic cells and are required for such killing. The primary cells for mediating ADCC, NK cells, express FcγRIII only, whereas monocytes express FcγRI, FcγRII and FcγRIII. FcR expression on hematopoietic cells is summarized in Table 3 on page 464 of Ravetch and Kinet, *Annu. Rev. Immunol* 9:457-92 (1991). To assess ADCC activity of a molecule of interest, an in vitro ADCC assay, such as that described in U.S. Pat. No. 5,500,362 or 5,821,337 may be performed. Useful effector cells for such assays include peripheral blood mononuclear cells (PBMC) and Natural Killer (NK) cells. Alternatively, or additionally, ADCC activity of the molecule of interest may be assessed in vivo, e.g., in an animal model such as that disclosed in Clynes et al. *PNAS (USA)* 95:652-656 (1998).

The polypeptide comprising a variant Fc region which "exhibits increased ADCC" or mediates ADCC in the presence of human effector cells more effectively than a polypeptide having wild type IgG Fc or a parent polypeptide is one which in vitro or in vivo is substantially more effective at mediating ADCC, when the amounts of polypeptide with variant Fc region and the polypeptide with wild type Fc region (or the parent polypeptide) in the assay are essentially the same. Generally, such variants will be identified using any in vitro ADCC assay known in the art, such as assays or methods for determining ADCC activity, e.g., in an animal model etc. In some embodiments, the variant is from about 5 fold to about 100 fold, e.g. from about 25 to about 50 fold, more effective at mediating ADCC than the wild type Fc (or parent polypeptide).

"Complement dependent cytotoxicity" or "CDC" refers to the lysis of a target cell in the presence of complement. Activation of the classical complement pathway is initiated by the binding of the first component of the complement system (C1q) to antibodies (of the appropriate subclass) which are bound to their cognate antigen. To assess complement activation, a CDC assay, e.g. as described in Gazzano-Santoro et al., *J. Immunol. Methods* 202:163 (1996), may be performed. Polypeptide variants with altered Fc region amino acid sequences and increased or decreased C1q binding capability are described in U.S. Pat. No. 6,194,551B1 and WO99/51642. The contents of those patent publications are specifically incorporated herein by reference. See also, Idusogie et al. *J. Immunol.* 164: 4178-4184 (2000).

Unless otherwise specified, a "nucleotide sequence encoding an amino acid sequence" includes all nucleotide sequences that are degenerate versions of each other and that encode the same amino acid sequence. The phrase nucleotide sequence that encodes a protein or an RNA may also include introns to the extent that the nucleotide sequence encoding the protein may in some version contain an intron(s).

The term "operably linked" refers to functional linkage between a regulatory sequence and a heterologous nucleic acid sequence resulting in expression of the latter. For example, a first nucleic acid sequence is operably linked with a second nucleic acid sequence when the first nucleic acid sequence is placed in a functional relationship with the second nucleic acid sequence. For instance, a promoter is operably linked to a coding sequence if the promoter affects the transcription or expression of the coding sequence. Generally, operably linked DNA sequences are contiguous and, where necessary to join two protein coding regions, in the same reading frame.

"Homologous" refers to the sequence similarity or sequence identity between two polypeptides or between two nucleic acid molecules. When a position in both of the two compared sequences is occupied by the same base or amino acid monomer subunit, e.g., if a position in each of two DNA molecules is occupied by adenine, then the molecules are homologous at that position. The percent of homology between two sequences is a function of the number of matching or homologous positions shared by the two sequences divided by the number of positions compared times 100. For example, if 6 of 10 of the positions in two sequences are matched or homologous then the two sequences are 60% homologous. By way of example, the DNA sequences ATTGCC and TATGGC share 50% homology. Generally, a comparison is made when two sequences are aligned to give maximum homology.

An "effective amount" of an anti-PcrV antibody or composition as disclosed herein, is an amount sufficient to carry out a specifically stated purpose. An "effective amount" can be determined empirically and by known methods relating to the stated purpose.

The term "therapeutically effective amount" refers to an amount of an anti-PcrV antibody or composition as disclosed herein, effective to "treat" a disease or disorder in an individual. In the case of P. aeruginosa infection, the therapeutically effective amount of the anti-PcrV antibody or composition as disclosed herein can reduce the number of infected cells; inhibit (i.e., slow to some extent and preferably stop) the spread of infection; and/or relieve to some extent one or more of the symptoms associated with the infection. To the extent the anti-PcrV antibody or composition as disclosed herein can prevent P. aeruginosa growth and/or kill P. aeruginosa in an infection, the anti-PcrV can be cytostatic and/or cytotoxic. In some embodiments, the therapeutically effective amount is an amount that inhibits infection in a patient. In some embodiments, the therapeutically effective amount is an amount that completely eradicates infection in a patient.

As used herein, by "pharmaceutically acceptable" or "pharmacologically compatible" is meant a material that is not biologically or otherwise undesirable, e.g., the material may be incorporated into a pharmaceutical composition administered to a patient without causing any significant undesirable biological effects or interacting in a deleterious manner with any of the other components of the composition in which it is contained. Pharmaceutically acceptable carriers or excipients have preferably met the required standards of toxicological and manufacturing testing and/or are included on the Inactive Ingredient Guide prepared by the U.S. Food and Drug administration.

It is understood that embodiments of the application described herein include "consisting" and/or "consisting essentially of" embodiments.

Reference to "about" a value or parameter herein includes (and describes) variations that are directed to that value or parameter per se. For example, description referring to "about X" includes description of "X".

As used herein, reference to "not" a value or parameter generally means and describes "other than" a value or parameter. For example, the method is not used to treat infection of type X means the method is used to treat infection of types other than X.

As used herein and in the appended claims, the singular forms "a," "or," and "the" include plural referents unless the context clearly dictates otherwise.

Anti-PcrV Antibodies

In one aspect, the present application provides anti-PcrV antibodies that specifically bind to PcrV. Anti-PcrV antibodies include, but are not limited to, humanized antibodies, chimeric antibodies, mouse antibodies, human antibodies, and antibodies comprising the heavy chain and/or light chain CDRs discussed herein. In one aspect, the application provides isolated antibodies that bind to PcrV. Contemplated anti-PcrV antibodies include, for example, full-length anti-PcrV antibodies (e.g., full-length IgG1, IgG2 or IgG4), anti-PcrV scFvs, multi-specific (such as bispecific) anti-PcrV antibodies, anti-PcrV immunoconjugates, and the like. In some embodiments, the anti-PcrV antibody is a Fab, a Fab', a F(ab)'2, a Fab'-SH, a single-chain Fv (scFv), an Fv fragment, a dAb, a Fd, or a diabody. In some embodiments, reference to an antibody that specifically binds to PcrV means that the antibody binds to PcrV with an affinity that is at least about 10 times (including for example at least about any of 10, $10^2$, $10^3$, $10^4$, $10^5$, $10^6$, or $10^7$ times) its binding affinity for non-target. In some embodiments, the non-target is an antigen that is not PcrV. Binding affinity can be determined by methods known in the art, such as ELISA, fluorescence activated cell sorting (FACS) analysis, or radioimmunoprecipitation assay (RIA). $K_d$ can be determined by methods known in the art, such as surface plasmon resonance (SPR) assay or biolayer interferometry (BLI).

In certain aspects, the anti-PcrV antibody or antigen-binding fragment thereof that specifically binds to Pseudomonas PcrV (a) promotes, mediates, or enhances opsonophagocytic killing (OPK) of P. aeruginosa, and/or (b) disrupts the activity of the type III toxin secretion system.

Although anti-PcrV antibodies containing human sequences (e.g., human heavy and light chain variable domain sequences comprising human CDR sequences) are extensively discussed herein, non-human anti-PcrV antibodies are also contemplated. In some embodiments, non-human anti-PcrV antibodies comprise human CDR sequences from an anti-PcrV antibody as described herein and non-human framework sequences. Non-human framework sequences include, in some embodiments, any sequence that can be used for generating synthetic heavy and/or light chain variable domains using one or more human CDR sequences as described herein, including, e.g., mammals, e.g., mouse, rat, rabbit, pig, bovine (e.g., cow, bull, buffalo), deer, sheep, goat, chicken, cat, dog, ferret, primate (e.g., marmoset, rhesus monkey), etc. In some embodiments, a non-human anti-PcrV antibody includes an anti-PcrV antibody generated by grafting one or more human CDR sequences as described herein onto a non-human framework sequence (e.g., a mouse or chicken framework sequence).

The complete amino acid sequence of an exemplary PcrV protein comprises or consists of the amino acid sequence of SEQ ID NO: 71. In some embodiments, the anti-PcrV antibody described herein specifically recognizes an epitope within *Pseudomonas* PcrV. In some embodiments, the anti-PcrV antibody is specific for *Pseudomonas* PcrV and does not exhibit species cross-reactivity or other types of non-*Pseudomonas* protein cross-reactivity.

In some embodiments, the anti-PcrV antibody described herein specifically binds to a linear epitope within *Pseudomonas* PcrV. In some embodiments, the anti-PcrV antibody described herein specifically binds to a nonlinear epitope within *Pseudomonas* PcrV. In some embodiments, the anti-PcrV antibody described herein specifically binds to an epitope on *Pseudomonas* PcrV, where the epitope comprises at least any one of 1, 2, 3, 4, 5 or 6 amino acid residues selected from the group of Gln160, Asp165, Asp170, Asp173, Thr175, and Ser202 of *Pseudomonas* PcrV, according to SEQ ID NO: 71. In some embodiments, the anti-PcrV antibody described herein specifically binds to an epitope on *Pseudomonas* PcrV, where the epitope comprises at least 2 amino acid residues selected from the group of Gln160, Asp165, Asp170, Asp173, Thr175, and Ser202 of *Pseudomonas* PcrV, according to SEQ ID NO: 71. In some embodiments, the anti-PcrV antibody described herein specifically binds to an epitope on *Pseudomonas* PcrV, where the epitope comprises at least 3 amino acid residues selected from the group of Gln160, Asp165, Asp170, Asp173, Thr175, and Ser202 of *Pseudomonas* PcrV, according to SEQ ID NO: 71. In some embodiments, the anti-PcrV antibody described herein specifically binds to an epitope on *Pseudomonas* PcrV, where the epitope comprises at least 4 amino acid residues selected from the group of Gln160, Asp165, Asp170, Asp173, Thr175, and Ser202 of *Pseudomonas* PcrV, according to SEQ ID NO: 71. In some embodiments, the anti-PcrV antibody described herein specifically binds to an epitope on *Pseudomonas* PcrV, where the epitope comprises at least 5 amino acid residues selected from the group of Gln160, Asp165, Asp170, Asp173, Thr175, and Ser202 of *Pseudomonas* PcrV, according to SEQ ID NO: 71. In some embodiments, the anti-PcrV antibody described herein specifically binds to an epitope on *Pseudomonas* PcrV, where the epitope comprises Gln160, Asp165, Asp170, Asp173, Thr175, and Ser202 of *Pseudomonas* PcrV, according to SEQ ID NO: 71.

In some embodiments, the anti-PcrV antibody comprises an antibody heavy chain constant region and an antibody light chain constant region. In some embodiments, the anti-PcrV antibody comprises an IgG1 heavy chain constant region. In some embodiments, the anti-PcrV antibody comprises an IgG2 heavy chain constant region. In some embodiments, the anti-PcrV antibody comprises an IgG3 heavy chain constant region. In some embodiments, the anti-PcrV antibody comprises an IgG4 heavy chain constant region. In some embodiments, the IgG is a human IgG. In some embodiments, the heavy chain constant region comprises or consists of the amino acid sequence of SEQ ID NO: 73. In some embodiments, the heavy chain constant region comprises or consists of the amino acid sequence of SEQ ID NO: 74. In some embodiments, the anti-PcrV comprises a lambda light chain constant region. In some embodiments, the anti-PcrV antibody comprises a kappa light chain constant region. In some embodiments, the light chain constant region comprises or consists of the amino acid sequence of SEQ ID NO: 72. In some embodiments, the anti-PcrV antibody comprises an antibody heavy chain variable domain and an antibody light chain variable domain.

In one aspect, the present application provides an isolated anti-PcrV antibody, wherein the anti-PcrV antibody comprises a heavy chain variable domain ($V_H$) comprising: a heavy chain complementarity determining region (HC-CDR) 1 comprising $X_1X_2X_3MS$ (SEQ ID NO: 39), or a variant thereof comprising up to about 3 amino acid substitutions, wherein $X_1$ is D or S, $X_2$ is Y or N and $X_3$ is P, H, Y or S; an HC-CDR2 comprising $X_1ISESGGSTX_2X_3ADSVKG$ (SEQ ID NO: 40), or a variant thereof comprising up to about 3 amino acid substitutions, wherein $X_1$ is G or V; $X_2$ is N or Y; and $X_3$ is D or Y; and an HC-CDR3 comprising $GRFX_1X_2X_3X_4X_5X_6FX_7RAVYGMDV$ (SEQ ID NO: 41), or a variant thereof comprising up to about 3 amino acid substitutions, wherein $X_1$ is S or C, $X_2$ is T, G, D, Y, Q or A, $X_3$ is S, D, N, E, L, A, or Y, $X_4$ is S, T, Y, or A, $X_5$ is S, H, Q, A, R, K, G, E, Y or D, $X_6$ is H or C, and $X_7$ is F or Y; and a light chain variable domain ($V_L$) comprising: a light chain complementarity determining region (LC-CDR) 1 comprising $RASQGIX_1SYLA$ (SEQ ID NO: 42), or a variant thereof comprising up to about 3 amino acid substitutions, wherein $X_1$ is S or R; a LC-CDR2 comprising AASTLQS (SEQ ID NO: 34), or a variant thereof comprising up to about 3 amino acid substitutions; and a LC-CDR3 comprising $QQLX_1SYPLX_2$ (SEQ ID NO: 43), or a variant thereof comprising up to about 3 amino acid substitutions, wherein $X_1$ is S, N or K, and $X_2$ is S or T.

In some embodiments, the anti-PcrV antibody comprises a $V_H$ comprising: an HC-CDR1 comprising the amino acid sequence of any one of SEQ ID NOs: 1-8, or a variant thereof comprising up to about 3 (such as about any of 1, 2, or 3) amino acid substitutions, an HC-CDR2 comprising the amino acid sequence of any one of SEQ ID NOs: 9-14, or a variant thereof comprising up to about 3 (such as about any of 1, 2, or 3) amino acid substitutions, and an HC-CDR3 comprising the amino acid sequence of any one of SEQ ID NOs: 15-31, or a variant thereof comprising up to about 3 (such as about any of 1, 2, or 3) amino acid substitutions; and a $V_L$ comprising: an LC-CDR1 comprising the amino acid sequence of SEQ ID NO: 32 or 33, or a variant thereof comprising up to about 3 (such as about any of 1, 2, or 3) amino acid substitutions, an LC-CDR2 comprising the amino acid sequence of SEQ ID NO: 34, or a variant thereof comprising up to about 3 (such as about any of 1, 2, or 3) amino acid substitutions, and an LC-CDR3 comprising the amino acid sequence of any one of SEQ ID NOs: 35-38, or a variant thereof comprising up to about 3 (such as about any of 1, 2, or 3) amino acid substitutions.

In some embodiments, the anti-PcrV antibody comprises a $V_H$ comprising: an HC-CDR1 comprising the amino acid sequence of any one of SEQ ID NOs: 1-8, an HC-CDR2 comprising the amino acid sequence of any one of SEQ ID NOs: 9-14, and an HC-CDR3 comprising the amino acid sequence of any one of SEQ ID NOs: 15-31; and a $V_L$ comprising: an LC-CDR1 comprising the amino acid sequence of SEQ ID NO: 32 or 33 an LC-CDR2 comprising the amino acid sequence of SEQ ID NO: 34, and an LC-CDR3 comprising the amino acid sequence of any one of SEQ ID NOs: 35-38.

In some embodiments, the anti-PcrV antibody comprises a $V_H$ comprising an HC-CDR1, an HC-CDR2 and an HC-CDR3 of the $V_H$ comprising the amino acid sequence of any one of SEQ ID NOs: 48-64; and a $V_L$ comprising a LC-CDR1, a LC-CDR2, and a LC-CDR3 of the $V_L$ comprising the amino acid sequence of any one of SEQ ID NOs: 65-70.

In some embodiments, the anti-PcrV antibody comprises a $V_H$ comprising the amino acid sequence of any one of SEQ ID NOs: 48-64, or a variant thereof having at least about 90% (for example at least about any of 91%, 92%, 93%, 94%, 95%, 96%, 97%, 98%, or 99%) sequence identity, and a $V_L$ comprising the amino acid sequence of any one of SEQ ID NOs: 65-70, or a variant thereof having at least about 90% sequence identity. In some embodiments, the anti-PcrV antibody comprises a $V_H$ comprising the amino acid sequence of any one of SEQ ID NOs: 48-64, and a $V_L$ comprising the amino acid sequence of any one of SEQ ID NOs: 65-70.

In some embodiments, the anti-PcrV is a full-length antibody. In some embodiments, the anti-PcrV antibody comprises IgG1 constant domains. In some embodiments, the IgG1 is human IgG1. In some embodiments, the anti-PcrV antibody comprises IgG4 constant domains. In some embodiments, the IgG4 is human IgG4. In some embodiments, the anti-PcrV heavy chain constant region comprises or consists of the amino acid sequence of SEQ ID NO: 73. In some embodiments, the anti-PcrV heavy chain constant region comprises or consists of the amino acid sequence of SEQ ID NO: 74. In some embodiments, the anti-PcrV light chain constant region comprises or consists of the amino acid sequence of SEQ ID NO: 72.

In some embodiments, there is provided an isolated anti-PcrV antibody, wherein the anti-PcrV antibody comprises a heavy chain variable domain ($V_H$) comprising: a heavy chain complementarity determining region (HC-CDR) 1 comprising DX$_1$X$_2$MS (SEQ ID NO: 44), or a variant thereof comprising up to about 3 amino acid substitutions, wherein X$_1$ is N or Y and X$_2$ is P, H, or Y; an HC-CDR2 comprising X$_1$ISESGGSTNYADSVKG (SEQ ID NO: 45), or a variant thereof comprising up to about 3 amino acid substitutions, wherein X$_1$ is G or V; and an HC-CDR3 comprising GRFSTX$_1$SX$_2$HFX$_3$RAVYGMDV (SEQ ID NO: 46), or a variant thereof comprising up to about 3 amino acid substitutions, wherein X$_1$ is N, S, D, or L, X$_2$ is S or A, and X$_3$ is F or Y; and a light chain variable domain ($V_L$) comprising: a light chain complementarity determining region (LC-CDR) 1 comprising RASQGIS-SYLA (SEQ ID NO: 32), or a variant thereof comprising up to about 3 amino acid substitutions; a LC-CDR2 comprising AASTLQS (SEQ ID NO: 34), or a variant thereof comprising up to about 3 amino acid substitutions; and a LC-CDR3 comprising QQLSSYPLX$_1$ (SEQ ID NO: 47), or a variant thereof comprising up to about 3 amino acid substitutions, wherein X$_1$ is S or T.

In some embodiments, the anti-PcrV antibody comprises a $V_H$ comprising HC-CDR1, HC-CDR2 and HC-CDR3 of the $V_H$ of SEQ ID NO: 51, and a $V_L$ comprising LC-CDR1, LC-CDR2 and LC-CDR3 of the $V_L$ of SEQ ID NO: 67. In some embodiments, the anti-PcrV antibody comprises a $V_H$ comprising HC-CDR1, HC-CDR2 and HC-CDR3 of the $V_H$ of SEQ ID NO: 52, and a $V_L$ comprising LC-CDR1, LC-CDR2 and LC-CDR3 of the $V_L$ of SEQ ID NO: 65. In some embodiments, the anti-PcrV antibody comprises a $V_H$ comprising HC-CDR1, HC-CDR2 and HC-CDR3 of the $V_H$ of SEQ ID NO: 61, and a $V_L$ comprising LC-CDR1, LC-CDR2 and LC-CDR3 of the $V_L$ of SEQ ID NO: 65. In some embodiments, the anti-PcrV antibody comprises a $V_H$ comprising HC-CDR1, HC-CDR2 and HC-CDR3 of the $V_H$ of SEQ ID NO: 62, and a $V_L$ comprising LC-CDR1, LC-CDR2 and LC-CDR3 of the $V_L$ of SEQ ID NO: 67.

In some embodiments, the anti-PcrV antibody comprises a $V_H$ comprising: an HC-CDR1 comprising the amino acid sequence of SEQ ID NO: 1, an HC-CDR2 comprising the amino acid sequence of SEQ ID NO: 9, and an HC-CDR3 comprising the amino acid sequence of SEQ ID NO: 15, or a variant thereof comprising up to about 5 amino acid substitutions in the HC-CDRs; and a $V_L$ comprising: an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35, or a variant thereof comprising up to about 5 amino acid substitutions in the LC-CDRs.

In some embodiments, the anti-PcrV antibody comprises a $V_H$ comprising: an HC-CDR1 comprising the amino acid sequence of SEQ ID NO: 1, an HC-CDR2 comprising the amino acid sequence of SEQ ID NO: 9, and an HC-CDR3 comprising the amino acid sequence of SEQ ID NO: 15; and a $V_L$ comprising: an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35. In some embodiments, there is provided an anti-PcrV antibody that specifically competes with an antibody comprising a $V_H$ comprising: an HC-CDR1 comprising the amino acid sequence of SEQ ID NO: 1, an HC-CDR2 comprising the amino acid sequence of SEQ ID NO: 9, and an HC-CDR3 comprising the amino acid sequence of SEQ ID NO: 15; and a $V_L$ comprising: an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35. In some embodiments, there is provided an anti-PcrV antibody that binds to the same epitope as an antibody comprising a $V_H$ comprising: an HC-CDR1 comprising the amino acid sequence of SEQ ID NO: 1, an HC-CDR2 comprising the amino acid sequence of SEQ ID NO: 9, and an HC-CDR3 comprising the amino acid sequence of SEQ ID NO: 15; and a $V_L$ comprising: an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35.

In some embodiments, the anti-PcrV antibody comprises a $V_H$ comprising the amino acid sequence of SEQ ID NO: 48, or a variant thereof having at least about 90% (for example at least about any of 91%, 92%, 93%, 94%, 95%, 96%, 97%, 98%, or 99%) sequence identity, and a $V_L$ comprising the amino acid sequence of SEQ ID NO: 65, or a variant thereof having at least about 90% sequence identity. In some embodiments, the anti-PcrV antibody comprises a $V_H$ comprising the amino acid sequence of SEQ ID NO: 48 and a $V_L$ comprising the amino acid sequence of SEQ ID NO: 65. In some embodiments, the anti-PcrV antibody comprises a $V_H$ comprising an HC-CDR1, an HC-CDR2 and an HC-CDR3 of the $V_H$ comprising the amino acid sequence of SEQ ID NO: 48; and a $V_L$ comprising a LC-CDR1, a LC-CDR2, and a LC-CDR3 of the $V_L$ comprising the amino acid sequence of SEQ ID NOs: 65.

In some embodiments, the anti-PcrV antibody comprises a $V_H$ comprising: an HC-CDR1 comprising the amino acid sequence of SEQ ID NO: 2, an HC-CDR2 comprising the amino acid sequence of SEQ ID NO: 10, and an HC-CDR3 comprising the amino acid sequence of SEQ ID NO: 16, or a variant thereof comprising up to about 5 amino acid substitutions in the HC-CDRs; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35, or a variant thereof comprising up to about 5 amino acid substitutions in the LC-CDRs.

In some embodiments, the anti-PcrV antibody comprises a $V_H$ comprising: an HC-CDR1 comprising the amino acid sequence of SEQ ID NO: 2, an HC-CDR2 comprising the amino acid sequence of SEQ ID NO: 10, and an HC-CDR3 comprising the amino acid sequence of SEQ ID NO: 16; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35. In some embodiments, there is provided an anti-PcrV antibody that specifically competes with an antibody comprising a $V_H$ comprising: an HC-CDR1 comprising the amino acid sequence of SEQ ID NO: 2, an HC-CDR2 comprising the amino acid sequence of SEQ ID NO: 10, and an HC-CDR3 comprising the amino acid sequence of SEQ ID NO: 16; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35. In some embodiments, there is provided an anti-PcrV antibody that binds to the same epitope as an antibody comprising a $V_H$ comprising: an HC-CDR1 comprising the amino acid sequence of SEQ ID NO: 2, an HC-CDR2 comprising the amino acid sequence of SEQ ID NO: 10, and an HC-CDR3 comprising the amino acid sequence of SEQ ID NO: 16; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35.

In some embodiments, the anti-PcrV antibody comprises a $V_H$ comprising the amino acid sequence of SEQ ID NO: 49, or a variant thereof having at least about 90% (for example at least about any of 91%, 92%, 93%, 94%, 95%, 96%, 97%, 98%, or 99%) sequence identity, and a $V_L$ comprising the amino acid sequence of SEQ ID NO: 65, or a variant thereof having at least about 90% sequence identity. In some embodiments, the anti-PcrV antibody comprises a $V_H$ comprising the amino acid sequence of SEQ ID NO: 49 and a $V_L$ comprising the amino acid sequence of SEQ ID NO: 65. In some embodiments, the anti-PcrV antibody comprises a $V_H$ comprising an HC-CDR1, an HC-CDR2 and an HC-CDR3 of the $V_H$ comprising the amino acid sequence of SEQ ID NO: 49; and a $V_L$ comprising a LC-CDR1, a LC-CDR2, and a LC-CDR3 of the $V_L$ comprising the amino acid sequence of SEQ ID NOs: 65.

In some embodiments, the anti-PcrV antibody comprises a $V_H$ comprising: an HC-CDR1 comprising the amino acid sequence of SEQ ID NO: 1, an HC-CDR2 comprising the amino acid sequence of SEQ ID NO: 9, and an HC-CDR3 comprising the amino acid sequence of SEQ ID NO: 17, or a variant thereof comprising up to about 5 amino acid substitutions in the HC-CDRs; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 36, or a variant thereof comprising up to about 5 amino acid substitutions in the LC-CDRs.

In some embodiments, the anti-PcrV antibody comprises a $V_H$ comprising: an HC-CDR1 comprising the amino acid sequence of SEQ ID NO: 1, an HC-CDR2 comprising the amino acid sequence of SEQ ID NO: 9, and an HC-CDR3 comprising the amino acid sequence of SEQ ID NO: 17; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 36. In some embodiments, there is provided an anti-PcrV antibody that specifically competes with an antibody comprising a $V_H$ comprising: an HC-CDR1 comprising the amino acid sequence of SEQ ID NO: 1, an HC-CDR2 comprising the amino acid sequence of SEQ ID NO: 9, and an HC-CDR3 comprising the amino acid sequence of SEQ ID NO: 17; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 36. In some embodiments, there is provided an anti-PcrV antibody that binds to the same epitope as an antibody comprising a $V_H$ comprising: an HC-CDR1 comprising the amino acid sequence of SEQ ID NO: 1, an HC-CDR2 comprising the amino acid sequence of SEQ ID NO: 9, and an HC-CDR3 comprising the amino acid sequence of SEQ ID NO: 17; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 36.

In some embodiments, the anti-PcrV antibody comprises a $V_H$ comprising the amino acid sequence of SEQ ID NO: 50, or a variant thereof having at least about 90% (for example at least about any of 91%, 92%, 93%, 94%, 95%, 96%, 97%, 98%, or 99%) sequence identity, and a $V_L$ comprising the amino acid sequence of SEQ ID NO: 66, or a variant thereof having at least about 90% sequence identity. In some embodiments, the anti-PcrV antibody comprises a $V_H$ comprising the amino acid sequence of SEQ ID NO: 50 and a $V_L$ comprising the amino acid sequence of SEQ ID NO: 66. In some embodiments, the anti-PcrV antibody comprises a $V_H$ comprising an HC-CDR1, an HC-CDR2 and an HC-CDR3 of the $V_H$ comprising the amino acid sequence of SEQ ID NO: 50; and a $V_L$ comprising a LC-CDR1, a LC-CDR2, and a LC-CDR3 of the $V_L$ comprising the amino acid sequence of SEQ ID NOs: 66.

In some embodiments, the anti-PcrV antibody comprises a $V_H$ comprising: an HC-CDR1 comprising the amino acid sequence of SEQ ID NO: 3, an HC-CDR2 comprising the amino acid sequence of SEQ ID NO: 10, and an HC-CDR3 comprising the amino acid sequence of SEQ ID NO: 18, or a variant thereof comprising up to about 5 amino acid substitutions in the HC-CDRs; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37, or a variant thereof comprising up to about 5 amino acid substitutions in the LC-CDRs.

In some embodiments, the anti-PcrV antibody comprises a $V_H$ comprising: an HC-CDR1 comprising the amino acid sequence of SEQ ID NO: 3, an HC-CDR2 comprising the amino acid sequence of SEQ ID NO: 10, and an HC-CDR3 comprising the amino acid sequence of SEQ ID NO: 18; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37. In some embodiments, there is provided an anti-PcrV antibody that specifically competes with an antibody comprising a $V_H$ comprising: an HC-CDR1 comprising the amino acid sequence of SEQ ID NO: 3, an HC-CDR2 comprising the amino acid sequence of SEQ ID NO: 10, and an HC-CDR3 comprising the amino acid sequence of SEQ ID NO: 18; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37. In some embodiments, there is provided an anti-PcrV antibody that binds to the same epitope as an antibody comprising a $V_H$ comprising: an HC-CDR1 comprising the amino acid sequence of SEQ ID NO: 3, an HC-CDR2 comprising the amino acid sequence of SEQ ID NO: 10, and an HC-CDR3 comprising the amino acid sequence of SEQ ID NO: 18; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37.

In some embodiments, the anti-PcrV antibody comprises a $V_H$ comprising the amino acid sequence of SEQ ID NO: 51, or a variant thereof having at least about 90% (for example at least about any of 91%, 92%, 93%, 94%, 95%, 96%, 97%, 98%, or 99%) sequence identity, and a $V_L$ comprising the amino acid sequence of SEQ ID NO: 67, or a variant thereof having at least about 90% sequence identity. In some embodiments, the anti-PcrV antibody comprises a $V_H$ comprising the amino acid sequence of SEQ ID NO: 51 and a $V_L$ comprising the amino acid sequence of SEQ ID NO: 67. In some embodiments, the anti-PcrV antibody comprises a $V_H$ comprising an HC-CDR1, an HC-CDR2 and an HC-CDR3 of the $V_H$ comprising the amino acid sequence of SEQ ID NO: 51; and a $V_L$ comprising a LC-CDR1, a LC-CDR2, and a LC-CDR3 of the $V_L$ comprising the amino acid sequence of SEQ ID NO: 67.

In some embodiments, the anti-PcrV antibody comprises a $V_H$ comprising: an HC-CDR1 comprising the amino acid sequence of SEQ ID NO: 3, an HC-CDR2 comprising the amino acid sequence of SEQ ID NO: 10, and an HC-CDR3 comprising the amino acid sequence of SEQ ID NO: 19, or a variant thereof comprising up to about 5 amino acid substitutions in the HC-CDRs; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35, or a variant thereof comprising up to about 5 amino acid substitutions in the LC-CDRs.

In some embodiments, the anti-PcrV antibody comprises a $V_H$ comprising: an HC-CDR1 comprising the amino acid sequence of SEQ ID NO: 3, an HC-CDR2 comprising the amino acid sequence of SEQ ID NO: 10, and an HC-CDR3 comprising the amino acid sequence of SEQ ID NO: 19; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35. In some embodiments, there is provided an anti-PcrV antibody that specifically competes with an antibody comprising a $V_H$ comprising: an HC-CDR1 comprising the amino acid sequence of SEQ ID NO: 3, an HC-CDR2 comprising the amino acid sequence of SEQ ID NO: 10, and an HC-CDR3 comprising the amino acid sequence of SEQ ID NO: 19; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35. In some embodiments, there is provided an anti-PcrV antibody that binds to the same epitope as an antibody comprising a $V_H$ comprising: an HC-CDR1 comprising the amino acid sequence of SEQ ID NO: 3, an HC-CDR2 comprising the amino acid sequence of SEQ ID NO: 10, and an HC-CDR3 comprising the amino acid sequence of SEQ ID NO: 19; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35.

In some embodiments, the anti-PcrV antibody comprises a $V_H$ comprising the amino acid sequence of SEQ ID NO: 52, or a variant thereof having at least about 90% (for example at least about any of 91%, 92%, 93%, 94%, 95%, 96%, 97%, 98%, or 99%) sequence identity, and a $V_L$ comprising the amino acid sequence of SEQ ID NO: 65, or a variant thereof having at least about 90% sequence identity. In some embodiments, the anti-PcrV antibody comprises a $V_H$ comprising the amino acid sequence of SEQ ID NO: 52 and a $V_L$ comprising the amino acid sequence of SEQ ID NO: 65. In some embodiments, the anti-PcrV antibody comprises a $V_H$ comprising an HC-CDR1, an HC-CDR2 and an HC-CDR3 of the $V_H$ comprising the amino acid sequence of SEQ ID NO: 52; and a $V_L$ comprising a LC-CDR1, a LC-CDR2, and a LC-CDR3 of the $V_L$ comprising the amino acid sequence of SEQ ID NOs: 65.

In some embodiments, the anti-PcrV antibody comprises a $V_H$ comprising an HC-CDR1 comprising the amino acid sequence of SEQ ID NO: 3, an HC-CDR2 comprising the amino acid sequence of SEQ ID NO: 11, and an HC-CDR3 comprising the amino acid sequence of SEQ ID NO: 20, or a variant thereof comprising up to about 5 amino acid substitutions in the HC-CDRs; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35, or a variant thereof comprising up to about 5 amino acid substitutions in the LC-CDRs.

In some embodiments, the anti-PcrV antibody comprises a $V_H$ comprising an HC-CDR1 comprising the amino acid sequence of SEQ ID NO: 3, an HC-CDR2 comprising the amino acid sequence of SEQ ID NO: 11, and an HC-CDR3 comprising the amino acid sequence of SEQ ID NO: 20; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35. In some embodiments, there is provided an anti-PcrV antibody that specifically competes with an antibody comprising a $V_H$ comprising an HC-CDR1 comprising the amino acid sequence of SEQ ID NO: 3, an HC-CDR2 comprising the amino acid sequence of SEQ ID NO: 11, and an HC-CDR3 comprising the amino acid sequence of SEQ ID NO: 20; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35. In some embodiments, there is provided an anti-PcrV antibody that binds to the same epitope as an antibody comprising a $V_H$ comprising an HC-CDR1 comprising the amino acid sequence of SEQ ID NO: 3, an HC-CDR2 comprising the amino acid sequence of SEQ ID NO: 11, and an HC-CDR3 comprising the amino acid sequence of SEQ ID NO: 20; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35.

In some embodiments, the anti-PcrV antibody comprises a $V_H$ comprising the amino acid sequence of SEQ ID NO: 53, or a variant thereof having at least about 90% (for example at least about any of 91%, 92%, 93%, 94%, 95%, 96%, 97%, 98%, or 99%) sequence identity, and a $V_L$ comprising the amino acid sequence of SEQ ID NO: 65, or a variant thereof having at least about 90% sequence identity. In some embodiments, the anti-PcrV antibody comprises a $V_H$ comprising the amino acid sequence of SEQ ID NO: 53 and a $V_L$ comprising the amino acid sequence of SEQ ID NO: 65. In some embodiments, the anti-PcrV antibody comprises a $V_H$ comprising an HC-CDR1, an HC-CDR2 and an HC-CDR3 of the $V_H$ comprising the amino acid sequence of SEQ ID NO: 53; and a $V_L$ comprising a LC-CDR1, a LC-CDR2, and a LC-CDR3 of the $V_L$ comprising the amino acid sequence of SEQ ID NOs: 65.

In some embodiments, the anti-PcrV antibody comprises a $V_H$ comprising: an HC-CDR1 comprising the amino acid sequence of SEQ ID NO: 4, an HC-CDR2 comprising the amino acid sequence of SEQ ID NO: 10, and an HC-CDR3 comprising the amino acid sequence of SEQ ID NO: 21, or a variant thereof comprising up to about 5 amino acid substitutions in the HC-CDRs; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35, or a variant thereof comprising up to about 5 amino acid substitutions in the LC-CDRs.

In some embodiments, the anti-PcrV antibody comprises a $V_H$ comprising: an HC-CDR1 comprising the amino acid sequence of SEQ ID NO: 4, an HC-CDR2 comprising the amino acid sequence of SEQ ID NO: 10, and an HC-CDR3 comprising the amino acid sequence of SEQ ID NO: 21; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35. In some embodiments, there is provided an anti-PcrV antibody that specifically competes with an antibody comprising a $V_H$ comprising: an HC-CDR1 comprising the amino acid sequence of SEQ ID NO: 4, an HC-CDR2 comprising the amino acid sequence of SEQ ID NO: 10, and an HC-CDR3 comprising the amino acid sequence of SEQ ID NO: 21; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35. In some embodiments, there is provided an anti-PcrV antibody that binds to the same epitope as an antibody comprising a $V_H$ comprising: an HC-CDR1 comprising the amino acid sequence of SEQ ID NO: 4, an HC-CDR2 comprising the amino acid sequence of SEQ ID NO: 10, and an HC-CDR3 comprising the amino acid sequence of SEQ ID NO: 21; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35.

In some embodiments, the anti-PcrV antibody comprises a $V_H$ comprising the amino acid sequence of SEQ ID NO: 54, or a variant thereof having at least about 90% (for example at least about any of 91%, 92%, 93%, 94%, 95%, 96%, 97%, 98%, or 99%) sequence identity, and a $V_L$ comprising the amino acid sequence of SEQ ID NO: 65, or a variant thereof having at least about 90% sequence identity. In some embodiments, the anti-PcrV antibody comprises a $V_H$ comprising the amino acid sequence of SEQ ID NO: 54 and a $V_L$ comprising the amino acid sequence of SEQ ID NO: 65. In some embodiments, the anti-PcrV antibody comprises a $V_H$ comprising an HC-CDR1, an HC-CDR2 and an HC-CDR3 of the $V_H$ comprising the amino acid sequence of SEQ ID NO: 54; and a $V_L$ comprising a LC-CDR1, a LC-CDR2, and a LC-CDR3 of the $V_L$ comprising the amino acid sequence of SEQ ID NOs: 65.

In some embodiments, the anti-PcrV antibody comprises a $V_H$ comprising: an HC-CDR1 comprising the amino acid sequence of SEQ ID NO: 5, an HC-CDR2 comprising the amino acid sequence of SEQ ID NO: 10, and an HC-CDR3 comprising the amino acid sequence of SEQ ID NO: 22, or a variant thereof comprising up to about 5 amino acid substitutions in the HC-CDRs; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37, or a variant thereof comprising up to about 5 amino acid substitutions in the LC-CDRs.

In some embodiments, the anti-PcrV antibody comprises a $V_H$ comprising: an HC-CDR1 comprising the amino acid sequence of SEQ ID NO: 5, an HC-CDR2 comprising the amino acid sequence of SEQ ID NO: 10, and an HC-CDR3 comprising the amino acid sequence of SEQ ID NO: 22; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37. In some embodiments, there is provided an anti-PcrV antibody that specifically competes with an antibody comprising a $V_H$ comprising: an HC-CDR1 comprising the amino acid sequence of SEQ ID NO: 5, an HC-CDR2 comprising the amino acid sequence of SEQ ID NO: 10, and an HC-CDR3 comprising the amino acid sequence of SEQ ID NO: 22; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37. In some embodiments, there is provided an anti-PcrV antibody that binds to the same epitope as an antibody comprising a $V_H$ comprising: an HC-CDR1 comprising the amino acid sequence of SEQ ID NO: 5, an HC-CDR2 comprising the amino acid sequence of SEQ ID NO: 10, and an HC-CDR3 comprising the amino acid sequence of SEQ ID NO: 22; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37.

In some embodiments, the anti-PcrV antibody comprises a $V_H$ comprising the amino acid sequence of SEQ ID NO: 55, or a variant thereof having at least about 90% (for example at least about any of 91%, 92%, 93%, 94%, 95%, 96%, 97%, 98%, or 99%) sequence identity, and a $V_L$ comprising the amino acid sequence of SEQ ID NO: 67, or a variant thereof having at least about 90% sequence identity. In some embodiments, the anti-PcrV antibody comprises a $V_H$ comprising the amino acid sequence of SEQ ID NO: 55 and a $V_L$ comprising the amino acid sequence of SEQ ID NO: 67. In some embodiments, the anti-PcrV antibody comprises a $V_H$ comprising an HC-CDR1, an HC-CDR2 and an HC-CDR3 of the $V_H$ comprising the amino acid sequence of SEQ ID NO: 55; and a $V_L$ comprising a LC-CDR1, a LC-CDR2, and a LC-CDR3 of the $V_L$ comprising the amino acid sequence of SEQ ID NOs: 67.

In some embodiments, the anti-PcrV antibody comprises a $V_H$ comprising: an HC-CDR1 comprising the amino acid sequence of SEQ ID NO: 6, an HC-CDR2 comprising the amino acid sequence of SEQ ID NO: 10, and an HC-CDR3 comprising the amino acid sequence of SEQ ID NO: 23, or a variant thereof comprising up to about 5 amino acid substitutions in the HC-CDRs; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37, or a variant thereof comprising up to about 5 amino acid substitutions in the LC-CDRs.

In some embodiments, the anti-PcrV antibody comprises a $V_H$ comprising: an HC-CDR1 comprising the amino acid sequence of SEQ ID NO: 6, an HC-CDR2 comprising the amino acid sequence of SEQ ID NO: 10, and an HC-CDR3 comprising the amino acid sequence of SEQ ID NO: 23; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37. In some embodiments, there is provided an anti-PcrV antibody that specifically competes with an antibody comprising a $V_H$ comprising: an HC-CDR1 comprising the amino acid sequence of SEQ ID NO: 6, an HC-CDR2 comprising the amino acid sequence of SEQ ID NO: 10, and an HC-CDR3 comprising the amino acid sequence of SEQ ID NO: 23; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37. In some embodiments, there is provided an anti-PcrV antibody that binds to the same epitope as an antibody comprising a $V_H$ comprising: an HC-CDR1 comprising the amino acid sequence of SEQ ID NO: 6, an HC-CDR2 comprising the amino acid sequence of SEQ ID NO: 10, and an HC-CDR3 comprising the amino acid sequence of SEQ ID NO: 23; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37.

In some embodiments, the anti-PcrV antibody comprises a $V_H$ comprising the amino acid sequence of SEQ ID NO: 56, or a variant thereof having at least about 90% (for example at least about any of 91%, 92%, 93%, 94%, 95%, 96%, 97%, 98%, or 99%) sequence identity, and a $V_L$ comprising the amino acid sequence of SEQ ID NO: 67, or a variant thereof having at least about 90% sequence identity. In some embodiments, the anti-PcrV antibody comprises a $V_H$ comprising the amino acid sequence of SEQ ID NO: 56 and a $V_L$ comprising the amino acid sequence of SEQ ID NO: 67. In some embodiments, the anti-PcrV antibody comprises a $V_H$ comprising an HC-CDR1, an HC-CDR2 and an HC-CDR3 of the $V_H$ comprising the amino acid sequence of SEQ ID NO: 56; and a $V_L$ comprising a LC-CDR1, a LC-CDR2, and a LC-CDR3 of the $V_L$ comprising the amino acid sequence of SEQ ID NOs: 67.

In some embodiments, the anti-PcrV antibody comprises a $V_H$ comprising: an HC-CDR1 comprising the amino acid sequence of SEQ ID NO: 1, an HC-CDR2 comprising the amino acid sequence of SEQ ID NO: 12, and an HC-CDR3 comprising the amino acid sequence of SEQ ID NO: 24, or a variant thereof comprising up to about 5 amino acid substitutions in the HC-CDRs; and a $V_L$ comprising an LC-CDR1 comprising the amino acid sequence of SEQ ID NO: 33, an LC-CDR2 comprising the amino acid sequence of SEQ ID NO: 34, and an LC-CDR3 comprising the amino acid sequence of SEQ ID NO: 35, or a variant thereof comprising up to about 5 amino acid substitutions in the LC-CDRs.

In some embodiments, the anti-PcrV antibody comprises a $V_H$ comprising: an HC-CDR1 comprising the amino acid sequence of SEQ ID NO: 1, an HC-CDR2 comprising the amino acid sequence of SEQ ID NO: 12, and an HC-CDR3 comprising the amino acid sequence of SEQ ID NO: 24; and a $V_L$ comprising an LC-CDR1 comprising the amino acid sequence of SEQ ID NO: 33, an LC-CDR2 comprising the amino acid sequence of SEQ ID NO: 34, and an LC-CDR3 comprising the amino acid sequence of SEQ ID NO: 35. In some embodiments, there is provided an anti-PcrV antibody that specifically competes with an antibody comprising a $V_H$ comprising: an HC-CDR1 comprising the amino acid sequence of SEQ ID NO: 1, an HC-CDR2 comprising the amino acid sequence of SEQ ID NO: 12, and an HC-CDR3 comprising the amino acid sequence of SEQ ID NO: 24; and a $V_L$ comprising an LC-CDR1 comprising the amino acid sequence of SEQ ID NO: 33, an LC-CDR2 comprising the amino acid sequence of SEQ ID NO: 34, and an LC-CDR3 comprising the amino acid sequence of SEQ ID NO: 35. In some embodiments, there is provided an anti-PcrV antibody that binds to the same epitope as an antibody comprising a $V_H$ comprising: an HC-CDR1 comprising the amino acid sequence of SEQ ID NO: 1, an HC-CDR2 comprising the amino acid sequence of SEQ ID NO: 12, and an HC-CDR3 comprising the amino acid sequence of SEQ ID NO: 24; and a $V_L$ comprising an LC-CDR1 comprising the amino acid sequence of SEQ ID NO: 33, an LC-CDR2 comprising the amino acid sequence of SEQ ID NO: 34, and an LC-CDR3 comprising the amino acid sequence of SEQ ID NO: 35.

In some embodiments, the anti-PcrV antibody comprises a $V_H$ comprising the amino acid sequence of SEQ ID NO: 57, or a variant thereof having at least about 90% (for example at least about any of 91%, 92%, 93%, 94%, 95%, 96%, 97%, 98%, or 99%) sequence identity, and a $V_L$ comprising the amino acid sequence of SEQ ID NO: 68, or a variant thereof having at least about 90% sequence identity. In some embodiments, the anti-PcrV antibody comprises a $V_H$ comprising the amino acid sequence of SEQ ID NO: 57 and a $V_L$ comprising the amino acid sequence of SEQ ID NO: 68. In some embodiments, the anti-PcrV antibody comprises a $V_H$ comprising an HC-CDR1, an HC-CDR2 and an HC-CDR3 of the $V_H$ comprising the amino acid sequence of SEQ ID NO: 57; and a $V_L$ comprising a LC-CDR1, a LC-CDR2, and a LC-CDR3 of the $V_L$ comprising the amino acid sequence of SEQ ID NOs: 68.

In some embodiments, the anti-PcrV antibody comprises a $V_H$ comprising: an HC-CDR1 comprising the amino acid sequence of SEQ ID NO: 2, an HC-CDR2 comprising the amino acid sequence of SEQ ID NO: 10, and an HC-CDR3 comprising the amino acid sequence of SEQ ID NO: 25, or a variant thereof comprising up to about 5 amino acid substitutions in the HC-CDRs; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37, or a variant thereof comprising up to about 5 amino acid substitutions in the LC-CDRs.

In some embodiments, the anti-PcrV antibody comprises a $V_H$ comprising: an HC-CDR1 comprising the amino acid sequence of SEQ ID NO: 2, an HC-CDR2 comprising the amino acid sequence of SEQ ID NO: 10, and an HC-CDR3 comprising the amino acid sequence of SEQ ID NO: 25; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37. In some embodiments, there is provided an anti-PcrV antibody that specifically competes with an antibody comprising a $V_H$ comprising: an HC-CDR1 comprising the amino acid sequence of SEQ ID NO: 2, an HC-CDR2 comprising the amino acid sequence of SEQ ID NO: 10, and an HC-CDR3 comprising the amino acid sequence of SEQ ID NO: 25; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37. In some embodiments, there is provided an anti-PcrV antibody that binds to the same epitope as an antibody comprising a $V_H$ comprising: an HC-CDR1 comprising the amino acid sequence of SEQ ID NO: 2, an HC-CDR2 comprising the amino acid sequence of SEQ ID NO: 10, and an HC-CDR3 comprising the amino acid sequence of SEQ ID NO: 25; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37.

In some embodiments, the anti-PcrV antibody comprises a $V_H$ comprising the amino acid sequence of SEQ ID NO: 58, or a variant thereof having at least about 90% (for example at least about any of 91%, 92%, 93%, 94%, 95%, 96%, 97%, 98%, or 99%) sequence identity, and a $V_L$ comprising the amino acid sequence of SEQ ID NO: 69, or a variant thereof having at least about 90% sequence identity. In some embodiments, the anti-PcrV antibody comprises a $V_H$ comprising the amino acid sequence of SEQ ID NO: 58 and a $V_L$ comprising the amino acid sequence of SEQ ID NO: 69. In some embodiments, the anti-PcrV antibody comprises a $V_H$ comprising an HC-CDR1, an HC-CDR2 and an HC-CDR3 of the $V_H$ comprising the amino acid sequence of SEQ ID NO: 58; and a $V_L$ comprising a LC-CDR1, a LC-CDR2, and a LC-CDR3 of the $V_L$ comprising the amino acid sequence of SEQ ID NOs: 69.

In some embodiments, the anti-PcrV antibody comprises a $V_H$ comprising: an HC-CDR1 comprising the amino acid sequence of SEQ ID NO: 1, an HC-CDR2 comprising the amino acid sequence of SEQ ID NO: 9, and an HC-CDR3 comprising the amino acid sequence of SEQ ID NO: 26, or a variant thereof comprising up to about 5 amino acid substitutions in the HC-CDRs; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35, or a variant thereof comprising up to about 5 amino acid substitutions in the LC-CDRs.

In some embodiments, the anti-PcrV antibody comprises a $V_H$ comprising: an HC-CDR1 comprising the amino acid sequence of SEQ ID NO: 1, an HC-CDR2 comprising the amino acid sequence of SEQ ID NO: 9, and an HC-CDR3 comprising the amino acid sequence of SEQ ID NO: 26; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35. In some embodiments, there is provided an anti-PcrV antibody that specifically competes with an antibody comprising a $V_H$ comprising: an HC-CDR1 comprising the amino acid sequence of SEQ ID NO: 1, an HC-CDR2 comprising the amino acid sequence of SEQ ID NO: 9, and an HC-CDR3 comprising the amino acid sequence of SEQ ID NO: 26; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35. In some embodiments, there is provided an anti-PcrV antibody that binds to the same epitope as an antibody comprising a $V_H$ comprising: an HC-CDR1 comprising the amino acid sequence of SEQ ID NO: 1, an HC-CDR2 comprising the amino acid sequence of SEQ ID NO: 9, and an HC-CDR3 comprising the amino acid sequence of SEQ ID NO: 26; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35.

In some embodiments, the anti-PcrV antibody comprises a $V_H$ comprising the amino acid sequence of SEQ ID NO: 59, or a variant thereof having at least about 90% (for example at least about any of 91%, 92%, 93%, 94%, 95%, 96%, 97%, 98%, or 99%) sequence identity, and a $V_L$ comprising the amino acid sequence of SEQ ID NO: 65, or a variant thereof having at least about 90% sequence identity. In some embodiments, the anti-PcrV antibody comprises a $V_H$ comprising the amino acid sequence of SEQ ID NO: 59 and a $V_L$ comprising the amino acid sequence of SEQ ID NO: 65. In some embodiments, the anti-PcrV antibody comprises a $V_H$ comprising an HC-CDR1, an HC-CDR2 and an HC-CDR3 of the $V_H$ comprising the amino acid sequence of SEQ ID NO: 59; and a $V_L$ comprising a LC-CDR1, a LC-CDR2, and a LC-CDR3 of the $V_L$ comprising the amino acid sequence of SEQ ID NOs: 65.

In some embodiments, the anti-PcrV antibody comprises a $V_H$ comprising: an HC-CDR1 comprising the amino acid sequence of SEQ ID NO: 3, an HC-CDR2 comprising the amino acid sequence of SEQ ID NO: 10, and an HC-CDR3 comprising the amino acid sequence of SEQ ID NO: 27, or a variant thereof comprising up to about 5 amino acid substitutions in the HC-CDRs; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35, or a variant thereof comprising up to about 5 amino acid substitutions in the LC-CDRs.

In some embodiments, the anti-PcrV antibody comprises a $V_H$ comprising: an HC-CDR1 comprising the amino acid sequence of SEQ ID NO: 3, an HC-CDR2 comprising the amino acid sequence of SEQ ID NO: 10, and an HC-CDR3 comprising the amino acid sequence of SEQ ID NO: 27; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35. In some embodiments, there is provided an anti-PcrV antibody that specifically competes with an antibody comprising a $V_H$ comprising: an HC-CDR1 comprising the amino acid sequence of SEQ ID NO: 3, an HC-CDR2 comprising the amino acid sequence of SEQ ID NO: 10, and an HC-CDR3 comprising the amino acid sequence of SEQ ID NO: 27; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35. In some embodiments, there is provided an anti-PcrV antibody that binds to the same epitope as an antibody comprising a $V_H$ comprising: an HC-CDR1 comprising the amino acid sequence of SEQ ID NO: 3, an HC-CDR2 comprising the amino acid sequence of SEQ ID NO: 10, and an HC-CDR3 comprising the amino acid sequence of SEQ ID NO: 27; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35.

In some embodiments, the anti-PcrV antibody comprises a $V_H$ comprising the amino acid sequence of SEQ ID NO: 60, or a variant thereof having at least about 90% (for example at least about any of 91%, 92%, 93%, 94%, 95%, 96%, 97%, 98%, or 99%) sequence identity, and a $V_L$ comprising the amino acid sequence of SEQ ID NO: 65, or a variant thereof having at least about 90% sequence identity. In some embodiments, the anti-PcrV antibody comprises a $V_H$ comprising the amino acid sequence of SEQ ID NO: 60 and a $V_L$ comprising the amino acid sequence of SEQ ID NO: 65. In some embodiments, the anti-PcrV antibody comprises a $V_H$ comprising an HC-CDR1, an HC-CDR2 and an HC-CDR3 of the $V_H$ comprising the amino acid sequence of SEQ ID NO: 60; and a $V_L$ comprising a LC-CDR1, a LC-CDR2, and a LC-CDR3 of the $V_L$ comprising the amino acid sequence of SEQ ID NOs: 65.

In some embodiments, the anti-PcrV antibody comprises a $V_H$ comprising: an HC-CDR1 comprising the amino acid sequence of SEQ ID NO: 1, an HC-CDR2 comprising the amino acid sequence of SEQ ID NO: 10, and an HC-CDR3 comprising the amino acid sequence of SEQ ID NO: 28, or a variant thereof comprising up to about 5 amino acid substitutions in the HC-CDRs; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35, or a variant thereof comprising up to about 5 amino acid substitutions in the LC-CDRs.

In some embodiments, the anti-PcrV antibody comprises a $V_H$ comprising: an HC-CDR1 comprising the amino acid sequence of SEQ ID NO: 1, an HC-CDR2 comprising the amino acid sequence of SEQ ID NO: 10, and an HC-CDR3 comprising the amino acid sequence of SEQ ID NO: 28; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35. In some embodiments, there is provided an anti-PcrV antibody that specifically competes with an antibody comprising a $V_H$ comprising: an HC-CDR1 comprising the amino acid sequence of SEQ ID NO: 1, an HC-CDR2 comprising the amino acid sequence of SEQ ID NO: 10, and an HC-CDR3 comprising the amino acid sequence of SEQ ID NO: 28; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35. In some embodiments, there is provided an anti-PcrV antibody that binds to the same epitope as an antibody comprising a $V_H$ comprising: an HC-CDR1 comprising the amino acid sequence of SEQ ID NO: 1, an HC-CDR2 comprising the amino acid sequence of SEQ ID NO: 10, and an HC-CDR3 comprising the amino acid sequence of SEQ ID NO: 28; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35.

In some embodiments, the anti-PcrV antibody comprises a $V_H$ comprising the amino acid sequence of SEQ ID NO: 61, or a variant thereof having at least about 90% (for example at least about any of 91%, 92%, 93%, 94%, 95%, 96%, 97%, 98%, or 99%) sequence identity, and a $V_L$ comprising the amino acid sequence of SEQ ID NO: 65, or a variant thereof having at least about 90% sequence identity. In some embodiments, the anti-PcrV antibody comprises a $V_H$ comprising the amino acid sequence of SEQ ID NO: 61 and a $V_L$ comprising the amino acid sequence of SEQ ID NO: 65. In some embodiments, the anti-PcrV antibody comprises a $V_H$ comprising an HC-CDR1, an HC-CDR2 and an HC-CDR3 of the $V_H$ comprising the amino acid sequence of SEQ ID NO: 61; and a $V_L$ comprising a LC-CDR1, a LC-CDR2, and a LC-CDR3 of the $V_L$ comprising the amino acid sequence of SEQ ID NOs: 65.

In some embodiments, the anti-PcrV antibody comprises a $V_H$ comprising: an HC-CDR1 comprising the amino acid sequence of SEQ ID NO: 7, an HC-CDR2 comprising the amino acid sequence of SEQ ID NO: 13, and an HC-CDR3 comprising the amino acid sequence of SEQ ID NO: 29, or a variant thereof comprising up to about 5 amino acid substitutions in the HC-CDRs; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37, or a variant thereof comprising up to about 5 amino acid substitutions in the LC-CDRs.

In some embodiments, the anti-PcrV antibody comprises a $V_H$ comprising: an HC-CDR1 comprising the amino acid sequence of SEQ ID NO: 7, an HC-CDR2 comprising the amino acid sequence of SEQ ID NO: 13, and an HC-CDR3 comprising the amino acid sequence of SEQ ID NO: 29; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37. In some embodiments, there is provided an anti-PcrV antibody that specifically competes with an antibody comprising a $V_H$ comprising: an HC-CDR1 comprising the amino acid sequence of SEQ ID NO: 7, an HC-CDR2 comprising the amino acid sequence of SEQ ID NO: 13, and an HC-CDR3 comprising the amino acid sequence of SEQ ID NO: 29; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37. In some embodiments, there is provided an anti-PcrV antibody that binds to the same epitope as an antibody comprising a $V_H$ comprising: an HC-CDR1 comprising the amino acid sequence of SEQ ID NO: 7, an HC-CDR2 comprising the amino acid sequence of SEQ ID NO: 13, and an HC-CDR3 comprising the amino acid sequence of SEQ ID NO: 29; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37.

In some embodiments, the anti-PcrV antibody comprises a $V_H$ comprising the amino acid sequence of SEQ ID NO: 62, or a variant thereof having at least about 90% (for example at least about any of 91%, 92%, 93%, 94%, 95%, 96%, 97%, 98%, or 99%) sequence identity, and a $V_L$ comprising the amino acid sequence of SEQ ID NO: 67, or a variant thereof having at least about 90% sequence identity. In some embodiments, the anti-PcrV antibody comprises a $V_H$ comprising the amino acid sequence of SEQ ID NO: 62 and a $V_L$ comprising the amino acid sequence of SEQ ID NO: 67. In some embodiments, the anti-PcrV antibody comprises a $V_H$ comprising an HC-CDR1, an HC-CDR2 and an HC-CDR3 of the $V_H$ comprising the amino acid sequence of SEQ ID NO: 62; and a $V_L$ comprising a LC-CDR1, a LC-CDR2, and a LC-CDR3 of the $V_L$ comprising the amino acid sequence of SEQ ID NOs: 67.

In some embodiments, the anti-PcrV antibody comprises a $V_H$ comprising: an HC-CDR1 comprising the amino acid sequence of SEQ ID NO: 1, an HC-CDR2 comprising the amino acid sequence of SEQ ID NO: 10, and an HC-CDR3 comprising the amino acid sequence of SEQ ID NO: 30, or a variant thereof comprising up to about 5 amino acid substitutions in the HC-CDRs; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35, or a variant thereof comprising up to about 5 amino acid substitutions in the LC-CDRs.

In some embodiments, the anti-PcrV antibody comprises a $V_H$ comprising: an HC-CDR1 comprising the amino acid sequence of SEQ ID NO: 1, an HC-CDR2 comprising the amino acid sequence of SEQ ID NO: 10, and an HC-CDR3 comprising the amino acid sequence of SEQ ID NO: 30; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35. In some embodiments, there is provided an anti-PcrV antibody that specifically competes with an antibody comprising a $V_H$ comprising: an HC-CDR1 comprising the amino acid sequence of SEQ ID NO: 1, an HC-CDR2 comprising the amino acid sequence of SEQ ID NO: 10, and an HC-CDR3 comprising the amino acid sequence of SEQ ID NO: 30; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35. In some embodiments, there is provided an anti-PcrV antibody that binds to the same epitope as an antibody comprising a $V_H$ comprising: an HC-CDR1 comprising the amino acid sequence of SEQ ID NO: 1, an HC-CDR2 comprising the amino acid sequence of SEQ ID NO: 10, and an HC-CDR3 comprising the amino acid sequence of SEQ ID NO: 30; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35.

In some embodiments, the anti-PcrV antibody comprises a $V_H$ comprising the amino acid sequence of SEQ ID NO: 63, or a variant thereof having at least about 90% (for example at least about any of 91%, 92%, 93%, 94%, 95%, 96%, 97%, 98%, or 99%) sequence identity, and a $V_L$ comprising the amino acid sequence of SEQ ID NO: 65, or a variant thereof having at least about 90% sequence identity. In some embodiments, the anti-PcrV antibody comprises a $V_H$ comprising the amino acid sequence of SEQ ID NO: 63 and a $V_L$ comprising the amino acid sequence of SEQ ID NO: 65. In some embodiments, the anti-PcrV antibody comprises a $V_H$ comprising an HC-CDR1, an HC-CDR2 and an HC-CDR3 of the $V_H$ comprising the amino acid sequence of SEQ ID NO: 63; and a $V_L$ comprising a LC-CDR1, a LC-CDR2, and a LC-CDR3 of the $V_L$ comprising the amino acid sequence of SEQ ID NOs: 65.

In some embodiments, the anti-PcrV antibody comprises a $V_H$ comprising: an HC-CDR1 comprising the amino acid sequence of SEQ ID NO: 8, an HC-CDR2 comprising the amino acid sequence of SEQ ID NO: 14, and an HC-CDR3 comprising the amino acid sequence of SEQ ID NO: 31, or a variant thereof comprising up to about 5 amino acid substitutions in the HC-CDRs; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37, or a variant thereof comprising up to about 5 amino acid substitutions in the LC-CDRs.

In some embodiments, the anti-PcrV antibody comprises a $V_H$ comprising: an HC-CDR1 comprising the amino acid sequence of SEQ ID NO: 8, an HC-CDR2 comprising the amino acid sequence of SEQ ID NO: 14, and an HC-CDR3 comprising the amino acid sequence of SEQ ID NO: 31; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37. In some embodiments, there is provided an anti-PcrV antibody that specifically competes with an antibody comprising a $V_H$ comprising: an HC-CDR1 comprising the amino acid sequence of SEQ ID NO: 8, an HC-CDR2 comprising the amino acid sequence of SEQ ID NO: 14, and an HC-CDR3 comprising the amino acid sequence of SEQ ID NO: 31; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37. In some embodiments, there is provided an anti-PcrV antibody that binds to the same epitope as an antibody comprising a $V_H$ comprising: an HC-CDR1 comprising the amino acid sequence of SEQ ID NO: 8, an HC-CDR2 comprising the amino acid sequence of SEQ ID NO: 14, and an HC-CDR3 comprising the amino acid sequence of SEQ ID NO: 31; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37.

In some embodiments, the anti-PcrV antibody comprises a $V_H$ comprising the amino acid sequence of SEQ ID NO: 64, or a variant thereof having at least about 90% (for example at least about any of 91%, 92%, 93%, 94%, 95%, 96%, 97%, 98%, or 99%) sequence identity, and a $V_L$ comprising the amino acid sequence of SEQ ID NO: 67, or a variant thereof having at least about 90% sequence identity. In some embodiments, the anti-PcrV antibody comprises a $V_H$ comprising the amino acid sequence of SEQ ID NO: 64 and a $V_L$ comprising the amino acid sequence of SEQ ID NO: 67. In some embodiments, the anti-PcrV antibody comprises a $V_H$ comprising an HC-CDR1, an HC-CDR2 and an HC-CDR3 of the $V_H$ comprising the amino acid sequence of SEQ ID NO: 64; and a $V_L$ comprising a LC-CDR1, a LC-CDR2, and a LC-CDR3 of the $V_L$ comprising the amino acid sequence of SEQ ID NOs: 67.

In some embodiments, the anti-PcrV antibody comprises a $V_H$ comprising: an HC-CDR1 comprising the amino acid sequence of SEQ ID NO: 7, an HC-CDR2 comprising the amino acid sequence of SEQ ID NO: 13, and an HC-CDR3 comprising the amino acid sequence of SEQ ID NO: 29, or a variant thereof comprising up to about 5 amino acid substitutions in the HC-CDRs; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 38, or a variant thereof comprising up to about 5 amino acid substitutions in the LC-CDRs.

In some embodiments, the anti-PcrV antibody comprises a $V_H$ comprising: an HC-CDR1 comprising the amino acid sequence of SEQ ID NO: 7, an HC-CDR2 comprising the amino acid sequence of SEQ ID NO: 13, and an HC-CDR3 comprising the amino acid sequence of SEQ ID NO: 29; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 38. In some embodiments, there is provided an anti-PcrV antibody that specifically competes with an antibody comprising a $V_H$ comprising: an HC-CDR1 comprising the amino acid sequence of SEQ ID NO: 7, an HC-CDR2 comprising the amino acid sequence of SEQ ID NO: 13, and an HC-CDR3 comprising the amino acid sequence of SEQ ID NO: 29; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 38. In some embodiments, there is provided an anti-PcrV antibody that binds to the same epitope as an antibody comprising a $V_H$ comprising: an HC-CDR1 comprising the amino acid sequence of SEQ ID NO: 7, an HC-CDR2 comprising the amino acid sequence of SEQ ID NO: 13, and an HC-CDR3 comprising the amino acid sequence of SEQ ID NO: 29; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 38.

In some embodiments, the anti-PcrV antibody comprises a $V_H$ comprising the amino acid sequence of SEQ ID NO: 62, or a variant thereof having at least about 90% (for example at least about any of 91%, 92%, 93%, 94%, 95%, 96%, 97%, 98%, or 99%) sequence identity, and a $V_L$ comprising the amino acid sequence of SEQ ID NO: 70, or a variant thereof having at least about 90% sequence identity. In some embodiments, the anti-PcrV antibody comprises a $V_H$ comprising the amino acid sequence of SEQ ID NO: 62 and a $V_L$ comprising the amino acid sequence of SEQ ID NO: 70. In some embodiments, the anti-PcrV antibody comprises a $V_H$ comprising an HC-CDR1, an HC-CDR2 and an HC-CDR3 of the $V_H$ comprising the amino acid sequence of SEQ ID NO: 62; and a $V_L$ comprising a LC-CDR1, a LC-CDR2, and a LC-CDR3 of the $V_L$ comprising the amino acid sequence of SEQ ID NOs: 70.

In some embodiments, competition assays may be used to identify a monoclonal antibody that competes with an anti-PcrV antibody described herein for binding to PcrV. Competition assays can be used to determine whether two antibodies bind the same epitope by recognizing identical or sterically overlapping epitopes or one antibody competitively inhibits binding of another antibody to the antigen. In certain embodiments, such a competing antibody binds to the same epitope that is bound by an antibody described herein. Exemplary competition assays include, but are not limited to, routine assays such as those provided in Harlow and Lane (1988) Antibodies: A Laboratory Manual ch. 14 (Cold Spring Harbor Laboratory, Cold Spring Harbor, N.Y.). Detailed exemplary methods for mapping an epitope to which an antibody binds are provided in Morris (1996) "Epitope Mapping Protocols," in Methods in Molecular Biology vol. 66 (Humana Press, Totowa, N.J.). In some embodiments, two antibodies are said to bind to the same epitope if each blocks binding of the other by 50% or more. In some embodiments, the antibody that competes with an anti-PcrV antibody described herein is a chimeric, humanized or human antibody.

Exemplary anti-PcrV antibody sequences are shown in Tables 2 and 3. Those skilled in the art will recognize that many algorithms are known for prediction of CDR positions and for delimitation of antibody heavy chain and light chain variable regions. Anti-PcrV antibodies comprising CDRs, $V_H$ and/or $V_L$ sequences from antibodies described herein, but based on prediction algorithms other than those exemplified in the tables below, are within the scope of this invention.

TABLE 2

Exemplary anti-PcrV antibody CDR sequences.

| Name | CDR H1 | CDR H2 | CDR H3 |
|---|---|---|---|
| 13-42 | DYPMS (SEQ ID NO: 1) | GISESGG STNDADS VKG (SEQ ID NO: 9) | GRFCTNS SCFFRAV YGMDV (SEQ ID NO: 15) |
| 2B1 | SYPMS (SEQ ID NO: 2) | GISESGG STNYADS VKG (SEQ ID NO: 10) | CRFSCES HHFFRAV YGMDV (SEQ ID NO: 16) |
| 3H10 | DYPMS (SEQ ID NO: 1) | GISESGG STNDADS VKG (SEQ ID NO: 9) | GRFSDYS QIIFFRA VYGMDV (SEQ ID NO: 17) |
| 8C1 | DNHMS (SEQ ID NO: 3) | GISESGG STNYADS VKG (SEQ ID NO: 10) | GRFSTNS AIIFFRA VYGMDV (SEQ ID NO: 18) |
| 7C1 | DNHMS (SEQ ID NO: 3) | GISESGG STNYADS VKG (SEQ ID NO: 10) | GRFSTSS SHFYRAV YGMDV (SEQ ID NO: 19) |
| 2D3 | DNHMS (SEQ ID NO: 3) | GISESGG STYYADS VKG (SEQ ID NO: 11) | GRFSYDT RHFFRAV YGMDV (SEQ ID NO: 20) |
| 3A9 | DYSMS (SEQ ID NO: 4) | GISESGG STNYADS VKG (SEQ ID NO: 10) | GRFSDST KHFFRAV YGMDV (SEQ ID NO: 21) |
| 3A11 | SYHMS (SEQ ID NO: 5) | GISESGG STNYADS VKG (SEQ ID NO: 10) | GRFSQSS SHFFRAV YGMDV (SEQ ID NO: 22) |
| 3B12 | SNHMS (SEQ ID NO: 6) | GISESGG STNYADS VKG (SEQ ID NO: 10) | GRFSDEY GIIFFRA VYGMDV (SEQ ID NO: 23) |
| 3G3 | DYPMS (SEQ ID NO: 1) | GISESGG STYDADS VKG (SEQ ID NO: 12) | GRFSASA GIIFFRA VYGMDV (SEQ ID NO: 24) |
| 4A10 | SYPMS (SEQ ID NO: 2) | GISESGG STNYADS VKG (SEQ ID NO: 10) | GRFSDAS EHFFRAV YGMDV (SEQ ID NO: 25) |
| 5B3 | DYPMS (SEQ ID NO: 1) | GISESGG STNDADS VKG (SEQ ID NO: 9) | GRFSQDS YHFFRAV YGMDV (SEQ ID NO: 26) |

TABLE 2-continued

Exemplary anti-PcrV antibody CDR sequences.

| Name | | | |
|---|---|---|---|
| 6A10 | DNHMS (SEQ ID NO: 3) | GISESGGSTNYADSVKG (SEQ ID NO: 10) | GRFSTSSSIIFFRAVYGMDV (SEQ ID NO: 27) |
| 6D10 | DYPMS (SEQ ID NO: 1) | GISESGGSTNYADSVKG (SEQ ID NO: 10) | GRFSTDSSHFYRAVYGMDV (SEQ ID NO: 28) |
| 7B1 | DNYMS (SEQ ID NO: 7) | VISESGGSTNYADSVKG (SEQ ID NO: 13) | GRFSTLSSHFFRAVYGMDV (SEQ ID NO: 29) |
| 7B2 | DYPMS (SEQ ID NO: 1) | GISESGGSTNYADSVKG (SEQ ID NO: 10) | GRFSTDSSHFFRAVYGMDV (SEQ ID NO: 30) |
| 9B12 | DNPMS (SEQ ID NO: 8) | VISESGGSTNDADSVKG (SEQ ID NO: 14) | GRFSTNSDHFYRAVYGMDV (SEQ ID NO: 31) |
| 7B1-1F5 | DNYMS (SEQ ID NO: 7) | VISESGGSTNYADSVKG (SEQ ID NO: 13) | GRFSTLSSIIFFRAVYGMDV (SEQ ID NO: 29) |

| Name | CDR L1 | CDR L2 | CDR L3 |
|---|---|---|---|
| 13-42 | RASQGISSYLA (SEQ ID NO: 32) | AASTLQS (SEQ ID NO: 34) | QQLSSYPLS (SEQ ID NO: 35) |
| 2B1 | RASQGISSYLA (SEQ ID NO: 32) | AASTLQS (SEQ ID NO: 34) | QQESSYPLS (SEQ ID NO: 35) |
| 3H10 | RASQGISSYLA (SEQ ID NO: 32) | AASTLQS (SEQ ID NO: 34) | QQLNSYPLT (SEQ ID NO: 36) |
| 8C1 | RASQGISSYLA (SEQ ID NO: 32) | AASTLQS (SEQ ID NO: 34) | QQLSSYPLT (SEQ ID NO: 37) |
| 7C1 | RASQGISSYLA (SEQ ID NO: 32) | AASTLQS (SEQ ID NO: 34) | QQLSSYPLS (SEQ ID NO: 35) |
| 2D3 | RASQGISSYLA (SEQ ID NO: 32) | AASTLQS (SEQ ID NO: 34) | QQLSSYPLS (SEQ ID NO: 35) |
| 3A9 | RASQGISSYLA (SEQ ID NO: 32) | AASTLQS (SEQ ID NO: 34) | QQLSSYPLS (SEQ ID NO: 35) |
| 3A11 | RASQGISSYLA (SEQ ID NO: 32) | AASTLQS (SEQ ID NO: 34) | QQLSSYPLT (SEQ ID NO: 37) |
| 3B12 | RASQGISSYLA (SEQ ID NO: 32) | AASTLQS (SEQ ID NO: 34) | QQLSSYPLT (SEQ ID NO: 37) |
| 3G3 | RASQGIRSYLA (SEQ ID NO: 33) | AASTLQS (SEQ ID NO: 34) | QQLSSYPLS (SEQ ID NO: 35) |
| 4A10 | RASQGISSYLA (SEQ ID NO: 32) | AASTLQS (SEQ ID NO: 34) | QQLSSYPLT (SEQ ID NO: 37) |
| 5B3 | RASQGISSYLA (SEQ ID NO: 32) | AASTLQS (SEQ ID NO: 34) | QQLSSYPLS (SEQ ID NO: 35) |
| 6A10 | RASQGISSYLA (SEQ ID NO: 32) | AASTLQS (SEQ ID NO: 34) | QQLSSYPLS (SEQ ID NO: 35) |
| 6D10 | RASQGISSYLA (SEQ ID NO: 32) | AASTLQS (SEQ ID NO: 34) | QQLSSYPLS (SEQ ID NO: 35) |
| 7B1 | RASQGISSYLA (SEQ ID NO: 32) | AASTLQS (SEQ ID NO: 34) | QQLSSYPLT (SEQ ID NO: 37) |
| 7B2 | RASQGISSYLA (SEQ ID NO: 32) | AASTLQS (SEQ ID NO: 34) | QQLSSYPLS (SEQ ID NO: 35) |
| 9BL2 | RASQGISSYLA (SEQ ID NO: 32) | AASTLQS (SEQ ID NO: 34) | QQLSSYPLT (SEQ ID NO: 37) |
| 7B1-1F5 | RASQGISSYLA (SEQ ID NO: 32) | AASTLQS (SEQ ID NO: 34) | QQLKSYPLT (SEQ ID NO: 38) |

TABLE 3

Exemplary $V_H$ and $V_L$ sequences.

| SEQ ID NO | Description | Sequence |
|---|---|---|
| 48 | 13-42 $V_H$ | EVQLLESGGGLVQPGGSLRLSCTASGFTFSDYPMSWVRQAPGKGLDWVSGISESGGSTNDADSVKGRFSTSRDNSKSTLYLDMNSLRAEDTAIYYCAKGRFCTNSSCFFRAVYGMDVWGQGTAVTVSS |
| 49 | 2B1 $V_H$ | EVQLLESGGGLVQPGGSLRLSCTASGFTFSSYPMSWVRQAPGKGLDWVSGISESGGSTNYADSVKGRFSTSRDNSKSTLYLDMNSLRAEDTAIYYCAKGRFSGESHHFFRAVYGMDVWGQGTAVTVSS |

TABLE 3-continued

Exemplary $V_H$ and $V_L$ sequences.

| SEQ ID NO | Description | Sequence |
|---|---|---|
| 50 | 3H10 $V_H$ | EVQLLESGGGLVQPGGSLRLSCTASGFTFSDYPMSWVRQAPGKGLDWVSGISESGGSTNDADSVKGRFSTSRDNSKSTLYLDMNSLRAEDTAIYYCAKGRFSDYSQHFFRAVYGMDVWGQGTAVTVSS |
| 51 | 8C1 $V_H$ | EVQLLESGGGLVQPGGSLRLSCTASGFTFSDNHMSWVRQAPGKGLDWVSGISESGGSTNYADSVKGRFSTSRDNSKSTLYLDMNSLRAEDTAIYYCAKGRFSTNSAHFFRAVYGMDVWGQGTAVTVSS |
| 52 | 7C1 $V_H$ | EVQLLESGGGLVQPGGSLRLSCTASGFTFSDNHMSWVRQAPGKGLDWVSGISESGGSTNYADSVKGRFSTSRDNSKSTLYLDMNSLRAEDTAIYYCAKGRFSTSSSHFYRAVYGMDVWGQGTAVTVSS |
| 53 | 2D3 $V_H$ | EVQLLESGGGLVQPGGSLRLSCTASGFTFSDNHMSWVRQAPGKGLDWVSGISESGGSTYYADSVKGRFSTSRDNSKSTLYLDMNSLRAEDTAIYYCAKGRFSYDTRHFFRAVYGMDVWGQGTAVTVSS |
| 54 | 3A9 $V_H$ | EVQLLESGGGLVQPGGSLRLSCTASGFTFSDYSMSWVRQAPGKGLDWVSGISESGGSTNYADSVKGRFSTSRDNSKSTLYLDMNSLRAEDTAIYYCAKGRFSDSTKHFFRAVYGMDVWGQGTAVTVSS |
| 55 | 3A11 $V_H$ | EVQLLESGGGLVQPGGSLRLSCTASGFTFSSYHMSWVRQAPGKGLDWVSGISESGGSTNYADSVKGRFSTSRDNSKSTLYLDMNSLRAEDTAIYYCAKGRFSQSSSHFFRAVYGMDVWGQGTAVTVSS |
| 56 | 3B12 $V_H$ | EVQLLESGGGLVQPGGSLRLSCTASGFTFSSNHMSWVRQAPGKGLDWVSGISESGGSTNYADSVKGRISTSRDNSKSTLYLDMNSLRAEDTAIYYCAKGRFSDEYGHFFRAVYGMDVWGQGTAVTVSS |
| 57 | 3G3 $V_H$ | EVQLLESGGGLVQPGGSLRLSCTASGFTFSDYPMSWVRQAPGKGLDWVSGISESGGSTYDADSVKGRFSTSRDNSKSTLYLDMNSLRAEDTAIYYCAKGRFSASAGHFFRAVYGMDVWGQGTAVTVSS |
| 58 | 4A10 $V_H$ | EVQLLESGGGLVQPGGSLRLSCTASGFTFSSYPMSWVRQAPGKGLDWVSGISESGGSTNYADSVKGRFSTSRDNSKSTLYLDMNSLRAEDTAIYYCAKGRFSDASEHFFRAVYGMDVWGQGTAVTVSS |
| 59 | 5B3 $V_H$ | EVQLLESGGGLVQPGGSLRLSCTASGITFSDYPMSWVRQAPGKGLDWVSGISESGGSTND ADSVKGRFSTSRDNSKSTLYLDMNSLRAEDTAIYYCAKGRFSQDSYHFFRAVYGMDVWGQGTAVTVSS |
| 60 | 6A10 $V_H$ | EVQLLESGGGLVQPGGSLRLSCTASGFTFSDNHMSWVRQAPGKGLDWVSGISESGGSTNYADSVKGRFSTSRDNSKSTLYLDMNSLRAEDTAIYYCAKGRFSTSSSHFFRAVYGMDVWGQGTAVTVSS |
| 61 | 6D10 $V_H$ | EVQLLESGGGLVQPGGSLRLSCTASGFTFSDYPMSWVRQAPGKGLDWVSGISESGGSTNYADSVKGRFSTSRDNSKSTLYLDMNSLRAEDTAIYYCAKGRFSTDSSHFYRAVYGMDVWGQGTAVTVSS |
| 62 | 7B1, 7B1-1F5 $V_H$ | EVQLLESGGGLVQPGGSLRLSCTASGFTFSDNYMSWVRQAPGKGLDWVSVISESGGSTNYADSVKGRFSTSRDNSKSTLYLDMNSLRAEDTAIYYCAKGRFSTLSSHFFRAVYGMDVWGQGTAVTVSS |
| 63 | 7B2 $V_H$ | EVQLLESGGGLVQPGGSLRLSCTASGFTFSDYPMSWVRQAPGKGLDWVSGISESGGSTNYADSVKGRFSTSRDNSKSTLYLDMNSLRAEDTAIYYCAKGRFSTDSSHFFRAVYGMDVWGQGTAVTVSS |
| 64 | 9B12 $V_H$ | EVQLLESGGGLVQPGGSLRLSCTASGFTFSDNPMSWVRQAPGKGLDWVSVISESGGSTXDADSVKGRFSTSRDXSKSTLYLDMXSLRAEDTAIYYCAKGRFSTNSDHFYRAVYGMDVWGQGTAVTVSS |
| 65 | 13-42, 2B1, 7C1, 2D3, 3A9, 5B3, 6A10, 6D10, 7B2 $V_L$ | DIQLTQSPSSLSASVGDRVTITCRASQGISSYLAWYQQKPGKAPKLLIYAASTLQSGVPSRFSGSGSGTDFTLTISSLQPEDFATYYCQQLSSYPLSFGGGTKVEIK |
| 66 | 3H10 $V_L$ | DIQLTQSPSSLSASVGDRVTITCRASQGISSYLAWYQQKPGKAPKLLIYAASTLQSGVPSRFSGSGSGTDFTLTISSLQPEDFATYYCQQLNSYPLTFGGGTKVElK |
| 67 | 8C1, 3A11, 3B12, 7B1, 9B12 $V_L$ | DIQLTQSPSSLSASVGDRVTITCRASQGISSYLAWYQQKPGKAPKLLIYAASTLQSGVPSRFSGSGSGTDFTLTISSLQPEDFATYYCQQLSSYPLTFGGGTKVEIK |
| 68 | 3G3 $V_L$ | DIQLTQSPSSLSASVGDRVTITCRASQGIRSYLAWYQQKPGKAPKLLIYAASTLQSGVPSRFSGSGSGTDFTLTISSLQPEDFATYYCQQLSSYPLSFGGGTKVEIK |

TABLE 3-continued

Exemplary $V_H$ and $V_L$ sequences.

| SEQ ID NO | Description | Sequence |
|---|---|---|
| 69 | 4A10 $V_L$ | DIQLTQSPSSLSASVGDRVT ITCRASQGISSYLAWYQQKP GKTPKLLIYAASTLQSGVPS RFSGSGSGTDFTLTISSLQP EDFATYYCQQLSSYPLTFGG GTKVEIK |
| 70 | 7B1-1F5 $V_L$ | DIQLTQSPSSFSASTGDRVT ITCRASQGISSYLAWYQQKP GKAPKVLIYAASTLQSGVPS RFSGSGSGTEFTLTISSLQP EDFATYYCQQLKSYPLTFGG GTKLEIK |

TABLE 4

Exemplary Sequences

| SEQ ID NO: | Description | Sequence |
|---|---|---|
| 71 | Full-length PcrV | MEVRNLNAARELFLDELLAASAAPASAEQEELLALLRSERIVLAHAGQP LSEAQVLKALAWLLAANPSAPPGQGLEVLREVLQARRQPGAQWDLRE FLVSAYFSLHGRLDEDVIGVYKDV LQTQDGKRKALLDELKALTAELKVYSVIQSQINAALSAKQGIRIDAGGI DLVDPTLYGYAVGDPRWKDSPEYALLSNLDTFSGKLSIKDFLSGSPKQS GELKGLSDEYPFEKDNNPVGNFATTVSDRSRPLNDKVNEKTTLLNDTSS RYNSAVEALNRFIQKYDSVLRDILSAI |
| 72 | Light chain constant region | RTVAAPSVFIFPPSDEQLKSGTASVVCLLNNFYPREAKVQWKVDNALQS GNSQESVTEQDSKDSTYSLSSTLTLSKADYEKHKVYACEVTHQGLSSPV TKSFNRGEC |
| 73 | IgG1 heavy chain constant region | ASTKGPSVFPLAPSSKSTSGGTAALGCLVKDYFPEPVTVSWNSGALTSG VHTFPAVLQSSGLYSLSSVVTVPSSSLGTQTYICNVNHKPSNTKVDKKV EPKSCDKTHTCPPCPAPELLGGPSVFLFPPKPKDTLMISRTPEVTCVVVD VSHEDPEVKFNWYVDGVEVHNAKTKPREEQYNSTYRVVSVLTVLHQD WLNGKEYKCKVSNKALPAPIEKTISKAKGQPREPQVYTLPPSREEMTKN QVSLTCLVKGFYPSDIAVEWESNGQPENNYKTTPPVLDSDGSFFLYSKL TVDKSRWQQGNVFSCSVMHEALHNHYTQKSLSLSPGK |
| 74 | IgG4 heavy chain constant region | ASTKGPSVFPLAPCSRSTSESTAALGCLVKDYFPEPVTVSWNSGALTSG VHTFPAVLQSSGLYSLSSVVTVPSSSLGTKTYTCNVDHKPSNTKVDKRV ESKYGPPCPSCPAPEFLGGPSVFLFPPKPKDTLMISRTPEVTCVVVDVSQ EDPEVQFNWYVDGVEVHNAKTKPREEQFNSTYRVVSVLTVLHQDWLN GKEYKCKVSNKGLPSSIEKTISKAKGQPREPQVYTLPPSQEEMTKNQVS LTCLVKGFYPSDIAVEWESNGQPENNYKTTPPVLDSDGSFFLYSRLTVD KSRWQEGNVFSCSVMHEALHNHYTQKSLSLSLGK |

Binding Affinity

Binding affinity can be indicated by $K_d$, $K_{off}$, $K_{on}$, or $K_a$. The term "$K_{off}$", as used herein, is intended to refer to the off-rate constant for dissociation of an antibody from the antibody/antigen complex, as determined from a kinetic selection set up. The term "$K_{on}$", as used herein, is intended to refer to the on-rate constant for association of an antibody to the antigen to form the antibody/antigen complex. The term equilibrium dissociation constant "$K_d$", as used herein, refers to the dissociation constant of a particular antibody-antigen interaction, and describes the concentration of antigen required to occupy one half of all of the antibody-binding domains present in a solution of antibody molecules at equilibrium, and is equal to $K_{off}/K_{on}$. The measurement of $K_d$ presupposes that all binding agents are in solution. In the case where the antibody is tethered to a cell wall, e.g., in a yeast expression system, the corresponding equilibrium rate constant is expressed as EC50, which gives a good approximation of $K_d$. The affinity constant, $K_a$, is the inverse of the dissociation constant, $K_d$.

The dissociation constant ($K_d$) is used as an indicator showing affinity of antibody moieties to antigens. For example, easy analysis is possible by the Scatchard method using antibodies marked with a variety of marker agents, as well as by using Biacore (made by Amersham Biosciences), analysis of biomolecular interactions by surface plasmon resonance, according to the user's manual and attached kit. The $K_d$ value that can be derived using these methods is expressed in units of M (Mols). An antibody that specifically binds to a target may have a $K_d$ of, for example, $\leq 10^{-7}$ M, $\leq 10^{-8}$ M, $\leq 10^{-9}$ M, $\leq 10^{-10}$ M, $\leq 10^{-11}$ M, $\leq 10^{-12}$ M, or $\leq 10^{-13}$ M.

Binding specificity of the antibody can be determined experimentally by methods known in the art. Such methods comprise, but are not limited to, Western blots, ELISA-, RIA-, ECL-, IRMA-, EIA-, BIAcore-tests and peptide scans.

In some embodiments, the anti-PcrV antibody specifically binds to a target PcrV with a $K_d$ of about $10^{-7}$ M to about $10^{-13}$ M (such as about $10^{-7}$ M to about $10^{-13}$ M, about $10^{-8}$ M to about $10^{-13}$ M, about $10^{-9}$ M to about $10^{-13}$ M, or about $10^{-10}$ M to about $10^{-12}$ M). Thus in some embodiments, the $K_d$ of the binding between the anti-PcrV antibody and PcrV, is about $10^{-7}$ M to about $10^{-1}$ M, about $1 \times 10^{-7}$ M to about $5 \times 10^{-13}$ M, about $10^{-7}$ M to about $10^{-12}$ M, about $10^{-7}$ M to about $10^{-13}$ M, about $10^{-7}$ M to about $10^{-10}$ M, about $10^{-7}$ M to about $10^{-9}$ M, about $10^{-8}$ M to about $10^{-13}$ M, about $1 \times 10^{-8}$ M to about $5 \times 10^{-13}$ M, about $10^{-8}$ M to about $10^{-12}$ M, about $10^{-8}$ M to about $10^{-11}$ M, about $10^{-8}$ M to about $10^{-10}$ M, about $10^{-8}$ M to about $10^{-9}$ M, about $5 \times 10^{-9}$ M to about $1 \times 10^{-13}$ M, about $5 \times 10^{-9}$ M to about $1 \times 10^{-12}$ M, about $5 \times 10^{-9}$ M to about $1 \times 10^{-11}$ M, about $5 \times 10^{-9}$ M to about $1 \times 10^{-10}$ M, about $10^{-9}$ M to about $10^{-110}$ M, about $10^{-9}$ M to about $10^{-12}$ M, about $10^{-9}$ M to about $10^{-11}$ M, about $10^{-9}$ M to about $10^{-10}$ M, about $5\times10^{-10}$ M to about $1\times10^{-13}$ M, about $5\times10^{-10}$ M to about $1\times10^{-12}$ M, about $5\times10^{-10}$ M to about $1\times10^{-11}$ M, about $10^{-10}$ M to about $10^{-13}$ M, about $1\times10^{-10}$ M to about $5\times10^{-13}$ M, about $1\times10^{-10}$ M to about $1\times10^{-12}$ M, about $1\times10^{-10}$ M to about $5\times10^{-12}$ M, about $1\times10^{-10}$ M to about $1\times10^{-11}$ M, about $10^{-11}$ M to about $10^{-13}$ M, about $1\times10^{-11}$ M to about $5\times10^{-13}$ M, about $10^{-11}$ M to about $10^{-12}$ M, or about $10^{-12}$ M to about $10^{-13}$ M. In some embodiments, the $K_d$ of the binding between the anti-PcrV antibody and a PcrV is about $10^{-7}$ M to about $10^{-13}$ M.

In some embodiments, the $K_d$ of the binding between the anti-PcrV antibody and a non-target is higher than the $K_d$ of the binding between the anti-PcrV antibody and the target, and is herein referred to in some embodiments as the binding affinity of the anti-PcrV antibody to the target (e.g., PcrV) is higher than that to a non-target. In some embodiments, the non-target is an antigen that is not PcrV. In some embodiments, the $K_d$ of the binding between the anti-PcrV antibody (against PcrV) and a non-PcrV target can be at least about 10 times, such as about 10-100 times, about 100-1000 times, about $10^3$-$10^4$ times, about $10^4$-$10^5$ times, about $10^5$-$10^6$ times, about $10^6$-$10^7$ times, about $10^7$-$10^8$ times, about $10^8$-$10^9$ times, about $10^9$-$10^{10}$ times, about $10^{10}$-$10^{11}$ times, or about $10^{11}$-$10^{12}$ times of the $K_d$ of the binding between the anti-PcrV antibody and a target PcrV.

Nucleic Acids

Nucleic acid molecules encoding the anti-PcrV antibodies are also contemplated. In some embodiments, there is provided a nucleic acid (or a set of nucleic acids) encoding a full-length anti-PcrV antibody, including any of the full-length anti-PcrV antibodies described herein. In some embodiments, the nucleic acid (or a set of nucleic acids) encoding the anti-PcrV antibody described herein may further comprises a nucleic acid sequence encoding a peptide tag (such as protein purification tag, e.g., His-tag, HA tag).

Also contemplated here are isolated host cells comprising an anti-PcrV antibody, an isolated nucleic acid encoding the polypeptide components of the anti-PcrV antibody, or a vector comprising a nucleic acid encoding the polypeptide components of the anti-PcrV antibody described herein.

The present application also includes variants to these nucleic acid sequences. For example, the variants include nucleotide sequences that hybridize to the nucleic acid sequences encoding the anti-PcrV antibodies of the present application under at least moderately stringent hybridization conditions.

The present application also provides vectors in which a nucleic acid of the present application is inserted.

In brief summary, the expression of an anti-PcrV antibody (e.g., full-length anti-PcrV antibody) by a natural or synthetic nucleic acid encoding the anti-PcrV antibody can be achieved by inserting the nucleic acid into an appropriate expression vector, such that the nucleic acid is operably linked to 5' and 3' regulatory elements, including for example a promoter (e.g., a lymphocyte-specific promoter) and a 3' untranslated region (UTR). The vectors can be suitable for replication and integration in eukaryotic host cells. Typical cloning and expression vectors contain transcription and translation terminators, initiation sequences, and promoters useful for regulation of the expression of the desired nucleic acid sequence.

The nucleic acids of the present application may also be used for nucleic acid immunization and gene therapy, using standard gene delivery protocols. Methods for gene delivery are known in the art. See, e.g., U.S. Pat. Nos. 5,399,346; 5,580,859; 5,589,466, incorporated by reference herein in their entireties. In some embodiments, the application provides a gene therapy vector.

The nucleic acid can be cloned into a number of types of vectors. For example, the nucleic acid can be cloned into a vector including, but not limited to a plasmid, a phagemid, a phage derivative, an animal virus, and a cosmid. Vectors of particular interest include expression vectors, replication vectors, probe generation vectors, and sequencing vectors.

Further, the expression vector may be provided to a cell in the form of a viral vector. Viral vector technology is well known in the art and is described, for example, in Green and Sambrook (2013, Molecular Cloning: A Laboratory Manual, Cold Spring Harbor Laboratory, New York), and in other virology and molecular biology manuals. Viruses which are useful as vectors include, but are not limited to, retroviruses, adenoviruses, adeno-associated viruses, herpes viruses, and lentiviruses. In general, a suitable vector contains an origin of replication functional in at least one organism, a promoter sequence, convenient restriction endonuclease sites, and one or more selectable markers (see, e.g., WO 01/96584; WO 01/29058; and U.S. Pat. No. 6,326,193).

A number of viral based systems have been developed for gene transfer into mammalian cells. For example, retroviruses provide a convenient platform for gene delivery systems. A selected gene can be inserted into a vector and packaged in retroviral particles using techniques known in the art. The recombinant virus can then be isolated and delivered to cells of the subject either in vivo or ex vivo. A number of retroviral systems are known in the art. In some embodiments, adenovirus vectors are used. A number of adenovirus vectors are known in the art. In some embodiments, lentivirus vectors are used. Vectors derived from retroviruses such as the lentivirus are suitable tools to achieve long-term gene transfer since they allow long-term, stable integration of a transgene and its propagation in daughter cells. Lentiviral vectors have the added advantage over vectors derived from onco-retroviruses such as murine leukemia viruses in that they can transduce non-proliferating cells, such as hepatocytes. They also have the added advantage of low immunogenicity.

Additional promoter elements, e.g., enhancers, regulate the frequency of transcriptional initiation. Typically, these are located in the region 30-110 bp upstream of the start site, although a number of promoters have recently been shown to contain functional elements downstream of the start site as well. The spacing between promoter elements frequently is flexible, so that promoter function is preserved when elements are inverted or moved relative to one another. In the thymidine kinase (tk) promoter, the spacing between promoter elements can be increased to 50 bp apart before activity begins to decline.

One example of a suitable promoter is the immediate early cytomegalovirus (CMV) promoter sequence. This promoter sequence is a strong constitutive promoter sequence capable of driving high levels of expression of any polynucleotide sequence operatively linked thereto. Another example of a suitable promoter is Elongation Growth Factor-1α (EF-1α). However, other constitutive promoter sequences may also be used, including, but not limited to the simian virus 40 (SV40) early promoter, mouse mammary tumor virus (MMTV), human immunodeficiency virus (HIV) long terminal repeat (LTR) promoter, MoMuLV promoter, an avian leukemia virus promoter, an Epstein-Barr virus immediate early promoter, a Rous sarcoma virus promoter, as well as human gene promoters such as, but not limited to, the actin promoter, the myosin promoter, the hemoglobin promoter, and the creatine kinase promoter. Further, the application should not be limited to the use of constitutive promoters. Inducible promoters are also contemplated as part of the application. The use of an inducible promoter provides a molecular switch capable of turning on expression of the polynucleotide sequence which it is operatively linked when such expression is desired, or turning off the expression when expression is not desired. Examples of inducible promoters include, but are not limited to a metallothionine promoter, a glucocorticoid promoter, a progesterone promoter, and a tetracycline promoter.

In some embodiments, the expression of the anti-PcrV antibody is inducible. In some embodiments, a nucleic acid sequence encoding the anti-PcrV antibody is operably linked to an inducible promoter, including any inducible promoter described herein.

Inducible Promoters

The use of an inducible promoter provides a molecular switch capable of turning on expression of the polynucleotide sequence which it is operatively linked when such expression is desired, or turning off the expression when expression is not desired. Exemplary inducible promoter systems for use in eukaryotic cells include, but are not limited to, hormone-regulated elements (e.g., see Mader, S. and White, J. H. (1993) Proc. Natl. Acad. Sci. USA 90:5603-5607), synthetic ligand-regulated elements (see, e.g., Spencer, D. M. et al 1993) Science 262: 1019-1024) and ionizing radiation-regulated elements (e.g., see Manome, Y. et al. (1993) Biochemistry 32: 10607-10613; Datta, R. et al. (1992) Proc. Natl. Acad. Sci. USA 89: 1014-10153). Further exemplary inducible promoter systems for use in in vitro or in vivo mammalian systems are reviewed in Gingrich et al. (1998) Annual Rev. Neurosci 21:377-405. In some embodiments, the inducible promoter system for use to express the anti-PcrV antibody is the Tet system. In some embodiments, the inducible promoter system for use to express the anti-PcrV antibody is the lac repressor system from *E. coli.*

An exemplary inducible promoter system for use in the present application is the Tet system. Such systems are based on the Tet system described by Gossen et al. (1993). In an exemplary embodiment, a polynucleotide of interest is under the control of a promoter that comprises one or more Tet operator (TetO) sites. In the inactive state, Tet repressor (TetR) will bind to the TetO sites and repress transcription from the promoter. In the active state, e.g., in the presence of an inducing agent such as tetracycline (Tc), anhydrotetracycline, doxycycline (Dox), or an active analog thereof, the inducing agent causes release of TetR from TetO, thereby allowing transcription to take place. Doxycycline is a member of the tetracycline family of antibiotics having the chemical name of 1-dimethylamino-2,4a,5,7,12-pentahydroxy-11-methyl-4,6-dioxo-1,4a,11,11a,12,12a-hexa hydrotetracene-3-carboxamide.

In one embodiment, a TetR is codon-optimized for expression in mammalian cells, e.g., murine or human cells. Most amino acids are encoded by more than one codon due to the degeneracy of the genetic code, allowing for substantial variations in the nucleotide sequence of a given nucleic acid without any alteration in the amino acid sequence encoded by the nucleic acid. However, many organisms display differences in codon usage, also known as "codon bias" (i.e., bias for use of a particular codon(s) for a given amino acid). Codon bias often correlates with the presence of a predominant species of tRNA for a particular codon, which in turn increases efficiency of mRNA translation. Accordingly, a coding sequence derived from a particular organism (e.g., a prokaryote) may be tailored for improved expression in a different organism (e.g., a eukaryote) through codon optimization.

Other specific variations of the Tet system include the following "Tet-Off" and "Tet-On" systems. In the Tet-Off system, transcription is inactive in the presence of Tc or Dox. In that system, a tetracycline-controlled transactivator protein (tTA), which is composed of TetR fused to the strong transactivating domain of VP16 from Herpes simplex virus, regulates expression of a target nucleic acid that is under transcriptional control of a tetracycline-responsive promoter element (TRE). The TRE is made up of TetO sequence concatamers fused to a promoter (commonly the minimal promoter sequence derived from the human cytomegalovirus (hCMV) immediate-early promoter). In the absence of Tc or Dox, tTA binds to the TRE and activates transcription of the target gene. In the presence of Tc or Dox, tTA cannot bind to the TRE, and expression from the target gene remains inactive.

Conversely, in the Tet-On system, transcription is active in the presence of Tc or Dox. The Tet-On system is based on a reverse tetracycline-controlled transactivator, rtTA. Like tTA, rtTA is a fusion protein comprised of the TetR repressor and the VP16 transactivation domain. However, a four amino acid change in the TetR DNA binding moiety alters rtTA's binding characteristics such that it can only recognize the tetO sequences in the TRE of the target transgene in the presence of Dox. Thus, in the Tet-On system, transcription of the TRE-regulated target gene is stimulated by rtTA only in the presence of Dox.

Another inducible promoter system is the lac repressor system from *E. coli* (See Brown et al., Cell 49:603-612 (1987)). The lac repressor system functions by regulating transcription of a polynucleotide of interest operably linked to a promoter comprising the lac operator (lacO). The lac repressor (lacR) binds to LacO, thus preventing transcription of the polynucleotide of interest. Expression of the polynucleotide of interest is induced by a suitable inducing agent, e.g., isopropyl-β-D-thiogalactopyranoside (IPTG).

In order to assess the expression of a polypeptide or portions thereof, the expression vector to be introduced into a cell can also contain either a selectable marker gene or a reporter gene or both to facilitate identification and selection of expressing cells from the population of cells sought to be transfected or infected through viral vectors. In other aspects, the selectable marker may be carried on a separate piece of DNA and used in a co-transfection procedure. Both selectable markers and reporter genes may be flanked with appropriate regulatory sequences to enable expression in the host cells. Useful selectable markers include, for example, antibiotic-resistance genes, such as neo and the like.

Reporter genes are used for identifying potentially transfected cells and for evaluating the functionality of regulatory sequences. In general, a reporter gene is a gene that is not present in or expressed by the recipient organism or tissue and that encodes a polypeptide whose expression is manifested by some easily detectable property, e.g., enzymatic activity. Expression of the reporter gene is assayed at a suitable time after the DNA has been introduced into the recipient cells. Suitable reporter genes may include genes encoding luciferase, β-galactosidase, chloramphenicol acetyl transferase, secreted alkaline phosphatase, or the green fluorescent protein gene (e.g., Ui-Tel et al., 2000 *FEBS Letters* 479: 79-82). Suitable expression systems are well known and may be prepared using known techniques or obtained commercially. In general, the construct with the minimal 5' flanking region showing the highest level of expression of reporter gene is identified as the promoter. Such promoter regions may be linked to a reporter gene and used to evaluate agents for the ability to modulate promoter-driven transcription.

In some embodiments, there is provided nucleic acid encoding a full-length anti-PcrV antibody according to any of the full-length anti-PcrV antibodies described herein. In some embodiments, the nucleic acid comprises one or more nucleic acid sequences encoding the heavy and light chains of the full-length anti-PcrV antibody. In some embodiments, each of the one or more nucleic acid sequences is contained in separate vectors. In some embodiments, at least some of the nucleic acid sequences are contained in the same vector. In some embodiments, all of the nucleic acid sequences are contained in the same vector. Vectors may be selected, for example, from the group consisting of mammalian expression vectors and viral vectors (such as those derived from retroviruses, adenoviruses, adeno-associated viruses, herpes viruses, and lentiviruses).

Methods of introducing and expressing genes into a cell are known in the art. In the context of an expression vector, the vector can be readily introduced into a host cell, e.g., mammalian, bacterial, yeast, or insect cell by any method in the art. For example, the expression vector can be transferred into a host cell by physical, chemical, or biological means.

Physical methods for introducing a polynucleotide into a host cell include calcium phosphate precipitation, lipofection, particle bombardment, microinjection, electroporation, and the like. Methods for producing cells comprising vectors and/or exogenous nucleic acids are well-known in the art. See, for example, Green and Sambrook (2013, Molecular Cloning: A Laboratory Manual, Cold Spring Harbor Laboratory, New York). In some embodiments, the introduction of a polynucleotide into a host cell is carried out by calcium phosphate transfection.

Biological methods for introducing a polynucleotide of interest into a host cell include the use of DNA and RNA vectors. Viral vectors, and especially retroviral vectors, have become the most widely used method of inserting genes into mammalian, e.g., human cells. Other viral vectors can be derived from lentivirus, poxviruses, herpes simplex virus 1, adenoviruses and adeno-associated viruses, and the like. See, for example, U.S. Pat. Nos. 5,350,674 and 5,585,362.

Chemical means for introducing a polynucleotide into a host cell include colloidal dispersion systems, such as macromolecule complexes, nanocapsules, microspheres, beads, and lipid-based systems including oil-in-water emulsions, micelles, mixed micelles, and liposomes. An exemplary colloidal system for use as a delivery vehicle in vitro and in vivo is a liposome (e.g., an artificial membrane vesicle).

In the case where a non-viral delivery system is utilized, an exemplary delivery vehicle is a liposome. The use of lipid formulations is contemplated for the introduction of the nucleic acids into a host cell (in vitro, ex vivo or in vivo). In another aspect, the nucleic acid may be associated with a lipid. The nucleic acid associated with a lipid may be encapsulated in the aqueous interior of a liposome, interspersed within the lipid bilayer of a liposome, attached to a liposome via a linking molecule that is associated with both the liposome and the oligonucleotide, entrapped in a liposome, complexed with a liposome, dispersed in a solution containing a lipid, mixed with a lipid, combined with a lipid, contained as a suspension in a lipid, contained or complexed with a micelle, or otherwise associated with a lipid. Lipid, lipid/DNA or lipid/expression vector associated compositions are not limited to any particular structure in solution. For example, they may be present in a bilayer structure, as micelles, or with a "collapsed" structure. They may also simply be interspersed in a solution, possibly forming aggregates that are not uniform in size or shape. Lipids are fatty substances which may be naturally occurring or synthetic lipids. For example, lipids include the fatty droplets that naturally occur in the cytoplasm as well as the class of compounds which contain long-chain aliphatic hydrocarbons and their derivatives, such as fatty acids, alcohols, amines, amino alcohols, and aldehydes.

Regardless of the method used to introduce exogenous nucleic acids into a host cell or otherwise expose a cell to the inhibitor of the present application, in order to confirm the presence of the recombinant DNA sequence in the host cell, a variety of assays may be performed. Such assays include, for example, "molecular biological" assays well known to those of skill in the art, such as Southern and Northern blotting, RT-PCR and PCR; "biochemical" assays, such as detecting the presence or absence of a particular peptide, e.g., by immunological means (ELISAs and Western blots) or by assays described herein to identify agents falling within the scope of the application.

Preparation of Anti-PcrV Antibodies

In some embodiments, the anti-PcrV antibody is a monoclonal antibody or derived from a monoclonal antibody. In some embodiments, the anti-PcrV antibody comprises $V_H$ and $V_L$ domains, or variants thereof, from the monoclonal antibody. In some embodiments, the anti-PcrV antibody further comprises $C_H1$ and $C_L$ domains, or variants thereof, from the monoclonal antibody. Monoclonal antibodies can be prepared, e.g., using known methods in the art, including hybridoma methods, yeast display, phage display methods, or using recombinant DNA methods. Additionally, exemplary yeast display and phage display methods are described herein and in the Examples below.

In a hybridoma method, a hamster, mouse, or other appropriate host animal is typically immunized with an immunizing agent to elicit lymphocytes that produce or are capable of producing antibodies that will specifically bind to the immunizing agent. Alternatively, the lymphocytes can be immunized in vitro. The immunizing agent can include a polypeptide or a fusion protein of the protein of interest. Generally, peripheral blood lymphocytes ("PBLs") are used if cells of human origin are desired, or spleen cells or lymph node cells are used if non-human mammalian sources are desired. The lymphocytes are then fused with an immortalized cell line using a suitable fusing agent, such as polyethylene glycol, to form a hybridoma cell. Immortalized cell lines are usually transformed mammalian cells, particularly myeloma cells of rodent, bovine, and human origin. Usually, rat or mouse myeloma cell lines are employed. The hybridoma cells can be cultured in a suitable culture medium that preferably contains one or more substances that inhibit the growth or survival of the unfused, immortalized cells. For example, if the parental cells lack the enzyme hypoxanthine guanine phosphoribosyl transferase (HGPRT or HPRT), the culture medium for the hybridomas typically will include hypoxanthine, aminopterin, and thymidine ("HAT medium"), which prevents the growth of HGPRT-deficient cells.

In some embodiments, the immortalized cell lines fuse efficiently, support stable high-level expression of antibody by the selected antibody-producing cells, and are sensitive to a medium such as HAT medium. In some embodiments, the immortalized cell lines are murine myeloma lines, which can be obtained, for instance, from the Salk Institute Cell Distribution Center, San Diego, California and the American Type Culture Collection, Manassas, Virginia. Human myeloma and mouse-human heteromyeloma cell lines also have been described for the production of human monoclonal antibodies.

The culture medium in which the hybridoma cells are cultured can then be assayed for the presence of monoclonal antibodies directed against the polypeptide. The binding specificity of monoclonal antibodies produced by the hybridoma cells can be determined by immunoprecipitation or by an in vitro binding assay, such as radioimmunoassay (RIA) or enzyme-linked immunoabsorbent assay (ELISA). Such techniques and assays are known in the art. The binding affinity of the monoclonal antibody can, for example, be determined by the Scatchard analysis of Munson and Pollard, *Anal. Biochem.*, 107:220 (1980).

After the desired hybridoma cells are identified, the clones can be sub cloned by limiting dilution procedures and grown by standard methods. Goding, supra. Suitable culture media for this purpose include, for example, Dulbecco's Modified Eagle's Medium and RPMI-1640 medium. Alternatively, the hybridoma cells can be grown in vivo as ascites in a mammal.

The monoclonal antibodies secreted by the sub clones can be isolated or purified from the culture medium or ascites fluid by conventional immunoglobulin purification procedures such as, for example, protein A-Sepharose, hydroxylapatite chromatography, gel electrophoresis, dialysis, or affinity chromatography.

In some embodiments, according to any of the anti-PcrV antibodies described herein, the anti-PcrV antibody comprises sequences from a clone selected from an antibody library (such as a phage library presenting scFv or Fab fragments). The clone may be identified by screening combinatorial libraries for antibody fragments with the desired activity or activities. For example, a variety of methods are known in the art for generating phage display libraries and screening such libraries for antibodies possessing the desired binding characteristics. Such methods are reviewed, e.g., in Hoogenboom et al., *Methods in Molecular Biology* 178:1-37 (O'Brien et al., ed., Human Press, Totowa, N.J., 2001) and further described, e.g., in McCafferty et al., *Nature* 348:552-554; Clackson et al., *Nature* 352: 624-628 (1991); Marks et al., *J. Mol. Biol.* 222: 581-597 (1992); Marks and Bradbury, *Methods in Molecular Biology* 248:161-175 (Lo, ed., Human Press, Totowa, N.J., 2003); Sidhu et al., *J. Mol. Biol.* 338(2): 299-310 (2004); Lee et al., *J. Mol. Biol.* 340(5): 1073-1093 (2004); Fellouse, *Proc. Natl. Acad. Sci. USA* 101(34): 12467-12472 (2004); and Lee et al., *J. Immunol. Methods* 284(1-2): 119-132(2004).

In certain phage display methods, repertoires of $V_H$ and $V_L$ genes are separately cloned by polymerase chain reaction (PCR) and recombined randomly in phage libraries, which can then be screened for antigen-binding phage as described in Winter et al., *Ann. Rev. Immunol.*, 12: 433-455 (1994). Phages typically display antibody fragments, either as scFv fragments or as Fab fragments. Libraries from immunized sources provide high-affinity antibodies to the immunogen without the requirement of constructing hybridomas. Alternatively, the naive repertoire can be cloned (e.g., from human) to provide a single source of antibodies to a wide range of non-self and also self-antigens without any immunization as described by Griffiths et al., *EMBO J*, 12: 725-734 (1993). Finally, naive libraries can also be made synthetically by cloning unrearranged V-gene segments from stem cells, and using PCR primers containing random sequence to encode the highly variable CDR3 regions and to accomplish rearrangement in vitro, as described by Hoogenboom and Winter, *J. Mol. Biol.*, 227: 381-388 (1992). Patent publications describing human antibody phage libraries include, for example: U.S. Pat. No. 5,750,373, and US Patent Publication Nos. 2005/0079574, 2005/0119455, 2005/0266000, 2007/0117126, 2007/0160598, 2007/0237764, 2007/0292936, and 2009/0002360.

The anti-PcrV antibodies can be prepared using phage display to screen libraries for anti-PcrV antibody moieties specific to the target PcrV. The library can be a human scFv phage display library having a diversity of at least one$\times 10^9$ (such as at least about any of $1\times 10^9$, $2.5\times 10^9$, $5\times 10^9$, $7.5\times 10^9$, $1\times 10^{10}$, $2.5\times 10^{10}$, $5\times 10^{10}$, $7.5\times 10^{10}$, or $1\times 10^{11}$) unique human antibody fragments. In some embodiments, the library is a naïve human library constructed from DNA extracted from human PMBCs and spleens from healthy donors, encompassing all human heavy and light chain subfamilies. In some embodiments, the library is a naïve human library constructed from DNA extracted from PBMCs isolated from patients with various diseases, such as patients with autoimmune diseases, cancer patients, and patients with infectious diseases. In some embodiments, the library is a semi-synthetic human library, wherein heavy chain CDR3 is completely randomized, with all amino acids (with the exception of cysteine) equally likely to be present at any given position (see, e.g., Hoet, R. M. et al., *Nat. Biotechnol.* 23(3):344-348, 2005). In some embodiments, the heavy chain CDR3 of the semi-synthetic human library has a length from about 5 to about 24 (such as about any of 5, 6, 7, 8, 9, 10, 11, 12, 13, 14, 15, 16, 17, 18, 19, 20, 21, 22, 23, or 24) amino acids. In some embodiments, the library is a fully-synthetic phage display library. In some embodiments, the library is a non-human phage display library.

Phage clones that bind to the target PcrV with high affinity can be selected by iterative binding of phage to the target PcrV, which is bound to a solid support (such as, for example, beads for solution panning or mammalian cells for cell panning), followed by removal of non-bound phage and by elution of specifically bound phage. The bound phage clones are then eluted and used to infect an appropriate host cell, such as *E. coli* XL1-Blue, for expression and purification. The panning can be performed for multiple (such as about any of 2, 3, 4, 5, 6 or more) rounds with solution panning, cell panning, or a combination of both, to enrich for phage clones binding specifically to the target PcrV. Enriched phage clones can be tested for specific binding to the target PcrV by any methods known in the art, including for example ELISA and FACS.

Monoclonal antibodies can also be made by recombinant DNA methods, such as those described in U.S. Pat. No. 4,816,567. DNA encoding the monoclonal antibodies of the application can be readily isolated and sequenced using conventional procedures (e.g., by using oligonucleotide probes that are capable of binding specifically to genes encoding the heavy and light chains of murine antibodies). Hybridoma cells as described above or PcrV-specific phage clones of the application can serve as a source of such DNA. Once isolated, the DNA can be placed into expression vectors, which are then transfected into host cells such as simian COS cells, Chinese hamster ovary (CHO) cells, or myeloma cells that do not otherwise produce immunoglobulin protein, to obtain the synthesis of monoclonal antibodies in the recombinant host cells. The DNA also can be modified, for example, by substituting the coding sequence for human heavy- and light-chain constant domains and/or framework regions in place of the homologous non-human sequences (U.S. Pat. No. 4,816,567; Morrison et al., supra) or by covalently joining to the immunoglobulin coding sequence all or part of the coding sequence for a non-immunoglobulin polypeptide. Such a non-immunoglobulin polypeptide can be substituted for the constant domains of an antibody of the application, or can be substituted for the variable domains of one antigen-combining site of an antibody of the application to create a chimeric bivalent antibody.

The antibodies can be monovalent antibodies. Methods for preparing monovalent antibodies are known in the art. For example, one method involves recombinant expression of immunoglobulin light chain and modified heavy chain. The heavy chain is truncated generally at any point in the Fc region so as to prevent heavy-chain crosslinking. Alternatively, the relevant cysteine residues are substituted with another amino acid residue or are deleted so as to prevent crosslinking.

In vitro methods are also suitable for preparing monovalent antibodies. Digestion of antibodies to produce fragments thereof, particularly Fab fragments, can be accomplished using any method known in the art.

Antibody variable domains with the desired binding specificities (antibody-antigen combining sites) can be fused to immunoglobulin constant-domain sequences. The fusion preferably is with an immunoglobulin heavy-chain constant domain, comprising at least part of the hinge, CH2, and CH3 regions. In some embodiments, the first heavy-chain constant region (CH1) containing the site necessary for light-chain binding is present in at least one of the fusions. DNAs encoding the immunoglobulin heavy-chain fusions and, if desired, the immunoglobulin light chain, are inserted into separate expression vectors, and are co-transfected into a suitable host organism.

Human and Humanized Antibodies

The anti-PcrV antibodies (e.g., full-length anti-PcrV antibodies) can be humanized antibodies or human antibodies. Humanized forms of non-human (e.g., murine) antibody moieties are chimeric immunoglobulins, immunoglobulin chains, or fragments thereof (such as Fv, Fab, Fab', F(ab')$_2$, scFv, or other antigen-binding subsequences of antibodies) that typically contain minimal sequence derived from non-human immunoglobulin. Humanized antibody moieties include human immunoglobulins, immunoglobulin chains, or fragments thereof (recipient antibody) in which residues from a CDR of the recipient are replaced by residues from a CDR of a non-human species (donor antibody) such as mouse, rat, or rabbit having the desired specificity, affinity, and capacity. In some instances, Fv framework residues of the human immunoglobulin are replaced by corresponding non-human residues. Humanized antibody moieties can also comprise residues that are found neither in the recipient antibody nor in the imported CDR or framework sequences. In general, the humanized antibody can comprise substantially all of at least one, and typically two, variable domains, in which all or substantially all of the CDR regions correspond to those of a non-human immunoglobulin, and all or substantially all of the FR regions are those of a human immunoglobulin consensus sequence.

Generally, a humanized antibody has one or more amino acid residues introduced into it from a source that is non-human. These non-human amino acid residues are often referred to as "import" residues, which are typically taken from an "import" variable domain. According to some embodiments, humanization can be essentially performed following the method of Winter and co-workers (Jones et al., Nature, 321: 522-525 (1986); Riechmann et al., Nature, 332: 323-327 (1988); Verhoeyen et al., Science, 239: 1534-1536 (1988)), by substituting rodent CDRs or CDR sequences for the corresponding sequences of a human antibody. Accordingly, such "humanized" antibody moieties are antibody moieties (U.S. Pat. No. 4,816,567), wherein substantially less than an intact human variable domain has been substituted by the corresponding sequence from a non-human species. In practice, humanized antibody moieties are typically human antibody moieties in which some CDR residues and possibly some FR residues are substituted by residues from analogous sites in rodent antibodies.

As an alternative to humanization, human antibody moieties can be generated. For example, it is now possible to produce transgenic animals (e.g., mice) that are capable, upon immunization, of producing a full repertoire of human antibodies in the absence of endogenous immunoglobulin production. For example, it has been described that the homozygous deletion of the antibody heavy-chain joining region (JH) gene in chimeric and germ-line mutant mice results in complete inhibition of endogenous antibody production. Transfer of the human germ-line immunoglobulin gene array into such germ-line mutant mice will result in the production of human antibodies upon antigen challenge. See, e.g., Jakobovits et al., PNAS USA, 90:2551 (1993); Jakobovits et al., Nature, 362:255-258 (1993); Bruggemann et al., Year in Immunol., 7:33 (1993); U.S. Pat. Nos. 5,545, 806, 5,569,825, 5,591,669; 5,545,807; and WO 97/17852. Alternatively, human antibodies can be made by introducing human immunoglobulin loci into transgenic animals, e.g., mice in which the endogenous immunoglobulin genes have been partially or completely inactivated. Upon challenge, human antibody production is observed that closely resembles that seen in humans in all respects, including gene rearrangement, assembly, and antibody repertoire. This approach is described, for example, in U.S. Pat. Nos. 5,545, 807; 5,545,806; 5,569,825; 5,625,126; 5,633,425; and 5,661,016, and Marks et al., Bio/Technology, 10: 779-783 (1992); Lonberg et al., Nature, 368: 856-859 (1994); Morrison, Nature, 368: 812-813 (1994); Fishwild et al., Nature Biotechnology, 14: 845-851 (1996); Neuberger, Nature Biotechnology, 14: 826 (1996); Lonberg and Huszar, Intern. Rev. Immunol., 13: 65-93 (1995).

Human antibodies may also be generated by in vitro activated B cells (see U.S. Pat. Nos. 5,567,610 and 5,229, 275) or by using various techniques known in the art, including phage display libraries. Hoogenboom and Winter, J. Mol. Biol., 227:381 (1991); Marks et al., J. Mol. Biol., 222:581 (1991). The techniques of Cole et al. and Boerner et al. are also available for the preparation of human monoclonal antibodies. Cole et al., Monoclonal Antibodies and Cancer Therapy, Alan R. Liss, p. 77 (1985) and Boerner et al., J. Immunol., 147(1): 86-95 (1991).

Anti-PcrV Antibody Variants

In some embodiments, amino acid sequence variants of the anti-PcrV antibodies (e.g., full-length anti-PcrV antibody) provided herein are contemplated. For example, it may be desirable to improve the binding affinity and/or other biological properties of the antibody. Amino acid sequence variants of an antibody may be prepared by introducing appropriate modifications into the nucleotide sequence encoding the antibody, or by peptide synthesis. Such modifications include, for example, deletions from, and/or insertions into and/or substitutions of residues within the amino acid sequences of the antibody. Any combination of deletion, insertion, and substitution can be made to arrive at the final construct, provided that the final construct possesses the desired characteristics, e.g., antigen-binding.

In some embodiments, anti-PcrV antibody variants having one or more amino acid substitutions are provided. Sites of interest for substitutional mutagenesis include the HVRs and FRs. Amino acid substitutions may be introduced into an antibody of interest and the products screened for a desired activity, e.g., improved bioactivity, retained/improved antigen binding, decreased immunogenicity, or improved opsonophagocytic killing (OPK) of pathogens, such as *P. aeruginosa*.

Conservative substitutions are shown in Table 4 below.

TABLE 4

CONSERVATIVE SUBSTITITIONS

| Original Residue | Exemplary Substitutions | Preferred Substitutions |
|---|---|---|
| Ala (A) | Val; Leu; Ile | Val |
| Arg (R) | Lys; Gln; Asn | Lys |
| Asn (N) | Gln; His; Asp, Lys; Arg | Gln |
| Asp (D) | Glu; Asn | Glu |
| Cys (C) | Ser; Ala | Ser |
| Gln (Q) | Asn; Glu | Asn |
| Glu (E) | Asp; Gln | Asp |
| Gly (G) | Ala | Ala |
| His (H) | Asn; Gln; Lys; Arg | Arg |
| Ile (I) | Leu; Val; Met; Ala; Phe; Norleucine | Leu |
| Leu (L) | Norleucine; Ile; Val; Met; Ala; Phe | Ile |
| Lys (K) | Arg; Gln; Asn | Arg |
| Met (M) | Leu; Phe; Ile | Leu |
| Phe (F) | Trp; Leu; Val; He; Ala; Tyr | Tyr |
| Pro (P) | Ala | Ala |
| Ser (S) | Thr | Thr |
| Thr (T) | Val; Ser | Ser |
| Trp (W) | Tyr; Phe | Tyr |
| Tyr (Y) | Trp; Phe; Thr; Ser | Phe |
| Val (V) | Ile; Leu; Met; Phe; Ala; Norleucine | Leu |

Amino acids may be grouped into different classes according to common side-chain properties:
 a. hydrophobic: Norleucine, Met, Ala, Val, Leu, Ile;
 b. neutral hydrophilic: Cys, Ser, Thr, Asn, Gln;
 c. acidic: Asp, Glu;
 d. basic: His, Lys, Arg;
 e. residues that influence chain orientation: Gly, Pro;
 f. aromatic: Trp, Tyr, Phe.

Non-conservative substitutions will entail exchanging a member of one of these classes for another class.

An exemplary substitutional variant is an affinity matured antibody, which may be conveniently generated, e.g., using phage display-based affinity maturation techniques. Briefly, one or more CDR residues are mutated and the variant antibody moieties displayed on phage and screened for a particular biological activity (e.g., bioactivity based on RBC lysis inhibition assay or binding affinity). Alterations (e.g., substitutions) may be made in HVRs, e.g., to improve bioactivity based on RBC lysis inhibition assay or antibody affinity. Such alterations may be made in HVR "hotspots," i.e., residues encoded by codons that undergo mutation at high frequency during the somatic maturation process (see, e.g., Chowdhury, *Methods Mol. Biol.* 207:179-196 (2008)), and/or specificity determining residues (SDRs), with the resulting variant $V_H$ or $V_L$ being tested for binding affinity. Affinity maturation by constructing and reselecting from secondary libraries has been described, e.g., in Hoogenboom et al. in *Methods in Molecular Biology* 178:1-37 (O'Brien et al., ed., Human Press, Totowa, N.J., (2001).)

In some embodiments of affinity maturation, diversity is introduced into the variable genes chosen for maturation by any of a variety of methods (e.g., error-prone PCR, chain shuffling, or oligonucleotide-directed mutagenesis). A secondary library is then created. The library is then screened to identify any antibody variants with the desired affinity. Another method to introduce diversity involves HVR-directed approaches, in which several HVR residues (e.g., 4-6 residues at a time) are randomized. HVR residues involved in antigen binding may be specifically identified, e.g., using alanine scanning mutagenesis or modeling. CDR-H3 and CDR-L3 in particular are often targeted.

In some embodiments, substitutions, insertions, or deletions may occur within one or more HVRs so long as such alterations do not substantially reduce the ability of the antibody to bind antigen. For example, conservative alterations (e.g., conservative substitutions as provided herein) that do not substantially reduce binding affinity may be made in HVRs. Such alterations may be outside of HVR "hotspots" or SDRs. In some embodiments of the variant VH and VL sequences provided above, each HVR either is unaltered, or contains no more than one, two or three amino acid substitutions.

A useful method for identification of residues or regions of an antibody that may be targeted for mutagenesis is called "alanine scanning mutagenesis" as described by Cunningham and Wells (1989) *Science*, 244:1081-1085. In this method, a residue or group of target residues (e.g., charged residues such as arg, asp, his, lys, and glu) are identified and replaced by a neutral or negatively charged amino acid (e.g., alanine or polyalanine) to determine whether the interaction of the antibody with antigen is affected. Further substitutions may be introduced at the amino acid locations demonstrating functional sensitivity to the initial substitutions. Alternatively, or additionally, a crystal structure of an antigen-antibody complex can be determined to identify contact points between the antibody and antigen. Such contact residues and neighboring residues may be targeted or eliminated as candidates for substitution. Variants may be screened to determine whether they contain the desired properties.

Amino acid sequence insertions include amino- and/or carboxyl-terminal fusions ranging in length from one residue to polypeptides containing a hundred or more residues, as well as intrasequence insertions of single or multiple amino acid residues. Examples of terminal insertions include an antibody with an N-terminal methionyl residue. Other insertional variants of the antibody molecule include the fusion to the N- or C-terminus of the antibody to an enzyme (e.g. for ADEPT) or a polypeptide which increases the serum half-life of the antibody.

Fc Region Variants

In some embodiments, one or more amino acid modifications may be introduced into the Fc region of an antibody (e.g., a full-length anti-PcrV antibody or anti-PcrV Fc fusion protein) provided herein, thereby generating an Fc region variant. In some embodiments, the Fc region variant has enhanced ADCC effector function, often related to binding to Fc receptors (FcRs). In some embodiments, the Fc region variant has decreased ADCC effector function. There are many examples of changes or mutations to Fc sequences that can alter effector function. For example, WO 00/42072 and Shields et al. *J. Biol. Chem.* 9(2): 6591-6604 (2001) describe antibody variants with improved or diminished binding to FcRs. The contents of those publications are specifically incorporated herein by reference.

Antibody-Dependent Cell-Mediated Cytotoxicity (ADCC) is a mechanism of action of therapeutic antibodies against tumor cells. ADCC is a cell-mediated immune defense whereby an effector cell of the immune system actively lyses a target cell (e.g., an infected cell), whose membrane-surface antigens have been bound by specific antibodies (e.g., an anti-PcrV antibody). The typical ADCC involves activation of NK cells by antibodies. An NK cell expresses CD16 which is an Fc receptor. This receptor recognizes, and binds to, the Fc portion of an antibody bound to the surface of a target cell. The most common Fc receptor on the surface of an NK cell is called CD16 or FcγRIII. Binding of the Fc receptor to the Fc region of an antibody results in NK cell activation, release of cytolytic granules and consequent target cell apoptosis.

In some embodiments, the application contemplates an anti-PcrV antibody variant (such as a full-length anti-PcrV antibody variant) comprising an Fc region that possesses some but not all effector functions, which makes it a desirable candidate for applications in which the half-life of the anti-PcrV antibody in vivo is important yet certain effector functions (such as CDC and ADCC) are unnecessary or deleterious. In vitro and/or in vivo cytotoxicity assays can be conducted to confirm the reduction/depletion of CDC and/or ADCC activities. For example, Fc receptor (FcR) binding assays can be conducted to ensure that the antibody lacks FcγR binding (hence likely lacking ADCC activity), but retains FcRn binding ability. The primary cells for mediating ADCC, NK cells, express FcγRIII only, whereas monocytes express Fc-RI, FcγRII and FcγRIII. FcR expression on hematopoietic cells is summarized in Table 3 on page 464 of Ravetch and Kinet, *Annu. Rev. Immunol.* 9:457-492 (1991). Non-limiting examples of in vitro assays to assess ADCC activity of a molecule of interest is described in U.S. Pat. No. 5,500,362 (see, e.g. Hellstrom, I. et al. *Proc. Nat'l Acad. Sci. USA* 83:7059-7063 (1986)) and Hellstrom, I et al., *Proc. Nat'l Acad. Sci. USA* 82:1499-1502 (1985); U.S. Pat. No. 5,821,337 (see Bruggemann, M. et al., *J. Exp. Med.* 166:1351-1361 (1987)). Alternatively, non-radioactive assay methods may be employed (see, for example, ACTI™ non-radioactive cytotoxicity assay for flow cytometry (CellTechnology, Inc. Mountain View, Calif.; and CytoTox 96™ non-radioactive cytotoxicity assay (Promega, Madison, Wis.). Useful effector cells for such assays include peripheral blood mononuclear cells (PBMC) and Natural Killer (NK) cells. Alternatively, or additionally, ADCC activity of the molecule of interest may be assessed in vivo, e.g., in an animal model such as that disclosed in Clynes et al. *Proc. Nat'l Acad. Sci. USA* 95:652-656 (1998). C1q binding assays may also be carried out to confirm that the antibody is unable to bind C1q and hence lacks CDC activity. See, e.g., C1q and C3c binding ELISA in WO 2006/029879 and WO 2005/100402. To assess complement activation, a CDC assay may be performed (see, for example, Gazzano-Santoro et al., *J. Immunol. Methods* 202:163 (1996); Cragg, M. S. et al., *Blood* 101:1045-1052 (2003); and Cragg, M. S. and M. J. Glennie, *Blood* 103: 2738-2743 (2004)). FcRn binding and in vivo clearance/half-life determinations can also be performed using methods known in the art (see, e.g., Petkova, S. B. et al., *Int'l. Immunol.* 18(12):1759-1769 (2006)).

Antibodies with reduced effector function include those with substitution of one or more of Fc region residues 238, 265, 269, 270, 297, 327 and 329 (U.S. Pat. No. 6,737,056). Such Fc mutants include Fc mutants with substitutions at two or more of amino acid positions 265, 269, 270, 297 and 327, including the so-called "DANA" Fc mutant with substitution of residues 265 and 297 to alanine (U.S. Pat. No. 7,332,581).

Certain antibody variants with improved or diminished binding to FcRs are described. (See, e.g., U.S. Pat. No. 6,737,056; WO 2004/056312, and Shields et al., *J. Biol. Chem.* 9(2): 6591-6604 (2001).)

In some embodiments, alterations are made in the Fc region that result in altered (i.e., either improved or diminished) opsonization, e.g. such as described in Moore et al., *MAbs.* 2(2): 181-189 (2010).

In some embodiments, there is provided an anti-PcrV antibody (such as a full-length anti-PcrV antibody) variant comprising a variant Fc region comprising one or more amino acid substitutions which increase half-life and/or improve binding to the neonatal Fc receptor (FcRn). Antibodies with increased half-lives and improved binding to FcRn are described in US2005/0014934A1 (Hinton et al.). Those antibodies comprise an Fc region with one or more substitutions therein which improve binding of the Fc region to FcRn. Such Fc variants include those with substitutions at one or more of Fc region residues: 238, 256, 265, 272, 286, 303, 305, 307, 311, 312, 317, 340, 356, 360, 362, 376, 378, 380, 382, 413, 424 or 434, e.g., substitution of Fc region residue 434 (U.S. Pat. No. 7,371,826).

See also Duncan & Winter, *Nature* 322:738-40 (1988); U.S. Pat. Nos. 5,648,260; 5,624,821; and WO 94/29351 concerning other examples of Fc region variants.

Anti-PcrV antibodies (such as full-length anti-PcrV antibodies) comprising any of the Fc variants described herein, or combinations thereof, are contemplated.

Glycosylation Variants

In some embodiments, an anti-PcrV antibody (such as a full-length anti-PcrV antibody) provided herein is altered to increase or decrease the extent to which the anti-PcrV antibody is glycosylated. Addition or deletion of glycosylation sites to an anti-PcrV antibody may be conveniently accomplished by altering the amino acid sequence of the anti-PcrV antibody or polypeptide portion thereof such that one or more glycosylation sites is created or removed.

Where the anti-PcrV antibody comprises an Fc region, the carbohydrate attached thereto may be altered. Native antibodies produced by mammalian cells typically comprise a branched, biantennary oligosaccharide that is generally attached by an N-linkage to Asn297 of the CH2 domain of the Fc region. See, e.g., Wright et al., *TIBTECH* 15:26-32 (1997). The oligosaccharide may include various carbohydrates, e.g., mannose, N-acetyl glucosamine (GlcNAc), galactose, and sialic acid, as well as a fucose attached to a GlcNAc in the "stem" of the biantennary oligosaccharide structure. In some embodiments, modifications of the oligosaccharide in an anti-PcrV antibody of the application may be made in order to create anti-PcrV antibody variants with certain improved properties.

The N-glycans attached to the CH2 domain of Fc is heterogeneous. Antibodies or Fc fusion proteins generated in CHO cells are fucosylated by fucosyltransferase activity. See Shoji-Hosaka et al., J. Biochem. 2006, 140:777-83. Normally, a small percentage of naturally occurring afucosylated IgGs may be detected in human serum. N-glycosylation of the Fc is important for binding to FcγR; and afucosylation of the N-glycan increases Fc's binding capacity to FcγRIIa. Increased FcγRIIIa binding can enhance ADCC, which can be advantageous in certain antibody therapeutic applications in which cytotoxicity is desirable.

In some embodiments, an enhanced effector function can be detrimental when Fc-mediated cytotoxicity is undesirable. In some embodiments, the Fc fragment or CH2 domain is not glycosylated. In some embodiments, the N-glycosylation site in the CH2 domain is mutated to prevent from glycosylation.

In some embodiments, anti-PcrV antibody (such as a full-length anti-PcrV antibody) variants are provided comprising an Fc region wherein a carbohydrate structure attached to the Fc region has reduced fucose or lacks fucose, which may improve ADCC function. Specifically, anti-PcrV antibodies are contemplated herein that have reduced fucose relative to the amount of fucose on the same anti-PcrV antibody produced in a wild-type CHO cell. That is, they are characterized by having a lower amount of fucose than they would otherwise have if produced by native CHO cells (e.g., a CHO cell that produce a native glycosylation pattern, such as, a CHO cell containing a native FUT8 gene). In some embodiments, the anti-PcrV antibody is one wherein less than about 50%, 40%, 30%, 20%, 10%, or 5% of the N-linked glycans thereon comprise fucose. For example, the amount of fucose in such an anti-PcrV antibody may be from 1% to 80%, from 1% to 65%, from 5% to 65% or from 20% to 40%. In some embodiments, the anti-PcrV antibody is one wherein none of the N-linked glycans thereon comprise fucose, i.e., wherein the anti-PcrV antibody is completely without fucose, or has no fucose or is afucosylated. The amount of fucose is determined by calculating the average amount of fucose within the sugar chain at Asn297, relative to the sum of all glycostructures attached to Asn 297 (e. g. complex, hybrid and high mannose structures) as measured by MALDI-TOF mass spectrometry, as described in WO 2008/077546, for example. Asn297 refers to the asparagine residue located at about position 297 in the Fc region (EU numbering of Fc region residues); however, Asn297 may also be located about ±3 amino acids upstream or downstream of position 297, i.e., between positions 294 and 300, due to minor sequence variations in antibodies. Such fucosylation variants may have improved ADCC function. See, e.g., US Patent Publication Nos. US 2003/0157108 (Presta, L.); US 2004/0093621 (Kyowa Hakko Kogyo Co., Ltd). Examples of publications related to "defucosylated" or "fucose-deficient" antibody variants include: US 2003/0157108; WO 2000/61739; WO 2001/29246; US 2003/0115614; US 2002/0164328; US 2004/0093621; US 2004/0132140; US 2004/0110704; US 2004/0110282; US 2004/0109865; WO 2003/085119; WO 2003/084570; WO 2005/035586; WO 2005/035778; WO2005/053742; WO2002/031140; Okazaki et al. *J. Mol. Biol.* 336:1239-1249 (2004); Yamane-Ohnuki et al. *Biotech. Bioeng.* 87: 614 (2004). Examples of cell lines capable of producing defucosylated antibodies include Lec13 CHO cells deficient in protein fucosylation (Ripka et al. *Arch. Biochem. Biophys.* 249:533-545 (1986); US Pat Appl No US 2003/0157108 A1, Presta, L; and WO 2004/056312 A1, Adams et al., especially at Example 11), and knockout cell lines, such as α-1,6-fucosyltransferase gene, FUT8, knockout CHO cells (see, e.g., Yamane-Ohnuki et al. *Biotech. Bioeng.* 87: 614 (2004); Kanda, Y. et al., *Biotechnol. Bioeng.,* 94(4):680-688 (2006); and WO2003/085107).

Anti-PcrV antibody (such as a full-length anti-PcrV antibody) variants are further provided with bisected oligosaccharides, e.g., in which a biantennary oligosaccharide attached to the Fc region of the anti-PcrV antibody is bisected by GlcNAc. Such anti-PcrV antibody (such as a full-length anti-PcrV antibody) variants may have reduced fucosylation and/or improved ADCC function. Examples of such antibody variants are described, e.g., in WO 2003/011878 (Jean-Mairet et al.); U.S. Pat. No. 6,602,684 (Umana et al.); US 2005/0123546 (Umana et al.), and Ferrara et al., *Biotechnology and Bioengineering,* 93(5): 851-861 (2006). Anti-PcrV antibody (such as full-length anti-PcrV antibody) variants with at least one galactose residue in the oligosaccharide attached to the Fc region are also provided. Such anti-PcrV antibody variants may have improved CDC function. Such antibody variants are described, e.g., in WO 1997/30087 (Patel et al.); WO 1998/58964 (Raju, S.); and WO 1999/22764 (Raju, S.).

In some embodiments, the anti-PcrV antibody (such as a full-length anti-PcrV antibody) variants comprising an Fc region are capable of binding to an FcγRIII. In some embodiments, the anti-PcrV antibody (such as a full-length anti-PcrV antibody) variants comprising an Fc region have ADCC activity in the presence of human effector cells (e.g., T cell) or have increased ADCC activity in the presence of human effector cells compared to the otherwise same anti-PcrV antibody (such as a full-length anti-PcrV antibody) comprising a human wild-type Fc region.

Cysteine Engineered Variants

In some embodiments, it may be desirable to create cysteine engineered anti-PcrV antibodies (such as a full-length anti-PcrV antibody) in which one or more amino acid residues are substituted with cysteine residues. In some embodiments, the substituted residues occur at accessible sites of the anti-PcrV antibody. By substituting those residues with cysteine, reactive thiol groups are thereby positioned at accessible sites of the anti-PcrV antibody and may be used to conjugate the anti-PcrV antibody to other moieties, such as drug moieties or linker-drug moieties, to create an anti-PcrV immunoconjugate, as described further herein. Cysteine engineered anti-PcrV antibodies (e.g., full-length anti-PcrV antibodies) may be generated as described, e.g., in U.S. Pat. No. 7,521,541.

Derivatives

In some embodiments, an anti-PcrV antibody (such as a full-length anti-PcrV antibody) provided herein may be further modified to contain additional non-proteinaceous moieties that are known in the art and readily available. The moieties suitable for derivatization of the anti-PcrV antibody include but are not limited to water soluble polymers. Non-limiting examples of water soluble polymers include, but are not limited to, polyethylene glycol (PEG), copolymers of ethylene glycol/propylene glycol, carboxymethylcellulose, dextran, polyvinyl alcohol, polyvinyl pyrrolidone, poly-1,3-dioxolane, poly-1,3,6-trioxane, ethylene/maleic anhydride copolymer, polyaminoacids (either homopolymers or random copolymers), and dextran or poly(n-vinyl pyrrolidone)polyethylene glycol, propropylene glycol homopolymers, prolypropylene oxide/ethylene oxide copolymers, polyoxyethylated polyols (e.g., glycerol), polyvinyl alcohol, and mixtures thereof. Polyethylene glycol propionaldehyde may have advantages in manufacturing due to its stability in water. The polymer may be of any molecular weight, and may be branched or unbranched. The number of polymers attached to the anti-PcrV antibody may vary, and if more than one polymer are attached, they can be the same or different molecules. In general, the number and/or type of polymers used for derivatization can be determined based on considerations including, but not limited to, the particular properties or functions of anti-PcrV antibody to be improved, whether the anti-PcrV antibody derivative will be used in a therapy under defined conditions, etc.

In some embodiments, conjugates of an anti-PcrV antibody (such as a full-length anti-PcrV antibody) and nonproteinaceous moiety that may be selectively heated by exposure to radiation are provided. In some embodiments, the nonproteinaceous moiety is a carbon nanotube (Kam et al., *Proc. Natl. Acad. Sci. USA* 102: 11600-11605 (2005)). The radiation may be of any wavelength, and includes, but is not limited to, wavelengths that do not harm ordinary cells, but which heat the nonproteinaceous moiety to a temperature at which cells proximal to the anti-PcrV antibody-nonproteinaceous moiety are killed.

Pharmaceutical Compositions

Also provided herein are compositions (such as pharmaceutical compositions, also referred to herein as formulations) comprising any of the anti-PcrV antibodies (such as a full-length anti-PcrV antibody), nucleic acids encoding the antibodies, vectors comprising the nucleic acids encoding the antibodies, or host cells comprising the nucleic acids or vectors described herein. In some embodiments, there is provided a pharmaceutical composition comprising any one of the anti-PcrV antibodies described herein and a pharmaceutically acceptable carrier.

Suitable formulations of the anti-PcrV antibodies are obtained by mixing an anti-PcrV antibody having the desired degree of purity with optional pharmaceutically acceptable carriers, excipients or stabilizers (*Remington's Pharmaceutical Sciences* 16th edition, Osol, A. Ed. (1980)), in the form of lyophilized formulations or aqueous solutions. Acceptable carriers, excipients, or stabilizers are nontoxic to recipients at the dosages and concentrations employed, and include buffers such as phosphate, citrate, and other organic acids; antioxidants including ascorbic acid and methionine; preservatives (such as octadecyldimethylbenzyl ammonium chloride; hexamethonium chloride; benzalkonium chloride, benzethonium chloride; phenol, butyl or benzyl alcohol; alkyl parabens such as methyl or propylparaben; catechol; resorcinol; cyclohexanol; 3-pentanol; and m-cresol); low molecular weight (less than about 10 residues) polypeptides; proteins, such as serum albumin, gelatin, or immunoglobulins; hydrophilic polymers such as olyvinylpyrrolidone; amino acids such as glycine, glutamine, asparagine, histidine, arginine, or lysine; monosaccharides, disaccharides, and other carbohydrates including glucose, mannose, or dextrins; chelating agents such as EDTA; sugars such as sucrose, mannitol, trehalose or sorbitol; salt-forming counter-ions such as sodium; metal complexes (e.g. Zn-protein complexes); and/or non-ionic surfactants such as TWEEN™, PLURONICS™ or polyethylene glycol (PEG). Exemplary formulations are described in WO98/56418, expressly incorporated herein by reference. Lyophilized formulations adapted for subcutaneous administration are described in WO97/04801. Such lyophilized formulations may be reconstituted with a suitable diluent to a high protein concentration and the reconstituted formulation may be administered subcutaneously to the individual to be treated herein. Lipofectins or liposomes can be used to deliver the anti-PcrV antibodies of this application into cells.

The formulation herein may also contain one or more active compounds in addition to the anti-PcrV antibody (such as a full-length anti-PcrV antibody) as necessary for the particular indication being treated, preferably those with complementary activities that do not adversely affect each other. For example, it may be desirable to further provide an anti-neoplastic agent, a growth inhibitory agent, a cytotoxic agent, or a chemotherapeutic agent in addition to the anti-PcrV antibody. Such molecules are suitably present in combination in amounts that are effective for the purpose intended. The effective amount of such other agents depends on the amount of anti-PcrV antibody present in the formulation, the type of disease or disorder or treatment, and other factors discussed above. These are generally used in the same dosages and with administration routes as described herein or about from 1 to 99% of the heretofore employed dosages.

The anti-PcrV antibodies (e.g., full-length anti-PcrV antibodies) may also be entrapped in microcapsules prepared, for example, by coacervation techniques or by interfacial polymerization, for example, hydroxymethylcellulose or gelatin-microcapsules and poly-(methylmethacylate) microcapsules, respectively, in colloidal drug delivery systems (for example, liposomes, albumin microspheres, microemulsions, nano-particles and nanocapsules) or in macroemulsions. Sustained-release preparations may be prepared.

Sustained-release preparations of the anti-PcrV antibodies (e.g., full-length anti-PcrV antibodies) can be prepared. Suitable examples of sustained-release preparations include semipermeable matrices of solid hydrophobic polymers containing the antibody (or fragment thereof), which matrices are in the form of shaped articles, e.g., films, or microcapsules. Examples of sustained-release matrices include polyesters, hydrogels (for example, poly(2-hydroxyethyl-methacrylate), or poly(vinylalcohol)), polylactides (U.S. Pat. No. 3,773,919), copolymers of L-glutamic acid and ethyl-L-glutamate, non-degradable ethylene-vinyl acetate, degradable lactic acid-glycolic acid copolymers such as the LUPRON DEPOT™ (injectable microspheres composed of lactic acid-glycolic acid copolymer and leuprolide acetate), and poly-D (−)-3-hydroxybutyric acid. While polymers such as ethylene-vinyl acetate and lactic acid-glycolic acid enable release of molecules for over 100 days, certain hydro gels release proteins for shorter time periods. When encapsulated antibody remain in the body for a long time, they can denature or aggregate as a result of exposure to moisture at 37° C., resulting in a loss of biological activity and possible changes in immunogenicity. Rational strategies can be devised for stabilization of anti-PcrV antibodies depending on the mechanism involved. For example, if the aggregation mechanism is discovered to be intermolecular S—S bond formation through thio-disulfide interchange, stabilization can be achieved by modifying sulfhydryl residues, lyophilizing from acidic solutions, controlling moisture content, using appropriate additives, and developing specific polymer matrix compositions.

In some embodiments, the anti-PcrV antibody (such as a full-length anti-PcrV antibody) is formulated in a buffer comprising a citrate, NaCl, acetate, succinate, glycine, polysorbate 80 (Tween 80), or any combination of the foregoing. In some embodiments, the anti-PcrV antibody is formulated in a buffer comprising about 100 mM to about 150 mM glycine. In some embodiments, the anti-PcrV antibody is formulated in a buffer comprising about 50 mM to about 100 mM NaCl. In some embodiments, the anti-PcrV antibody is formulated in a buffer comprising about 10 mM to about 50 mM acetate. In some embodiments, the anti-PcrV antibody is formulated in a buffer comprising about 10 mM to about 50 mM succinate. In some embodiments, the anti-PcrV antibody is formulated in a buffer comprising about 0.005% to about 0.02% polysorbate 80. In some embodiments, the anti-PcrV antibody is formulated in a buffer having a pH between about 5.1 and 5.6. In some embodiments, the anti-PcrV antibody is formulated in a buffer comprising 10 mM citrate, 100 mM NaCl, 100 mM glycine, and 0.01% polysorbate 80, wherein the formulation is at pH 5.5.

The formulations to be used for in vivo administration must be sterile. This is readily accomplished by, e.g., filtration through sterile filtration membranes.

Methods of Treatment or Prevention Using Anti-PcrV Antibodies

In certain aspects, there is provided a method of treating a *Pseudomonas* infection in an individual comprising administering to the individual an effective amount of a composition comprising any of the anti-PcrV antibodies described herein. In some embodiments, the method of treating a *Pseudomonas* infection further provides therapeutic or prophylactic effect on diseases and/or conditions associated with *Pseudomonas* infection. In some aspects, there is provided a method of preventing a *Pseudomonas* infection in an individual comprising administering to the individual an effective amount of a composition comprising any of the anti-PcrV antibodies described herein. In some embodiments, use of the anti-PcrV antibody according to any one of the anti-PcrV antibodies described above, or a pharmaceutical composition comprising an anti-PcrV antibody according to any one of the pharmaceutical compositions described above in the manufacture of a medicament for treating a disease or condition.

Diseases and/or conditions associated with *Pseudomonas* infection include, but are not limited to fever, chills, fatigues, muscle and joint pain, swelling of joints, headache, diarrhea, skin rashes, pus in wounds, bacteremia, acute pneumonia, intraperitoneal infection. Further exemplary diseases include, but are not limited to, respiratory tract infections, bacteremia, septic shock, suppurative arthritis, enteritis, skin and soft tissue infections (such as burn wound infections), urinary tract infections, intestinal infections, ulcerative keratitis, chronic suppurative otitis media, mastoiditis, sinusitis, and endocarditis. In some embodiments, the method of treating or preventing a *Pseudomonas* infection reduces rate of mortality resulting from the *Pseudomonas* infection.

In some embodiments, there is provided a method of treating or preventing a *Pseudomonas* infection in an individual comprising administering to the individual an effective amount of a composition comprising an anti-PcrV antibody. In some embodiments, the anti-PcrV antibody specifically binds to a linear epitope within *Pseudomonas* PcrV. In some embodiments, the anti-PcrV described herein specifically binds to a nonlinear epitope within *Pseudomonas* PcrV. In some embodiments, there is provided a method of treating or preventing a *Pseudomonas* infection in an individual comprising administering to the individual an effective amount of a composition comprising an anti-PcrV antibody, where the anti-PcrV antibody binds to an epitope comprising at least any one of 1, 2, 3, 4, 5, or 6 amino acid residues selected from the group of Gln160, Asp165, Asp170, Asp173, Thr175, and Ser202 of *Pseudomonas* PcrV, according to SEQ ID NO: 71.

In some embodiments, there is provided a method of treating or preventing a *Pseudomonas* infection in an individual comprising administering to the individual an effective amount of a composition comprising an anti-PcrV antibody, wherein the anti-PcrV antibody comprises a $V_H$ comprising an HC-CDR1 comprising the amino acid sequence of any one of SEQ ID NOs: 1-8, an HC-CDR2 comprising the amino acid sequence of any one of SEQ ID NOs: 9-14, and an HC-CDR3 comprising the amino acid sequence of any one of SEQ ID NOs: 15-31; and a $V_L$ comprising an LC-CDR1 comprising the amino acid sequence of any one of SEQ ID NOs: 32-33, an LC-CDR2 comprising the amino acid sequence of any one of SEQ ID NOs: 34, and an LC-CDR3 comprising the amino acid sequence of any one of SEQ ID NOs: 35-38. In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising an HC-CDR1 comprising the amino acid sequence of any one of SEQ ID NOs: 1-8, an HC-CDR2 comprising the amino acid sequence of any one of SEQ ID NOs: 9-14, and an HC-CDR3 comprising the amino acid sequence of any one of SEQ ID NOs: 15-31; and a $V_L$ comprising an LC-CDR1 comprising the amino acid sequence of any one of SEQ ID NOs: 32-33, an LC-CDR2 comprising the amino acid sequence of any one of SEQ ID NOs: 34, and an LC-CDR3 comprising the amino acid sequence of any one of SEQ ID NOs: 35-38. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising an HC-CDR1 comprising the amino acid sequence of any one of SEQ ID NOs: 1-8, an HC-CDR2 comprising the amino acid sequence of any one of SEQ ID NOs: 9-14, and an HC-CDR3 comprising the amino acid sequence of any one of SEQ ID NOs: 15-31; and a $V_L$ comprising an LC-CDR1 comprising the amino acid sequence of SEQ ID NOs: any one of 32-33, an LC-CDR2 comprising the amino acid sequence of any one of SEQ ID NOs: 34, and an LC-CDR3 comprising the amino acid sequence of any one of SEQ ID NOs: 35-38.

In some embodiments, there is provided a method of treating or preventing a *Pseudomonas* infection in an individual comprising administering to the individual an effective amount of a composition comprising an anti-PcrV antibody, wherein the anti-PcrV antibody comprises a $V_H$ comprising the amino acid sequence of any one of SEQ ID NOs: 48-64, and a $V_L$ comprising the amino acid sequence of any one of SEQ ID NOs: 65-70. In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising the amino acid sequence of any one of SEQ ID NOs: 48-64, and a $V_L$ comprising the amino acid sequence of any one of SEQ ID NOs: 65-70. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising the amino acid sequence of any one of SEQ ID NOs: 48-64, and a $V_L$ comprising the amino acid sequence of any one of SEQ ID NOs: 65-70.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising an HC-CDR1 comprising the amino acid sequence of SEQ ID NO: 1, an HC-CDR2 comprising the amino acid sequence of SEQ ID NO: 9, and an HC-CDR3 comprising the amino acid sequence of SEQ ID NO: 15; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising an HC-CDR1 comprising the amino acid sequence of SEQ ID NO: 1, an HC-CDR2 comprising the amino acid sequence of SEQ ID NO: 9, and an HC-CDR3 comprising the amino acid sequence of SEQ ID NO: 15; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising the amino acid sequence of SEQ ID NO: 48 and a $V_L$ comprising the amino acid sequence of SEQ ID NO: 65. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising the amino acid sequence of SEQ ID NO: 48 and a $V_L$ comprising the amino acid sequence of SEQ ID NO: 65.

In some embodiments, there is provided a method of treating or preventing a *Pseudomonas* infection in an individual comprising administering to the individual an effective amount of a composition comprising an anti-PcrV antibody comprising: a $V_H$ comprising an HC-CDR1 comprising the amino acid sequence of SEQ ID NO: 1, an HC-CDR2 comprising the amino acid sequence of SEQ ID NO: 9, and an HC-CDR3 comprising the amino acid sequence of SEQ ID NO: 15, or a variant thereof comprising up to 5 amino acid substitutions; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35, or a variant thereof comprising up to 5 amino acid substitutions. In some embodiments, the anti-PcrV antibody comprises a $V_H$ comprising the amino acid sequence of SEQ ID NO: 48, or a variant thereof having at least 90% sequence identity to the amino acid sequence of SEQ ID NO: 48; and a $V_L$ comprising the amino acid sequence of SEQ ID NO: 65, or a variant thereof having at least 90% sequence identity to the amino acid sequence of SEQ ID NO: 65.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising an HC-CDR1 comprising the amino acid sequence of SEQ ID NO: 2, an HC-CDR2 comprising the amino acid sequence of SEQ ID NO: 10, and an HC-CDR3 comprising the amino acid sequence of SEQ ID NO: 16; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising an HC-CDR1 comprising the amino acid sequence of SEQ ID NO: 2, an HC-CDR2 comprising the amino acid sequence of SEQ ID NO: 10, and an HC-CDR3 comprising the amino acid sequence of SEQ ID NO: 16; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising the amino acid sequence of SEQ ID NO: 49 and a $V_L$ comprising the amino acid sequence of SEQ ID NO: 65. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising the amino acid sequence of SEQ ID NO: 49 and a $V_L$ comprising the amino acid sequence of SEQ ID NO: 65.

In some embodiments, there is provided a method of treating or preventing a *Pseudomonas* infection in an individual comprising administering to the individual an effective amount of a composition comprising an anti-PcrV antibody comprising: a $V_H$ comprising an HC-CDR1 comprising the amino acid sequence of SEQ ID NO: 2, an HC-CDR2 comprising the amino acid sequence of SEQ ID NO: 10, and an HC-CDR3 comprising the amino acid sequence of SEQ ID NO: 16, or a variant thereof comprising up to 5 amino acid substitutions; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35, or a variant thereof comprising up to 5 amino acid substitutions. In some embodiments, the anti-PcrV antibody comprises a $V_H$ comprising the amino acid sequence of SEQ ID NO: 49, or a variant thereof having at least 90% sequence identity to the amino acid sequence of SEQ ID NO: 49; and a $V_L$ comprising the amino acid sequence of SEQ ID NO: 65, or a variant thereof having at least 90% sequence identity to the amino acid sequence of SEQ ID NO: 65.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising an HC-CDR1 comprising the amino acid sequence of SEQ ID NO: 1, an HC-CDR2 comprising the amino acid sequence of SEQ ID NO: 9, and an HC-CDR3 comprising the amino acid sequence of SEQ ID NO: 17; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 36. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising an HC-CDR1 comprising the amino acid sequence of SEQ ID NO: 1, an HC-CDR2 comprising the amino acid sequence of SEQ ID NO: 9, and an HC-CDR3 comprising the amino acid sequence of SEQ ID NO: 17; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 36.

In some embodiments, there is provided a method of treating or preventing a 2715 *Pseudomonas* infection in an individual comprising administering to the individual an effective amount of a composition comprising an anti-PcrV antibody, wherein the anti-PcrV antibody competes with an antibody comprising: a $V_H$ comprising the amino acid sequence of SEQ ID NO: 50 and a $V_L$ comprising the amino acid sequence of SEQ ID NO: 66. In some embodiments, there is provided a method of treating or preventing a 2720 *Pseudomonas* infection in an individual comprising administering to the individual an effective amount of a composition comprising an anti-PcrV antibody, wherein the anti-PcrV antibody binds to the same epitope as an antibody comprising: a $V_H$ comprising the amino acid sequence of SEQ ID NO: 50 and a $V_L$ comprising the amino acid sequence of SEQ ID NO: 66.

In some embodiments, there is provided a method of treating or preventing a *Pseudomonas* infection in an individual comprising administering to the individual an effective amount of a composition comprising an anti-PcrV antibody comprising: a $V_H$ comprising an HC-CDR1 comprising the amino acid sequence of SEQ ID NO: 1, an HC-CDR2 comprising the amino acid sequence of SEQ ID NO: 9, and an HC-CDR3 comprising the amino acid sequence of SEQ ID NO: 17, or a variant thereof comprising up to 5 amino acid substitutions; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 36, or a variant thereof comprising up to 5 amino acid substitutions. In some embodiments, the anti-PcrV antibody comprises a $V_H$ comprising the amino acid sequence of SEQ ID NO: 50, or a variant thereof having at least 90% sequence identity to the amino acid sequence of SEQ ID NO: 50, and a $V_L$ comprising the amino acid sequence of SEQ ID NO: 66, or a variant thereof having at least 90% sequence identity to the amino acid sequence of SEQ ID NO: 66.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising an HC-CDR1 comprising the amino acid sequence of SEQ ID NO: 3, an HC-CDR2 comprising the amino acid sequence of SEQ ID NO: 10, and an HC-CDR3 comprising the amino acid sequence of SEQ ID NO: 18; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising an HC-CDR1 comprising the amino acid sequence of SEQ ID NO: 3, an HC-CDR2 comprising the amino acid sequence of SEQ ID NO: 10, and an HC-CDR3 comprising the amino acid sequence of SEQ ID NO: 18; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising the amino acid sequence of SEQ ID NO: 51 and a $V_L$ comprising the amino acid sequence of SEQ ID NO: 67. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising the amino acid sequence of SEQ ID NO: 51 and a $V_L$ comprising the amino acid sequence of SEQ ID NO: 67.

In some embodiments, there is provided a method of treating or preventing a *Pseudomonas* infection in an individual comprising administering to the individual an effective amount of a composition comprising an anti-PcrV antibody comprising: a $V_H$ comprising an HC-CDR1 comprising the amino acid sequence of SEQ ID NO: 3, an HC-CDR2 comprising the amino acid sequence of SEQ ID NO: 10, and an HC-CDR3 comprising the amino acid sequence of SEQ ID NO: 18, or a variant thereof comprising up to 5 amino acid substitutions; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37, or a variant thereof comprising up to 5 amino acid substitutions. In some embodiments, the anti-PcrV antibody comprises a $V_H$ comprising the amino acid sequence of SEQ ID NO: 51, or a variant thereof having at least 90% sequence identity to the amino acid sequence of SEQ ID NO: 51; and a $V_L$ comprising the amino acid sequence of SEQ ID NO: 67, or a variant thereof having at least 90% sequence identity to the amino acid sequence of SEQ ID NO: 67. In some embodiments, the method prevents a 2785 *Pseudomonas* infection in an individual.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising an HC-CDR1 comprising the amino acid sequence of SEQ ID NO: 3, an HC-CDR2 comprising the amino acid sequence of SEQ ID NO: 10, and an HC-CDR3 comprising the amino acid sequence of SEQ ID NO: 19; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising an HC-CDR1 comprising the amino acid sequence of SEQ ID NO: 3, an HC-CDR2 comprising the amino acid sequence of SEQ ID NO: 10, and an HC-CDR3 comprising the amino acid sequence of SEQ ID NO: 19; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising the amino acid sequence of SEQ ID NO: 52 and a $V_L$ comprising the amino acid sequence of SEQ ID NO: 65. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising the amino acid sequence of SEQ ID NO: 52 and a $V_L$ comprising the amino acid sequence of SEQ ID NO: 65.

In some embodiments, there is provided a method of treating or preventing a *Pseudomonas* infection in an individual comprising administering to the individual an effective amount of a composition comprising an anti-PcrV antibody comprising: a $V_H$ comprising an HC-CDR1 comprising the amino acid sequence of SEQ ID NO: 3, an HC-CDR2 comprising the amino acid sequence of SEQ ID NO: 10, and an HC-CDR3 comprising the amino acid sequence of SEQ ID NO: 19, or a variant thereof comprising up to 5 amino acid substitutions; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35, or a variant thereof comprising up to 5 amino acid substitutions. In some embodiments, the anti-PcrV antibody comprises a $V_H$ comprising the amino acid sequence of SEQ ID NO: 52, or a variant thereof having at least 90% sequence identity to the amino acid sequence of SEQ ID NO: 52; and a $V_L$ comprising the amino acid sequence of SEQ ID NO: 65, or a variant thereof having at least 90% sequence identity to the amino acid sequence of SEQ ID NO: 65.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising an HC-CDR1 comprising the amino acid sequence of SEQ ID NO: 3, an HC-CDR2 comprising the amino acid sequence of SEQ ID NO: 11, and an HC-CDR3 comprising the amino acid sequence of SEQ ID NO: 20; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising an HC-CDR1 comprising the amino acid sequence of SEQ ID NO: 3, an HC-CDR2 comprising the amino acid sequence of SEQ ID NO: 11, and an HC-CDR3 comprising the amino acid sequence of SEQ ID NO: 20; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising the amino acid sequence of SEQ ID NO: 53 and a $V_L$ comprising the amino acid sequence of SEQ ID NO: 65. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising the amino acid sequence of SEQ ID NO: 53 and a $V_L$ comprising the amino acid sequence of SEQ ID NO: 65.

In some embodiments, there is provided a method of treating or preventing a *Pseudomonas* infection in an individual comprising administering to the individual an effective amount of a composition comprising an anti-PcrV antibody comprising: a $V_H$ comprising an HC-CDR1 comprising the amino acid sequence of SEQ ID NO: 3, an HC-CDR2 comprising the amino acid sequence of SEQ ID NO: 11, and an HC-CDR3 comprising the amino acid sequence of SEQ ID NO: 20, or a variant thereof comprising up to 5 amino acid substitutions; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35, or a variant thereof comprising up to 5 amino acid substitutions. In some embodiments, the anti-PcrV antibody comprises a $V_H$ comprising the amino acid sequence of SEQ ID NO: 53, or a variant thereof having at least 90% sequence identity to the amino acid sequence of SEQ ID NO: 53; and a $V_L$ comprising the amino acid sequence of SEQ ID NO: 65, or a variant thereof having at least 90% sequence identity to the amino acid sequence of SEQ ID NO: 65.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising an HC-CDR1 comprising the amino acid sequence of SEQ ID NO: 4, an HC-CDR2 comprising the amino acid sequence of SEQ ID NO: 10, and an HC-CDR3 comprising the amino acid sequence of SEQ ID NO: 21; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising an HC-CDR1 comprising the amino acid sequence of SEQ ID NO: 4, an HC-CDR2 comprising the amino acid sequence of SEQ ID NO: 10, and an HC-CDR3 comprising the amino acid sequence of SEQ ID NO: 21; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising the amino acid sequence of SEQ ID NO: 54 and a $V_L$ comprising the amino acid sequence of SEQ ID NO: 65. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising the amino acid sequence of SEQ ID NO: 54 and a $V_L$ comprising the amino acid sequence of SEQ ID NO: 65.

In some embodiments, there is provided a method of treating or preventing a *Pseudomonas* infection in an individual comprising administering to the individual an effective amount of a composition comprising an anti-PcrV antibody comprising: a $V_H$ comprising an HC-CDR1 comprising the amino acid sequence of SEQ ID NO: 4, an HC-CDR2 comprising the amino acid sequence of SEQ ID NO: 10, and an HC-CDR3 comprising the amino acid sequence of SEQ ID NO: 21, or a variant thereof comprising up to 5 amino acid substitutions; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35, or a variant thereof comprising up to 5 amino acid substitutions. In some embodiments, the anti-PcrV antibody comprises a $V_H$ comprising the amino acid sequence of SEQ ID NO: 54, or a variant thereof having at least 90% sequence identity to the amino acid sequence of SEQ ID NO: 54; and a $V_L$ comprising the amino acid sequence of SEQ ID NO: 65, or a variant thereof having at least 90% sequence identity to the amino acid sequence of SEQ ID NO: 65.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising an HC-CDR1 comprising the amino acid sequence of SEQ ID NO: 5, an HC-CDR2 comprising the amino acid sequence of SEQ ID NO: 10, and an HC-CDR3 comprising the amino acid sequence of SEQ ID NO: 22; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising an HC-CDR1 comprising the amino acid sequence of SEQ ID NO: 5, an HC-CDR2 comprising the amino acid sequence of SEQ ID NO: 10, and an HC-CDR3 comprising the amino acid sequence of SEQ ID NO: 22; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising the amino acid sequence of SEQ ID NO: 55 and a $V_L$ comprising the amino acid sequence of SEQ ID NO: 67. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising the amino acid sequence of SEQ ID NO: 55 and a $V_L$ comprising the amino acid sequence of SEQ ID NO: 67.

In some embodiments, there is provided a method of treating or preventing a *Pseudomonas* infection in an individual comprising administering to the individual an effective amount of a composition comprising an anti-PcrV antibody comprising: a $V_H$ comprising an HC-CDR1 comprising the amino acid sequence of SEQ ID NO: 5, an HC-CDR2 comprising the amino acid sequence of SEQ ID NO: 10, and an HC-CDR3 comprising the amino acid sequence of SEQ ID NO: 22, or a variant thereof comprising up to 5 amino acid substitutions; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37, or a variant thereof comprising up to 5 amino acid substitutions. In some embodiments, the anti-PcrV antibody comprises a $V_H$ comprising the amino acid sequence of SEQ ID NO: 55, or a variant thereof having at least 90% sequence identity to the amino acid sequence of SEQ ID NO: 55; and a $V_L$ comprising the amino acid sequence of SEQ ID NO: 67, or a variant thereof having at least 90% sequence identity to the amino acid sequence of SEQ ID NO: 67.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising an HC-CDR1 comprising the amino acid sequence of SEQ ID NO: 6, an HC-CDR2 comprising the amino acid sequence of SEQ ID NO: 10, and an HC-CDR3 comprising the amino acid sequence of SEQ ID NO: 23; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising an HC-CDR1 comprising the amino acid sequence of SEQ ID NO: 6, an HC-CDR2 comprising the amino acid sequence of SEQ ID NO: 10, and an HC-CDR3 comprising the amino acid sequence of SEQ ID NO: 23; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising the amino acid sequence of SEQ ID NO: 56 and a $V_L$ comprising the amino acid sequence of SEQ ID NO: 67. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising the amino acid sequence of SEQ ID NO: 56 and a $V_L$ comprising the amino acid sequence of SEQ ID NO: 67.

In some embodiments, there is provided a method of treating or preventing a *Pseudomonas* infection in an individual comprising administering to the individual an effective amount of a composition comprising an anti-PcrV antibody comprising: a $V_H$ comprising an HC-CDR1 comprising the amino acid sequence of SEQ ID NO: 6, an HC-CDR2 comprising the amino acid sequence of SEQ ID NO: 10, and an HC-CDR3 comprising the amino acid sequence of SEQ ID NO: 23, or a variant thereof comprising up to 5 amino acid substitutions; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37, or a variant thereof comprising up to 5 amino acid substitutions. In some embodiments, the anti-PcrV antibody comprises a $V_H$ comprising the amino acid sequence of SEQ ID NO: 56, or a variant thereof having at least 90% sequence identity to the amino acid sequence of SEQ ID NO: 56; and a $V_L$ comprising the amino acid sequence of SEQ ID NO: 67, or a variant thereof having at least 90% sequence identity to the amino acid sequence of SEQ ID NO: 67.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising an HC-CDR1 comprising the amino acid sequence of SEQ ID NO: 1, an HC-CDR2 comprising the amino acid sequence of SEQ ID NO: 12, and an HC-CDR3 comprising the amino acid sequence of SEQ ID NO: 24; and a $V_L$ comprising an LC-CDR1 comprising the amino acid sequence of SEQ ID NO: 33, an LC-CDR2 comprising the amino acid sequence of SEQ ID NO: 34, and an LC-CDR3 comprising the amino acid sequence of SEQ ID NO: 35. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising an HC-CDR1 comprising the amino acid sequence of SEQ ID NO: 1, an HC-CDR2 comprising the amino acid sequence of SEQ ID NO: 12, an HC-CDR3 comprising the amino acid sequence of SEQ ID NO: 24; and a $V_L$ comprising an LC-CDR1 comprising the amino acid sequence of SEQ ID NO: 33, an LC-CDR2 comprising the amino acid sequence of SEQ ID NO: 34, and an LC-CDR3 comprising the amino acid sequence of SEQ ID NO: 35.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising the amino acid sequence of SEQ ID NO: 57 and a $V_L$ comprising the amino acid sequence of SEQ ID NO: 68. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising the amino acid sequence of SEQ ID NO: 57 and a $V_L$ comprising the amino acid sequence of SEQ ID NO: 68.

In some embodiments, there is provided a method of treating or preventing a *Pseudomonas* infection in an individual comprising administering to the individual an effective amount of a composition comprising an anti-PcrV antibody comprising: a $V_H$ comprising an HC-CDR1 comprising the amino acid sequence of SEQ ID NO: 1, an HC-CDR2 comprising the amino acid sequence of SEQ ID NO: 12, and an HC-CDR3 comprising the amino acid sequence of SEQ ID NO: 24, or a variant thereof comprising up to 5 amino acid substitutions; and a $V_L$ comprising an LC-CDR1 comprising the amino acid sequence of SEQ ID NO: 33, an LC-CDR2 comprising the amino acid sequence of SEQ ID NO: 34, and an LC-CDR3 comprising the amino acid sequence of SEQ ID NO: 35, or a variant thereof comprising up to 5 amino acid substitutions. In some embodiments, the anti-PcrV antibody comprises a $V_H$ comprising the amino acid sequence of SEQ ID NO: 57, or a variant thereof having at least 90% sequence identity to the amino acid sequence of SEQ ID NO: 57; and a $V_L$ comprising the amino acid sequence of SEQ ID NO: 68, or a variant thereof having at least 90% sequence identity to the amino acid sequence of SEQ ID NO: 68.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising an HC-CDR1 comprising the amino acid sequence of SEQ ID NO: 2, an HC-CDR2 comprising the amino acid sequence of SEQ ID NO: 10, and an HC-CDR3 comprising the amino acid sequence of SEQ ID NO: 25; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising an HC-CDR1 comprising the amino acid sequence of SEQ ID NO: 2, an HC-CDR2 comprising the amino acid sequence of SEQ ID NO: 10, and an HC-CDR3 comprising the amino acid sequence of SEQ ID NO: 25; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising the amino acid sequence of SEQ ID NO: 58 and a $V_L$ comprising the amino acid sequence of SEQ ID NO: 69. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising the amino acid sequence of SEQ ID NO: 58 and a $V_L$ comprising the amino acid sequence of SEQ ID NO: 69.

In some embodiments, there is provided a method of treating or preventing a *Pseudomonas* infection in an individual comprising administering to the individual an effective amount of a composition comprising an anti-PcrV antibody comprising: a $V_H$ comprising an HC-CDR1 comprising the amino acid sequence of SEQ ID NO: 2, an HC-CDR2 comprising the amino acid sequence of SEQ ID NO: 10, and an HC-CDR3 comprising the amino acid sequence of SEQ ID NO: 25, or a variant thereof comprising up to 5 amino acid substitutions; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37, or a variant thereof comprising up to 5 amino acid substitutions. In some embodiments, the anti-PcrV antibody comprises a $V_H$ comprising the amino acid sequence of SEQ ID NO: 58, or a variant thereof having at least 90% sequence identity to the amino acid sequence of SEQ ID NO: 58; and a $V_L$ comprising the amino acid sequence of SEQ ID NO: 69, or a variant thereof having at least 90% sequence identity to the amino acid sequence of SEQ ID NO: 69.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising an HC-CDR1 comprising the amino acid sequence of SEQ ID NO: 1, an HC-CDR2 comprising the amino acid sequence of SEQ ID NO: 9, and an HC-CDR3 comprising the amino acid sequence of SEQ ID NO: 26; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising an HC-CDR1 comprising the amino acid sequence of SEQ ID NO: 1, an HC-CDR2 comprising the amino acid sequence of SEQ ID NO: 9, and an HC-CDR3 comprising the amino acid sequence of SEQ ID NO: 26; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising the amino acid sequence of SEQ ID NO: 59 and a $V_L$ comprising the amino acid sequence of SEQ ID NO: 65. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising the amino acid sequence of SEQ ID NO: 59 and a $V_L$ comprising the amino acid sequence of SEQ ID NO: 65.

In some embodiments, there is provided a method of treating or preventing a *Pseudomonas* infection in an individual comprising administering to the individual an effective amount of a composition comprising an anti-PcrV antibody comprising: a $V_H$ comprising an HC-CDR1 comprising the amino acid sequence of SEQ ID NO: 1, an HC-CDR2 comprising the amino acid sequence of SEQ ID NO: 9, and an HC-CDR3 comprising the amino acid sequence of SEQ ID NO: 26, or a variant thereof comprising up to 5 amino acid substitutions; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35, or a variant thereof comprising up to 5 amino acid substitutions. In some embodiments, the anti-PcrV antibody comprises a $V_H$ comprising the amino acid sequence of SEQ ID NO: 59, or a variant thereof having at least 90% sequence identity to the amino acid sequence of SEQ ID NO: 59; and a $V_L$ comprising the amino acid sequence of SEQ ID NO: 65, or a variant thereof having at least 90% sequence identity to the amino acid sequence of SEQ ID NO: 65.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising an HC-CDR1 comprising the amino acid sequence of SEQ ID NO: 3, an HC-CDR2 comprising the amino acid sequence of SEQ ID NO: 10, and an HC-CDR3 comprising the amino acid sequence of SEQ ID NO: 27; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising an HC-CDR1 comprising the amino acid sequence of SEQ ID NO: 3, an HC-CDR2 comprising the amino acid sequence of SEQ ID NO: 10, and an HC-CDR3 comprising the amino acid sequence of SEQ ID NO: 27; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising the amino acid sequence of SEQ ID NO: 60 and a $V_L$ comprising the amino acid sequence of SEQ ID NO: 65. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising the amino acid sequence of SEQ ID NO: 60 and a $V_L$ comprising the amino acid sequence of SEQ ID NO: 65.

In some embodiments, there is provided a method of treating or preventing a *Pseudomonas* infection in an individual comprising administering to the individual an effective amount of a composition comprising an anti-PcrV antibody comprising: a $V_H$ comprising an HC-CDR1 comprising the amino acid sequence of SEQ ID NO: 3, an HC-CDR2 comprising the amino acid sequence of SEQ ID NO: 10, and an HC-CDR3 comprising the amino acid sequence of SEQ ID NO: 27, or a variant thereof comprising up to 5 amino acid substitutions; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35, or a variant thereof comprising up to 5 amino acid substitutions. In some embodiments, the anti-PcrV antibody provided herein comprises a $V_H$ comprising the amino acid sequence of SEQ ID NO: 60, or a variant thereof having at least 90% sequence identity to the amino acid sequence of SEQ ID NO: 60; and a $V_L$ comprising the amino acid sequence of SEQ ID NO: 65, or a variant thereof having at least 90% sequence identity to the amino acid sequence of SEQ ID NO: 65.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising an HC-CDR1 comprising the amino acid sequence of SEQ ID NO: 1, an HC-CDR2 comprising the amino acid sequence of SEQ ID NO: 10, and an HC-CDR3 comprising the amino acid sequence of SEQ ID NO: 28; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising an HC-CDR1 comprising the amino acid sequence of SEQ ID NO: 1, an HC-CDR2 comprising the amino acid sequence of SEQ ID NO: 10, and an HC-CDR3 comprising the amino acid sequence of SEQ ID NO: 28; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising the amino acid sequence of SEQ ID NO: 61 and a $V_L$ comprising the amino acid sequence of SEQ ID NO: 65. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising the amino acid sequence of SEQ ID NO: 61 and a $V_L$ comprising the amino acid sequence of SEQ ID NO: 65.

In some embodiments, there is provided a method of treating or preventing a *Pseudomonas* infection in an individual comprising administering to the individual an effective amount of a composition comprising an anti-PcrV antibody comprising: a $V_H$ comprising an HC-CDR1 comprising the amino acid sequence of SEQ ID NO: 1, an HC-CDR2 comprising the amino acid sequence of SEQ ID NO: 10, and an HC-CDR3 comprising the amino acid sequence of SEQ ID NO: 28, or a variant thereof comprising up to 5 amino acid substitutions; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35, or a variant thereof comprising up to 5 amino acid substitutions. In some embodiments, the anti-PcrV antibody comprises a $V_H$ comprising the amino acid sequence of SEQ ID NO: 61, or a variant thereof having at least 90% sequence identity to the amino acid sequence of SEQ ID NO: 61; and a $V_L$ comprising the amino acid sequence of SEQ ID NO: 65, or a variant thereof having at least 90% sequence identity to the amino acid sequence of SEQ ID NO: 65.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising an HC-CDR1 comprising the amino acid sequence of SEQ ID NO: 7, an HC-CDR2 comprising the amino acid sequence of SEQ ID NO: 13, and an HC-CDR3 comprising the amino acid sequence of SEQ ID NO: 29; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising an HC-CDR1 comprising the amino acid sequence of SEQ ID NO: 7, an HC-CDR2 comprising the amino acid sequence of SEQ ID NO: 13, and an HC-CDR3 comprising the amino acid sequence of SEQ ID NO: 29; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising the amino acid sequence of SEQ ID NO: 62 and a $V_L$ comprising the amino acid sequence of SEQ ID NO: 67. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising the amino acid sequence of SEQ ID NO: 62 and a $V_L$ comprising the amino acid sequence of SEQ ID NO: 67.

In some embodiments, there is provided a method of treating or preventing a *Pseudomonas* infection in an individual comprising administering to the individual an effective amount of a composition comprising an anti-PcrV antibody comprising: a $V_H$ comprising an HC-CDR1 comprising the amino acid sequence of SEQ ID NO: 7, an HC-CDR2 comprising the amino acid sequence of SEQ ID NO: 13, and an HC-CDR3 comprising the amino acid sequence of SEQ ID NO: 29, or a variant thereof comprising up to 5 amino acid substitutions; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37, or a variant thereof comprising up to 5 amino acid substitutions. In some embodiments, the anti-PcrV antibody comprises a $V_H$ comprising the amino acid sequence of SEQ ID NO: 62, or a variant thereof having at least 90% sequence identity to the amino acid sequence of SEQ ID NO: 62; and a $V_L$ comprising the amino acid sequence of SEQ ID NO: 67, or a variant thereof having at least 90% sequence identity to the amino acid sequence of SEQ ID NO: 67.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising an HC-CDR1 comprising the amino acid sequence of SEQ ID NO: 1, an HC-CDR2 comprising the amino acid sequence of SEQ ID NO: 10, and an HC-CDR3 comprising the amino acid sequence of SEQ ID NO: 30; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising an HC-CDR1 comprising the amino acid sequence of SEQ ID NO: 1, an HC-CDR2 comprising the amino acid sequence of SEQ ID NO: 10, and an HC-CDR3 comprising the amino acid sequence of SEQ ID NO: 30; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising the amino acid sequence of SEQ ID NO: 63 and a $V_L$ comprising the amino acid sequence of SEQ ID NO: 65. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising the amino acid sequence of SEQ ID NO: 63 and a $V_L$ comprising the amino acid sequence of SEQ ID NO: 65.

In some embodiments, there is provided a method of treating or preventing a *Pseudomonas* infection in an individual comprising administering to the individual an effective amount of a composition comprising an anti-PcrV antibody comprising: a $V_H$ comprising an HC-CDR1 comprising the amino acid sequence of SEQ ID NO: 1, an HC-CDR2 comprising the amino acid sequence of SEQ ID NO: 10, and an HC-CDR3 comprising the amino acid sequence of SEQ ID NO: 30, or a variant thereof comprising up to 5 amino acid substitutions; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35, or a variant thereof comprising up to 5 amino acid substitutions. In some embodiments, the anti-PcrV antibody comprises a $V_H$ comprising the amino acid sequence of SEQ ID NO: 63, or a variant thereof having at least 90% sequence identity to the amino acid sequence of SEQ ID NO: 63; and a $V_L$ comprising the amino acid sequence of SEQ ID NO: 65, or a variant thereof having at least 90% sequence identity to the amino acid sequence of SEQ ID NO: 65.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising an HC-CDR1 comprising the amino acid sequence of SEQ ID NO: 8, an HC-CDR2 comprising the amino acid sequence of SEQ ID NO: 14, and an HC-CDR3 comprising the amino acid sequence of SEQ ID NO: 31; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising an HC-CDR1 comprising the amino acid sequence of SEQ ID NO: 8, an HC-CDR2 comprising the amino acid sequence of SEQ ID NO: 14, and an HC-CDR3 comprising the amino acid sequence of SEQ ID NO: 31; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37.

In some embodiments, there is provided a method of treating or preventing a 3340 *Pseudomonas* infection in an individual comprising administering to the individual an effective amount of a composition comprising an anti-PcrV antibody, wherein the anti-PcrV antibody competes with an antibody comprising: a $V_H$ comprising the amino acid sequence of SEQ ID NO: 64 and a $V_L$ comprising the amino acid sequence of SEQ ID NO: 67. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising the amino acid sequence of SEQ ID NO: 64 and a $V_L$ comprising the amino acid sequence of SEQ ID NO: 67.

In some embodiments, there is provided a method of treating or preventing a *Pseudomonas* infection in an individual comprising administering to the individual an effective amount of a composition comprising an anti-PcrV antibody comprising: a $V_H$ comprising an HC-CDR1 comprising the amino acid sequence of SEQ ID NO: 8, an HC-CDR2 comprising the amino acid sequence of SEQ ID NO: 14, and an HC-CDR3 comprising the amino acid sequence of SEQ ID NO: 31, or a variant thereof comprising up to 5 amino acid substitutions; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37, or a variant thereof comprising up to 5 amino acid substitutions. In some embodiments, the anti-PcrV antibody comprises a $V_H$ comprising the amino acid sequence of SEQ ID NO: 64, or a variant thereof having at least 90% sequence identity to the amino acid sequence of SEQ ID NO: 64; and a $V_L$ comprising the amino acid sequence of SEQ ID NO: 67, or a variant thereof having at least 90% sequence identity to the amino acid sequence of SEQ ID NO: 67.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising an HC-CDR1 comprising the amino acid sequence of SEQ ID NO: 7, an HC-CDR2 comprising the amino acid sequence of SEQ ID NO: 13, and an HC-CDR3 comprising the amino acid sequence of SEQ ID NO: 29; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 38. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising an HC-CDR1 comprising the amino acid sequence of SEQ ID NO: 7, an HC-CDR2 comprising the amino acid sequence of SEQ ID NO: 13, and an HC-CDR3 comprising the amino acid sequence of SEQ ID NO: 29; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 38.

In some embodiments, there is provided a method of treating or preventing a *Pseudomonas* infection in an individual comprising administering to the individual an effective amount of a composition comprising an anti-PcrV antibody, wherein the anti-PcrV antibody competes with an antibody comprising: a $V_H$ comprising the amino acid sequence of SEQ ID NO: 62 and a $V_L$ comprising the amino acid sequence of SEQ ID NO: 70. In some embodiments, there is provided a method of treating or preventing a *Pseudomonas* infection in an individual comprising administering to the individual an effective amount of a composition comprising an anti-PcrV antibody, wherein the anti-PcrV antibody binds to the same epitope as an antibody comprising: a $V_H$ comprising the amino acid sequence of SEQ ID NO: 62 and a $V_L$ comprising the amino acid sequence of SEQ ID NO: 70.

In some embodiments, there is provided a method of treating or preventing a *Pseudomonas* infection in an individual comprising administering to the individual an effective amount of a composition comprising an anti-PcrV antibody comprising: a $V_H$ comprising an HC-CDR1 comprising the amino acid sequence of SEQ ID NO: 7, an HC-CDR2 comprising the amino acid sequence of SEQ ID NO: 13, and an HC-CDR3 comprising the amino acid sequence of SEQ ID NO: 29, or a variant thereof comprising up to 5 amino acid substitutions; and a $V_L$ comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 38, or a variant thereof comprising up to 5 amino acid substitutions. In some embodiments, the anti-PcrV antibody comprises a $V_H$ comprising the amino acid sequence of SEQ ID NO: 62, or a variant thereof having at least 90% sequence identity to the amino acid sequence of SEQ ID NO: 62; and a $V_L$ comprising the amino acid sequence of SEQ ID NO: 70, or a variant thereof having at least 90% sequence identity to the amino acid sequence of SEQ ID NO: 70

In some embodiments, there is provided a method of treating or preventing a *Pseudomonas* infection in an individual comprising administering to the individual an effective amount of a composition comprising an anti-PcrV antibody, wherein the anti-PcrV antibody described herein specifically binds to an epitope on *Pseudomonas* PcrV, where the epitope comprises any one of 1, 2, 3, 4, 5 or 6 amino acid residues selected from the group of Gln160, Asp165, Asp170, Asp173, Thr175, and Ser202 of *Pseudomonas* PcrV, according to SEQ ID No: 71. In some embodiments, the anti-PcrV antibody in the composition competes with an antibody that binds to any one of 1, 2, 3, 4, 5, or 6 amino residues selected from the group of Gln160, Asp165, Asp170, Asp173, Thr175, and Ser202 of *Pseudomonas* PcrV, according to SEQ ID No: 71.

In some embodiments according to any of the methods of treatment or prevention described herein, the anti-PcrV antibody comprises an antibody heavy chain constant region and an antibody light chain constant region. In some embodiments, the anti-PcrV antibody comprises an IgG1 heavy chain constant region. In some embodiments, the anti-PcrV antibody comprises an IgG2 heavy chain constant region. In some embodiments, the anti-PcrV antibody comprises an IgG3 heavy chain constant region. In some embodiments, the anti-PcrV antibody comprises an IgG4 heavy chain constant region. In some embodiments, the IgG is a human IgG. In some embodiments, the heavy chain constant region comprises or consists of the amino acid sequence of SEQ ID NO: 73. In some embodiments, the heavy chain constant region comprises or consists of the amino acid sequence of SEQ ID NO: 74. In some embodiments, the anti-PcrV comprises a lambda light chain constant region. In some embodiments, the anti-PcrV antibody comprises a kappa light chain constant region. In some embodiments, the light chain constant region comprises or consists of the amino acid sequence of SEQ ID NO: 72. In some embodiments, the anti-PcrV antibody comprises an antibody heavy chain variable domain and an antibody light chain variable domain.

In some embodiments according to any of the methods of treatment or prevention described herein, the method further provides therapeutic or prophylactic effect on diseases and/or conditions associated with *Pseudomonas* infection. In some embodiments, the method prevents a *Pseudomonas* infection in an individual.

In some embodiments, the individual is a mammal (e.g., human, non-human primate, rat, mouse, cow, horse, pig, sheep, goat, dog, cat, etc.). In some embodiments, the individual is a human. In some embodiments, the individual is a clinical patient, a clinical trial volunteer, an experimental animal, etc. In some embodiments, the individual is younger than about 60 years old (including for example younger than about any of 50, 40, 30, 25, 20, 15, or 10 years old). In some embodiments, the individual is older than about 60 years old (including for example older than about any of 70, 80, 90, or 100 years old).

In some embodiments, the individual has one or more risk factors associated with *P. aeruginosa* infection. For example, in some embodiments, the individual has exposed or breached skin mucuous layer. In some embodiments, the individual has one or more burn wounds. In some embodiments, the individual has one or more surgery wounds. In some embodiments, the individual has skin disease. In some embodiments, the individual is inserted with a foreign body, such as, but not limited to a mechanical ventilator or catheter. In some embodiments, the individual is diagnosed with or genetically prone to immunodeficiency diseases, including but not limited to HIV infection, AIDS and/or neutrophil deficiency. In some embodiments, the individual has received one or more forms of chemotherapy. In some embodiments, the individual has received one or more forms of glucocorticoid treatment. In some embodiments, the individual has received one or more forms of chemotherapy. In some embodiments, the individual is diagnosed with or genetically prone to cancer, diabetes and/or chronic structural lung diseases (such as cystic fibrosis or COPD). In some embodiments, the individual is diagnosed with or genetically prone to flora imbalance in digestive system and/or in other organs. In some embodiments, the individual has one or more risk factors associated with one or more diseases or disorders described herein.

The present application in some embodiments provides a method of delivering an anti-PcrV antibody (such as any one of the anti-PcrV antibodies described herein, e.g., an isolated anti-PcrV antibody) to a cell infected by a pathogen in an individual, the method comprising administering to the individual a composition comprising the anti-PcrV antibody.

In some embodiments according to any one of the methods described herein, the method further comprises administering one or more additional therapeutic agents. In some embodiments, at least one of the therapeutic agents is an antibiotic. In some embodiments, the antibiotic is a penicillin, a cephalosporin, a carbapenem, a fluoroquinolone, an aminoglycoside, a monobactam, a polymyxin, an antibiotic combination containing β-lactamase inhibitor, or any combinations thereof. In some embodiments, the antibiotic is Cefepim, Ceftazidime, Cefpirome, Imipenem, Meropenem, Ticarcillin, Piperacillin, Azlocillin, Carbenicillin, Mezlocillin, Aztreonam, Tobramycin, Gentamicin, Amikacin, Ciprofloxacin, Levofloxacin, Cefoperazon-Sulbactam, Piperacillin-Tazobactam, Fosfomycin, or any combinations thereof. In some embodiments, the antibiotic is one or more of Imipenem, Tobramycin, Ciprofloxacin, Meropenem or Aztreonam. In some embodiments, the antibiotic is one or more of Gentamycin, Ampicillin or Kanamycin.

Many diagnostic methods for infectious agents exhibiting PcrV expression and the clinical delineation of those diseases are known in the art. Such methods include, but are not limited to, e.g., immunohistochemistry, PCR, and fluorescent in situ hybridization (FISH).

In some embodiments, the anti-PcrV antibodies (e.g., full-length anti-PcrV antibodies) and/or compositions of the application are administered in combination with a second, third, or fourth agent (including, e.g., an antibiotic) to treat or prevent diseases or disorders involving PcrV-expressing pathogens.

Dosing and Method of Administering the Anti-PCRV Antibodies

The dose of the anti-PCRV antibody (such as isolated anti-PCRV antibody) compositions administered to an individual (such as a human) may vary with the particular composition, the mode of administration, and the type of disease being treated. In some embodiments, the amount of the composition (such as composition comprising isolated anti-PCRV antibody) is effective to result in an objective response (such as a partial response or a complete response) in the treatment or prevention of *Pseudomonas* infections. In some embodiments, the amount of the anti-PcrV antibody composition is sufficient to result in a complete response in the individual. In some embodiments, the amount of the anti-PcrV antibody composition is sufficient to result in a partial response in the individual. In some embodiments, the amount of the anti-PcrV antibody composition administered (for example when administered alone) is sufficient to produce an overall response rate of more than about any of 20%, 25%, 30%, 35%, 40%, 45%, 50%, 55%, 60%, 64%, 65%, 70%, 75%, 80%, 85%, or 90% among a population of individuals treated with the anti-PCRV antibody composition. Responses of an individual to the treatment or prevention by the methods described herein can be determined, for example, based on detection of *Pseudomonas* by methods such as by Gram stains or other phenotypic tests.

In some embodiments, the amount of the composition (such as composition comprising isolated anti-PcrV antibody) is sufficient to prolong progress-free survival of the individual. In some embodiments, the amount of the composition is sufficient to prolong overall survival of the individual. In some embodiments, the amount of the composition (for example when administered along) is sufficient to produce clinical benefit of more than about any of 50%, 60%, 70%, or 77% among a population of individuals treated with the anti-PcrV antibody composition.

In some embodiments, the amount of the composition (such as composition comprising isolated anti-PcrV antibody), alone or in combination with a second, third, and/or fourth agent, is an amount sufficient to decrease the number of *Pseudomonas* organ burden by at least about any of 10%, 20%, 30%, 40%, 50%, 60%, 70%, 80%, 90%, 95% or 100% compared to the corresponding organ burden in the same subject prior to treatment or compared to the corresponding activity in other subjects not receiving the treatment. Standard methods can be used to measure the magnitude of this effect, such as in vitro assays with purified enzyme, cell-based assays, animal models, or human testing.

In some embodiments, the amount of the anti-PcrV antibody (such as a full-length anti-PcrV antibody) in the composition is below the level that induces a toxicological effect (i.e., an effect above a clinically acceptable level of toxicity) or is at a level where a potential side effect can be controlled or tolerated when the composition is administered to the individual.

In some embodiments, the amount of the composition is close to a maximum tolerated dose (MTD) of the composition following the same dosing regimen. In some embodiments, the amount of the composition is more than about any of 80%, 90%, 95%, or 98% of the MTD.

In some embodiments, the amount of an anti-PcrV antibody (such as a full-length anti-PcrV antibody) in the composition is included in a range of about 0.001 µg to about 1000 µg.

In some embodiments, the composition or method further comprises one or more antibiotics. In some embodiments, the amount of an antibiotic (such as Imipenem, Tobramycin, Ciprofloxacin, Meropenem, Aztreonam, Ticarcillin, Piperacillin, Azlocillin, Carbenicillin, Mezlocillin, Gentamycin or Amikacin) in the composition is included in a range of about 0.001 µg to about 1000 µg.

In some embodiments of any of the above aspects, the effective amount of anti-PcrV antibody (such as a full-length anti-PcrV antibody) in the composition is in the range of about 0.1 µg/kg to about 100 mg/kg of total body weight.

In some embodiments of any of the above aspects, the effective amount of antibiotic (such as Imipenem, Tobramycin, Ciprofloxacin, Meropenem, Aztreonam, Ticarcillin, Piperacillin, Azlocillin, Carbenicillin, Mezlocillin, Gentamycin or Amikacin) in the composition is in the range of about 0.1 µg/kg to about 100 mg/kg of total body weight.

The anti-PcrV antibody compositions can be administered to an individual (such as human) via various routes, including, for example, intravenous, intra-arterial, intraperitoneal, intrapulmonary, oral, inhalation, intravesicular, intramuscular, intra-tracheal, subcutaneous, intraocular, intrathecal, transmucosal, and transdermal. In some embodiments, sustained continuous release formulation of the composition may be used. In some embodiments, the composition is administered intravenously. In some embodiments, the composition is administered intraportally. In some embodiments, the composition is administered intraarterially. In some embodiments, the composition is administered intraperitoneally. In some embodiments, the composition is administered intrahepatically. In some embodiments, the composition is administered by hepatic arterial infusion. In some embodiments, the administration is to an injection site distal to a first disease site.

Articles of Manufacture and Kits

In some embodiments of the application, there is provided an article of manufacture containing materials useful for treating or preventing a *Pseudomonas* infection in an individual, or for delivering an anti-PcrV antibody (such as a full-length anti-PcrV antibody) to a cell attached by a pathogen expressing PcrV. The article of manufacture can comprise a container and a label or package insert on or associated with the container. Suitable containers include, for example, bottles, vials, syringes, etc. The containers may be formed from a variety of materials such as glass or plastic. Generally, the container holds a composition which is effective for treating a disease or disorder described herein, and may have a sterile access port (for example the container may be an intravenous solution bag or a vial having a stopper pierceable by a hypodermic injection needle). At least one active agent in the composition is an anti-PcrV antibody of the application. The label or package insert indicates that the composition is used for treating the particular condition. The label or package insert will further comprise instructions for administering the anti-PcrV antibody composition to the patient. Articles of manufacture and kits comprising combinatorial therapies described herein are also contemplated.

Package insert refers to instructions customarily included in commercial packages of therapeutic products that contain information about the indications, usage, dosage, administration, contraindications and/or warnings concerning the use of such therapeutic products. In some embodiments, the package insert indicates that the composition is used for treating bacterial infections. In some embodiments, the package insert indicates that the composition is used for treating *Pseudomonas* infections.

Additionally, the article of manufacture may further comprise a second container comprising a pharmaceutically-acceptable buffer, such as bacteriostatic water for injection (BWFI), phosphate-buffered saline, Ringer's solution and dextrose solution. It may further include other materials desirable from a commercial and user standpoint, including other buffers, diluents, filters, needles, and syringes.

Kits are also provided that are useful for various purposes, e.g., useful for treating or preventing a *Pseudomonas* infection in an individual, or for delivering an anti-PcrV antibody (such as a full-length anti-PcrV antibody) to a cell attached by a pathogen expressing PcrV, optionally in combination with the articles of manufacture. Kits of the application include one or more containers comprising anti-PcrV antibody composition (or unit dosage form and/or article of manufacture), and in some embodiments, further comprise another agent (such as the agents described herein) and/or instructions for use in accordance with any of the methods described herein. The kit may further comprise a description of selection of individuals suitable for treatment. Instructions supplied in the kits of the application are typically written instructions on a label or package insert (e.g., a paper sheet included in the kit), but machine-readable instructions (e.g., instructions carried on a magnetic or optical storage disk) are also acceptable.

For example, in some embodiments, the kit comprises a composition comprising an anti-PcrV antibody (such as a full-length anti-PcrV antibody). In some embodiments, the kit comprises a) a composition comprising any one of the anti-PcrV antibodies described herein, and b) an effective amount of at least one other agent, wherein the other agent enhances the effect (e.g., treatment effect, detecting effect) of the anti-PcrV antibody. In some embodiments, the kit comprises a) a composition comprising any one of the anti-PcrV antibodies described herein, and b) instructions for administering the anti-PcrV antibody composition to an individual for treating a *Pseudomonas* infection in an individual. In some embodiments, the kit comprises a) a composition comprising any one of the anti-PcrV antibodies described herein, b) an effective amount of at least one other agent, wherein the other agent enhances the effect (e.g., treatment effect, detecting effect) of the anti-PcrV antibody, and c) instructions for administering the anti-PcrV antibody composition and the other agent(s) to an individual for useful for treating a *Pseudomonas* infection in an individual. The anti-PcrV antibody and the other agent(s) can be present in separate containers or in a single container. For example, the kit may comprise one distinct composition or two or more compositions wherein one composition comprises an anti-PcrV antibody and another composition comprises another agent.

In some embodiments, the kit comprises a nucleic acid (or set of nucleic acids) encoding an anti-PcrV antibody (such as a full-length anti-PcrV antibody). In some embodiments, the kit comprises a) a nucleic acid (or set of nucleic acids) encoding an anti-PcrV antibody, and b) a host cell for expressing the nucleic acid (or set of nucleic acids). In some embodiments, the kit comprises a) a nucleic acid (or set of nucleic acids) encoding an anti-PcrV antibody, and b) instructions for i) expressing the anti-PcrV antibody in a host cell, ii) preparing a composition comprising the anti-PcrV antibody, and iii) administering the composition comprising the anti-PcrV antibody to an individual for treating or preventing a *Pseudomonas* infection in an individual. In some embodiments, the kit comprises a) a nucleic acid (or set of nucleic acids) encoding an anti-PcrV antibody, b) a host cell for expressing the nucleic acid (or set of nucleic acids), and c) instructions for i) expressing the anti-PcrV antibody in the host cell, ii) preparing a composition comprising the anti-PcrV antibody, and iii) administering the composition comprising the anti-PcrV antibody to an individual for treating or preventing a *Pseudomonas* infection in an individual.

The kits of the application are in suitable packaging. Suitable packaging includes, but is not limited to, vials, bottles, jars, flexible packaging (e.g., sealed Mylar or plastic bags), and the like. Kits may optionally provide additional components such as buffers and interpretative information. The present application thus also provides articles of manufacture, which include vials (such as sealed vials), bottles, jars, flexible packaging, and the like.

The instructions relating to the use of the anti-PcrV antibody compositions generally include information as to dosage, dosing schedule, and route of administration for the intended treatment. The containers may be unit doses, bulk packages (e.g., multi-dose packages) or sub-unit doses. For example, kits may be provided that contain sufficient dosages of an anti-PcrV antibody (such as a full-length anti-PcrV antibody) as disclosed herein to provide effective treatment of an individual for an extended period, such as any of a week, 8 days, 9 days, 10 days, 11 days, 12 days, 13 days, 2 weeks, 3 weeks, 4 weeks, 6 weeks, 8 weeks, 3 months, 4 months, 5 months, 7 months, 8 months, 9 months, or more. Kits may also include multiple unit doses of the anti-PcrV antibody and pharmaceutical compositions and instructions for use and packaged in quantities sufficient for storage and use in pharmacies, for example, hospital pharmacies and compounding pharmacies.

Those skilled in the art will recognize that several embodiments are possible within the scope and spirit of this application. The application will now be described in greater detail by reference to the following non-limiting examples. The following examples further illustrate the application but, of course, should not be construed as in any way limiting its scope.

EXAMPLES

Example 1: Generation of Recombinant *Pseudomonas* PcrV and Selection of Anti-PcrV 3655 scFv Antibodies Generation of Recombinant *Pseudomonas* PcrV The full-length sequence of PcrV (PAO) was synthesized (Generay, Shanghai) and subcloned into the expression vector pET using restriction enzyme recognition sites NdeI and BamHI. His-tag or other conventionally used tags were used to tag PcrV. Expression vectors pET-6his-PcrV, pET-6his-Avi-PcrV were generated. In these constructs, "his" stands for His-tag, and "Avi" stands for Avidin tag. The expression and purification of recombinant PcrV including pET-6his-PcrV, pET-6His-Avi-PcrV were carried out according to manufacturer's protocol. Briefly, *E. Coli* cells were transformed with the expression vectors, and the cells were induced with IPTG and cultured at 25° C., and 220 rpm overnight. Subsequently, the *E. Coli* cells were sonicated, the cell debris were pelleted and removed, and the proteins were separated by centrifugation.

Proteins expressing his-tag were then purified using Ni Sepharose purification according to manufacturer's protocol. Specifically, the Qiagen Ni-NTA superflow cartridges were used for immobilized metal affinity chromatography (IMAC) analysis. The cartridges were first equilibrated with buffer A1 (50 mM $Na_3PO_4$, 0.15M NaCl, pH 7.2) with a flow rate of 150 cm/h. The pH of the supernatant of the culture media was adjusted to 7.2 and flown through the cartridges at room temperature at 150 cm/h. Next, buffer A1 (6 times the volume of that of the cartridges) was used to equilibrate the cartridges at cm/h. A 50 mM PB solution (0.15M NaCl and 0.2M Imidazole, pH 7.2) with a volume that is 10 times that of the cartridges was used to wash the cartridges and the elution was collected.

Generation of Biotinylated PcrV Antigen

Biotinylation of 6His-Avi-PcrV using the biotin ligase B0101A (GENECOPOEIA™) was carried out according to the manufacturer's protocol. Briefly, buffer A\B and Biotin Ligase were added to 6His-Avi-PcrV, followed by 1 hours of incubation at 30° C. The biotinylated PcrV is referred to as Bhavi-PcrV hereafter. The efficiency of biotinylation was measured using ELISA. Briefly, Bhavi-PcrV was removed by incubating with magnetic beads (Dynabeads™ MyOne™ Streptavidin T1), and the concentration of 6His-Avi-PcrV in supernatant was quantified by ELISA, using 6His-Avi-PcrV with known concentration as a standard material. The biotinylation efficiency was determined to be 90%.

Selection of Anti-PcrV scFv Antibodies

Generation of yeast scFv antibody display library: RNA collected from 2000 human blood samples was reverse-transcribed into cDNA, and the VH and VK fragments were amplified using VH- and VK-specific primers. Upon gel extraction and purification, scFvs were generated by linking VH and VK via a linker. The scFvs were cloned into the yeast display plasmid PYD1, which were then electroporated into yeast to generate the yeast scFv antibody display library.

Selection of Anti-PcrV scFv Antibodies as Determined by PcrV Binding:

The scFvs which recognized PcrV were isolated from the yeast display library. Briefly, magnetic-activated cell sorting (MACS) was used to enrich for cells expressing anti-PcrV scFv antibodies. Bhavi-PcrV was mixed with magnetic beads (Dynabeads™ MyOne™ Streptavidin T1) overnight to coat the biotinylated PcrV onto magnetic beads, according to manufacturer's protocol. The scFv antibody yeast library was then mixed with the PcrV coated beads for enriching yeast that display PcrV-recognizing antibodies, whereas the non-binders are washed away in washing steps. Subsequently, the collected yeast cells were labeled with PcrV proteins, and sorted by FACS to select for yeast displaying antibodies with high affinity to PcrV. The FACS-mediated selection was repeated 2-3 cycles. The selected yeast library cells were plated on agar, and single colonies were picked and assayed by further FACs analysis. From yeast clones that exhibited positive binding to PcrV, each scFV gene was subcloned into a prokaryotic expression vector and fused with a 6-his tag. The His-labeled scFv were then purified using Ni Sepharose purification as described above. A panel of positive scFv antibodies was obtained at the end of the selection process, and subjected to functional testing for the ability to inhibit RBC lysis caused by P. aeruginosa.

Analysis of Anti-PcrV scFv Candidates as Determined by RBC Lysis Inhibition

Monoclonal scFv antibodies were selected and assessed for biological activity by RBC lysis assay. Briefly, red blood cells (RBCs) were prepared from fresh whole human or rabbit blood by centrifugation, supplemented with EDTA and rinsed with multiple phosphate-buffered saline (PBS) washes. Washed RBCs (2.5% [vol/vol] final) in Dulbecco's modified Eagle's medium (DMEM) plus 10% fetal bovine serum (FBS) (Gibco) and purified anti-PcrV antibodies diluted in PBS were combined into wells of a round-bottom 96-well plate. Strain 57/66(O6) P. aeruginosa was grown to mid-log phase in 2× YT medium (Oxford), harvested by centrifugation, and resuspended in DMEM-fetal bovine serum (FBS) at an optical density at 600 nm (OD600) of 0.15. Ten microliters of bacterial suspension was added to the RBC-antibody mixture, mixed by agitation, and incubated for 3 hours at 37° C. and 5% CO2. The plates were briefly centrifuged (1000 rpm, 1 min) to pellet the intact RBCs, the supernatants transferred to a flat-bottom 96-well plate, and the OD405 was measured to detect any lysis, from which the relative amount of lysis inhibition was calculated and plotted. $IC_{50}$ values for the antibodies were also determined.

Example 2: Generation and Characterization of Full-Length Human Anti-PcrV Antibodies Generation of Full-Length Anti-PcrV Antibodies The most potent scFv antibodies were reformatted as human IgG1 antibody molecules with a human IgG1 heavy chain constant domain, and a human kappa light chain constant domain. VL and VH were amplified from the prokaryotic expression vector and introduced into eukaryotic expression vectors pTT5-L (containing kappa constant domain) and pTT5-H1 (containing IgG1 heavy chain constant domain). Plasmids expressing the light and heavy chains were extracted and used to transfect 293F cells. After the cells were cultured at 37° C., 8% CO2 and 120 rpm for 5 days, the antibodies in the culture media were purified using Protein A affinity chromatography.

Briefly, Protein A column was first equilibrated with a PBS buffer containing 50 mM PBS and 0.15M NaCl (pH7.2), at a flow rate of 150 cm/h and with a volume that is six times the volume of the column. The supernatant of the culture media (pH was adjusted to 7.2) was passed through the column at 150 cm/h. Upon further equilibration, the column was washed off using 50 mM sodium citrate (pH3.5) and the elution containing anti-PcrV antibodies was collected. The full length antibodies were functionally characterized for the ability to inhibit RBC lysis (see Example 1 for reference), A549/U937 cell lysis, as well as survival improvement in an acute pneumonia mouse model, according to the methods in Example 1 and the methods described below.

Analysis of Anti-PcrV Candidates as Determined by A549 or U937 Lysis Inhibition

To assay for ability to inhibit cytotoxicity and cell lysis caused by P. aeruginosa, the candidate anti-PcrV antibodies were added to human bronchoepithelial cell line A549 or human histiocytic lymphoma cell line U937 seeded in white 96-well plates (Nunc Nunclon Delta) in DMEM plus 10% fetal bovine serum. Log-phase strain PA103(O11) P. aeruginosa was added at a multiplicity of infection (MOI) of 10 and incubated for 2 h at 37° C. and 5% CO2, followed by 20 minutes of equilibration at room temperature. Lactate dehydrogenase (LDH) released from lysed cells was quantified using the CytoTox-ONE kit (Promega), to assay membrane integrity. The relative amount of lysis inhibition was plotted accordingly. $IC_{50}$ values for the antibodies were also determined.

Analysis of Anti-PcrV Candidates as Determined in Mouse Acute Pneumonia Model

The candidate anti-PcrV antibodies were assayed for the ability to improve survival in a mouse acute pneumonia model. In a prophylactic model, 7-8 week old BALB/c mice (Vital River Laboratory) were administered the candidate antibodies or PBS intraperitoneally (i.p.) 24 hr before infection, at doses of 1, 5, 10 or 25 mg/kg mouse weight. To generate an acute pneumonia model, which was performed as described previously (DiGiandomenico et al., 2007, Proc. Natl. Acad. Sci. U.S.A, 104:4624-4629), the BALB/c mice were intranasally inoculated with P. aeruginosa (PA103 strain) suspended in a 40 µl inoculum at the lethal dose, or double the lethal dose (at $8\times10^5$-$1.6\times10^6$ CFU; 1* or 2*LD90). Mouse survival was recorded for up to 7 days post-infection.

13-42 mAb as Lead Antibody for Further Optimization

Out of the full-length antibodies that were generated, 13-42 monoclonal antibody was selected as the lead parent antibody, as determined by its ability to inhibit RBC lysis, A549 or U937 cell lysis, as well as the ability to improve survival in an acute pneumonia mouse model.

Example 3: Generation and Characterization of Optimized Full-Length Anti-PcrV Antibodies Out of the full-length antibodies that were generated, 13-42 was selected as the lead parental antibody for further optimization. In particular, 13-42 was optimized to remove free cysteine residues and glycosylation sites in CDR3 region of the heavy chain (HC-CDR3), as well as to improve homology to human germ line by selectively engineering 11 amino acid residues in HC-CDR1, HC-CDR2, and LC-CDR3. Two methodologies were employed to optimize 13-42 derived antibodies.

In the first method, the loci encoding the two cysteines in HC-CDR3 were first mutated to encode stop codons to generate an optimization template. Subsequently, the mutated loci encoding the stop codons (previously encoding the two cysteines) were randomly mutated to any of the 20 amino acids. At the same time, the glycosylation sites (i.e., NSS) in HC-CDR3 were eliminated by mutating either Asn (N) or Ser (S) in any NXS sequences in HC-CDR3; and the locus for each of the remaining amino acid in CDR-H3 was randomly mutated one at a time. Finally, the non-human amino acid sequences in CDR-L3, CDR-H1 and CDR-H2 were mutated to improve homology to human sequences.

In an alternative scheme, the loci encoding the two cysteines in HC-CDR3 were first mutated to encode stop codons to generate an optimization template. Subsequently, the mutated loci encoding the stop codons (previously encoding the two cysteines) were randomly mutated to any of the 20 amino acids. At the same time, the loci for all amino acids previously flanked by the cysteines in CDR-H3 were randomly mutated simultaneously. Finally, the non-human amino acid sequences in CDR-L3, CDR-H1 and CDR-H2 were mutated to improve homology to human sequences.

Starting with the scFv of 13-42, a phage scFv display library containing mutations in the CDR regions was generated as described above. Variants that were able to bind PcrV with high affinity and with low dissociation rate were identified using ELISA or BLI, and their functions were tested for inhibition on RBC lysis and A549 cell lysis. The scFv antibodies optimized from 13-42 showing comparable or improved biological activity compared to the parental 13-42 scFv were used to generate full-length antibodies. A panel of optimized full-length antibodies was obtained at the end of the selection.

The optimized antibodies were tested for PcrV binding as assayed by ELISA. For the ELISA experiment, synthetic PcrV was used to coat the wells of a 96-well plate. On the following day, after washing with PBST, blocking with 200 µL PBS-milk for an hour, and another wash with PBST, the antibodies were added and incubated for an hour at 37° C. The plate was washed with 0.1% TBST for 6 times before 100 µL of Goat-anti-human Fc antibody-AP (1:3000 in PBS) was added to each well and incubated for an hour. After washing with 0.1% TBST for 6 times, 50 µL of pNPP was added to each well and color was developed for 10-20 minutes at 37 C. The signals were read by a microplate reader at 410 nm. The ELISA results (OD410) were analyzed and the EC50 values were calculated, as shown in Table 5.

TABLE 5

Binding affinity of Optimized anti-PcrV mAb clones to PcrV

| Optimized anti-PcrV mAb clones | ELISA assay EC50(ug/ml) | Optimized anti-PcrV mAb clones | ELISA assay EC50(ug/ml) |
|---|---|---|---|
| 4A10 | 0.1133 | 2B1 | 0.1624 |
| 7B1 | 0.1252 | 7B2 | 0.09672 |
| 7C1 | 0.1337 | 3H10 | 0.1488 |
| 8C1 | 0.1107 | 3G3 | 0.09364 |
| 6A10 | 0.1043 | 3A11 | 0.09516 |
| 5B3 | 0.1094 | 3A9 | 0.1161 |
| 3B12 | 0.1178 | 13-42 | 0.1316 |

The binding kinetics and affinity of optimized anti-PcrV mAb clones 7B1, 7C1, 8C1, 6A10, 5B3, 3B12, 4A10, 2B1, 7B2, 3H10, 3G3, 3A11, and 3A9 to PcrV were also tested by BLI and shown in Table 6.

TABLE 6

Binding affinity of Optimized anti-PcrV mAb clones to PcrV

| Optimized anti-PcrV mAb clones | kd(M) | Optimized anti-PcrV mAb clones | kd(M) |
|---|---|---|---|
| 7B1 | <1.0E-12 | 7B2 | 8.75E-11 |
| 7C1 | 1.01E-10 | 3H10 | 7.79E-10 |
| 8C1 | 3.30E-10 | 3G3 | 3.81E-10 |
| 6A10 | 2.04E-10 | 3A11 | 1.26E-10 |
| 5B3 | 4.55E-10 | 3A9 | 5.33E-10 |
| 3B12 | 1.67E-10 | 13-42 | 4.14E-10 |
| 4A10 | 6.06E-10 | | |
| 2B1 | 1.94E-10 | | |

The optimized full length antibodies were then functionally characterized for the ability to inhibit RBC lysis and A549 cell lysis, according to the methods described in Examples 1 and 2.

Optimized Anti-PcrV Antibodies Inhibit RBC and A549 Cell Lysis Caused by *P. aeruginosa*

RBC Lysis Inhibition by Optimized Anti-PcrV Antibodies

The ability of optimized anti-PcrV mAb clones 7B1, 7C1, 8C1, 6D10, 6A10, 5B3, 3B12, 4A10, 2B1, 7B2, 3H10, 3G3, 9B12, 3A9, 2D3, 7B1-1F5, to inhibit red blood cell lysis was compared to the parental 13-42 mAb and the reference antibody V2L2-MD. RBC lysis inhibition assay was performed as described in Example 1.

Figure 1B:
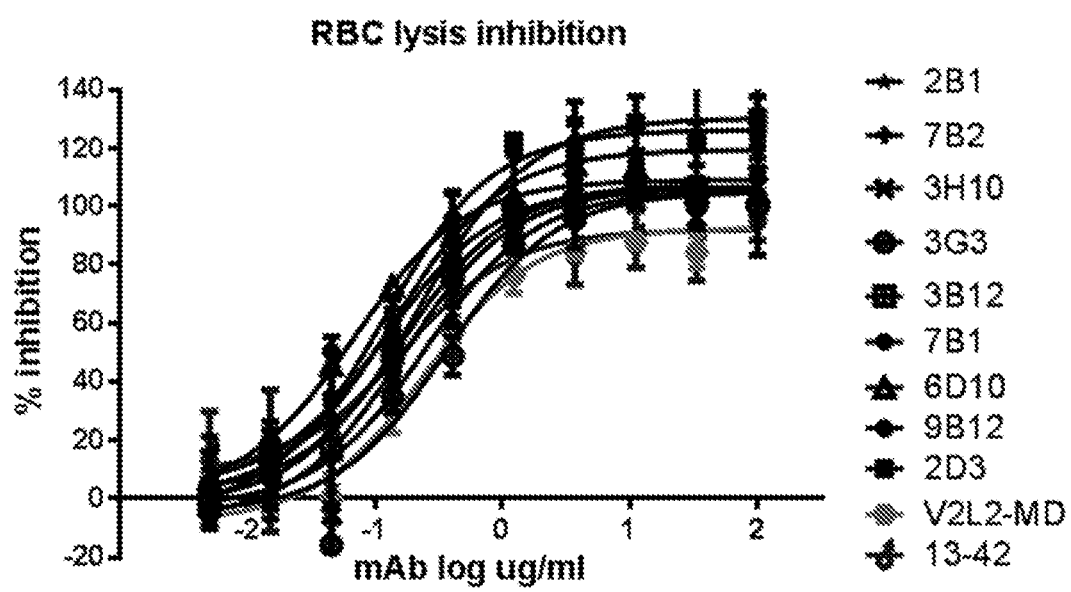

As shown in FIGS. 1A and 1B and Table 7, all antibodies optimized from 13-42 exhibited better or comparable efficacies in inhibiting RBC lysis as parental 13-42 mAb and V2L2-MD.

TABLE 7

Potency of Optimized anti-PcrV mAb in inhibiting RBC lysis

| Optimized anti-PcrV mAb clones | RBC lysis assay IC$_{50}$(ug/ml) | Optimized anti-PcrV mAb clones | RBC lysis assay IC$_{50}$(ug/ml) |
|---|---|---|---|
| 7B1 | 0.10 | 7B2 | 0.05 |
| 7C1 | 0.10 | 3H10 | 0.16 |
| 8C1 | 0.12 | 3G3 | 0.18 |
| 6D10 | 0.16 | 9B12 | 0.07 |
| 6A10 | 0.04 | 3A9 | 0.23 |
| 5B3 | 0.12 | 2D3 | 0.05 |
| 3B12 | 0.16 | 13-42 | 0.23 |
| 4A10 | 0.16 | V2L2-MD | 0.21 |
| 2B1 | 0.12 | 7B1-1F5 | 0.19 |

A549 Cell Lysis Inhibition by Optimized Anti-PcrV Antibodies

The ability of optimized anti-PcrV 7B1, 7C1, 8C1, 610, 6A10, 5B3, 3B12, 4A10, 2B1, 7B2, 3H10, 3G3, 3A11, 3A9 to inhibit A549 cell lysis was also evaluated, as compared to the parental 13-42 mAb. A549 cell lysis inhibition assay was performed as described in Example 2.

Figure 2A:
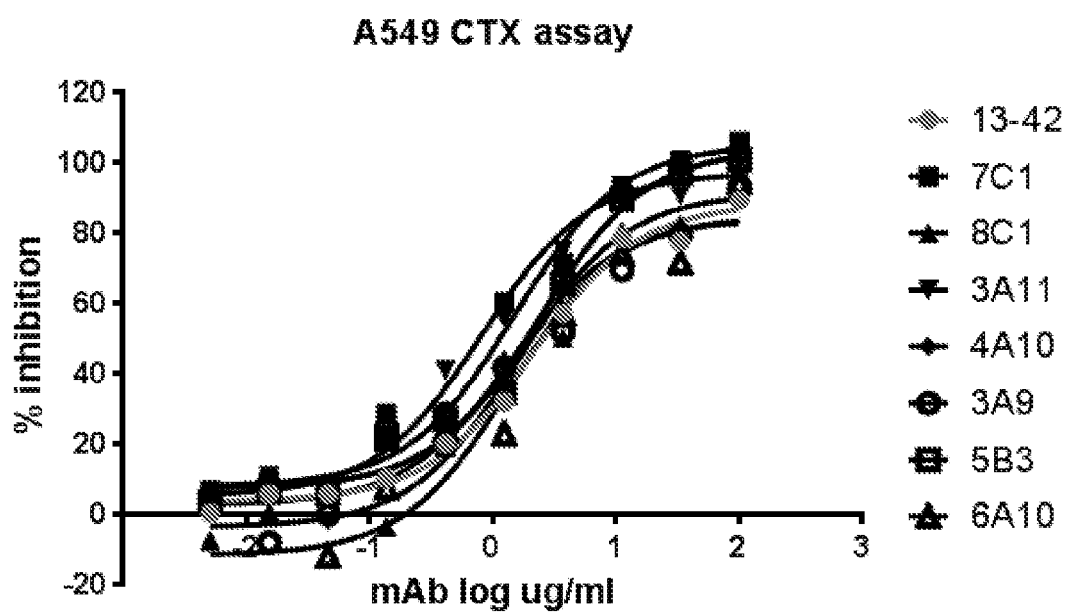
FIGS. 2A and 2B show the ability of lead optimized antibodies in in inhibiting A549 cell lysis compared to parental 13-42 mAb.
Figure 2B:
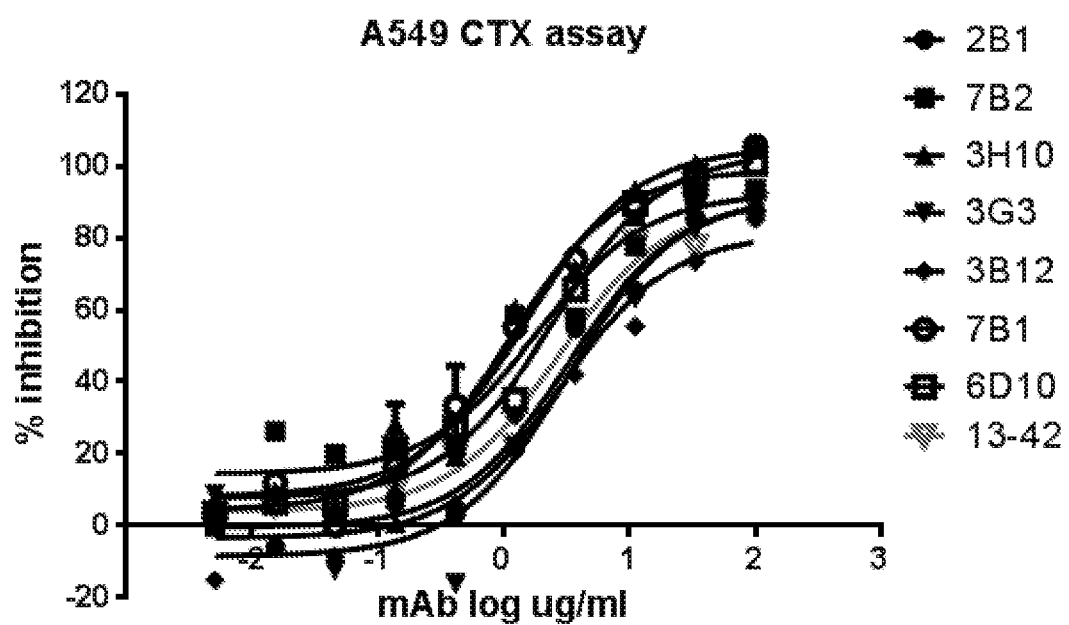

As shown in FIGS. 2A and 2B and Table 8, all antibodies optimized from 13-42 exhibited better or comparable efficacies in inhibiting A549 lysis as 13-42 mAb.

TABLE 8

Potency of Optimized anti-PcrV mAb in inhibiting A549 lysis

| Optimized anti-PcrV mAb clones | A549 cytotoxicity assay IC$_{50}$(ug/ml) | Optimized anti-PcrV mAb clones | A549 cytotoxicity assay IC$_{50}$(ug/ml) |
|---|---|---|---|
| 7B1 | 1.06 | 2B1 | 3.01 |
| 7C1 | 1.36 | 7B2 | 2.32 |
| 8C1 | 1.94 | 3H10 | 1.78 |
| 6D10 | 2.63 | 3G3 | 2.75 |
| 6A10 | 2.00 | 3A11 | 0.91 |
| 5B3 | 2.39 | 3A9 | 1.21 |
| 3B12 | 2.68 | 13-42 | 2.67 |
| 4A10 | 2.80 | | |

Example 4: Characterizing the Specificity and Affinity of Optimized Anti-PcrV Antibodies Of the optimized antibodies, 7C1, 7B1, 8C1 and 6D10 antibodies were further characterized for their affinity and specificity in PcrV binding.

Binding Affinity of Optimized Antibodies to PcrV

The association constant (ka), dissociation constant (kd) and the equilibrium dissociation constant (kD) for binding of optimized anti-PcrV mAb clones 7B1, 7C1, 8C1, 6D10 and reference antibody V2L2-MD to PcrV were tested by BIACORE (GE company). The kD values for optimized clones 7B1, 7C1, 8C1, 6D10 (8.47 E-11M, 4.57 E-11M, 3.16 E-11M, 5.20 E-11 M, respectively) were determined to be comparable to that for the V2L2-MD antibody (4 E-11 M). Furthermore, the optimized antibodies 7B1, 7C1, 8C1 and 6D10 displayed comparable association and dissociation kinetics in PcrV binding, as shown by comparable ka and kd values (data not shown).

Specificity of Anti-PcrV Antibodies

The specificity of the optimized anti-PcrV antibodies were characterized by measuring cross-reactivity to BV particles and to PcrV-negative A549 cells.

Figure 3:
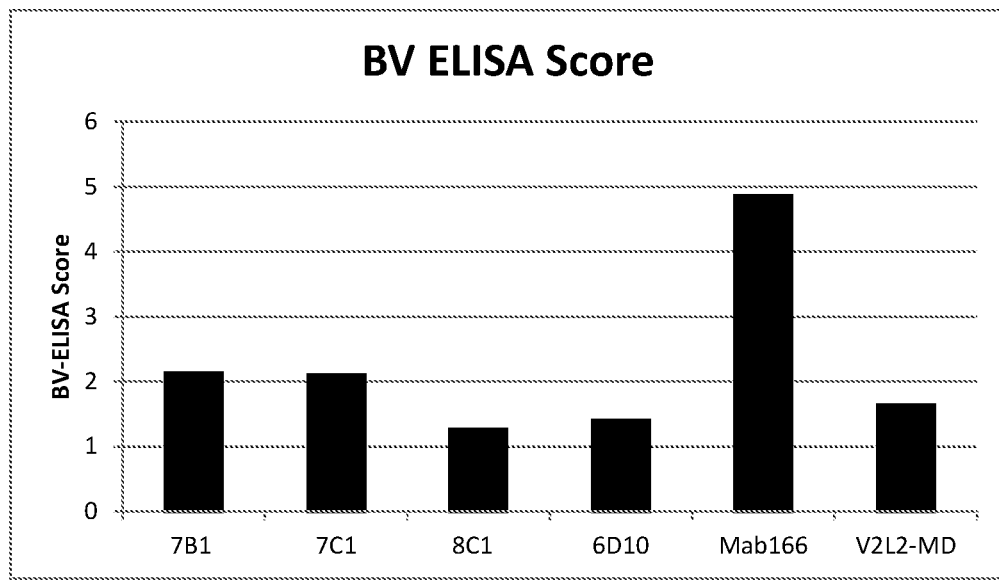
FIG. 3 shows the cross-reactivity of lead optimized antibodies 7B1, 7C1, 8C1, and 6D10 to BV particles compared to reference antibodies Mab166 and V2L2-MD, as measured by ELISA.
Figure 4A:
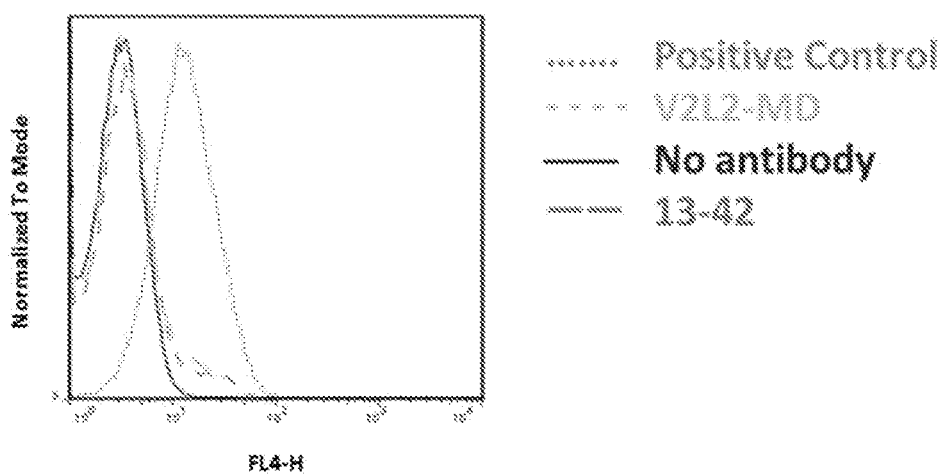
FIG. 4A to 4E show the cross-reactivity of 13-42 mAb and optimized antibodies 7B1, 7C1, 8C1, and 6D10 to PcrV-negative A549 cells, as measured by FACS.
Figure 4B:
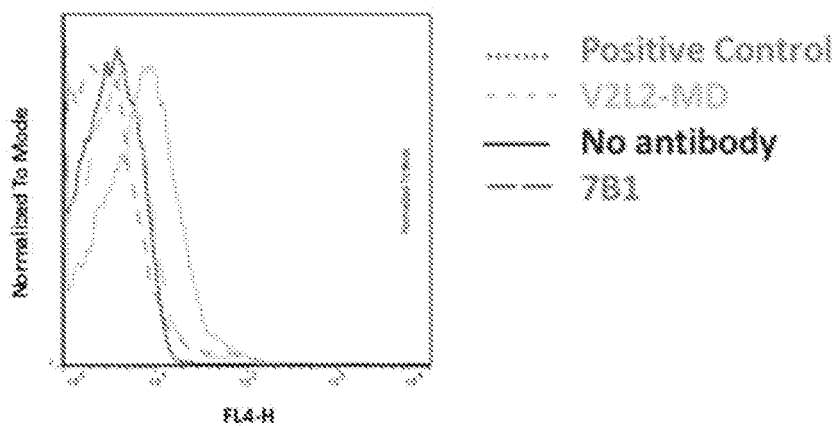
Figure 4C:
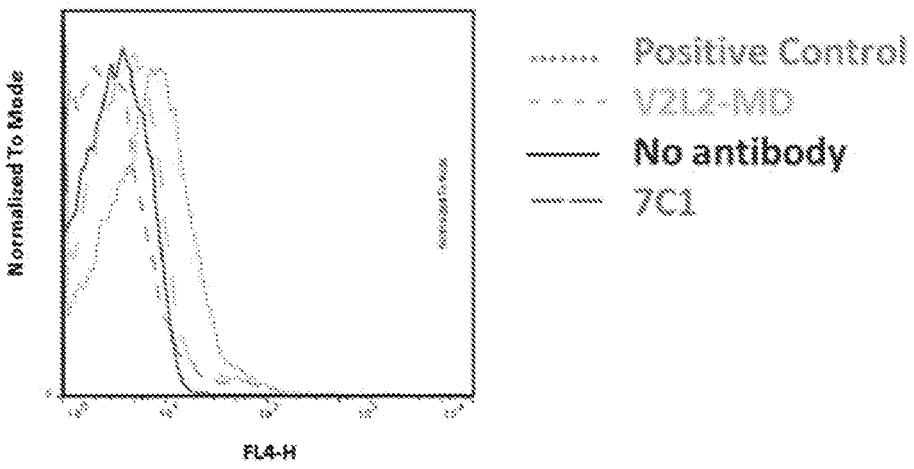
Figure 4D:
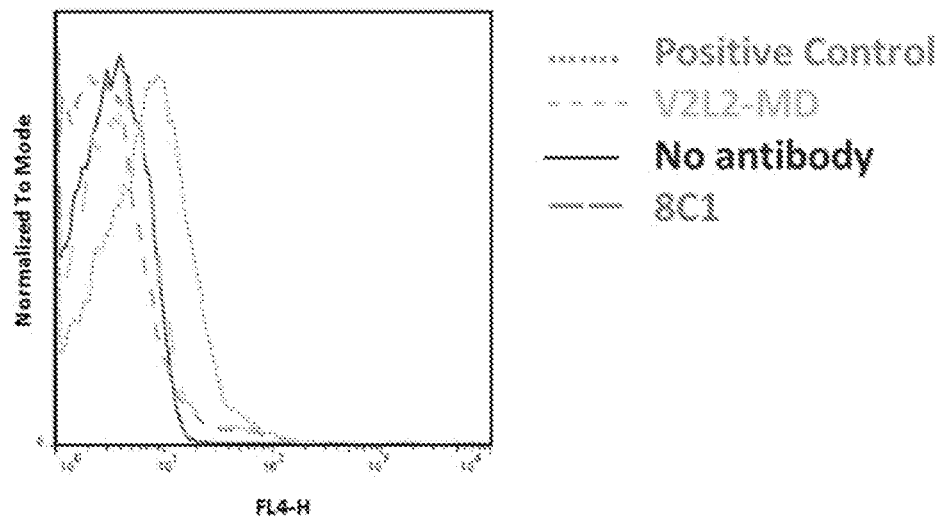
Figure 4E:
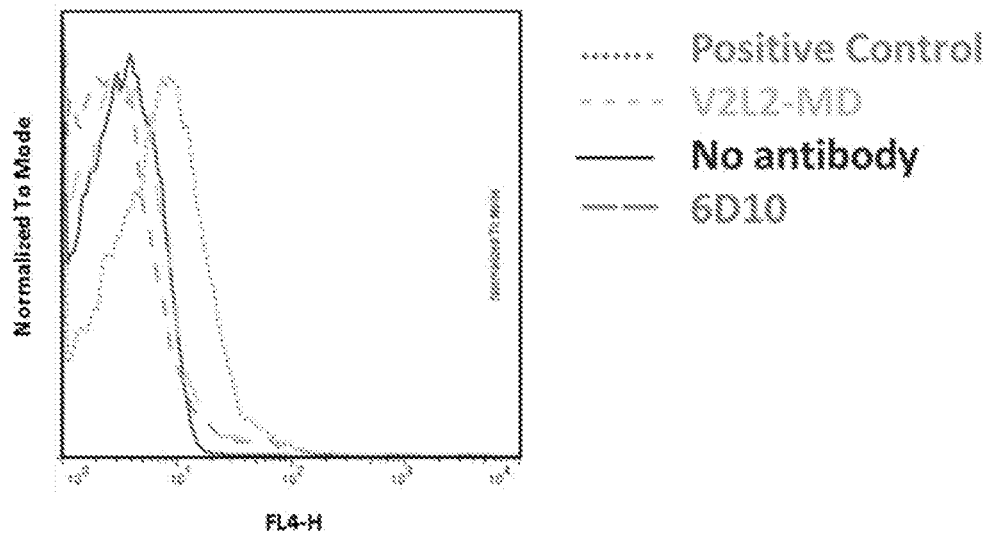

Cross-reactivity to BV particles: Using ELISA, optimized antibodies 7C1, 7B1, 8C1, 6D10, and reference antibodies V2L2-MD and Mab166 were tested for cross-reactivity to BV particles according to the method described previously (See Hötzel I, et al, 2012, mAbs 4:6, 753-760). As shown in FIG. 3, Mab166 displayed a high level of non-specific binding to BV particles. In contrast, the antibodies 7C1, 7B1, 8C1, 6D10 displayed low levels of non-specific binding, similar to V2L2-MD and much lower than Mab166.

Cross-reactivity to A549 cells: Using FACS, parental antibody 13-42, optimized antibodies 7C1, 7B1, 8C1, 6D10 as well as V2L2-MD were tested for cross-reactivity to PcrV-negative A549 cells. As shown in FIGS. 4A-4E, 13-42 mAb as well as the optimized antibodies 7C1, 7B1, 8C1, 6D10 all displayed similarly low levels of A549 binding as negative control (no antibody) and V2L2-MD, while a positive control antibody specific to GM-CSFR on A549 cells displayed a higher level of binding to A549 cells.

Taken together, these results indicated that optimized antibodies 7C1, 7B1, 8C1 and 6D10 displayed similarly low non-specific binding as parental antibody 13-42 mAb and reference antibody V2L2-MD, while displaying much lower non-specific binding than Mab166, another reference anti-PcrV antibody.

Example 5: Optimized Full-Length Anti-PcrV Antibodies Broadly Neutralize P. aeruginosa Strains To examine whether the optimized anti-PcrV antibodies can neutralize a broad spectrum of P. aeruginosa strains, the ability of optimized anti-PcrV antibodies to inhibit RBC and A549 cell lysis caused by multiple clinically relevant P. aeruginosa strains (O6, O11, O1, O16), which represent 70% of clinical cases of P. aeruginosa infections, was investigated.

RBC Lysis Inhibition by Optimized Anti-PcrV Antibodies

The optimized anti-PcrV mAb clones 7C1, 8C1, and 7B1 were further analyzed for their abilities to inhibit red blood cell lysis by various strains of P. aeruginosa, namely strains O1-52/66, O16-177/81, and O6-57/66, as compared to the parental 13-42 mAb and the reference antibody V2L2-MD. RBC lysis inhibition assay was performed as described in Example 1.

Figure 5A:
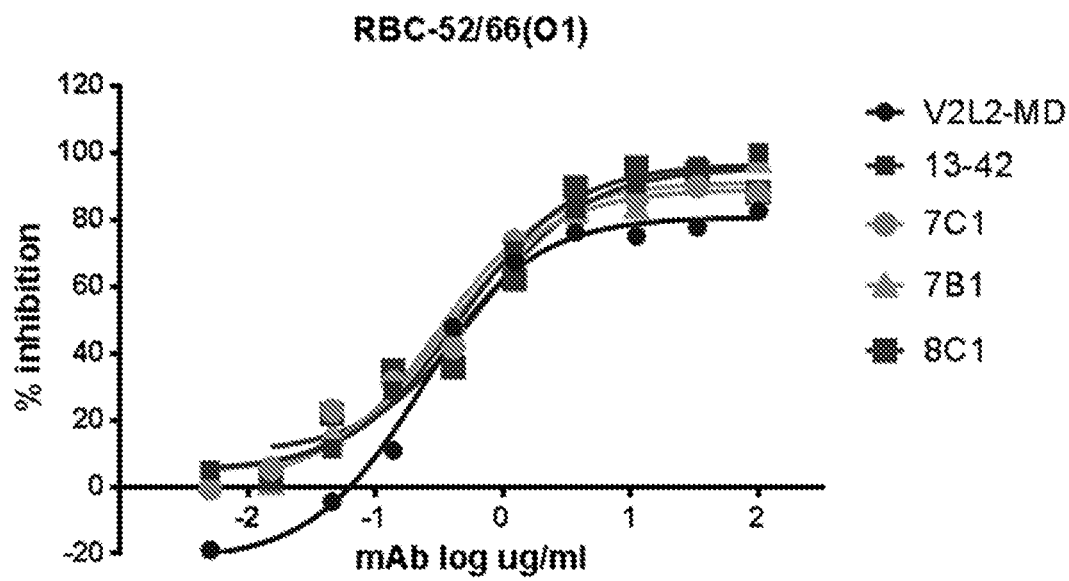
FIGS. 5A, 5B and 5C show the ability of optimized antibodies 7B1, 7C1 and 8C1 in inhibiting RBC lysis caused by O1-52/66, O16-177/81 and O6-57/66 strain respectively, as compared to parental 13-42 mAb and V2L2-MD reference antibody.
Figure 5B:
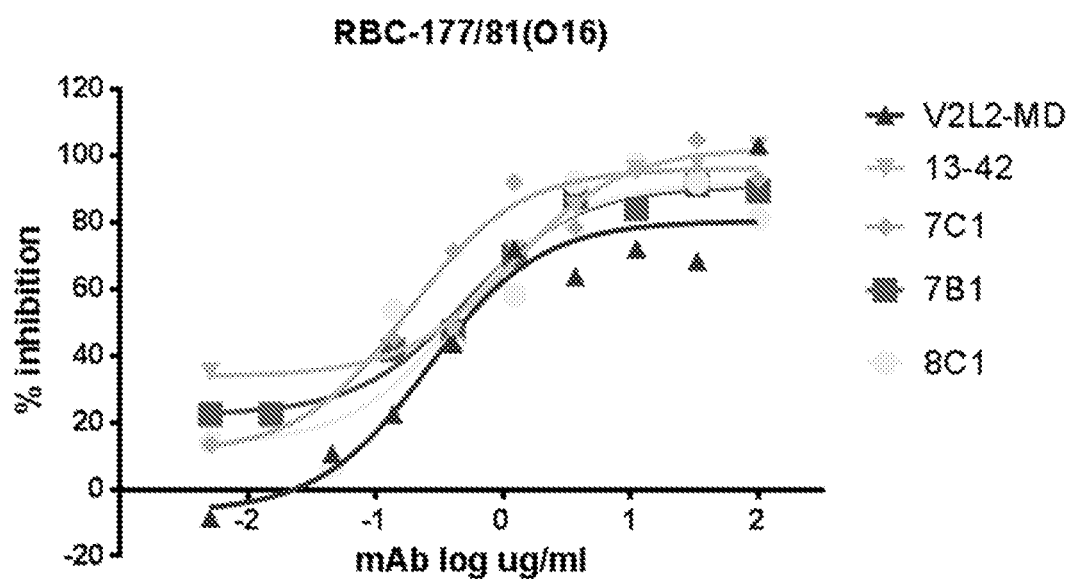
Figure 5C:
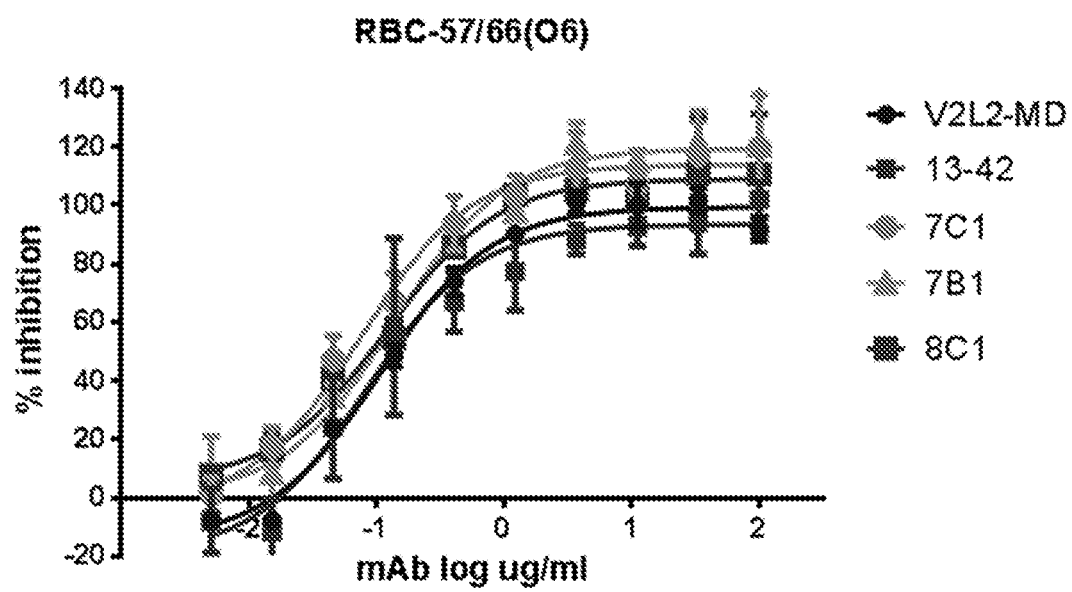
Figure 6A:
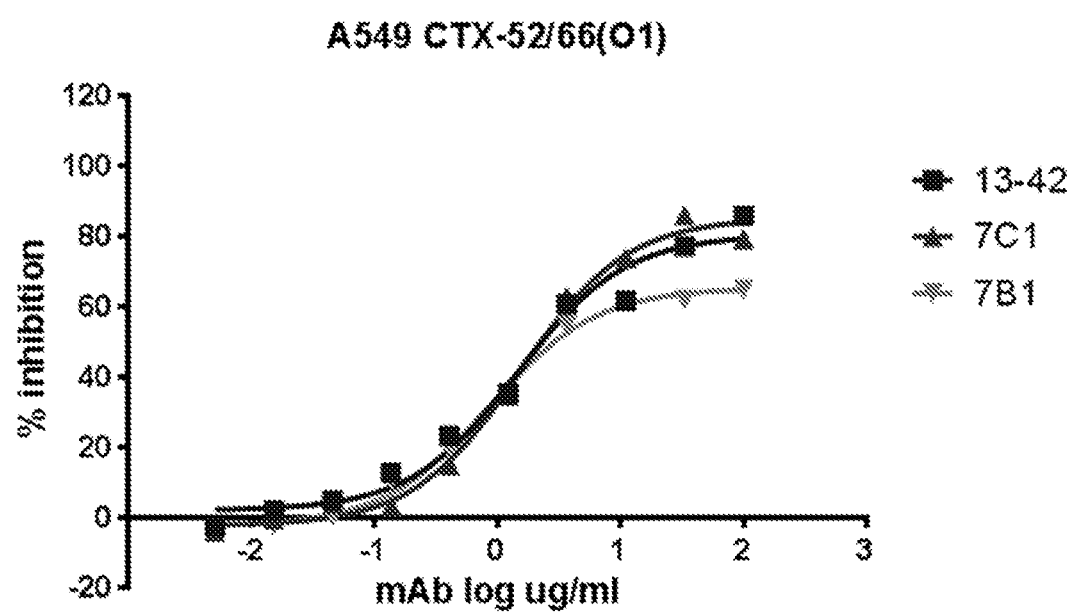
FIG. 6A to 6D show the ability of optimized antibodies 7B1, 7C1 and 8C1 in inhibiting A549 cell lysis caused by O1-52/66, O6-57/66, O16-177/81 and O11-PA103 strain respectively, as compared to parental 13-42 mAb.
Figure 6B:
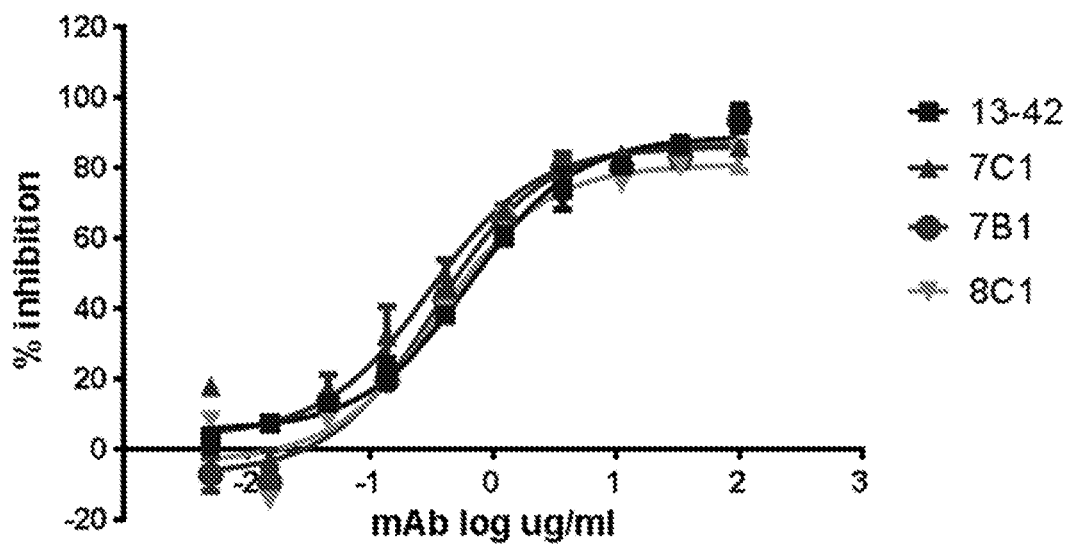
Figure 6C:
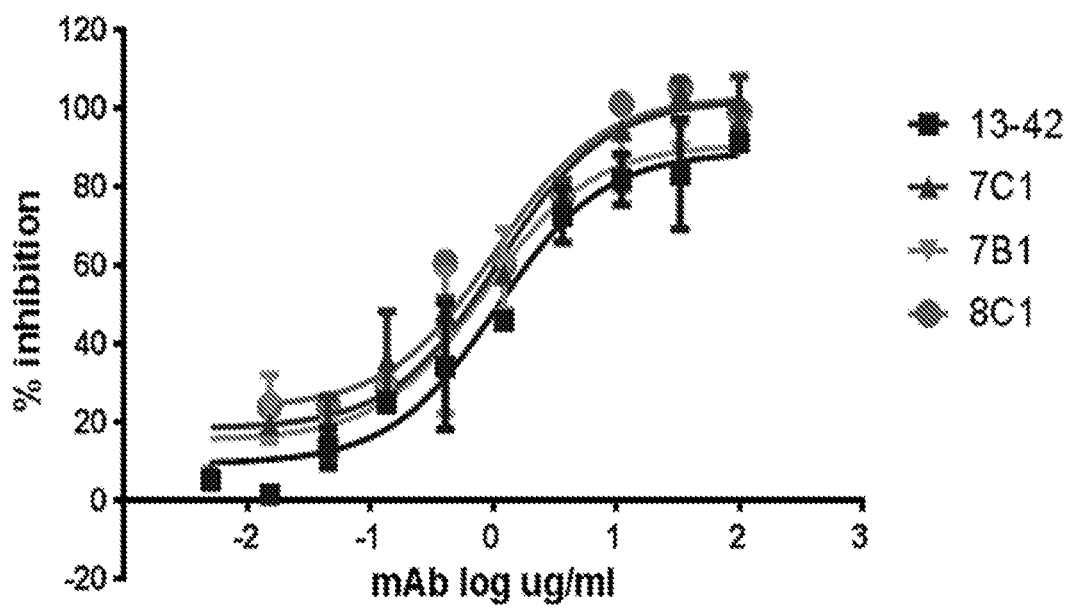
Figure 6D:
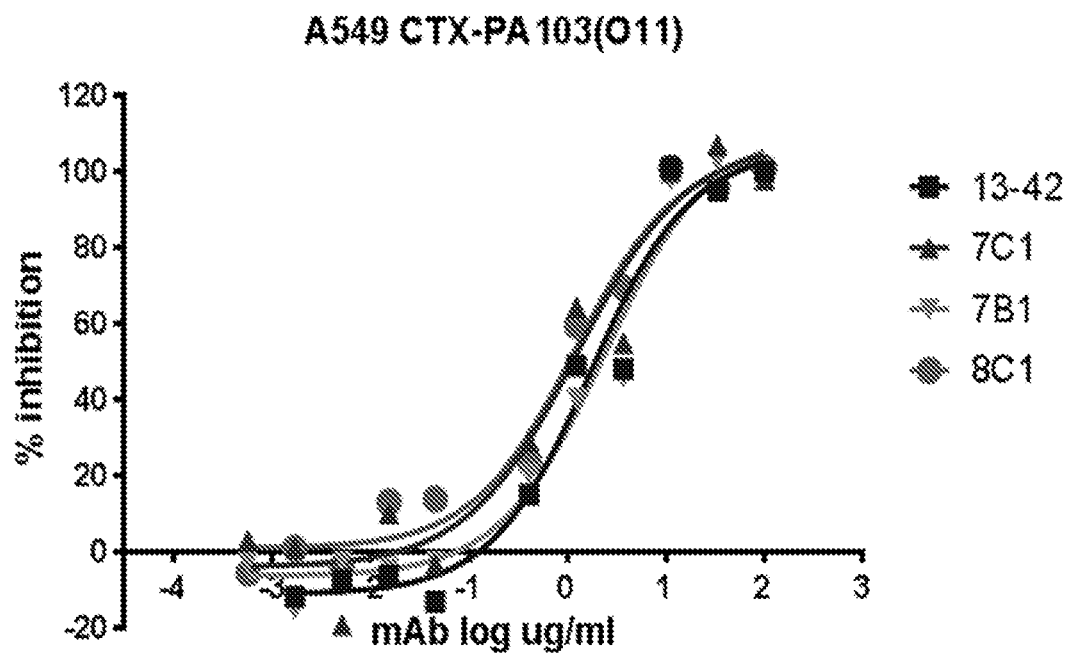

As shown in in FIGS. 5A-5C and Table 9, the optimized mAb clones 7C1, 8C1, and 7B1 exhibited better efficacy in inhibiting RBC lysis by strains O1-52/66, O16-177/81, and O6-57/66 than either the reference antibody V2L2-MD or the parental 13-42 mAb.

TABLE 9

Efficacy of Optimized anti-PcrV in inhibiting RBC lysis caused by various P. aeruginosa strains

| | Strain of P. aeruginosa | | | |
|---|---|---|---|---|
| mAb clones | O1-52/66 IC50 (µg/mL) | O16-177/81 IC50 (µg/mL) | O6-57/66 IC50 (µg/mL) | Average IC50 (µg/mL) |
| 7C1 | 0.3674 | 0.1409 | 0.0767 | 0.1950 |
| 8C1 | 0.4240 | 0.2522 | 0.1207 | 0.2656 |
| 7B1 | 0.3079 | 0.1974 | 0.1380 | 0.2144 |
| 13-42 | 0.4720 | 0.4635 | 0.1303 | 0.3553 |
| V2L2-MD | 0.6345 | 0.4769 | 0.1464 | 0.4193 |

A549 Cell Lysis Inhibition by Optimized Anti-PcrV Antibodies

The optimized anti-PcrV mAb clones 7C1, 8C1, and 7B1 were analyzed for their abilities to inhibit A549 cell lysis by various strains of P. aeruginosa, namely strains O6-57/66, O11-PA103, O1-52/66 and O16-177/81, as compared to the parental 13-42 mAb. A549 cell lysis inhibition assay was performed as described in Example 2.

As shown in FIGS. 6A-6D and Table 10, the optimized mAb clones 7C1, 8C1, and 7B1 exhibited comparable efficacy in inhibiting A549 lysis by strains O6-57/66, O11-PA103, O1-52/66 and O16-177/81 as compared to the parental 13-42 mAb.

TABLE 10

Efficacy in inhibiting A549 cell lysis caused by various *P. aeruginosa* strains

| mAb clones | Strain of *P. aeruginosa* | | | | Average IC50 (μg/mL) |
|---|---|---|---|---|---|
| | O6-57/66 IC50 (μg/mL) | O11-PA103 IC50 (μg/mL) | O1-52/66 IC50 (μg/mL) | O16-177/81 IC50 (μg/mL) | |
| 13-42 | 0.8909 | 1.207 | 2.339 | 1.078 | 1.3787 |
| 7C1 | 0.4962 | 1.117 | 1.998 | 1.095 | 1.1766 |
| 7B1 | 0.5031 | 2.607 | 4.558 | 0.8606 | 2.1322 |
| 8C1 | 0.7206 | 1.536 | N/D | 0.8811 | 1.0459 |

To further illustrate the optimized antibodies could broadly neutralize *P. aeruginosa* strains, the abilities of these antibodies to bind various forms of PcrV mutants were tested. Briefly, 100 PcrV sequences were randomly selected from Genebank database. In contrast to the wild type sequence as shown in SEQ ID No: 71, 13% of the selected sequences contained R, G, or K at position 225 (as compared of S in the wild type sequence SEQ No: 71), which was the main mutation around the epitope of 7B1.

Optimized 7B1, 7C1, 8C1 and 6D10 antibodies were characterized for their affinity and specificity in binding to these PcrV mutants (with mutations at position 225), and were found to strongly bind these mutants as well (data not shown). These findings further illustrate that the optimized anti-PcrV antibodies could neutralize a broad spectrum of *P. aeruginosa* strains, which might express various forms of PcrV mutants.

Example 6: Optimized Anti-PcrV Antibodies as Prophylactic Treatment for *P. aeruginosa* Infection The ability of the optimized anti-PcrV antibodies in protecting against *P. aeruginosa* infection prophylactically was demonstrated with survival improvement in mouse pneumonia model, intraperitoneal infection model and immunocompromised mouse pneumonia model.

Survival Improvement in Mouse Pneumonia Model by Anti-PcrV Antibodies

The ability of the optimized anti-PcrV antibodies 7C1, 7B1 and 3G3 to improve survival in mouse pneumonia model was evaluated in comparison to parental 13-42 mAb and HIV-10E8, a broadly neutralizing antibody against HIV described previously (See Huang J, et al, 2012, *Nature* 491:406), was used as a negative control.

In a prophylactic model, 7-8 week old BALB/c mice (Vital River Laboratory) were administered with antibodies intraperitoneally (i.p.) 24 h before infection, at doses of 1 or 10 mg/kg mouse weight. To induce acute pneumonia, the BALB/c mice were intranasally inoculated with *P. aeruginosa* (PA103 strain) suspended in a 40 μl inoculum at the lethal dose ($1*LD_{90}$) or at double the lethal dose ($2*LD_{90}$) ($8 \times 10^5 \sim 1.6 \times 10^6$ CFU). Mouse survival was recorded for up to 7 days post-infection. The results were represented as Kaplan-Meier survival curves.

Figure 7A:
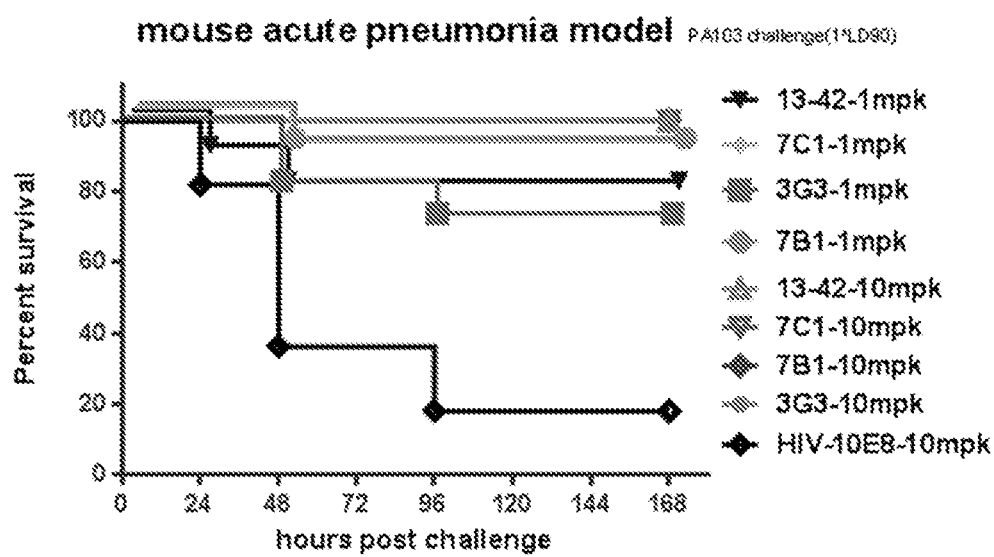
FIGS. 7A and 7B show the ability of lead optimized antibodies 7B1, 7C1 and 3G3 to improve survival prophylactically in a mouse acute pneumonia model, as compared to parental 13-42 mAb.
Figure 7B:
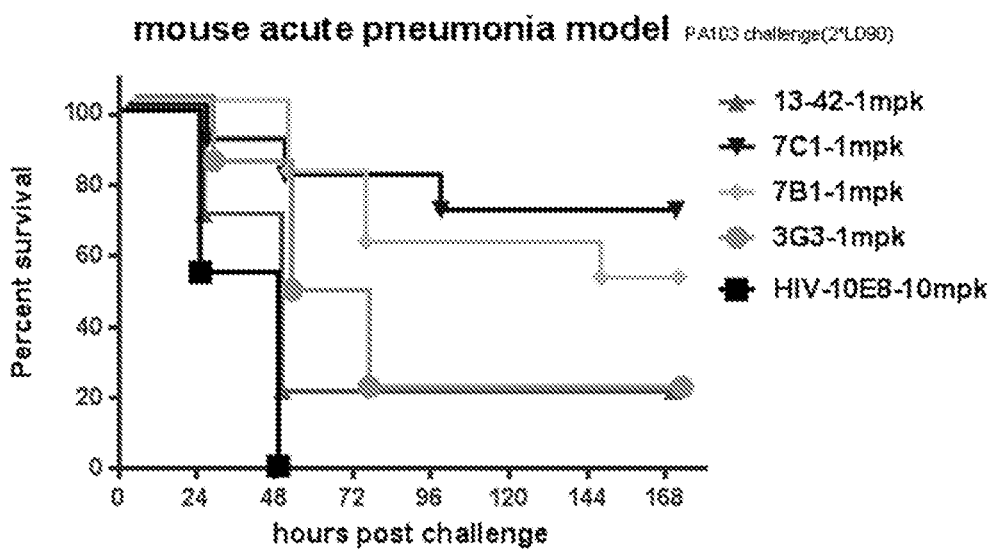

As shown by Kaplan-Meier survival curves in FIGS. 7A and 7B, at both 1× and 2× the lethal doses ($1*LD_{90}$ or $2*LD_{90}$; $8 \times 10^5 \sim 1.6 \times 10^6$ CFU) of *P. aeruginosa* inoculation, all anti-PcrV antibodies exhibited significant survival improvement compared to negative control (P <0.001). Also, the optimized antibodies 7C1, 7B1 exhibited comparable or better survival improvements than parental 13-42 mAb (P <0.05). Differences in survival were calculated by the log rank test.

Organ Burden in Mouse Pneumonia Model Administered with Anti-PcrV Antibodies

The ability of the parental anti-PcrV antibody 13-42 mAb in reducing organ burden for an acute pneumonia model was evaluated and compared to that of reference antibody V2L2-MD. The ability of the optimized anti-PcrV antibody clones 7B1, 7C1, 8C1, and 6D10 in reducing organ burden for an acute pneumonia model was further evaluated. HIV-10E8 was used as a negative control.

In a prophylactic model, 7-8 week old BALB/c mice (Vital River Laboratory) were administered with antibodies or PBS intraperitoneally (i.p.) 24 hr before infection, at 10 mg/kg mouse weight. To induce acute pneumonia, the BALB/c mice were intranasally inoculated with *P. aeruginosa* (PA103 strain) suspended in a 40 μl inoculum at half the lethal dose ($0.5*LD_{90}$; $3 \times 10^5$ CFU). 24 hours post-infection, mice were euthanized, where the lungs, spleens and kidneys were extracted, homogenized and diluted before plating on agar to measure the viable bacteria units (in CFU), which represented the *P. aeruginosa* burden in the respective organ sample.

As shown in FIG. 8A, 13-42 mAb exhibited better efficacy in reducing organ burden in the lung, and similar efficacy in reducing organ burden in spleen and kidney in the mouse pneumonia model, as compared to V2L2-MD.

Figure 8A:
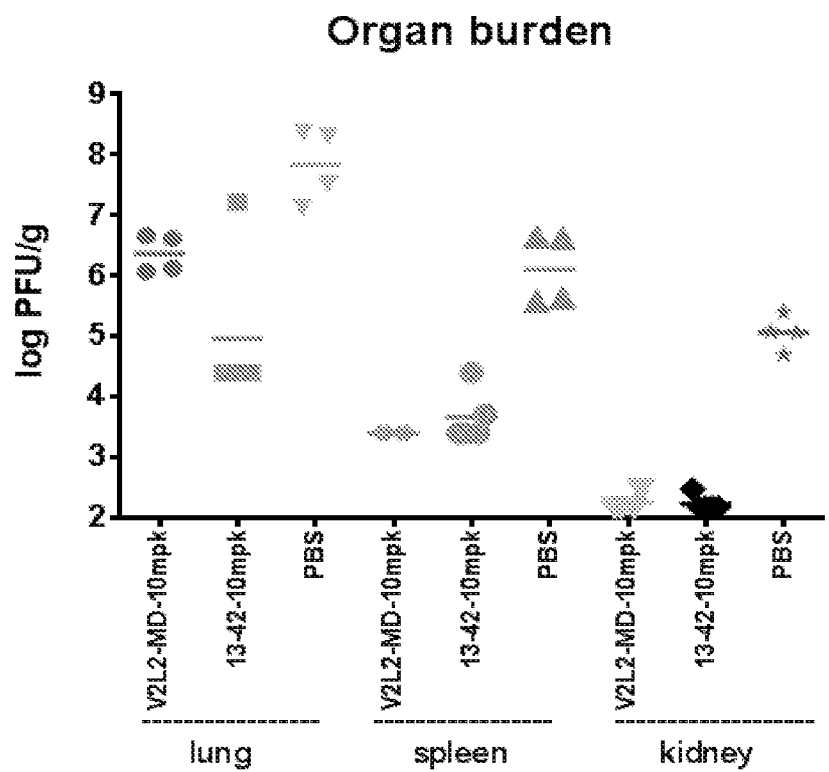
FIGS. 8A and 8B show the ability of parental 13-42 mAb, reference antibody V2L2-MD and lead optimized antibodies 7B1, 7C1, 8C1 and 6D10 to prophylactically reduce organ burden of P. aeruginosa in a mouse acute pneumonia model.
Figure 8B:
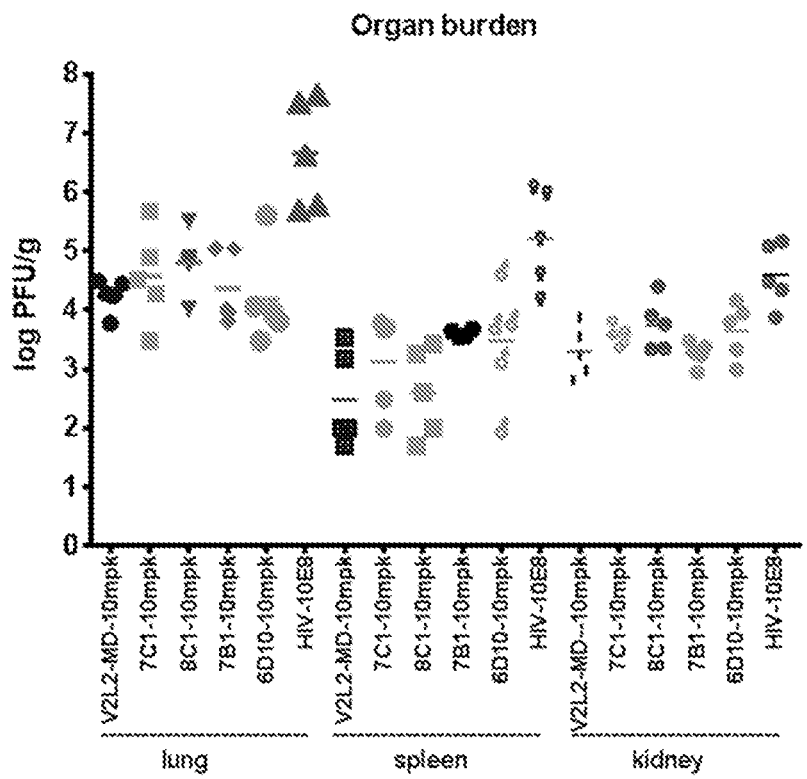

As shown in FIG. 8B, optimized anti-PcrV antibody clones 7B1, 7C1, 8C1, and 6D10 exhibited comparable efficacy in reducing organ burden in the lung, spleen and kidney as compared to V2L2-MD, and exhibited higher efficacy in reducing organ burden in the lung, spleen and kidney in the mouse pneumonia model as compared to HIV-10E8.

Survival Improvement in Mouse Intraperitoneal Infection Model Using Anti-PcrV Antibodies The ability of the optimized anti-PcrV antibodies 7C1, 7B1 and 8C1 to improve survival in a mouse intraperitoneal infection model was evaluated in comparison to parental 13-42 mAb. HIV-10E8 was used as negative control. The mouse intraperitoneal infection model was generated as described previously (See Warrener et al., 2014, *Antimicrob. Agents Chemother.*, 58, 4384-4391).

In a prophylactic model, 7-8 week old BALB/c mice (Vital River Laboratory) were administered antibodies by intraperitoneal (i.p.) injection 24 h before infection, at doses of 5 or 25 mg/kg mouse weight. To induce intraperitoneal infection, the BALB/c mice were intraperitoneally inoculated with *P. aeruginosa* (O6-57/66 strain) suspended in a 300 μl inoculum at triple the lethal dose ($3*LD90=7 \times 10^5$ CFU). Mouse survival was recorded for up to 5 days post-infection.

Figure 9:
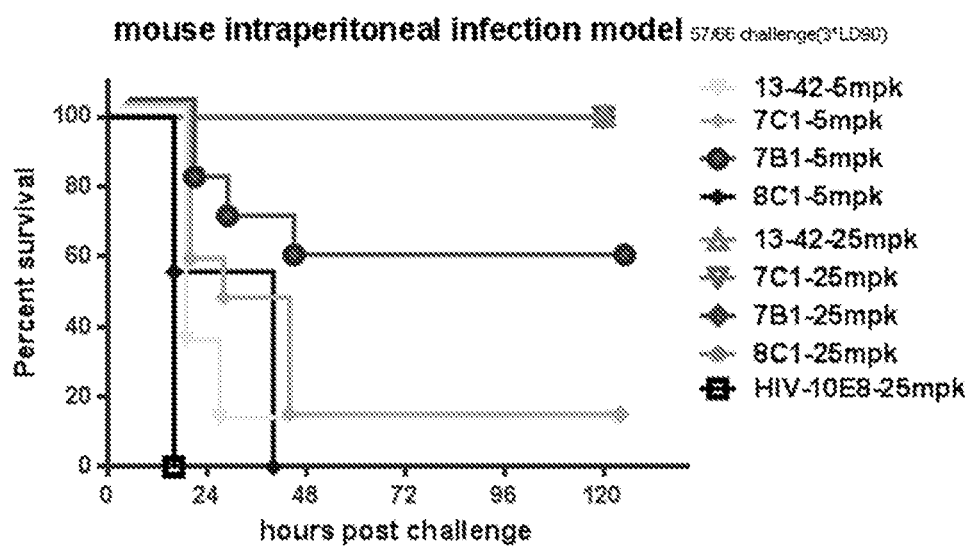
FIG. 9 shows the ability of lead optimized antibodies 7B1, 7C1 and 8C1 to improve survival prophylactically in a mouse intraperitoneal infection model, as compared to parental 13-42 mAb.

As shown in FIG. 9, at triple the lethal dose ($3*LD_{90}$) of *P. aeruginosa* inoculation, all anti-PcrV antibodies exhibited significant survival improvement compared to negative control at the 25 mg/kg antibody dose (P<0.0001). Also, the optimized antibodies 7C1, 7B1 exhibited comparable or better survival improvement as parental 13-42 mAb, at the 5 mg/kg antibody dose (P<0.05). Differences in survival were calculated by the log rank test.

Survival Improvement in Immunocompromised Mouse Pneumonia Model by Anti-PcrV Antibodies The ability of the optimized anti-PcrV antibodies 7C1, 7B1 and 8C1 to improve survival for acute pneumonia model in immunodeficient mice was evaluated in comparison to parental 13-42. HIV-10E8 was used as negative control. The acute pneumonia model in immunodeficient mice model was generated as described previously (DiGiandomenico et al., 2014, *Sci. Transl. Med.*, 6: 262ra155).

In a prophylactic model, to achieve immunosuppression, 7-8 week old BALB/c mice (Vital River Laboratory) were first administered 2 doses of 150 mg/kg of cyclophosphamide, at 4 days and 1 day before *P. aeruginosa* infection, to suppress white cell count. Antibodies were then administered intraperitoneally (i.p.) at 24 h before infection, at doses of 3.2 to 5 mg/kg mouse weight. To induce acute pneumonia, the BALB/c mice were intranasally inoculated with *P. aeruginosa* (O6-57/66 strain) suspended in a 40 µl inoculum at the lethal dose ($1*LD_{90}$=10 PFU). Mouse survival was recorded for up to 10 days post-infection.

Figure 10:
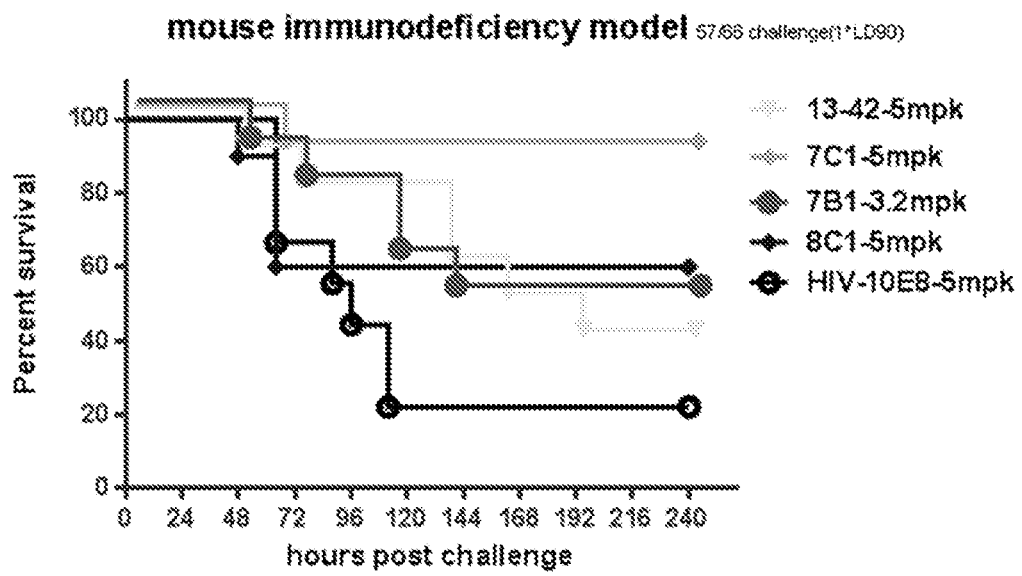
FIG. 10 shows the ability of lead optimized antibodies 7B1, 7C1 and 8C1 to improve survival prophylactically in an immunodeficiency mouse acute pneumonia model, as compared to parental 13-42 mAb.

As shown in FIG. 10, at the lethal dose ($1*LD_{90}$) of *P. aeruginosa* inoculation, all anti-PcrV antibodies exhibited significant survival improvement compared to negative control (P<0.05). Also, the optimized antibody 7C1 exhibited better survival improvement than the parental 13-42 antibody (P<0.05), while the optimized antibodies 7B1, 8C1 exhibited comparable or better protection than the parental 13-42 antibody (P<0.05). Differences in survival were calculated by the log rank test.

Taken together, these results show that the anti-PcrV antibodies disclosed herein can be employed to neutralize *P. aeruginosa* infection prophylactically in an immunodeficient mice acute pneumonia model.

Example 7: Optimized Anti-PcrV Antibodies as Therapeutic Treatment for *P. aeruginosa* Infection The ability of the optimized anti-PcrV antibodies in neutralizing *P. aeruginosa* infection therapeutically was demonstrated with survival improvement in a mouse pneumonia model.

Survival Improvement in Mouse Pneumonia Model by Optimized Anti-PcrV Antibodies

The ability of the optimized anti-PcrV antibodies 7C1, 7B1, 8C1 and 6D10 to improve survival for mouse acute pneumonia model was evaluated in comparison to positive control V2L2-MD. HIV-10E8 was used as negative control.

In a therapeutic model, to induce acute pneumonia, 7-8 week old BALB/c mice (Vital River Laboratory) were intranasally inoculated with *P. aeruginosa* (PA103 strain) suspended in a 40 µl inoculum at a lethal dose ($1*LD90=8\times10^5$ CFU). Antibodies or PBS were administered intravenously (i.v.) at 1 h post-infection, at a dose of 1 mg/kg or 10 mg/kg mouse weight. Mouse survival was recorded for up to 6 days post-infection.

Figure 11A:
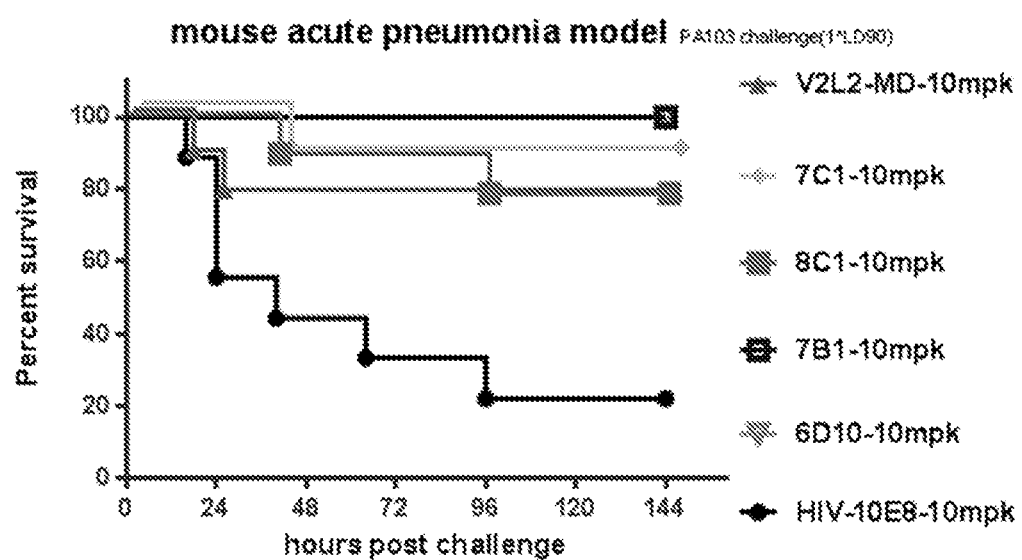
FIGS. 11A and 11B shows the ability of lead optimized antibodies 7B1, 7C1, 8C1 and 6D10 to improve survival therapeutically in a mouse acute pneumonia model, as compared to reference antibody V2L2-MD.
Figure 11B:
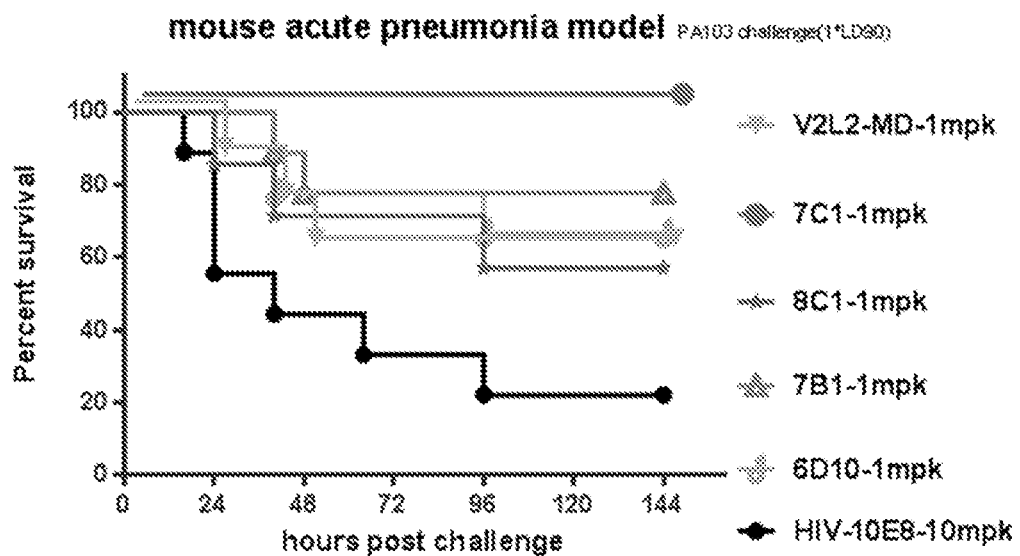

As shown in FIG. 11A-11B, at the lethal dose ($1*LD_{90}$) of *P. aeruginosa* inoculation, all anti-PcrV antibodies exhibited significant survival improvement compared to negative control (p<0.05). Also, the optimized antibodies 7C1, 7B1, 8C1 and 6D10 displayed survival improvement comparable to that of V2L2-MD. Differences in survival were calculated by the log rank test. The results show that the anti-PcrV antibodies disclosed herein can be employed to neutralize *P. aeruginosa* infection therapeutically.

Example 8: Combination Treatment of *P. aeruginosa* Infection Using Optimized Anti-PcrV Antibodies and Antibiotics Survival Improvement in Mouse Intraperitoneal Infection Model by Anti-PcrV Antibodies in Combination with Antibiotics The ability of the optimized anti-PcrV antibody 7B1 or 8C1 to improve survival in mouse intraperitoneal infection model was evaluated in comparison to antibiotics Meropenem, Tobramycin, Ciprofloxacin; and also in comparison to combination treatment of 7B1 or 8C1 with either antibiotic. HIV-10E8 was used as negative control.

In a prophylactic model for anti-PcrV testing, 7-8 week old BALB/c mice (Vital River Laboratory) were intraperitoneally injected with antibody 24h before infection or with antibiotic 1h post infection. Specifically, the mice were administered with either optimized anti-PcrV antibody clone 7B1 or 8C1 (at 5 mg/kg), Meropenem (at 3 mg/kg), Tobramycin (at 10 mg/kg), Ciprofloxacin (at 30 mg/kg), or a combination of 7B1 or 8C1 with one of the antibiotics. To induce intraperitoneal infection, the BALB/c mice were intraperitoneally inoculated with *P. aeruginosa* (PA103 strain) suspended in a 300 µl inoculum at triple the lethal dose ($3*LD90=7\times10^5$ CFU). Mouse survival was recorded for up to 5 days post-infection.

Figure 12A:
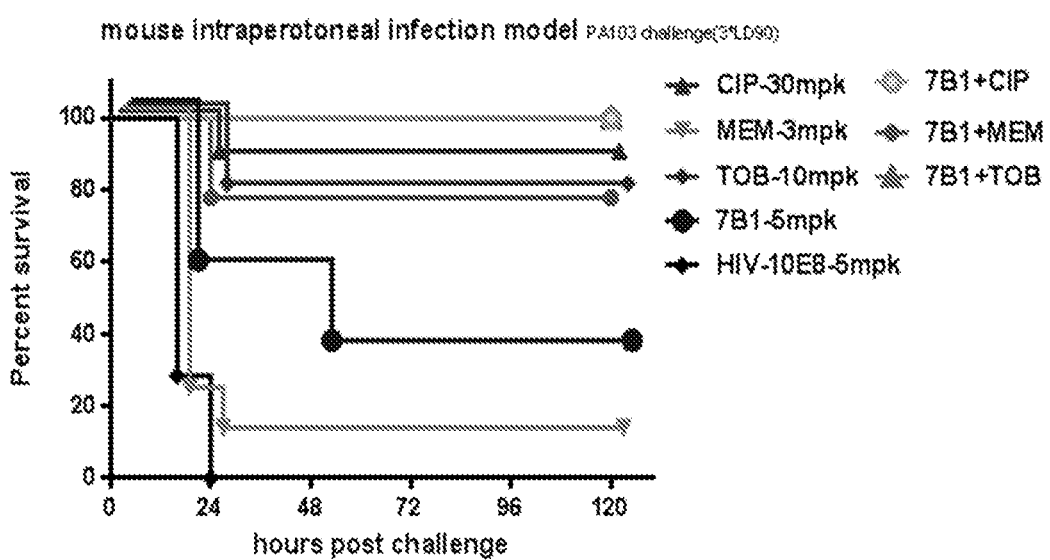
FIGS. 12A and 12B show the ability of lead optimized antibodies 7B1 and 8C1 to improve survival prophylactically in a mouse intraperitoneal infection model, alone or when combined with antibiotics Meropenem (MEM), Tobramycin (TOB), or Ciprofloxacin (CIP).
Figure 12B:
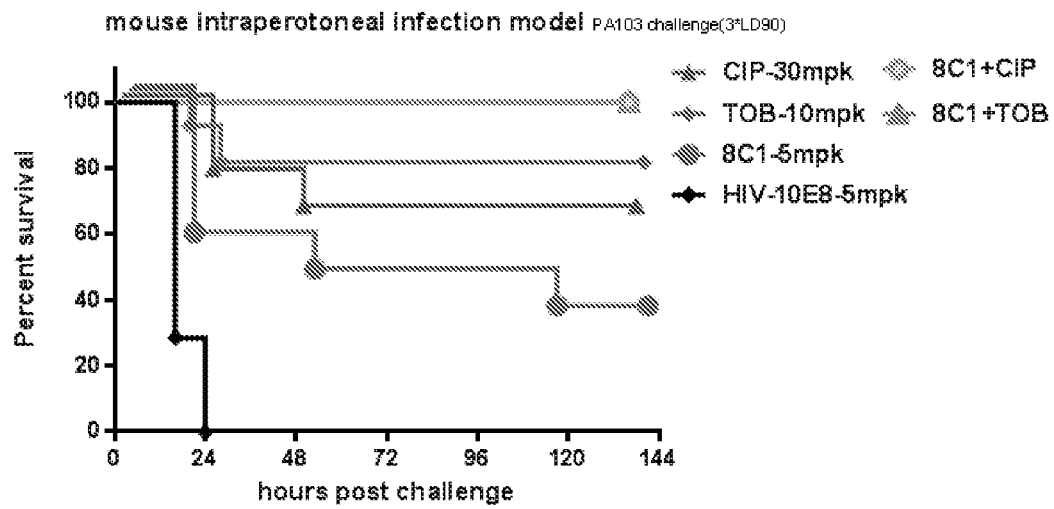

As shown in FIG. 12A, at the lethal dose of $3*LD_{90}$ of *P. aeruginosa* (PA103 stain) inoculation, the optimized antibodies 7B1 (at 5 mg/kg) exhibited better or comparable survival improvement as antibiotics Meropenem (at 3 mg/kg). The combination of 7B1 (at 5 mg/kg) with antibiotics Meropenem (at 3 mg/kg), Tobramycin (at 10 mg/kg) or Ciprofloxacin (at 30 mg/kg) exhibited enhanced survival improvement as compared to either the antibody treatment alone or the respective antibiotics treatment alone (p<0.05). As shown in FIG. 12B, the combination of 8C1 (at 5 mg/kg) with antibiotics Tobramycin (at 10 mg/kg) or Ciprofloxacin (at 30 mg/kg) also exhibited enhanced survival improvement as compared to either the antibody treatment alone or the respective antibiotics treatment (p<0.05). These results here demonstrate the clinical potential of using the anti-PcrV antibodies disclosed herein combined with antibiotics in neutralizing *P. aeruginosa*.

Example 9: Pharmacokinetic Profile of Optimized Anti-PcrV Antibodies

To investigate the in vivo pharmacokinetics of the parental 13-42 anti-PcrV antibody as well as the optimized clones, the plasma levels of 7C1, 7B1, 8C1 and 6D10 antibodies in rat were measured over time.

Pharmacokinetic profile in rat: 40 healthy adult rats (about 0.2 kg by weight) were equally into two groups, where each group registered similar average weight. One group was injected intravenously with 30 mg/kg of V2L2-MD, 7C1, 7B1, 8C1 or 6D10 and the other group was injected intravenously with 3 mg/kg of V2L2-MD, 7C1, 7B1, 8C1 or 6D10. Blood was collected at one hour after injection, and subsequently at 0 hour, 0.5 hour, 2 hour, 8 hour, 1 day, 3 days, 7 days, 11 days, 17 days, 23 days, 31 days, 41 days and 52 days after injection. After centrifugation, the plasma was used for analyzing antibody concentration using ELISA. For the ELISA experiment, synthetic PcrV was used to coat the wells of a 96-well plate. On the following day, after washing with PBST, blocking with 200 μL PBS-milk for an hour, and another wash with PBST, the plasma was added and incubated for an hour at 37° C. The plate was washed with 0.1% TBST for 6 times before 100 μL of Goat-anti-human Fc antibody-AP (1:3000 in PBS) was added to each well and incubated for an hour. After washing with 0.1% TBST for 6 times, 50 μL of pNPP was added to each well and color was developed for 10-20 minutes at 37° C. The signals were read by a microplate reader at 410 nm.

Figure 13A:
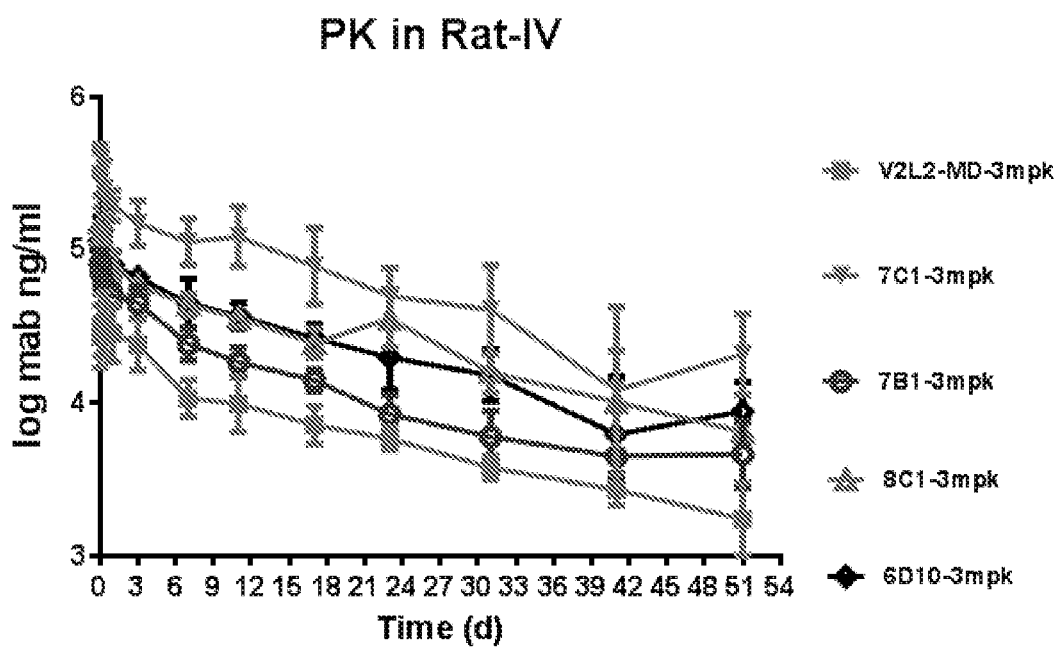
FIGS. 13A and 13B shows the pharmacokinetic profiles in rat for optimized antibody 7B1, 7C1, 8C1, 6D10 and reference antibody V2L2-MD, when administered intravenously at 3 mg/kg and 30 mg/kg doses, respectively.
Figure 13B:
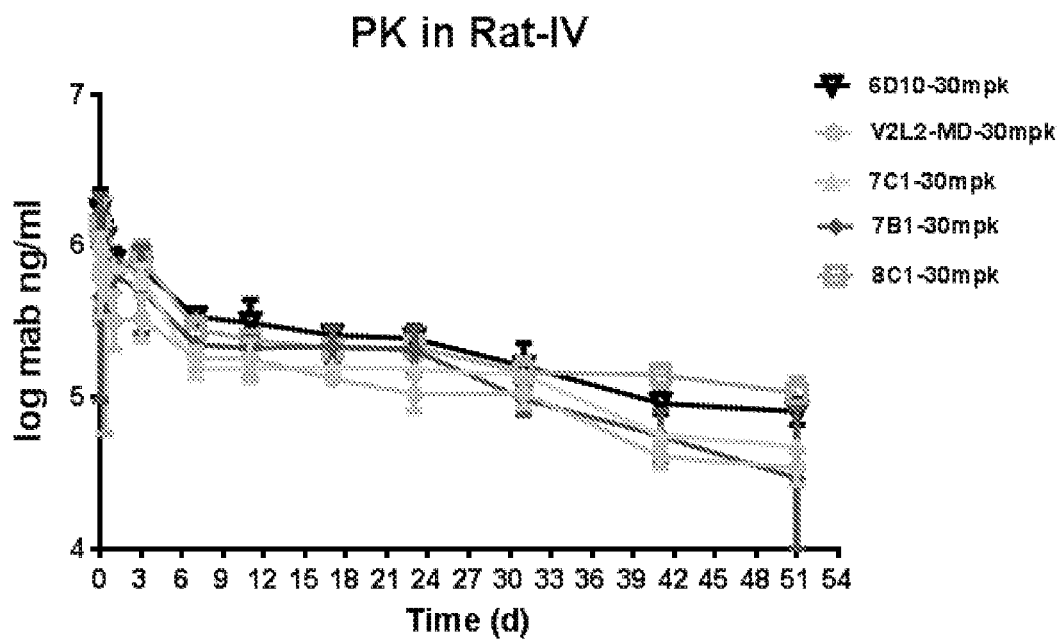

As shown in FIGS. 13A and 13B, the half-lives of 7C1, 7B1, 8C1 or 6D10 at both high and low i.v. dosages (3 mg/kg or 30 mg/kg) were comparable to or longer than that of reference antibody V2L2-MD, indicating that the optimized antibodies displayed more stable pharmacokinetic profiles at various doses as compared to the reference antibody V2L2-MD.

Example 10: Epitope Recognized by Optimized Antibodies

To characterize the epitope bound by the anti-PcrV antibodies, mutations were introduced in the PcrV protein, and the ability of the optimized antibody 7B1 mAb to bind these PcrV mutants was measured by ELISA.

Epitope Mapping of Anti-PcrV Antibodies

Figure 14A:
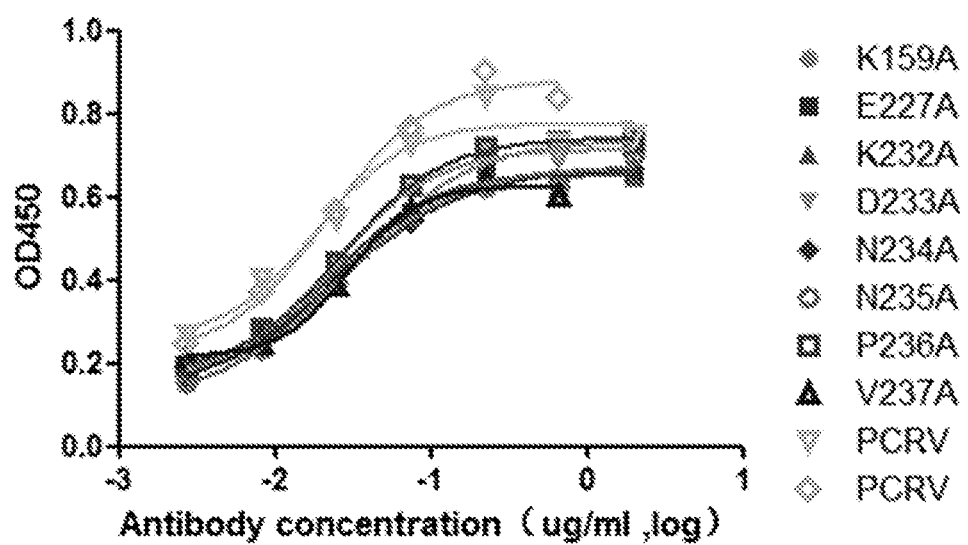
FIGS. 14A to 14D show the binding affinity of optimized antibody 7B1 for wild type PcrV and PcrV with mutations at exemplary amino acid residues, as measured by ELISA.
Figure 14B:
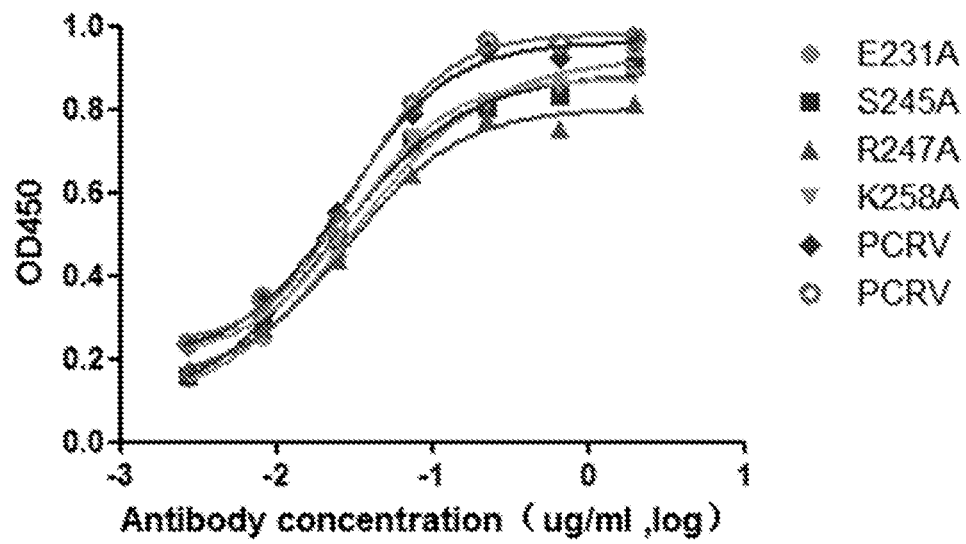
Figure 14C:
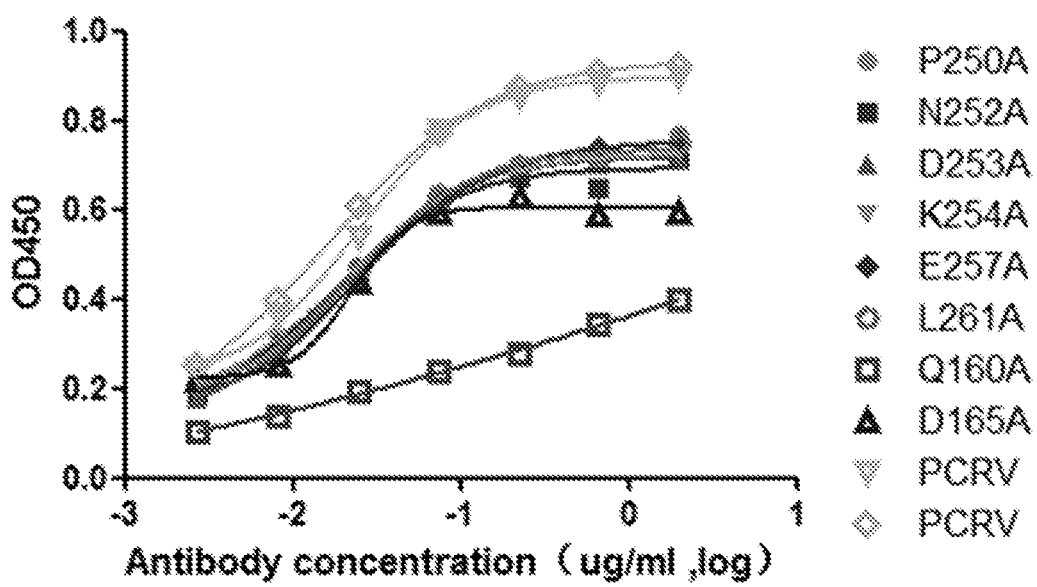
Figure 14D:
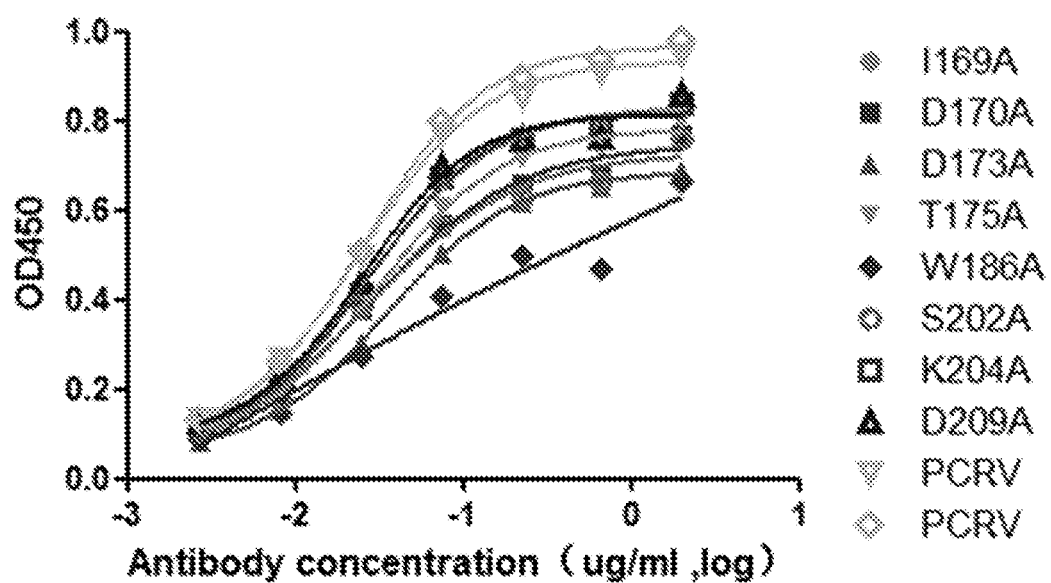

Using the discovery studio software, the predicted binding sites on PcrV for 7B1 and the optimized antibodies were identified, and the amino acid residues within the binding sites and in proximity to the binding sites were selected and subjected to alanine scanning. Subsequently, PcrV proteins carrying these selected mutations were expressed. The binding affinity of 7B1-IgG1 for each mutated PcrV protein was analyzed using ELISA. FIGS. 14A-14D show the ELISA binding curves of the antibodies for mutated PcrV, where mutation positions were according to sequence of SEQ ID NO: 71. As used herein, PcrV represents a His-tagged wild-type *P. aeruginosa* PcrV (PcrV-6His). Mutations at various positions of the amino acid sequence of the wild type PcrV were generated using alanine scanning as described above. As shown in FIGS. 14A-14D, a mutation at position Q160 significantly affected binding by 7B1-IgG1 (FIG. 14C). In contrast, mutation of Q160 in PcrV does not affect binding by reference antibody V2L2-MD (data not shown). A mutation at position D165 also affected binding by 7B1-IgG1 (FIG. 14C). In addition, mutations at each of positions D170, D173, T175 and S202 affected binding by 7B1-IgG1 (FIG. 14D). Based on these results, exemplary epitopes of the 7B1-IgG1 antibodies were identified as comprising amino acid residues Gln160, Asp165, Asp170, Asp173, Thr175, and Ser202, according to SEQ ID NO: 71.

The invention claimed is:

1. An isolated anti-PcrV antibody comprising:
   (i) a VH comprising an HC-CDR1 comprising the amino acid sequence of SEQ ID NO: 2, an HC-CDR2 comprising the amino acid sequence of SEQ ID NO: 10, and an HC-CDR3 comprising the amino acid sequence of SEQ ID NO: 16; and a VL comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35;
   (ii) a VH comprising an HC-CDR1 comprising the amino acid sequence of SEQ ID NO: 1, an HC-CDR2 comprising the amino acid sequence of SEQ ID NO: 9, and an HC-CDR3 comprising the amino acid sequence of SEQ ID NO: 17; and a VL comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 36;
   (iii) a VH comprising an HC-CDR1 comprising the amino acid sequence of SEQ ID NO: 3, an HC-CDR2 comprising the amino acid sequence of SEQ ID NO: 10, and an HC-CDR3 comprising the amino acid sequence of SEQ ID NO: 18; and a VL comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37;
   (iv) a VH comprising an HC-CDR1 comprising the amino acid sequence of SEQ ID NO: 3, an HC-CDR2 comprising the amino acid sequence of SEQ ID NO: 10, and an HC-CDR3 comprising the amino acid sequence of SEQ ID NO: 19; and a VL comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO:35;
   (v) a VH comprising an HC-CDR1 comprising the amino acid sequence of SEQ ID NO: 3, an HC-CDR2 comprising the amino acid sequence of SEQ ID NO: 11, and an HC-CDR3 comprising the amino acid sequence of SEQ ID NO: 20; and a VL comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35;

(vi) a VH comprising an HC-CDR1 comprising the amino acid sequence of SEQ ID NO: 6, an HC-CDR2 comprising the amino acid sequence of SEQ ID NO: 10, and an HC-CDR3 comprising the amino acid sequence of SEQ ID NO: 23; and a VL comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37;

(vii) a VH comprising an HC-CDR1 comprising the amino acid sequence of SEQ ID NO: 2, an HC-CDR2 comprising the amino acid sequence of SEQ ID NO: 10, and an HC-CDR3 comprising the amino acid sequence of SEQ ID NO: 25; and a VL comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37;

(viii) a VH comprising an HC-CDR1 comprising the amino acid sequence of SEQ ID NO: 1, an HC-CDR2 comprising the amino acid sequence of SEQ ID NO: 9, and an HC-CDR3 comprising the amino acid sequence of SEQ ID NO: 26; and a VL comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35;

(ix) a VH comprising an HC-CDR1 comprising the amino acid sequence of SEQ ID NO: 3, an HC-CDR2 comprising the amino acid sequence of SEQ ID NO: 10, and an HC-CDR3 comprising the amino acid sequence of SEQ ID NO: 27; and a VL comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35;

(x) a VH comprising an HC-CDR1 comprising the amino acid sequence of SEQ ID NO: 1, an HC-CDR2 comprising the amino acid sequence of SEQ ID NO: 10, and an HC-CDR3 comprising the amino acid sequence of SEQ ID NO: 28; and a VL comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35;

(xi) a VH comprising an HC-CDR1 comprising the amino acid sequence of SEQ ID NO: 7, an HC-CDR2 comprising the amino acid sequence of SEQ ID NO: 13, and an HC-CDR3 comprising the amino acid sequence of SEQ ID NO: 29; and a VL comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 37;

(xii) a VH comprising an HC-CDR1 comprising the amino acid sequence of SEQ ID NO: 1, an HC-CDR2 comprising the amino acid sequence of SEQ ID NO: 10, and an HC-CDR3 comprising the amino acid sequence of SEQ ID NO: 30; and a VL comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 35;

(xiii) a VH comprising an HC-CDR1 comprising the amino acid sequence of SEQ ID NO: 8, an HC-CDR2 comprising the amino acid sequence of SEQ ID NO: 14, and an HC-CDR3 comprising the amino acid sequence of SEQ ID NO: 31; and a VL comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO:37; or (xiv) a VH comprising an HC-CDR1 comprising the amino acid sequence of SEQ ID NO: 7, an HC-CDR2 comprising the amino acid sequence of SEQ ID NO: 13, and an HC-CDR3 comprising the amino acid sequence of SEQ ID NO: 29; and a VL comprising an LC-CDR1 comprising the amino acid sequence of SEQ ID NO: 32, an LC-CDR2 comprising the amino acid sequence of SEQ ID NO: 34, and an LC-CDR3 comprising the amino acid sequence of SEQ ID NO: 38".

2. The isolated anti-PcrV antibody of claim 1, comprising:

(i) a $V_H$ comprising the amino acid sequence of SEQ ID NO: 49 or a variant thereof having at least about 90% sequence identity to the amino acid sequence of SEQ ID NO: 49; and a $V_L$ comprising the amino acid sequence of SEQ ID NO: 65 or a variant thereof having at least about 90% sequence identity to the amino acid sequence of SEQ ID NO: 65;

(ii) a $V_H$ comprising the amino acid sequence of SEQ ID NO: 50 or a variant thereof having at least about 90% sequence identity to the amino acid sequence of SEQ ID NO: 50; and a $V_L$ comprising the amino acid sequence of SEQ ID NO: 66 or a variant thereof having at least about 90% sequence identity to the amino acid sequence of SEQ ID NO: 66;

(iii) a $V_H$ comprising the amino acid sequence of SEQ ID NO: 51 or a variant thereof having at least about 90% sequence identity to the amino acid sequence of SEQ ID NO: 51; and a $V_L$ comprising the amino acid sequence of SEQ ID NO: 67 or a variant thereof having at least about 90% sequence identity to the amino acid sequence of SEQ ID NO: 67;

(iv) a $V_H$ comprising the amino acid sequence of SEQ ID NO: 52 or a variant thereof having at least about 90% sequence identity to the amino acid sequence of SEQ ID NO: 52; and a $V_L$ comprising the amino acid sequence of SEQ ID NO: 65 or a variant thereof having at least about 90% sequence identity to the amino acid sequence of SEQ ID NO: 65;

(v) a $V_H$ comprising the amino acid sequence of SEQ ID NO: 53 or a variant thereof having at least about 90% sequence identity to the amino acid sequence of SEQ ID NO: 53; and a $V_L$ comprising the amino acid sequence of SEQ ID NO: 65 or a variant thereof having at least about 90% sequence identity to the amino acid sequence of SEQ ID NO: 65;

(vii) a Vu comprising the amino acid sequence of SEQ ID NO: 54 or a variant thereof having at least about 90% sequence identity to the amino acid sequence of SEQ ID NO: 54; and a $V_L$ comprising the amino acid sequence of SEQ ID NO: 65 or a variant thereof having at least about 90% sequence identity to the amino acid sequence of SEQ ID NO: 65;

(vi) a $V_H$ comprising the amino acid sequence of SEQ ID NO: 56 or a variant thereof having at least about 90% sequence identity to the amino acid sequence of SEQ ID NO: 56; and a $V_L$ comprising the amino acid sequence of SEQ ID NO: 67 or a variant thereof having at least about 90% sequence identity to the amino acid sequence of SEQ ID NO: 67;

(vii) a $V_H$ comprising the amino acid sequence of SEQ ID NO: 58 or a variant thereof having at least about 90% sequence identity to the amino acid sequence of SEQ ID NO: 58; and a $V_L$ comprising the amino acid sequence of SEQ ID NO: 69 or a variant thereof having at least about 90% sequence identity to the amino acid sequence of SEQ ID NO: 69;

(viii) a $V_H$ comprising the amino acid sequence of SEQ ID NO: 59 or a variant thereof having at least about 90% sequence identity to the amino acid sequence of SEQ ID NO: 59; and a $V_L$ comprising the amino acid sequence of SEQ ID NO: 65 or a variant thereof having at least about 90% sequence identity to the amino acid sequence of SEQ ID NO: 65;

(ix) a $V_H$ comprising the amino acid sequence of SEQ ID NO: 60 or a variant thereof having at least about 90% sequence identity to the amino acid sequence of SEQ ID NO: 60;

and a $V_L$ comprising the amino acid sequence of SEQ ID NO: 65 or a variant thereof having at least about 90% sequence identity to the amino acid sequence of SEQ ID NO: 65;

(x) a $V_H$ comprising the amino acid sequence of SEQ ID NO: 61 or a variant thereof having at least about 90% sequence identity to the amino acid sequence of SEQ ID NO: 61; and a $V_L$ comprising the amino acid sequence of SEQ ID NO: 65 or a variant thereof having at least about 90% sequence identity to the amino acid sequence of SEQ ID NO: 65;

(xi) a $V_H$ comprising the amino acid sequence of SEQ ID NO: 62 or a variant thereof having at least about 90% sequence identity to the amino acid sequence of SEQ ID NO: 62; and a $V_L$ comprising the amino acid sequence of SEQ ID NO: 67 or a variant thereof having at least about 90% sequence identity to the amino acid sequence of SEQ ID NO: 67;

(xii) a $V_H$ comprising the amino acid sequence of SEQ ID NO: 63 or a variant thereof having at least about 90% sequence identity to the amino acid sequence of SEQ ID NO: 63; and a $V_L$ comprising the amino acid sequence of SEQ ID NO: 65 or a variant thereof having at least about 90% sequence identity to the amino acid sequence of SEQ ID NO: 65;

(xiii) a $V_H$ comprising the amino acid sequence of SEQ ID NO: 64 or a variant thereof having at least about 90% sequence identity to the amino acid sequence of SEQ ID NO: 64; and a $V_L$ comprising the amino acid sequence of SEQ ID NO: 67 or a variant thereof having at least about 90% sequence identity to the amino acid sequence of SEQ ID NO: 67; or (xiv) a $V_H$ comprising the amino acid sequence of SEQ ID NO: 62 or a variant thereof having at least about 90% sequence identity to the amino acid sequence of SEQ ID NO: 62; and a $V_L$ comprising the amino acid sequence of SEQ ID NO: 70 or a variant thereof having at least about 90% sequence identity to the amino acid sequence of SEQ ID NO: 70.

3. The isolated anti-PcrV antibody according to claim 1, wherein: (i) the anti-PcrV antibody comprises an Fc fragment; and/or (ii) the anti-PcrV antibody is chimeric, human, or humanized; and/or (iii) the anti-PcrV antibody binds to the *Pseudomonas* PcrV with a Kd from about 0.1 pM to about 1 nM.

4. The isolated anti-PcrV antibody of claim 3, wherein the anti-PcrV antibody is a full-length IgG antibody.

5. The isolated anti-PcrV antibody of claim 4, wherein the anti-PcrV antibody is a full-length IgG1 or IgG4 antibody.

6. The isolated anti-PcrV antibody according claim 1, wherein the anti-PcrV antibody is an antigen binding fragment selected from the group consisting of an Fab, an Fab', an F(ab)'2, an Fab'-SH, a single-chain Fv (scFv), an Fv fragment, a dAb, a Fd, or and a diabody.

7. An isolated nucleic acid molecule that encodes the isolated anti-PcrV antibody according to claim 1.

8. A vector comprising the nucleic acid molecule of claim 7.

9. An isolated host cell comprising the isolated anti-PcrV antibody of claim 1.

10. A method of producing an isolated anti-PcrV antibody, comprising:
a) culturing the host cell of claim 9 under conditions effective to express the anti-PcrV antibody; and
b) obtaining the expressed anti-PcrV antibody from the host cell.

11. A pharmaceutical composition comprising the anti-PcrV antibody according to claim 1, and a pharmaceutically acceptable carrier.

12. A method of treating a disease or condition in an individual in need thereof, comprising administering to the individual an effective amount of the pharmaceutical composition of claim 11.

* * * * *